(12) United States Patent
Wang et al.

(10) Patent No.: US 12,049,151 B2
(45) Date of Patent: Jul. 30, 2024

(54) MULTI-LEVEL BATTERY SYSTEMS FOR BATTERY-OPERATED ENTITIES, METHODS FOR RAPID CHARGE TRANSFER THEREBETWEEN, AND METHODS FOR OPTIMIZING ENTITY ROUTING AND NETWORK CHARGE DISTRIBUTION

(71) Applicant: University of Florida Research Foundation, Incorporated, Gainesville, FL (US)

(72) Inventors: Shuo Wang, Gainesville, FL (US); Swarup Bhunia, Gainesville, FL (US); Prabuddha Chakraborty, Gainesville, FL (US); Robert Parker, Gainesville, FL (US); Rohan Reddy Kalavakonda, Gainesville, FL (US)

(73) Assignee: UNIVERSITY OF FLORIDA RESEARCH FOUNDATION, INCORPORATED, Gainesville, FL (US)

( * ) Notice: Subject to any disclaimer, the term of this patent is extended or adjusted under 35 U.S.C. 154(b) by 638 days.

(21) Appl. No.: 17/193,469

(22) Filed: Mar. 5, 2021

(65) Prior Publication Data
US 2021/0284043 A1 Sep. 16, 2021

Related U.S. Application Data

(60) Provisional application No. 62/987,471, filed on Mar. 10, 2020.

(51) Int. Cl.
*H02J 7/00* (2006.01)
*B60L 53/62* (2019.01)
(Continued)

(52) U.S. Cl.
CPC ............... *B60L 53/68* (2019.02); *B60L 53/62* (2019.02); *B60L 53/66* (2019.02); *B60L 53/67* (2019.02); *B60L 58/20* (2019.02); *B60L 2240/72* (2013.01)

(58) Field of Classification Search
CPC .......... B60L 53/68; B60L 53/67; B60L 53/62; B60L 53/66; B60L 58/20; B60L 2240/72
(Continued)

(56) References Cited

U.S. PATENT DOCUMENTS

2011/0302078 A1* 12/2011 Failing .................. B60L 53/126
  700/297
2013/0175973 A1* 7/2013 Jones ........................ B60L 3/12
  320/105

(Continued)

*Primary Examiner* — Alexis B Pacheco
(74) *Attorney, Agent, or Firm* — ALSTON & BIRD LLP

(57) ABSTRACT

Apparatus, systems, and methods described herein relate generally to on-the-go entity-to-entity charging for multi-level battery-powered entities in transportation systems. A method can include determining charge levels, current positions, battery configuration, and transport speeds for an electric vehicle (EV), identifying one or more EVs in need of charging, and mobilizing a nearby EV for on-the-go peer-to-peer charging. A processor, with a memory including computer program code, can be configured to receive current charge level data for mobile battery-powered entities, identify one or more EVs to be charged and one or more other EVs that have excess charge to transfer, and send charging instructions to the EVs. A routing and charge transaction scheduling algorithm can be used to optimize the route of one or more battery-powered entities and to schedule charge transactions between EVs and/or a charging entity. A heuristic battery architecture compiler can be used to optimize battery architecture.

9 Claims, 53 Drawing Sheets

(51) Int. Cl.
  *B60L 53/66* (2019.01)
  *B60L 53/67* (2019.01)
  *B60L 53/68* (2019.01)
  *B60L 58/20* (2019.01)
  *H02J 7/14* (2006.01)

(58) Field of Classification Search
  USPC .......................................................... 320/134
  See application file for complete search history.

(56) References Cited

U.S. PATENT DOCUMENTS

| | | | |
|---|---|---|---|
| 2014/0197787 A1* | 7/2014 | Mashinsky | B60L 53/55 |
| | | | 320/108 |
| 2015/0094888 A1* | 4/2015 | Hyde | B60L 53/63 |
| | | | 701/22 |
| 2018/0105054 A1* | 4/2018 | Fan | H02J 50/80 |
| 2019/0165591 A1* | 5/2019 | Kisacikoglu | B60L 53/20 |
| 2019/0275894 A1* | 9/2019 | Amacker | H04L 9/3239 |
| 2020/0006988 A1* | 1/2020 | Leabman | A61B 8/56 |
| 2020/0262305 A1* | 8/2020 | Chakraborty | B60L 53/57 |
| 2021/0291692 A1* | 9/2021 | Masoud | H02J 50/10 |
| 2021/0296939 A1* | 9/2021 | Lu | B60L 53/66 |
| 2021/0323420 A1* | 10/2021 | Lu | H04L 63/123 |
| 2021/0347275 A1* | 11/2021 | Chakraborty | B60L 53/80 |

* cited by examiner

MULTI-LEVEL BATTERY SYSTEMS FOR BATTERY-OPERATED ENTITIES, METHODS FOR RAPID CHARGE TRANSFER THEREBETWEEN, AND METHODS FOR OPTIMIZING ENTITY ROUTING AND NETWORK CHARGE DISTRIBUTION

CROSS-REFERENCE TO RELATED APPLICATIONS

The present application claims priority to, and the benefit of, U.S. Provisional Application No. 62/987,471, filed Mar. 10, 2020 and entitled "Multi-Level Battery Systems For Battery-Operated Entities, Methods For Rapid Charge Transfer Therebetween, And Methods For Optimizing Entity Routing And Network Charge Distribution," the entire disclosures of which are hereby incorporated herein by reference in their entireties for all purposes.

TECHNICAL FIELD

The present application relates generally to transportation systems; more particularly to electrical charge distribution among battery-powered entities in transportation systems; and still more particularly to consideration of battery architecture for electrical charge distribution among battery-powered entities in transportation systems.

BACKGROUND

As transportation solutions are further developed that rely at least in part on mobile battery power, there remain many barriers to large-scale implementation of at least partially battery-powered entities. This application presents various solutions to some of the barriers, in response to a long-felt need in the industry.

SUMMARY

Apparatus, systems, and methods described herein relate generally to multi-level batteries, fast battery charging, and fast charge sharing between battery-operated entities. For example, according to a first embodiment, a power plant is provided, such as for an electric vehicle or other battery-powered entity. In some embodiments, the power plant can comprise one or more electrochemical cells having a first charge transfer rate; one or more other electrochemical cells having a second charge transfer rate different from the first charge transfer rate; and a charge transfer element in electrical communication with at least one of the one or more electrochemical cells or at least one of the one or more other electrochemical cells, the charge transfer element being configured to electrically couple the power plant of the electric vehicle to a power plant of another electric vehicle, whereby the charge transfer element can cause an electrical charge to be communicated into or out of the at least one of the one or more electrochemical cells or the at least one of the one or more other electrochemical cells of the electric vehicle. In some embodiments, the one or more other electrochemical cells can be electrically coupled to the one or more electrochemical cells. In some embodiments, the first charge transfer rate may be larger than the second charge transfer rate. In some embodiments, the charge transfer element may be configured to be in electrical communication with the at least one of the one or more electrochemical cells and the at least one of the one or more other electrochemical cells. In some embodiment, the charge transfer element may be configured to establish an electrical connection between the charge transfer element and another charge transfer element of the other electric vehicle. In some embodiment, the charge transfer element may be configured to select, based at least upon one or more characteristics of the power plant of the other electric vehicle, at least one of the one or more electrochemical cells or the at least one of the one or more other electrochemical cells to provide a replenishing supply of the electrical charge to the power plant of the another electric vehicle. In some embodiment, the charge transfer element may be configured to establish or cause establishment of an electrical communication between the selected at least one electrochemical cell of the electric vehicle and the charge transfer element. In some embodiments, the charge transfer element is configured to cause the replenishing supply of the electrical charge to be communicated from the selected at least one electrochemical cell, through the charge transfer element, to another charge transfer element of the another electric vehicle. In some embodiments, the power plant of the electric vehicle is configured to cause a further replenishing supply of the electrical charge to be communicated from a non-selected at least one electrochemical cell, through the selected at least one electrochemical cell, through the charge transfer element, and to the other charge transfer element of the other electric vehicle. In some embodiments, the power plant may further comprise: a battery management system configured to monitor a charge level in the one or more electrochemical cells and the one or more other electrochemical cells, and cause communication of the electrical charge into or out of at least one of the one or more electrochemical cells, at least one of the one or more other electrochemical cells, the power plant of the another electric vehicle, an external charge source, and/or a powertrain of the electric vehicle.

According to a second embodiment, a method can be carried out, or caused to be carried out, for charging to or discharging from a power plant, such as a power plant of an electric vehicle. In some embodiments, the power plant can comprise: at least one first electrochemical cell having a first charge transfer rate, at least one second electrochemical cell electrically coupled to the at least one first electrochemical cell, the at least one second electrochemical cell having a second charge transfer rate less than the first charge transfer rate, and a charge transfer element electrically coupled to the at least one first electrochemical cell, the first charge transfer element being configured to select one of the at least one first electrochemical cell or the at least one second electrochemical cell into which to communicate an electrical charge or from which to discharge the electrical charge. In some embodiments, the method can comprise: establishing an electrical connection between the charge transfer element and a other charge transfer element of a charge providing entity; selecting, based at least in part upon a charge rate of the charge providing entity, from among the at least one first electrochemical cell and the at least one second electrochemical cell, at least one electrochemical cell for receiving the electric charge from the charge providing entity; and communicating or causing communication of a replenishing supply of the electrical charge from the charge providing entity, through the other charge transfer element, through the charge transfer element, and into the at least one electrochemical cell of the electric vehicle. In some embodiments, the at least one first electrochemical cells are electrically coupled to the at least one second electrochemical cells. In some embodiments, the method can further comprise: determining a charge transfer rate of the charge providing entity; and determining a charge level of the at least one first electrochemical cell and a charge level of the at least one second electrochemical cell. In some embodiments, said selecting may be selecting based at least upon one or more of: a destination and a route of the electric vehicle, a destination and a route of the charge providing entity, in an instance in which the charge providing entity is configured for mobile charge transfer, a discharge rate to the electric vehicle during operation, the charge level of the at least one first electrochemical cell and the at least one second electrochemical cell, the first and second charge transfer rates, the charge transfer rate of the charge providing entity, and/or a maximum time for which the charge transfer element and the other charge transfer element are able to be electrically coupled.

According to a third embodiment, a method can be carried out for managing charge distribution in a transportation system. In some embodiments, the method can comprise: receiving, from a plurality of mobile battery-powered entities, battery configuration information, battery charge level information, a current location, a current speed, and a destination; generating, based at least upon the battery charge level, the current location, the current speed, and the destination of the plurality of mobile battery-powered entities, a charge distribution map; designating, based at least upon the current battery charge level and the battery configuration information, one or more mobile battery-powered entities of the plurality of mobile battery-powered entities as charge donors; designating, based at least upon the current battery charge level and the battery configuration information, one or more other mobile battery-powered entities of the plurality of mobile battery-powered entities as charge recipients; determining an optimal route for each of the plurality of mobile battery-powered entities; and generating, based at least upon the optimal route for the plurality of mobile battery-powered entities, the designated charge recipients and the battery configuration information, charge transfer instructions for one or more of the charge donors and/or the charge recipients. In some embodiments, said charge transfer instructions comprise one or more of a current position of the corresponding mobile battery-powered entity, a current charge level for the corresponding mobile battery-powered entity, a charge capacity for the corresponding mobile battery-powered entity, a charge transfer rate capacity for the corresponding mobile battery-powered entity, charging cable configurational information for the corresponding mobile battery-powered entity, transport speed information for the corresponding mobile battery-powered entity, pre-determined route information for the corresponding mobile battery-powered entity, a destination for the corresponding mobile battery-powered entity, vehicle identification information for the corresponding mobile battery-powered entity, or charge transfer payment information for the corresponding mobile battery-powered entity. In some embodiments, the method can further comprise: identifying, based at least upon the charge distribution map, one or more charge deficient regions; and causing deployment of at least one charging vehicle or a mobile charging station. In some embodiments, each of the plurality of mobile battery-powered entities is selected from among battery-powered terrestrial vehicles, battery-powered aerial vehicles, battery-powered aquatic vehicles, charge relay vehicles, mobile charging stations, and charge storage vehicles. In some embodiments, the method can further comprise: receiving, from the plurality of mobile battery-powered entities, updated battery configuration information, updated battery charge level information, an updated current location, an updated current speed, and an updated destination; and updating the charge distribution map.

According to a fourth embodiment, an apparatus can be provided that comprises: at least one processor and at least one memory including computer program code, the at least one memory and the computer program code configured to, with the processor, cause the apparatus to at least: receive, from a plurality of mobile battery-powered entities, battery configuration information, battery charge level information, a current location, a current speed, and a destination; generate, based at least upon the battery charge level, the current location, the current speed, and the destination of the plurality of mobile battery-powered entities, a charge distribution map; designate, based at least upon the current battery charge level and the battery configuration information, one or more mobile battery-powered entities of the plurality of mobile battery-powered entities as charge donors; designate, based at least upon the current battery charge level and the battery configuration information, one or more other mobile battery-powered entities of the plurality of mobile battery-powered entities as charge recipients; determine an optimal route for each of the plurality of mobile battery-powered entities; and generate, based at least upon the optimal route for the plurality of mobile battery-powered entities, the designated charge recipients and the battery configuration information, charge transfer instructions for one or more of the charge donors and/or the charge recipients. In some embodiments, the at least one memory and the computer program code are configured to, with the processor, cause the apparatus to at least: transmit the route instructions and speed instructions to one or more mobile battery-powered entities of the plurality of mobile battery-powered entities; determine whether the one or more mobile battery-powered entities have complied with the route instructions and the speed instructions; and, in an instance in which the one or more mobile battery-powered entities have complied with the route instructions and the speed instructions, transmit the charge transfer instructions to the one or more mobile battery-powered entities. In some embodiments, the at least one memory and the computer program code are configured to, with the processor, cause the apparatus to at least: identify, based at least upon at least the charge distribution map, one or more charge deficient regions within the charge distribution map; and, in an instance in which one or more charge deficient regions exist, transmit deployment instructions and charge replenishment instructions to one or more charging vehicles or mobile charging stations.

According to a fifth embodiment, a multi-level battery system can be provided that comprises one or more electrochemical cells having a first charge transfer rate; one or more other electrochemical cells having a second charge transfer rate different from the first charge transfer rate; and a charge transfer element in electrical communication with at least one of the one or more electrochemical cells or at least one of the one or more other electrochemical cells, the charge transfer element being configured to electrically couple the power plant of the electric vehicle to a power plant of another electric vehicle, whereby the charge transfer element can cause an electrical charge to be communicated into or out of the at least one of the one or more electrochemical cells or the at least one of the one or more other electrochemical cells of the electric vehicle while the electric vehicle is moving. In some embodiments, the one or more other electrochemical cells are electrically coupled to the one or more electrochemical cells. In some embodiments, the first charge transfer rate is larger than the second charge transfer rate. In some embodiments, the charge transfer element is configured to be in electrical communication with the at least one of the one or more electrochemical cells and the at least one of the one or more other electrochemical cells. In some embodiments, the charge transfer element is further configured to: establish or cause establishment of an electrical connection between the charge transfer element and another charge transfer element of the other electric vehicle, select, based at least upon one or more characteristics of the power plant of the other electric vehicle, the at least one of the one or more electrochemical cells or the at least one of the one or more other electrochemical cells, and establish electrical communication between the selected at least one electrochemical cell of the electric vehicle and the charge transfer element. In some embodiments, the charge transfer element is configured to cause a replenishing supply of the electrical charge to be communicated from the selected at least one electrochemical cell, through the charge transfer element, to another charge transfer element of the other electric vehicle. In some embodiments, the multi-level battery system of the electric vehicle is configured to cause a further replenishing supply of the electrical charge to be communicated from a non-selected at least one electrochemical cell, through the selected at least one electrochemical cell, through the charge transfer element, and to the other charge transfer element of the other electric vehicle.

According to a sixth embodiment, a method can be provided for mobile charging between electric vehicles while the electric vehicles travel along a route, the method comprising: providing a first electric vehicle comprising: at least one first electrochemical cell having a first charge transfer rate, at least one second electrochemical cell having a second charge transfer rate less than the first charge transfer rate, and a first charge transfer element configured to select one of the at least one first electrochemical cell or the at least one second electrochemical cell into which to charge electrical charge or from which to discharge electrical charge; the method further comprising: establishing an electrical connection between the first charge transfer element and a second charge transfer element of a second electric vehicle; selecting, based at least in part upon a charge rate of at least one third electrochemical cell of the second electric vehicle, from among the at least one first electrochemical cell and the at least one second electrochemical cell, at least one electrochemical cell; in an instance in which the first electric vehicle is being charged by the second electric vehicle, causing communication of a replenishing supply of the electrical charge from the third electrochemical cell of the second electric vehicle, through the second charge transfer element, through the first charge transfer element, and into the at least one electrochemical cell of the first electric vehicle; and, in an instance in which the second electric vehicle is being charged by the first electric vehicle, causing communication of the replenishing supply of the electrical charge from the at least one electrochemical cell of the first electric vehicle, through the first charge transfer element, through the second charge transfer element, and into the third electrochemical cell of the second electric vehicle. In some embodiments, the method can further comprise receiving charge transfer instructions comprising an indication of a vehicle identification, a current speed, a current location, and a current overall charge level of the second electric vehicle, the charge transfer instructions further comprising an indication of the third charge transfer rate for the third electrochemical cell of the second electric vehicle. In some embodiments, the at least one first electrochemical cells are electrically coupled to the at least one second electrochemical cells, and the method can further comprise: in an instance in which the charge transfer instructions indicate the first electric vehicle is to charge the second electric vehicle while the electric vehicles travel along the route, said selecting comprises selecting the at least one first electrochemical cell as the at least one electrochemical cell, and a first charge level of the at least one first electrochemical cell is less than a second charge level of the at least one second electrochemical cell, causing communication of the replenishing supply of the electrical charge from the at least one second electrochemical cell into the at least one first electrochemical cell before communicating the replenishing supply of electrical charge from the at least one first electrochemical cell, through the first and second charge transfer elements, and into the third electrochemical cell of the second electric vehicle. In some embodiments, the at least one first electrochemical cells are electrically coupled to the at least one second electrochemical cells, and the method can further comprise: in an instance in which the charge transfer instructions indicate the first electric vehicle is to be charged by the second electric vehicle while the electric vehicles travel along the route, said selecting comprises selecting the at least one first electrochemical cell as the at least one electrochemical cell, and a first charge level of the at least one first electrochemical cell is greater than a second charge level of the at least one second electrochemical cell, causing communication of an initial supply of the electrical charge from the first electrochemical cell to the second electrochemical cell before receiving the replenishing supply of the electrical charge from the at least one third electrochemical cell of the second vehicle, through the first and second charge transfer elements, and into the first electrochemical cell of the first electric vehicle.

According to a seventh embodiment, a method can be provided for mobile charging between electric vehicles while the electric vehicles travel along a route, the method comprising: providing a first electric vehicle comprising: at least one first electrochemical cell having a first charge transfer rate, at least one second electrochemical cell having a second charge transfer rate less than the first charge transfer rate, and a first charge transfer element configured to select one of the at least one first electrochemical cell or the at least one second electrochemical cell into which to charge electrical charge or from which to discharge electrical charge; the method further comprising: establishing an electrical connection between the first charge transfer element and a second charge transfer element of a second electric vehicle; selecting, based at least in part upon a charge rate of at least one third electrochemical cell of the second electric vehicle, from among the at least one first electrochemical cell and the at least one second electrochemical cell, at least one electrochemical cell; in an instance in which the first electric vehicle is being charged by the second electric vehicle, causing communication of a replenishing supply of the electrical charge from the third electrochemical cell of the second electric vehicle, through the second charge transfer element, through the first charge transfer element, and into the at least one electrochemical cell of the first electric vehicle; and, in an instance in which the second electric vehicle is being charged by the first electric vehicle, causing communication of the replenishing supply of the electrical charge from the at least one electrochemical cell of the first electric vehicle, through the first charge transfer element, through the second charge transfer element, and into the third electrochemical cell of the second electric vehicle. In some embodiments, the method can further comprise: receiving charge transfer instructions comprising an indication of a vehicle identification, a current speed, a current location, and a current overall charge level of the second electric vehicle, the charge transfer instructions further comprising an indication of the third charge transfer rate for the third electrochemical cell of the second electric vehicle. In some embodiments, the at least one first electrochemical cells are electrically coupled to the at least one second electrochemical cells, and the method can further comprise: in an instance in which the charge transfer instructions indicate the first electric vehicle is to charge the second electric vehicle while the electric vehicles travel along the route, said selecting comprises selecting the at least one first electrochemical cell as the at least one electrochemical cell, and a first charge level of the at least one first electrochemical cell is less than a second charge level of the at least one second electrochemical cell, causing communication of the replenishing supply of the electrical charge from the at least one second electrochemical cell into the at least one first electrochemical cell before communicating the replenishing supply of electrical charge from the at least one first electrochemical cell, through the first and second charge transfer elements, and into the third electrochemical cell of the second electric vehicle. In some embodiments, the at least one first electrochemical cells are electrically coupled to the at least one second electrochemical cells, and the method can further comprise: in an instance in which the charge transfer instructions indicate the first electric vehicle is to be charged by the second electric vehicle while the electric vehicles travel along the route, said selecting comprises selecting the at least one first electrochemical cell as the at least one electrochemical cell, and a first charge level of the at least one first electrochemical cell is greater than a second charge level of the at least one second electrochemical cell, causing communication of an initial supply of the electrical charge from the first electrochemical cell to the second electrochemical cell before receiving the replenishing supply of the electrical charge from the at least one third electrochemical cell of the second vehicle, through the first and second charge transfer elements, and into the first electrochemical cell of the first electric vehicle.

According to a seventh embodiment, a method can be provided that comprises: receiving, from a plurality of mobile battery-powered entities, battery configuration information, battery charge level information, a current location, a current speed, and a destination; generating, based at least upon the battery charge level, the current location, the current speed, and the destination of the plurality of mobile battery-powered entities, a charge distribution map; designating, based at least upon the current battery charge level and the battery configuration information, one or more mobile battery-powered entities of the plurality of mobile battery-powered entities as charge donors; designating, based at least upon the current battery charge level and the battery configuration information, one or more other mobile battery-powered entities of the plurality of mobile battery-powered entities as charge recipients; determining an optimal route for each of the plurality of mobile battery-powered entities; and generating, based at least upon the optimal route for the plurality of mobile battery-powered entities, the designated charge recipients and the battery configuration information, charge transfer instructions for one or more of the charge donors and/or the charge recipients. In some embodiments, the charge transfer instructions comprise one or more of a current position of the corresponding mobile battery-powered entity, a current charge level for the corresponding mobile battery-powered entity, a charge capacity for the corresponding mobile battery-powered entity, a charge transfer rate capacity for the corresponding mobile battery-powered entity, charging cable configurational information for the corresponding mobile battery-powered entity, transport speed information for the corresponding mobile battery-powered entity, pre-determined route information for the corresponding mobile battery-powered entity, a destination for the corresponding mobile battery-powered entity, vehicle identification information for the corresponding mobile battery-powered entity, or charge transfer payment information for the corresponding mobile battery-powered entity. In some embodiments, the method can further comprise: identifying, based at least upon the charge distribution map, one or more charge deficient regions; and causing deployment of at least one charging vehicle or a mobile charging station. In some embodiments, each of the plurality of mobile battery-powered entities is selected from among battery-powered terrestrial vehicles, battery-powered aerial vehicles, battery-powered aquatic vehicles, charge relay vehicles, mobile charging stations, and charge storage vehicles. In some embodiments, the method can further comprise: receiving, from the plurality of mobile battery-powered entities, updated battery configuration information, updated battery charge level information, an updated current location, an updated current speed, and an updated destination; and updating the charge distribution map.

According to an eighth embodiment, a method for distributing charge within a system of battery-powered vehicles can be provided, the method comprising: receiving current position information, current speed information, destination information, battery confirmation information, and current charge level data for a plurality of mobile battery-powered entities; and determining route instructions, speed instructions, and charge transfer instructions for each of the plurality of mobile battery-powered entities based at least upon one or more of the current position information, the current speed information, the destination information, the battery confirmation information, and the current charge level data. In some embodiments, the method can further comprise: generating, based at least upon at least the current position information, the destination information, and the current charge level data, for the plurality of mobile battery-powered entities, a charge distribution map. In some embodiments, the charge transfer instructions comprise one or more of a current position of the corresponding mobile battery-powered entity, a current charge level for the corresponding mobile battery-powered entity, a charge capacity for the corresponding mobile battery-powered entity, a charge transfer rate capacity for the corresponding mobile battery-powered entity, charging cable configurational information for the corresponding mobile battery-powered entity, transport speed information for the corresponding mobile battery-powered entity, pre-determined route information for the corresponding mobile battery-powered entity, a destination for the corresponding mobile battery-powered entity, vehicle identification information for the corresponding mobile battery-powered entity, or charge transfer payment information for the corresponding mobile battery-powered entity. In some embodiments, each of the plurality of mobile battery-powered entities is selected from among battery-powered terrestrial vehicles, battery-powered aerial vehicles, battery-powered aquatic vehicles, charge relay vehicles, mobile charging stations, and charge storage vehicles.

According to a ninth embodiment, an apparatus can be provided that comprises at least one processor and at least one memory including computer program code, the at least one memory and the computer program code configured to, with the processor, cause the apparatus to carry out at least one of the method of the first embodiment, the method of the second embodiment, the method of the third embodiment, the method of the fourth embodiment, and/or the method of the fifth embodiment.

According to a tenth embodiment, an apparatus can be provided that comprises at least one processor and at least one memory including computer program code, the at least one memory and the computer program code configured to, with the processor, cause the apparatus to at least: receive, from a plurality of mobile battery-powered entities, battery configuration information, battery charge level information, a current location, a current speed, and a destination; generate, based at least upon the battery charge level, the current location, the current speed, and the destination of the plurality of mobile battery-powered entities, a charge distribution map; designate, based at least upon the current battery charge level and the battery configuration information, one or more mobile battery-powered entities of the plurality of mobile battery-powered entities as charge donors; designate, based at least upon the current battery charge level and the battery configuration information, one or more other mobile battery-powered entities of the plurality of mobile battery-powered entities as charge recipients; determine an optimal route for each of the plurality of mobile battery-powered entities; and generate, based at least upon the optimal route for the plurality of mobile battery-powered entities, the designated charge recipients and the battery configuration information, charge transfer instructions for one or more of the charge donors and/or the charge recipients. In some embodiments, the at least one memory and the computer program code are configured to, with the processor, cause the apparatus to at least: transmit the route instructions and speed instructions to one or more mobile battery-powered entities of the plurality of mobile battery-powered entities; determine whether the one or more mobile battery-powered entities have complied with the route instructions and the speed instructions; and, in an instance in which the one or more mobile battery-powered entities have complied with the route instructions and the speed instructions, transmit the charge transfer instructions to the one or more mobile battery-powered entities. In some embodiments, the at least one memory and the computer program code are configured to, with the processor, cause the apparatus to at least: identify, based at least upon at least the charge distribution map, one or more charge deficient regions within the charge distribution map; and, in an instance in which one or more charge deficient regions exist, transmit deployment instructions and charge replenishment instructions to one or more charging vehicles or mobile charging stations.

According to an eleventh embodiment, a computer program product, such as a computer program product comprising a non-transitory computer readable medium storing computer readable instructions, the computer readable instructions operable to cause an apparatus, such as the apparatus of the sixth embodiment or the apparatus of the seventh embodiment, to carry out at least one of the method of the first embodiment, the method of the second embodiment, the method of the third embodiment, the method of the fourth embodiment, and/or the method of the fifth embodiment.

According to a twelfth embodiment, a multi-level battery for an electric vehicle is provided. In some embodiments, the multi-level battery can comprise: a first level comprising one or more first batteries having a first charge transfer rate and a first charge capacity; a second level comprising one or more second batteries having a second charge transfer rate different from the first charge transfer rate and a second charge capacity different from the first charge capacity; a charge transfer element in electrical communication with the one or more first batteries, the one or more second batteries, and an external charge source, the charge transfer element being configured to electrically couple the power plant of the electric vehicle to a power plant of another electric vehicle, whereby the charge transfer element can cause an electrical charge to be communicated into or out of the at least one of the one or more electrochemical cells or the at least one of the one or more other electrochemical cells of the electric vehicle while the electric vehicle is moving; and a battery management system configured to monitor a charge level in the one or more first batteries and the one or more second batteries, cause communication of the electrical charge into or out of at least one of the one or more first batteries, at least one of the one or more second batteries, the external charge source, and/or a powertrain of the electric vehicle. In some embodiments, the external charge source comprises one or more of: a stationary charging station, a mobile charging station, another electric vehicle, a charging drone, or a wireless charging transmitter.

According to a thirteenth embodiment, a method can be carried out that comprises: determining a first set of battery characteristics related to battery architecture; optimizing the first set of battery characteristics based at least upon at least one of: budget requirements, chemical compatibility requirements, and electrical requirements; determining, based at least upon the optimized first set of battery characteristics, a second set of battery characteristics; optimizing the second set of battery characteristics based at least upon at least one of: use requirements, space requirements, and structural requirements; and providing a battery architecture recommendation comprising the optimized first set of battery characteristics and the optimized second set of battery characteristics. In some embodiments, one or more of the first set of battery characteristics or the second set of battery characteristics comprise one or more of: a number of layers, a number of batteries per layer, a composition of each battery in each layer, a battery structure, a charge capacity, a charge transfer rate, a topology, a wiring type, a wiring configuration, a wiring material, a battery packing configuration, and one or more failure modes.

According to a fourteenth embodiment, a method can be carried out that provides: determining a current charge level of each battery in a multi-level battery system; in an instance in which the current charge level of a first battery in a first level of the multi-level battery system is below a level-specific current threshold and the current charge level of a second battery in a second level of the multi-level battery system is above the level-specific current threshold, causing transfer of charge from the second battery to the first battery; and in an instance in which the current charge level of the first battery in the first level of the multi-level battery system is below the level-specific current threshold and no other battery of the multi-level battery system has sufficient charge to provide charge to the first battery, receiving, at a current exchange mechanism of the multi-level battery system, charge from an external charge source.

BRIEF DESCRIPTION OF THE DRAWINGS

The accompanying drawings, which constitute a part of the description, illustrate embodiments of the present invention and, together with the description thereof, serve to explain the principles of the present invention.

DETAILED DESCRIPTION

Figure 1:
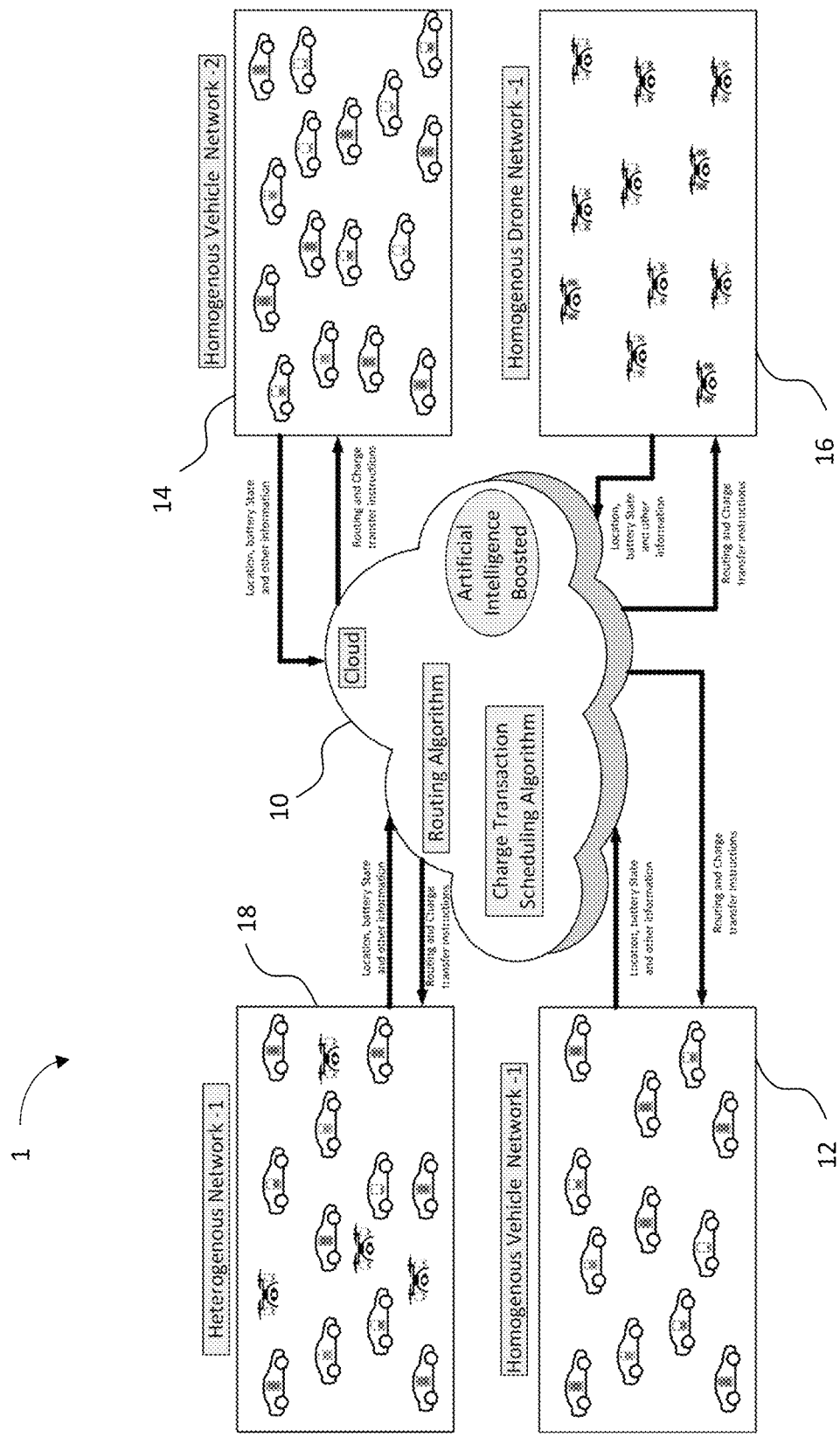
FIG. 1 provides an example approach for on-the-go peer-to-peer charging of vehicles along a roadway, according to some embodiments described herein.

Electric vehicles have existed for a while but have never enjoyed mainstream adoption. Now, with a global desire to reduce the carbon footprint of transportation systems and many leading auto manufacturers entering the electric vehicle (EV) space, EVs have become more appealing and affordable. Nevertheless, the adoption of EVs remains slow, mainly due to consumer concerns regarding battery life, battery range, and limited access to charging stations. Inefficient charging cycles or complete discharge of a battery reduces its life, making it imprudent to travel the full range provided by the battery without any recharging in the middle. Even though major cities in developed countries have charging stations, the amount is still unable to support a large EV population. Charging stations in remote regions are few and far between. Most of the existing charging stations are Level-2 (about 620 V) which typically require long waiting periods to charge a vehicle. Level-3 charging stations or direct current fast charging (DCFC) (about 440 V) stations are a faster alternative; however, they are limited and very expensive to build. With these concerns in mind, research has been conducted into several potential solutions, including innovations in EV battery technologies, but concluded that the battery range and charging time remains the most critical barrier, novel solutions like charging via solar-powered roads, however these approaches are not applicable, efficient, cost-effective, and/or politically doable in all countries, regions, or geographies.

Current methods for charging a battery for a battery-powered entity (e.g., vehicle, drone, vessel, robotic system, etc.) typically require that the battery-powered vehicle be parked in a fixed location during charging, and the user of the battery-powered entity must typically initiate charging of the battery-powered entity manually. This typically requires a great deal of time for charging and reflects a large inconvenience to the user of the battery-powered entity. As a further example of current hurdles to large-scale implementation, there are currently a limited number of charging ports at fixed charging locations for battery-powered entities, meaning that use of the charging ports typically operates on a first come, first serve basis. In other words, a first battery-powered entities having a battery at 90% charge capacity might be connected by the user for any reason before a user of a second battery-powered entities having a battery at 20% charge capacity without any priority given to the battery-powered entities having a lower charge capacity. Thus, there is currently no way to determine at a system level which battery-powered entities should be charged and at which charging location. As an additional example of current hurdles to large-scale implementation, the system of battery-powered entities currently includes a variety of different entity types, however none of the various entity types can be charged at the same fixed charging location, meaning redundant charging stations might be necessary at many locations to accommodate the various entity types. Therefore, there is a long-felt need in the industry for a system, method, and apparatus for charging battery-powered entities without relying on fixed charging stations, considering the need for and optimization of charge power to battery-powered entity within complex vehicle networks, and enabling either homogeneous or heterogeneous charging of battery-powered entities while they are "on-the-go," being transported through the system, in motion, in use, or the like.

As such, according to the current systems and approaches for charging EVs, EVs have a range that is limited by battery capacity and charge density, among other factors, which can restrict the effectiveness and suitability of EVs for long-distance driving. Even with enough charging stations, the charging stations are properly located along a driver's intended route, and rapid charging is used at every charging station along a driver's intended route, the travel time is impacted due to frequent, long halts for charging. Further, while the driver's intended route may have sufficient number of charging stations, all perfectly distributed and located along the driver's intended route, the driver is still forced to maintain their intended route and may not deviate unless they previously plan their deviation from the intended route to ensure there are sufficient charging stations located along the new route which deviates from the intended route.

Also, most of the modern high-end EVs are using Lithium-ion batteries, for which complete discharging and charging, or inefficient charging cycles can cause the Lithium-ion batteries to age at an accelerated rate. Hence, a long-distance drive without recharging the battery is undesirable for EVs. While improving the battery capacity is undoubtedly helpful, it could significantly increase the price of the EV. Besides, increasing battery capacity also may not solve the core problem of having to stop at a designated station to recharge.

As research continues to progress with regard to lithium-ion batteries that have a higher charge capacity or charge density, among other characteristics, the price per kilowatt-hour (kWh) for lithium-ion batteries is being reduced, but at a comparatively slow rate, making it difficult to increase the battery capacity of EVs without a drastic price increase. In addition, even drastically increasing the battery capacity of EVs will likely only solve some of the problem and may well only be possible for very high-end EVs due to the elevated cost of such advanced battery technologies. Even high-end EVs may have a maximum range of 700 to 370 miles but suffer from high charging times. Even with a 620V charging station, it often takes about 10 hours for a full charge. Although 440V stations may reduce the charging time, the amount of charging stations expected to be required to support a large EV fleet would be enormous and costly.

Currently, there are only limited stationary charging stations, even in urban areas of the wealthiest countries in the World. The overall number of stationary charging stations are few compared to refueling stations for vehicles with internal combustion engines (ICEs) and mostly limited to urban areas. EVs, especially high-end EVs, will suffer long charging times are level-1 or level-2 charging stations.

A brute force solution to the battery range and charging problem could be to build a high concentration of very high speed (Level-3) charging stations to allow fast charging anywhere in the World. However, dense and uniformly placed Level-3 stations costing $100,000 each is not feasible. Furthermore, the local power grids must be able to handle the large amount of power that must be transferred in a short amount of time for these stations. Also, there are currently very few level-3 stations (a.k.a. DC Fast Charging [DCFC] stations), making it infeasible to sustain a big EV fleet. Furthermore, building a large number of DCFC stations to sustain a big EV fleet is financially infeasible as each charging unit costs between about $10,000 U.S. Dollars (USD) and about $40,000 USD. Even if such DCFC stations could be built and distributed across a geography, there will still be many instances in which a higher density of EV drivers are clustered around a limited supply of DCFC units at one or more local DCFC stations while other DCFC stations in other areas go relatively unused. The immobility of the fixed location charging system, coupled with the unpredictable and dynamic nature of EV traffic patterns in EV charging systems makes it impossible to quickly adjust charging supply to changes in charging demand.

Another possible solution is to charge vehicles on the fly directly from the roadway. However, in initial implementations in France and elsewhere, roadways fitted with solar panels and designed to charge vehicles on the fly were only able to produce about 80,000 kWh per year due at least in part to the inherent dependency on suitable weather. Converting every road in the world into an electric/solar road is a big financial undertaking, rendering the solution infeasible. Likewise, roadways for on-the-fly EV charging that are powered by the grid are inefficient as every portion of the roadway must be powered by costly and environmentally impacting grid electricity, which is dependent upon the regional or local grid mixture and the inherent environmental impacts and costs associated therewith.

Charge sharing on-the-go, such as described in U.S. Provisional Patent Application No. 62/807,909, filed Feb. 20, 2019, entitled "System And Method For Charging Network Of Mobile Battery-Operated Units On-The-Go," the entire disclosure of which is hereby incorporated herein by reference in its entirety for all purposes, may be an effective approach for monitoring and equalizing charge across a system of mobile battery-operated entities. With a charge sharing system in place, the entities in the network can share charge among each other to stay functional perpetually. However, in some cases such entity-to-entity charge transfer processes will require the pairing of "on-the-go" battery-operated entities for an extensive amount of time due to the slow charge transfer rate of normal batteries used in such mobile battery-operated entities. Fast charge transfer rate batteries are available but they are more expensive than the slow charge transfer rate batteries and replacing the main battery of a mobile battery-powered entity with a fast charging battery is also not cost effective. In addition, there are often tradeoffs between the charge transfer rate of a battery and other important characteristics such as charge capacity, the use of exotic electrochemical materials such as advanced anode/cathode materials, highly engineered current collectors, rare earth metals, semi-solid or solid electrolytes, specialized ion-permeable separators, and/or the like. To address these and other issues, described herein are various embodiments of batteries having different levels, sections, portions, layers, materials, and/or the like, such that the batteries can accommodate different charge transfer rates, e.g., depending upon the particular details of a charge transfer event. Described herein also are exemplary algorithms that are operable to minimize entity-to-entity coupling time, to obtain overall fast charge transfer rates, e.g., by pairing entities that are compatible with regard to different charge transfer rates, and the like.

As such, provided herein are apparatuses, systems, computer program products, and methods related generally to multi-level batteries, fast battery charging, and fast charge sharing between battery-operated entities. Some embodiments relate to methods, systems, apparatuses, and computer program products for fast charging of a battery (e.g., a multi-level battery) and for fast charge sharing between battery operated entities (e.g., electric vehicles, drones, etc.), which are powered by a collection of small batteries, acting as a monolithic battery. In some embodiments, a method can comprise using multiple batteries of different charge transfer rates to power a battery powered entity. In some embodiments, the charge transfer rate between two "Fast Batteries" can be considered to be much higher than the charge transfer rate between two "Slow Batteries." Such a multi-level battery (multi-rate battery) setup may allow for faster charge transfer between battery operated entities during operation (or while "on-the-go"). This reduces the problem of slow charging a battery of a vehicle, when charged by another battery-operated vehicle on-the-go. Described herein are also four exemplary algorithms that may utilize different battery types to maximize efficiency of charge transfer within a transportation system. In some embodiments, decisions regarding how to use the different battery sets during operation can be determined directly at a battery powered entity, a computing device, or a cloud-based artificial intelligence (AI) application can optimally make the decision for a network of battery-operated entities to optimize the overall network efficiency.

As used herein, the terms "data," "content," "information," and similar terms may be used interchangeably, according to some example embodiments of the present invention, to refer to data capable of being transmitted, received, operated on, displayed, and/or stored. Thus, use of any such terms should not be taken to limit the spirit and scope of the disclosure. Further, where a computing device is described herein to receive data from another computing device, it will be appreciated that the data may be received directly from the other computing device or may be received indirectly via one or more computing devices, such as, for example, one or more servers, relays, routers, network access points, base stations, and/or the like.

As used herein, the term "computer-readable medium" as used herein refers to any medium configured to participate in providing information to a processor, including instructions for execution. Such a medium may take many forms, including, but not limited to a non-transitory computer-readable storage medium (for example, non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of non-transitory computer-readable media include a floppy disk, a flexible disk, hard disk, magnetic tape, any other non-transitory magnetic medium, a compact disc read only memory (CD-ROM), compact disc compact disc-rewritable (CD-RW), digital versatile disc (DVD), Blu-Ray, any other non-transitory optical medium, punch cards, paper tape, optical mark sheets, any other physical medium with patterns of holes or other optically recognizable indicia, a random access memory (RAM), a programmable read only memory (PROM), an erasable programmable read only memory (EPROM), a FLASH-EPROM, any other memory chip or cartridge, a carrier wave, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

As used herein, the term "circuitry" refers to all of the following: (a) hardware-only circuit implementations (such as implementations in only analog and/or digital circuitry); (b) to combinations of circuits and computer program product(s) comprising software (and/or firmware instructions stored on one or more computer readable memories), such as (as applicable): (i) to a combination of processor(s) or (ii) to portions of processor(s)/software (including digital signal processor(s)), software, and memory(ies) that work together to cause an apparatus, such as a mobile phone or server, to perform various functions described herein); and (c) to circuits, such as, for example, a microprocessor(s) or a portion of a microprocessor(s), that require software or firmware for operation, even if the software or firmware is not physically present. This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, other network device, and/or other computing device.

As used herein, the term "mobile entity" refers to any entity, vehicle, device, apparatus, system, equipment, or the like that is capable of and configured to move during at least some of the course of normal use or operation of the same. The terms "entity," "battery-powered entity," "mobile entity," "mobile battery-powered entity," "vehicle," "equipment," "vessel," and similar terms may be used interchangeably, according to some example embodiments of the present invention, to refer to any means of transportation, conveyance, transference, shipment, or passage in the physical world.

As used herein, the term "battery-powered" refers to an entity, such as a mobile entity, that is partially or fully powered using a battery collocated with the entity. For purposes of the present disclosure, the battery collocated with and at least partially powering such entities are considered to be rechargeable, replaceable, or both.

As used herein, "on-the-go" refers to activities that occur while terrestrial entities, aerial entities, aquatic entities, relay entities, charging entities, and other entities within the system that participate in or facilitate a charge transaction are in motion.

As used herein, the term "charging network" refers to discrete, disperse entities (such as mobile entities, stationary entities, devices, telecommunications equipment, a power supply, and the like) configured to participate, under at least partial guidance or direction from a centralized computing device, in one or more charge transactions.

As used herein, the term "computing device" refers to a specialized, centralized device, network, or system, comprising at least a processor and a memory device including computer program code, and configured to provide guidance or direction related to the charge transactions carried out in one or more charging networks.

As used herein, the term "charge transaction" refers to an instance of communicating a replenishing supply of electric charge to a battery-powered entity within a charging network.

As used herein, the term "battery" refers to any device capable of storing charged particles (such as electrons and/or protons) and/or generating a current of electrons (such as from ion exchange due to a reduction/oxidation reaction in the battery). The terms "battery," "cell," "rechargeable-battery," "charge storage device," "electrochemical cell," "power pack," "battery stack," and similar terms may be used interchangeably herein, according to some example embodiments of the present invention, to refer to means of generating and/or storing energy, whether as electrical potential energy, mechanical potential energy, chemical potential energy, ion transport potential, electrical charge, electrons, ions, electrochemical, supercapacitor capacitance, compressive energy, latent heat, gravitational potential energy, electrical potential, electromagnetic charge, any other suitable manner or means for energy storage, and/or the like. As such, were "battery" or "multi-level battery" are used, these terms should not be construed to mean only electrochemical cells configured to store ions or the like and to discharge electrons due to ion transport out of or into one or more electrodes. Instead, "battery" and "multi-level battery" refer to any device that stores energy.

As used herein, the terms "about," "substantially," and "approximately" generally mean plus or minus 10% of the value stated, e.g., "about 250 µm" would include 225 µm to 275 µm, "about 1,000 µm" would include 900 µm to 1,100 µm, and the like.

In some embodiments, to allow for efficient charge sharing, a cloud-based control system is provided that comprises a charge transaction scheduling unit, a rerouting unit, and a database for storing information from EVs. In some embodiments, EVs can interact with each other and the control system. The control system can instruct some EVs to share charge with some other EVs, can reroute some specific EVs to bring charge providers and receivers together, can speed lock EVs to allow seamless charge sharing, and/or can detach a charge provider/receiver for overall network charge optimization. To allow the charge scheduler to operate, the EVs can send information to the control system periodically. By way of example only, EV-to-EV synchronization for charge sharing can be carried out by dividing a road system into sections having separate control systems doing the micromanagement, or management of different sections of the road system. In some embodiments, the system can use a global control system to manage the separate control systems that are managing the different sections of the road system, e.g., for handling hand-off of EVs between different sections, for managing charge sharing between different sections, and/or the like. In some embodiments, sharing charge between EVs can distribute the total charge in the network among all the entities.

In some embodiments, without an outside-the-network charge source, the network may experience a slow overall charge decay, which may increase the percentage of EV halts. As used herein, EV halts are instances in which an EV must stop in the road system, either at a charging station, to wait for another EV to arrive to provide a replenishing charge, or because the EV's charge has run out and further progress is not possible. In some embodiments, in an effort to reduce EV halts across the road system, one or more Mobile Charging Stations (MoCS) can be mobilized. In some embodiments, MoCS can introduce a high volume of charge into the network. In some embodiments, a MoCS can charge one or more EVs in a particular lane of traffic, can charge a depleted MoCS, can charge a stationary charging station, can find and provide charge to a halted EV that does not have any remaining charge, and/or the like.

In some embodiments, in order to identify charge deprived regions in the road system, the control unit can maintain a charge distribution map that is updated at a regular interval. In some embodiments, MoCS can be mobilized to charge deprived regions of the road system or a particular section of the road system, e.g., if the constraints of the algorithm permit.

Furthermore, described herein are scalable peer-to-peer vehicle charging solutions that are both low cost and easily to implement with minimal changes to the EVs. According to some embodiments, vehicles will share charge and sustain each other to reach their respective destinations. In some embodiments, a set of cloud-based schedulers may be used to automatically and dynamically monitor participants (e.g., EVs, etc.), decide which participants will be charge providers and receivers (or on standby), and/or control charging locally, regionally, or at a system level.

In some embodiments, based, for instance, on the charge transaction and subsequent reroute decisions, the cloud-based control system can instruct the EVs to carry out charge transfer operations. With this scheme in place, the total charge in the EV network may eventually spread out across all the EVs. However, even in a dynamic network with EVs entering and leaving, as observed through simulation, the total charge of the network will slowly deplete. As such, according to some embodiments, to keep the EVs in a state of perpetual motion, a system may include one or more Mobile Charging Stations (MoCS), to bring in a considerable amount of outside charge into the EV network. In some embodiments, EVs may then be responsible for the fine-grained distribution of the outside charge deposited by the MoCS. In some embodiments, a local, remote, distributed, cloud, or networked controller or the like may be used to make such charge scheduling decisions. In some embodiments, such a controller may employ a scheduling algorithm that controls the charge transactions and decides when and where to insert a new MoCS. In some embodiments, the effectiveness of a scheduling algorithm may be quantitatively analyzed using a Simulator of Urban Mobility (SUMO) traffic simulator. As demonstrated later in this disclosure, the scheduling algorithms presented herein are fast, scalable, and efficient in dealing with battery-related problems present in modern EVs. The hereinbelow described systems, methods, algorithms, processes, apparatuses, and computer programs address at least some of the long-felt needs in the EV industry by introducing solutions to address EV charging issues by implementing an on-the-go peer-to-peer EV charge sharing scheme, providing a complete framework to enable electric vehicles to share charges as guided by, e.g., a cloud-based control system, provide systems and methods which utilize mobile charging stations, which fit seamlessly into the described framework, to counteract system charge depletion and/or address local, intra-system charge depletion and charge imbalances, provide algorithms for charge transaction scheduling and MoCS insertion that may also control the EVs for optimal rerouting and charge sharing, and provide an approach for quantitatively analyzing the effectiveness of the described systems, algorithms, methods, apparatuses, and computer programs using extensive simulations in SUMO.

Embodiments described herein relate generally to methods, systems, apparatuses, and associated algorithms for autonomous on-the-go charging of a network of battery-operated mobile entities, including, but not limited to, autonomous/semi-autonomous/manual vehicles, aerial vehicles such as drones, equipment, aquatic vehicles, charging vehicles, relay vehicles, robots, and the like, while the mobile entities are being transported within the system. The system can comprise a plurality of battery-powered vehicles of one or more vehicle types, the plurality of battery-powered vehicles being in wireless communication with one or more computing devices, including one or more servers, one or more relays, one or more routers, one or more network access points, one or more base stations, one or more clouds, one or more processors, the Internet, other such apparatuses or combinations thereof. A computing device can be configured to receive and transmit signals, data, files, or the like from or to battery-powered vehicles. Signals sent and received by the computing devices may include signaling information in accordance with an air interface standard of an applicable cellular system, and/or any number of different wireless networking and/or communications techniques, comprising but not limited to a fifth-generation (5G) wireless network or the like, a Wi-Fi, wireless local access network (WLAN) techniques such as Institute of Electrical and Electronics Engineers (IEEE) 802.11, 802.16, and/or the like. In addition, these signals may include vehicle characteristic data, sensor feedback data, vehicle generated/requested data, user generated/requested data, control instructions, global positioning system (GPS) position, battery status, destination, route information, road conditions, weather conditions, and/or the like. The system can be configured such that charging of battery-powered vehicles can be controlled by the computing device.

The plurality of battery-powered vehicles can comprise at least one of one or more battery-powered terrestrial vehicles, one or more battery-powered aerial vehicles, one or more battery-powered aquatic vehicles, and/or one or more charging vehicles. In some embodiments, battery-powered terrestrial vehicles can comprise but are not limited to automobiles, passenger trucks, cargo vans, transport trucks, eighteen-wheelers, lulls, dump trucks, tractors, motorcycles, snowmobiles, trains, buses, lorries, tanks, trailers, trolleys, scooters, electric bicycles, electric scooters, trams, all-terrain vehicles, recreational vehicles, electric unicycles, electric tricycle, cultivator, harvester, mower, wagon, bulldozer, grader, loader, forklift, crane, paver, loader, street sweeper, garbage truck, front-end loader, feller buncher, backhoe, excavator, any other suitable terrestrial vehicles, equipment, or apparatuses, and any variants or combinations thereof.

In some embodiments, battery-powered aerial vehicles can comprise but are not limited to any fixed wing or rotorcraft, unmanned aerial vehicles, unmanned aerial systems, unmanned combat aerial vehicles, drones, remote-controlled vehicles, airplanes, turbojets, turbofan craft, propeller planes, jet engine aircraft, helicopters, quadcopters, autogyros, cyclogyros, ornithopters, Flettner aircraft, hovercraft, monoplanes, biplanes, rocket-powered aircraft, spacecraft, motor gliders, ducted fan aircraft, airships, personal air vehicles, electric flying vehicles, tilting ducted fan aircraft, any other suitable aerial vehicles, equipment, or apparatuses, and any variants or combinations thereof. In some embodiments, battery-powered aquatic vehicles can comprise but are not limited to any fan-powered aquatic vehicles, jet-powered aquatic vehicles, propeller powered aquatic vehicles, hydrojet powered aquatic vehicles, airboats, barges, cruise ships, cutter, ferry, sloop, scow, freighter, hydroplane, hydrofoil, houseboat, jet ski, jetboat, ketch, naval ship, pontoon, pleasure craft, personal water craft, tanker, tugboat, towboat, trawler, yachts, submarines, any other suitable aquatic vehicles, equipment, or apparatuses, and any variants or combinations thereof.

In some embodiments, charging vehicles can comprise any vehicle or other mobile entity capable of receiving, storing, and/or transmitting an electric charge. In some embodiments, a charging vehicle can be similar to any of the battery-powered aerial vehicles, battery-powered terrestrial vehicles, and/or the battery-powered aquatic vehicles.

In some embodiments in which the system includes a plurality of battery-powered terrestrial vehicles, the system can further include one or more terrestrial charging vehicles. In some other embodiments in which the system includes a plurality of battery-powered aerial vehicles, the system can further include one or more aerial charging vehicles. In some other embodiments in which the system includes a plurality of battery-powered aquatic vehicles, the system can further include one or more aquatic charging vehicles. In some embodiments in which the system includes a plurality of battery-powered terrestrial vehicles and a plurality of battery-powered aerial vehicles, the system can further include one or more terrestrial charging vehicles and one or more aerial charging vehicles. In some other embodiments in which the system includes at least two of a) a plurality of battery-powered terrestrial vehicles, b) a plurality of battery-powered aerial vehicles, and/or c) a plurality of battery-powered aquatic vehicles, the system can comprise one or more of terrestrial, aerial, and/or aquatic charging vehicles, respectively.

In some embodiments, battery-powered mobile entities can be configured to be charged by a charging vehicle and/or another battery-powered mobile entity. In some embodiments, a charging network can comprise a first mobile battery-powered entity, such as a first automobile, can be configured to be electrically coupled to a second mobile battery-powered entity, such as a second automobile in order for the first battery-powered entity to receive or transmit electric charge from or to the second battery-powered entity. In other words, in some embodiments, the first automobile can be configured to establish a charging connection to the second automobile in order for the first automobile to charge or be charged by the second automobile. In some embodiments, the first vehicle can additionally or alternatively be configured to be electrically coupled to a charge vehicle such that a replenishing charge can be communicated from a charge vehicle to the first automobile and from the first vehicle to the second vehicle. In some embodiments, the first automobile, having sufficient charge to both operate and charge the second automobile, can be configured to be releasably, electrically coupled to the second automobile to communicate a replenishing supply of electric charge to the second automobile, in particular, to the battery of the second automobile. Likewise, in some embodiments, an automobile, having sufficient charge to both operate and charge a nearby unmanned aerial vehicle, can be configured to be releasably coupled and/or electrically coupled to the unmanned aerial vehicle to communicate a replenishing supply of electric charge to the unmanned aerial vehicle. As such, any one or more mobile entities described herein can be caused to communicate a replenishing supply of electric charge to any one or more other mobile entities, of any type or mode of transport, within the systems described.

Such charge transactions can be coordinated by a computing device, e.g., a cloud that comprises one or more servers connected to the charged and/or charging mobile entities via a wireless connection. In some embodiments, one or more of a charging entity, a relay entity, and a charged entity involved in a charge transaction can be informationally coupled to the computing device such that information about the charge transaction can be communicated to the computing device. Likewise, the computing device can be informationally coupled to one or more of a charging entity, a relay entity, and a charged entity involved in a charge transaction such that information, signals, suggested actions, and/or commands related to the charging transaction can be communicated to one or more of the charging entity, the relay entity, and the charged entity. In some embodiments, such informational coupling can be carried out wirelessly via a computing device, satellite, relay tower, cell tower, WiFi hotspot, transceiver, transponder, receiver, other suitable telecommunications equipment, or combinations thereof.

In some embodiments, the computing device, such as a server or a cloud computing environment, can be configured to maintain the charge distribution map based at least upon available sources of charging, entities may be in need of charging, and other relevant aspects and information related to the preparation and enactment of a charge transaction schedule. In other words, in some embodiments, the cloud computing environment or the like can use algorithms or other means for scheduling charge transactions between of heterogeneous or homogeneous mobile entities within a charging network.

In some embodiments, the charging network can comprise tens, hundreds, thousands, millions, or more of any sort or type or mode of transport of mobile entities described herein. In some embodiments, the charging network can also include charging entities, such as mobile and/or stationary charging entities. In some embodiments, the mobile charging entities can be charging trucks, charging aerial vehicles, charging aquatic vessels, or the like. In some embodiments, the mobile charging entity can comprise a charge storage device, such as a battery, a stack of batteries, a power bank, or any other suitable means for storing electric charge as ions or electrons, for generating electrons from chemical reactions such as redox reactions, or the like. By way of example only, and in no way meaning to limit the scope of this disclosure, some of the suitable battery types/chemistries that can be used include but are not limited to zinc-carbon, zinc-chloride, alkaline, nickel oxyhydroxide, lithium-containing, lithium-based, lithium-copper oxide, lithium-ion disulfide, lithium-manganese dioxide, lithium-carbon fluoride, lithium-chromium oxide, lithium-silicon, mercury oxide, zinc-air, Zamboni pile, silver oxide, magnesium, nickel-cadmium, lead-acid, nickel-metal hydride, nickel-zinc, silver-zinc, lithium-iron-phosphate, lithium ion, solid state batteries, aluminum air, Daniell cells, Li—$CoO_2$, Li—$MnO_2$, Li—$Mn_2O_4$, Li—$BF_4$, Li—$NiMnCoO_2$, Li—$FePO_4$, Li—$NiCoAlO_2$, $Li_4$—$Ti_5O_{12}$, Li—$FeS_2$, Li—$SOCl_2$, Li—$SOCl_2$—BrCl, Li—$SO_2Cl_2$, Li—$SO_2$, Li—$I_2$, Li—$Ag_2CrO_4$, Li—$Ag_2V_4O_{11}$, Li—CuO, Li—$Cu_4O(PO_4)_2$, Li—CuS, Li—PbCuS, Li—FeS, Li—$Bi_2Pb_2O_5$, Li—$Bi_2O_3$, Li—$V_2O_5$, Li—$CoO_2$, Li—$NiCoO_2$, Li—$CuCl_2$, Li/Al—$MnO_2$, Li/Al—$V_2O_5$, Li—Se, other suitable chemistries and configurations, variants thereof, and any combination thereof.

In some embodiments, the scheduling, commencement, and/or termination of, payment for, and record-keeping for charge transactions within a charging network or a plurality of charging networks can be governed by at least one or more centralized computing devices (e.g., a cloud). In some embodiments, the one or more computing devices can be configured to track the plurality of vehicles and dynamically authorize charging according to a charge-distribution map. In some embodiments, a computing device can, once, intermittently, or in real-time, generate the charge-distribution map, e.g., with the use of one or more scheduling algorithms. In some embodiments, if the computing device is a cloud computing environment in communication with a plurality of battery-powered vehicles or other battery-powered entities, the cloud can maintain an updated charge-distribution map, receive from the battery-powered entities updated GPS position, speed of travel, type of vehicle/entity, road/weather conditions, and other useful information, and employ an efficient charge scheduling algorithm to schedule charging instances between entities that are controllable within the system. In other words, the battery-powered vehicles transmit, e.g., in real-time, sufficient pertinent information to the cloud such that the cloud computing environment is able to use one or more charge-scheduling algorithms to schedule the next instances of charging between entities within the system and to update the charge-distribution map.

In some embodiments, a first mobile entity may not have the capability to, at least temporarily, communicate with the computing device (e.g., cloud), but may have the capability to communicate with a second mobile entity nearby the first mobile entity, the second mobile entity having the capability to communicate with the computing device. In such an embodiment, it might be helpful for the second mobile entity to relay the information from the first mobile entity to the computing device and to relay other information from the computing device to the first mobile entity. In such embodiments, the second mobile entity acts as a relay entity and can be so named in such a network. In some embodiments, a relay entity can communicate any data gathered by, received by, or generated by a battery-powered mobile entity to the computing device (e.g., cloud), in which case the computing device can update the charge-distribution map with said data from the battery-powered mobile entity, employ an algorithm or other such decision-making model or computer program to determine if a charging transaction is required, and can transmit or otherwise communicate instructions to the relay entity, the relay entity configured to either act upon the instructions or further communicate said instructions on to another entity such as the battery-powered mobile entity. In some embodiments, a relay entity can be configured to communicate with a plurality of mobile entities within a pre-determined proximity to the relay entity. In some embodiments, the relay entity can be a charging entity, a terrestrial mobile entity, an aerial mobile entity, an aquatic mobile entity, a stationary entity, or an intermediary communications entity such as a telecommunications tower or other such telecommunications device.

Once the computing device (e.g., cloud) determines that a charging transaction is desired or required, the computing device can communicate by any suitable means with one or more participants to the charging transaction with instructions to carry out the charging transaction. Upon receiving the instructions to carry out the charging transaction, the one or more participants to the charging transaction can initiate the charging transaction unilaterally, communicate the instructions to one or more other participants to the charging transaction, assume partial or total control of one or more other participants to the charging transaction, or otherwise initiate the charging transaction. In some embodiments, the computing device provides instructions to a relay vehicle to initiate a charging transaction between a nearby charging vehicle and a nearby battery-powered vehicle. The relay vehicle can then communicate said instructions to the charging vehicle solely or to the charging vehicle and also the battery-powered vehicle. In some embodiments, upon receiving said instructions at the charging vehicle, the charging vehicle can initiate communications with the battery-powered vehicle in order to facilitate and/or receive authorization for initiation of the charging transaction. In some embodiments, the charging vehicle might send a signal via a transceiver to a receiver of the battery-powered vehicle, the signal indicative of a command or a request. In some embodiments, the signal might be indicative of a command for the battery-powered vehicle to change its position and/or location with respect to the charging vehicle. In some embodiments, the signal might be indicative of a command for the battery-powered vehicle to changes its speed and/or velocity, such as by "speed locking" with the charging vehicle. In some embodiments, the signal might be indicative of an intention by the charging vehicle to changes its position, location, speed, and/or velocity to match those of the battery-powered vehicle. In some embodiments, the signal might be indicative of a request that the battery-powered vehicle carry out any of the previous actions described, with the difference between a request and a command being that the battery-powered vehicle can refuse to comply with the request whereas the battery-powered vehicle might be either not capable, only partially capable, or only capable following a particular emergency procedure, of refusing to comply with the command.

In some embodiments, once the battery-powered vehicle receives the signal, the battery-powered vehicle can be configured to immediately comply, to return a separate signal from a transceiver of the battery-powered vehicle to a receiver of the charging vehicle of an intention to comply with the instructions to initiate the charge transaction, can return a signal indicative of an intention to not comply with the instructions to initiate the charge transaction, a signal indicative of an alternative course of action or additional course of action with respect to the instructions to initiate a charge transaction, or combinations thereof. Such a return signal from the battery-powered vehicle can be considered a "hand shake" between the charging vehicle and the battery-powered vehicle, which can be carried out with or without encryption or other such authentication and/or security measures. In some embodiments, such an authentication measure might include the battery-powered vehicle communicating directly with the computing device (e.g., cloud) to verify the instructions received from the charging vehicle, to authorize payment for the charging transaction, or to verify or correct data related to the battery-powered vehicle, such as the battery-powered vehicle's location, position, speed, velocity, vehicle type, battery type, battery charge level, desire or lack thereof for participating in the charge transaction, or any other such information as necessary. All or some of this information can also be relayed to the computing device via the charging vehicle, via another battery-powered vehicle, via a relay device such as a mobile phone, tablet, WiFi router, telecommunications tower, other suitable telecommunications devices, variants thereof, and any combination thereof.

In some embodiments, once the particular details of the charge transaction are agreed upon between two or more of the battery-powered vehicle, another battery-powered vehicle, the relay vehicle, the charge vehicle, the computing device (e.g., cloud), and any other participants to the charge transaction or nearby entities that may need to be informed about the agreed-upon charge transaction, the charge transaction can commence. In some embodiments, during the charge transaction, a replenishing supply of electric charge can be communicated from one or more of the charge vehicle, another battery-powered vehicle, the relay vehicle, or any other participants to the charge transaction, and the battery-powered vehicle. In some embodiments, the replenishing supply of electric charge can be communicated to the battery-powered vehicle by a wired electrical coupling of the charge-supplying vehicle and the battery-powered vehicle. In some embodiments, the battery-powered vehicle can comprise a charge receiving element configured to be removably and electrically coupled to a charge transmitting element of the charge-supplying vehicle. In some embodiments, during regular operation of the battery-powered vehicle, the charge receiving element can be configured to be retained within the battery-powered vehicle, while the charge receiving element can be configured to be extended from the battery-powered vehicle during a charge transaction so as to be coupled with the charge transmitting element of the charge-supplying vehicle. In some embodiments, the battery-powered vehicle can have a charge receiving port that is not configured to be extended from the battery-powered vehicle during a charge transaction, while the charge-supplying vehicle can be configured to extend the charge transmitting element to establish and maintain electrical communication between the charge transmitting element and the charge receiving port of the battery-powered vehicle. In some embodiments, the charge receiving element of the battery-powered vehicle can be configured to be extended out from the battery-powered vehicle to establish and maintain electrical communication between the charge receiving element and a charge transmitting port of the charge-supplying vehicle, the charge transmitting port being stationary with regard to the charge-supplying vehicle during a charge transaction.

In some embodiments, the replenishing supply of electrical charge can be communicated to the battery-powered vehicle by a wireless electrically coupling of the charge-supplying vehicle and the battery-powered vehicle. In some embodiments, the replenishing supply of electrical charge can be communicated by a combination of a wired and a wireless electrically coupling of the charge-supplying vehicle and the battery-powered vehicle. In some embodiments, the battery-powered vehicle can comprise a wireless charging receiver and the battery-supplying vehicle can comprise a wireless charging transceiver. In some embodiments, the wireless charging receiver of the battery-powered vehicle can be configured to receive the replenishing supply of electrical charge from the wireless charging transceiver of the charge-supplying vehicle according to any suitable mechanism or protocol. Without wishing to be bound by any particular theory, the battery-powered vehicle can be configured to receive the replenishing supply of electrical charge from the wireless charging transceiver of the charge-supplying vehicle by magnetic resonant coupling therebetween. Alternatively, without wishing to be bound by any particular theory, the battery-powered vehicle can be configured to receive the replenishing supply of electrical charge from the wireless charging transceiver of the charge-supplying vehicle by tightly-coupled electromagnetic inductive or non-radiative charging. Alternatively, without wishing to be bound by any particular theory, the battery-powered vehicle can be configured to receive the replenishing supply of electrical charge from the wireless charging transceiver of the charge-supplying vehicle by loosely-coupled or radiative electromagnetic resonant charging. Alternatively, without wishing to be bound by any particular theory, the battery-powered vehicle can be configured to receive the replenishing supply of electrical charge from the wireless charging transceiver of the charge-supplying vehicle by uncoupled radio frequency wireless charging. Any and all other suitable wireless charging technologies, protocols, methods, approaches, systems, devices, and phenomena are contemplated herein and are hereby considered within the scope of this disclosure. In some embodiments, a proximity less than a pre-determined wireless charging proximity should be maintained between the battery-powered vehicle and the charge-supplying vehicle for the duration of the charge transaction in order to maintain a wireless charging connection therebetween.

In some embodiments, depending upon the type and charging protocol of wireless charging device or system used, the pre-determined wireless charging proximity can be between about zero meters and about 20 meters, about 0.001 meters and about 20 meters, about 0.001 meters and about 19 meters, about 0.001 meters and about 18 meters, about 0.001 meters and about 17 meters, about 0.001 meters and about 16 meters, about 0.001 meters and about 15 meters, about 0.001 meters and about 14 meters, about 0.001 meters and about 13 meters, about 0.001 meters and about 12 meters, about 0.001 meters and about 11 meters, about 0.001 meters and about 10 meters, about 0.001 meters and about 9 meters, about 0.001 meters and about 8 meters, about 0.001 meters and about 7 meters, about 0.001 meters and about 6 meters, about 0.001 meters and about 5 meters, about 0.001 meters and about 4 meters, about 0.001 meters and about 3 meters, about 0.001 meters and about 2 meters, about 0.001 meters and about 1 meter, about 0.001 meters and about 0.5 meters, about 0.001 meters and about 0.25 meters, about 0.001 meters and about 0.1 meters, about 0.001 meters and about 0.01 meters, about 0.01 meters and about 5 meters about 0.02 meters and about 4 meters, about 0.03 meters and about 3 meters, about 0.04 meters and about 2 meters, about 0.05 meters and about 1 meter, about 0.002 meters and about 5 meters, about 0.003 meters and about 5 meters, about 0.003 meters and about 5 meters, about 0.004 meters and about 5 meters, about 0.005 meters and about 5 meters, about 0.006 meters and about 5 meters, about 0.007 meters and about 5 meters, about 0.008 meters and about 5 meters, about 0.009 meters and about 5 meters, or about 0.01 meters and about 5 meters, inclusive of all values and ranges therebetween. In some embodiments, depending upon the type and charging protocol of wireless charging device or system used, the pre-determined wireless charging proximity can be less than about 20 meters, about 19 meters, about 18 meters, about 17 meters, about 16 meters, about 15 meters, about 14 meters, about 13 meters, about 12 meters, about 11 meters, about 9 meters, about 8 meters, about 7 meters, about 6 meters, about 5 meters, about 4 meters, about 3 meters, about 2 meters, about 1 meter, about 0.5 meters, about 0.25 meters, about 0.1 meters, less than about 0.05 meters, less than about 0.01 meters, or less than about 0.001 meters, inclusive of all values and ranges therebetween. In some embodiments, depending upon the type and charging protocol of wireless charging device or system used, the pre-determined wireless charging proximity can be greater than about zero meters, about 0.001 meters, about 0.002 meters, about 0.003 meters, about 0.004 meters, about 0.005 meters, about 0.006 meters, about 0.007 meters, about 0.008 meters, about 0.009 meters, about 0.01 meters, about 0.02 meters, about 0.03 meters, about 0.04 meters, about 0.05 meters, about 0.06 meters, about 0.07 meters, about 0.08 meters, about 0.09 meters, about 0.1 meters, about 0.2 meters, about 0.3 meters, about 0.4 meters, about 0.5 meters, about 0.6 meters, about 0.7 meters, about 0.8 meters, about 0.9 meters, about 1 meter, about 1.25 meters, about 1.5 meters, about 1.75 meters, about 2 meters, about 2.25 meters, about 2.5 meters, about 2.75 meters, about 3 meters, about 3.25 meters, about 3.5 meters, about 3.75 meters, about 4 meters, about 4.25 meters, about 4.5 meters, about 4.75 meters, about 5 meters, about 6 meters, about 7 meters, about 8 meters, about 9 meters, about 10 meters, about 11 meters, about 12 meters, about 13 meters, about 14 meters, about 15 meters, about 16 meters, about 17 meters, about 18 meters, about 19 meters, or greater than about 20 meters, inclusive of all values and ranges therebetween.

In some embodiments, in order to maintain a proper "speed lock," "position lock," "destination lock," "proximity lock," "velocity lock," and the like during the charge transaction, the charge-supplying vehicle may often either need to attain control or partial control of the battery-powered vehicle receiving the replenishing supply of electrical charge or relinquish control or partial control of the charge-supplying vehicle to the battery-powered vehicle receiving the replenishing supply of electrical charge for the duration of the charge transaction or a portion thereof. In some embodiments, in attaining or relinquishing control, one or both of the battery-powered vehicle and the charge-supplying vehicle may be asked or required to slow down, speed up, maintain a course of travel, diverge from a current course of travel, change lanes or headings, move to beside, behind, or ahead of the other vehicle, or in another way diverge from the normal course of travel maintained prior to commencement of the charge transaction.

In some embodiments, computing device (e.g., cloud) can comprise one or more servers, one or more computers, one or more networks, one or more intranets, one or more signal transmission devices, one or more signal receiving devices, one or more memory devices, computer program code, specialized computer program code, computer models, databases, one or more user interfaces, one or more displays, one or more user input devices, one or more middleware applications, one or more web browser applications, one or more virtual session applications, one or more satellites, one or more telecommunication towers, one or more telecommunication dishes, one or more power supplies, one or more signal booster devices, one or more network security programs, one or more authentication modules, one or more mobile devices, one or more tablets, one or more data models, one or more structured query language (SQL) databases, one or more NoSQL databases, one or more application programming interfaces, and/or any other suitable apparatuses, devices, networks, systems, programs, applications, or databases, without limitation.

In some embodiments, the computing device can further comprise a charge transaction ledger, a charge-distribution map, a mobile entity database, a user database, and/or one or more charge transaction scheduling algorithms. The charge transaction ledger can be a centralized ledger or a decentralized (e.g., blockchain) ledger of charge transactions that have occurred. The charge-distribution map can be generated, maintained and updated according to information received from the network or networks of mobile entities related to the past, real-time, or near real-time location, destination, speed, battery type, battery charge level, battery capacity, and other information related to each mobile entity (terrestrial, aerial, aquatic, charge entities, relay entities, etc.), as well as environmental data, available sources of grid or network electricity, and the like. The mobile entity database can comprise a listing of all or approximately all or substantially all of the mobile entities that are considered to be within the network or networks upon which the system described herein is enacted, while the user database can comprise owners/operators of said mobile entities as well as any pertinent information about the owners/operators, such as the one or more mobile entities to which the user is associated, biographical information, whether or not the owner/operator has agreed to participate in charge transactions, user payment information, and the like. The charge transaction scheduling algorithm is a specialized model for scheduling charge transactions that takes into account the relative location, destination, mobile entity type, battery type, battery charge level, and any other suitable information from the charge transaction ledger, the charge-distribution map, the mobile entity database, the user database, or elsewhere, to determine at any given time or for any given duration of time which mobile entities should be participating in a charge transaction and the role that each participating mobile entity should play in each charge transaction.

In some embodiments, an apparatus for governing charge transactions for a charging network can comprise at least one processor and at least one memory device including computer program code, the at least one memory device and the computer program code configured to, with the processor, cause the apparatus to at least receive current charge level data for a plurality of mobile battery-powered entities, determine, based at least on the current charge level data, one or more mobile battery-powered entities of the plurality of mobile battery-powered entities to be charged, determine, based at least on the current charge level data, one or more other mobile battery-powered entities of the plurality of mobile battery-powered entities to be caused to charge the one or more mobile battery-powered entities, and cause, while the one or more mobile battery-powered entities and are being transported within a pre-determined proximity of the one or more other mobile battery-powered entities, the one or more other mobile battery-powered entities to charge the one or more mobile battery-powered entities.

In some embodiments, a method of charging a mobile entity can comprise determining that a mobile battery-powered entity is within a pre-determined proximity of another mobile battery-powered entity, determining a charge level and a transport speed of the mobile battery-powered entity, determining the charge level and the transport speed of the other mobile battery-powered entity, in an instance in which the charge level of the mobile battery-powered entity is below a pre-determined (e.g., configurable) charge level and less than the charge level of the other mobile battery-powered entity, causing the mobile battery-powered entity to receive an electric charge from the other mobile battery-powered entity, and in an instance in which the charge level of the other mobile battery-powered entity is below the pre-determined (e.g., configurable) charge level and less than the charge level of the other mobile battery-powered entity, causing the other mobile battery-powered entity to receive the electric charge from the mobile battery-powered entity.

In some embodiments, a method for governing charge transactions for a charging network can comprise receiving current charge level data for a plurality of mobile battery-powered entities, determining, based at least on the current charge level data, one or more mobile battery-powered entities of the plurality of mobile battery-powered entities to be charged, determining, based at least on the current charge level data, one or more other mobile battery-powered entities of the plurality of mobile battery-powered entities to be caused to charge the one or more mobile battery-powered entities, and causing, while the one or more mobile battery-powered entities and are being transported within a pre-determined proximity of the one or more other mobile battery-powered entities, the one or more other mobile battery-powered entities to charge the one or more mobile battery-powered entities.

In some embodiments, a method for instigating a charge transaction for a mobile battery-powered entity in a charging network can comprise wirelessly transmitting, from a mobile battery-powered entity while the mobile battery-powered entity is being transported through a predefined area, a current charge level to a computing device, receiving an indication from the computing device as to whether the mobile battery-powered entity is to charge another mobile battery-powered entity, to be charged by the other mobile battery-powered entity, or neither charge nor be charged by the other mobile battery-powered entity, and in an instance in which the indication received indicates that the mobile battery-powered entity is either to charge or be charged by the other mobile battery-powered entity: determining a geospatial location and a transport speed of the mobile battery-powered entity, receiving the geospatial location and the transport speed of the other mobile battery-powered entity, causing the mobile battery-powered entity to speed lock with the other mobile battery-powered entity based at least on the geospatial location and the transport speed of the mobile battery-powered entity and the other mobile battery-powered entity, in an instance in which the indication received indicates that the mobile battery-powered entity is to charge the other mobile battery-powered entity, causing the mobile battery-powered entity to transmit a charge to the other mobile battery-powered entity, and in an instance in which the indication received indicates that the mobile battery-powered entity is to be charged by the other mobile battery-powered entity, causing the mobile battery-powered entity to receive the charge from the other mobile battery-powered entity.

FIG. 1 illustrates a system 1 for peer-to-peer charging between homogeneous and/or heterogeneous networks of electric vehicles. As illustrated, a computing device 10 (e.g., a cloud computing device) can comprise a routing algorithm and/or a charge transaction scheduling algorithm. In some embodiments, the computing device 10 can employ or comprise an artificial intelligence program configured to employ an algorithm to predict or calculate routing for electric vehicles in the network and schedule charge transfer events. In some embodiments, the system 1 can further comprise a first homogeneous vehicle network 12, a second homogeneous vehicle network 14, a homogeneous drone network 16, and/or a heterogeneous network 18. In some embodiments, battery powered entities within one of the networks 12, 14, 16, 18 may communicate with the computing device 10. In some embodiments, a battery powered entity (e.g., a vehicle) may communicate a current location, a current speed, a destination, a planned route, a battery state, and the like information to the computing device 10. In some embodiments, the computing device 10 can then carry out an algorithm, e.g., using the artificial intelligence program hosted at the computing device 10, to prepare optimized routing instructions for a plurality of vehicles or other battery powered entities in the system 1 and to prepare and provide charge transfer instructions.

Figure 2:
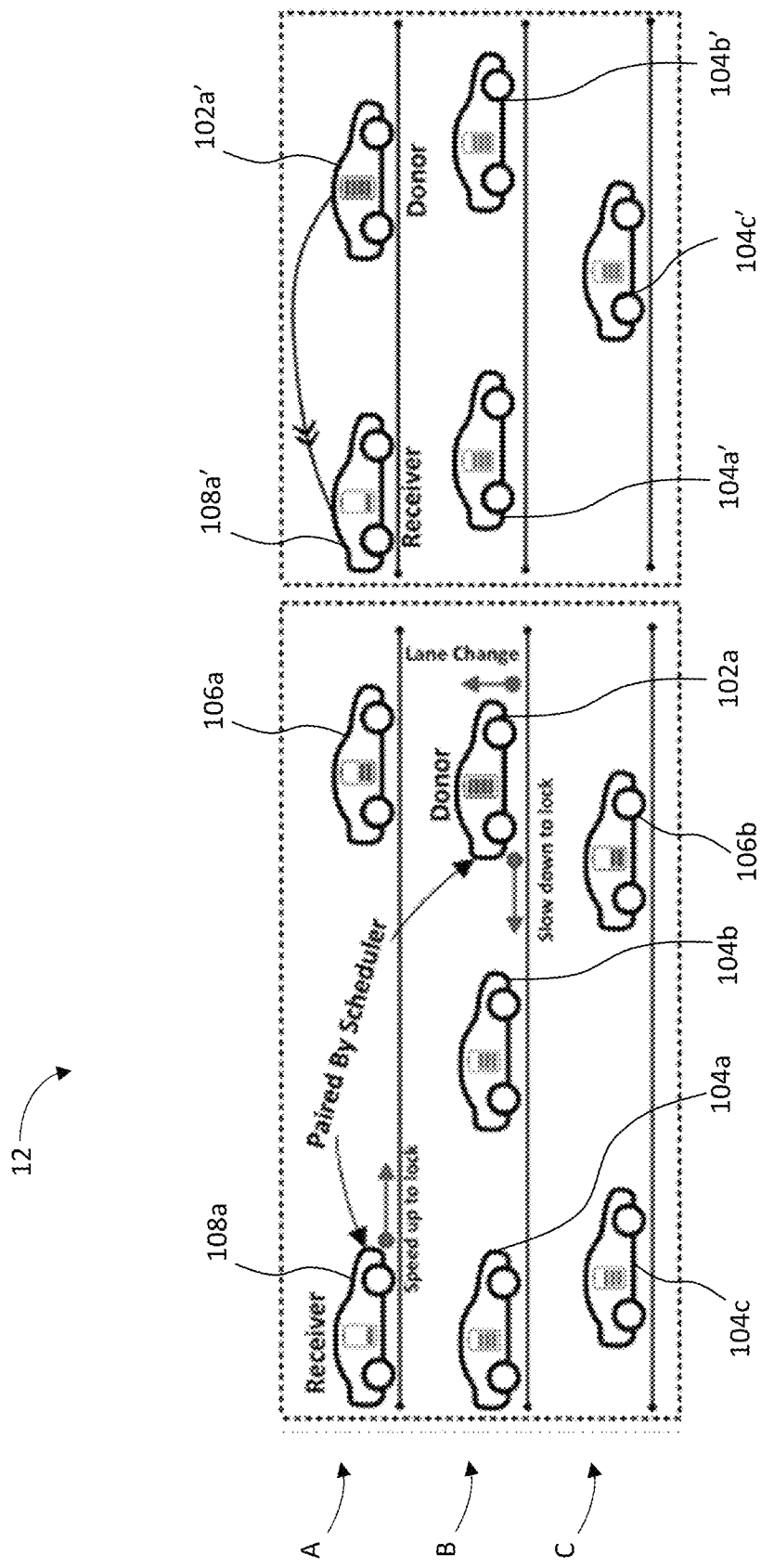
FIG. 2 provides an example approach for on-the-go peer-to-peer charging of vehicles along a roadway, according to some embodiments described herein.

FIG. 2 illustrates an exemplary embodiment of the first homogeneous vehicle network 12 comprising a plurality of electric vehicles, such as a first vehicle 108a and a second vehicle 106a in roadway A, a third vehicle 104a, a fourth vehicle 104b, and a fifth vehicle 102a in roadway B, and a sixth vehicle 104c and a seventh vehicle 106b in roadway C. In some embodiments, a routing and/or a charge distribution algorithm can be used to determine one or more charge donor vehicles and one or more charge receiver vehicles. In some embodiments, an algorithm can be used by, for instance, an artificial intelligence program, processing circuitry, a computer program product stored at a memory device, and/or a cloud computing device or the like, to identify a vehicle, such as the first vehicle 108a that has a reduced charge level and/or a charge level insufficient for the first vehicle 108a to reach its destination, which can be designated as the charge receiver vehicle. In some embodiments, an algorithm can be used to identify a vehicle with excess or a relatively greater charge level, such as the fifth vehicle 102a, which can be designated as the charge donor vehicle. In some embodiments, an algorithm, such as a routing algorithm, may determine that the first vehicle 108a, which is behind the fifth vehicle 102a with regard to the direction of travel of the two vehicles and in a different lane of the roadway, needs to speed up, while the fifth vehicle 102a needs to slow down and change lanes from roadway B to roadway A such that the two vehicles (the first vehicle 108a and the fifth vehicle 102a) are sufficiently close such that the fifth vehicle 102a can provide a replenishing supply of electric charge to the first vehicle 108a during a charge transfer event. Once the algorithm determines that the speed, routing changes, and charge transfers that are necessary for the vehicles within the first homogeneous vehicle network 12, the algorithm or a computing element operating the algorithm can provide route instructions and/or charge transfer instructions to one or both of the first vehicle 108a and the fifth vehicle 102a. For instance, as illustrated in FIG. 2, a location of the various vehicles in the first homogeneous vehicle network 12 can be seen on the left, whereas the location of the various vehicles in the first homogeneous vehicle network 12 once the route and charge transfer instructions are provided to the vehicles can be seen on the right. For instance, the first vehicle 108a and fifth vehicle 102a may change their location on the roadway relative to each other, shown as 108a' and 102a' on the right side.

Figure 3:
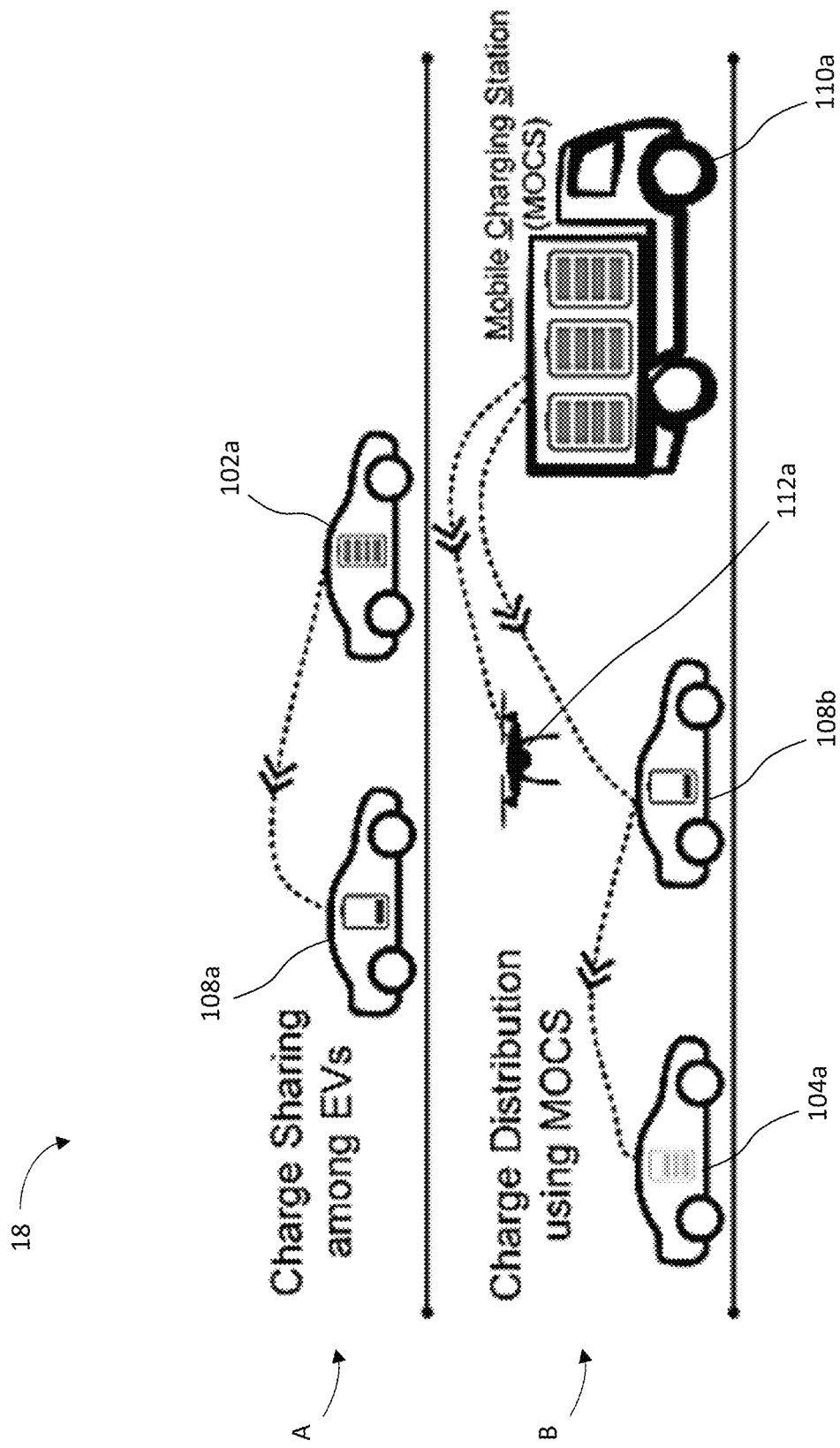
FIG. 3 provides an example of a system for charging a network of mobile battery-operated units on-the-go, according to some embodiments described herein.

FIG. 3 illustrates a plurality of roadways, A, B, and C, on or above which vehicles, e.g., EVs, may travel. In some embodiments, a first vehicle 108a can be traveling down roadway A. In some embodiments, the first vehicle 108a can be an EV, such as any of the EVs described herein. In some embodiments, the first vehicle 108a can have a battery that is depleted and/or which has a reduced charge. As illustrated in various figures of this present application, the current charge level of a vehicle is typically, although not necessarily always, illustrated by a battery level icon within or beside the illustrated vehicle, where no bar indicates no remaining charge, one bar indicates a low level of remaining charge or no remaining charge, two bars indicates a moderate level of remaining charge, and three or four bars indicate a high level of remaining charge or full charge remaining. In the figures, automobiles, such as cars, are often illustrated with a battery level icon, in the general shape of a battery, within the car, MoCS are typically illustrated as a truck with one or more battery level icons illustrated within a bed of the truck, and aerial vehicles are illustrated as drones with one or more battery level icons illustrated next to the body of the drone and beneath the rotors. However, the illustrated vehicles and battery icon position are not intended to limit this disclosure with regard to the types of vehicles covered by this disclosure nor with regard to the position, number, type, or charge level iterations for any battery or other suitable electrochemical device used in any suitable vehicle.

In some embodiments, the first vehicle 108a can have a charge that is determined to be, either by the first vehicle 108a itself or by another entity in the system 1, insufficient based at least on the destination and/or route planned for the first vehicle 108a. In an instance in which it is determined that the first vehicle 108a has insufficient charge for the first vehicle 108a to reach the planned destination according to the planned route, the first vehicle 108a or another entity of the system 1 can identify another vehicle, such as the fifth vehicle 102a as having comparatively more charge than the first vehicle 108a or which has excess charge level than is required for the fifth vehicle 102a to reach its planned destination via its planned route. Once the first vehicle 108a or the other entity of the system 1 identifies the fifth vehicle 102a as having an excess battery charge, the first vehicle 108a and the fifth vehicle 102a can establish an electrical connection therebetween in order to transfer charge from the fifth vehicle 102a to the first vehicle 108a.

As further illustrated in FIG. 3, a third vehicle 106a, a fourth vehicle 104a, and a fifth vehicle 104b, e.g., traveling on or above roadway A or roadway B, may be, partially depleted of battery charge, completely/nearly completely depleted of battery charge, and/or have an unknown battery charge. In some embodiments, if there is not a vehicle, such as the second vehicle 106a on roadway A, that is available on roadway B to provide a replenishing charge to one or more of the third vehicle 104a, fourth vehicle 104b, or fifth vehicle 102a, then a sixth vehicle 104c (illustrated as an EV vehicle in FIG. 2 and as a charging entity 110a in FIG. 3) can be deployed to the roadway B. In some embodiments, the sixth vehicle 104c (as a MoCS) can provide a replenishing charge directly to a vehicle, e.g., the fourth vehicle 104b and/or the fifth vehicle 102a. In some embodiments, even if the sixth vehicle 104c cannot or does not provide replenishing charge to a vehicle, e.g., the third vehicle 104a, another vehicle, such as the fourth vehicle 104b, can receive replenishing charge from the sixth vehicle 104c and in turn provide replenishing charge to the third vehicle 104a.

Alternatively or additionally, the above-described system 1 can be embodied by the first homogeneous vehicle network 12 illustration of FIG. 2. For instance, the approach can be carried out for three roadways (A, B, and C), which can be three parallel lanes along the same stretch of a highway, for instance. A first vehicle orientation can be seen in the left-hand dashed box, while a second vehicle orientation, seen in the right-hand dashed box, the change between the two orientations being the result of an algorithm-based orientation change in order to permit a charge transfer event between a donor vehicle and a recipient vehicle. As illustrated, the first vehicle 108a and the second vehicle 106a may be traveling along roadway A, the third vehicle 104a, fourth vehicle 104b, and fifth vehicle 102a may be traveling along roadway B, and the sixth vehicle 104c and a seventh vehicle 106b may be traveling along roadway C. As illustrated, the first vehicle 108a may be charge depleted, the second vehicle 106a and seventh vehicle 106b have a moderate level of charge remaining, and the second, third, fourth, fifth, and sixth vehicles (vehicles 106a, 104a, 104b, 102a, and 104c), may have a high level of charge remaining or may be fully charged. As such, a scheduling algorithm may be used to evaluate the available charge, proximity of each vehicle to other vehicles, and other factors such as vehicle compatibility with regard to inter-vehicle charge transfer. The scheduling algorithm, implemented for instance by a processor or the like (also referred to as a "scheduler") can pair a charge donor vehicle (e.g., the fifth vehicle 102a) with a receiving vehicle (e.g., the first vehicle 108a). In some embodiments, when the identified donor vehicle and receiving vehicle are not located sufficiently adjacent to facilitate a charge transfer event, the scheduler may request or otherwise cause one or both of the donor vehicle or the receiving vehicle to slow down or speed up in order to bring the donor vehicle and receiving vehicle into sufficient proximity. As illustrated, the scheduler can cause the first vehicle 108a, as the receiving vehicle, to speed up and stay in roadway A, cause the fifth vehicle 102a to slow down and, optionally, speed lock with the first vehicle 108a such that the vehicles are raveling at the same or sufficiently similar speed, and cause the fifth vehicle 102a to merge from roadway B to roadway A. The resulting orientation of vehicles on the roadways can be seen in the right-hand box of FIG. 2, in which the first vehicle 108a' and fifth vehicle 102a' are now in the same roadway (roadway A), immediately adjacent each other within roadway A, and are traveling at sufficiently the same speed such that the charge transfer event can take place.

Figure 4:
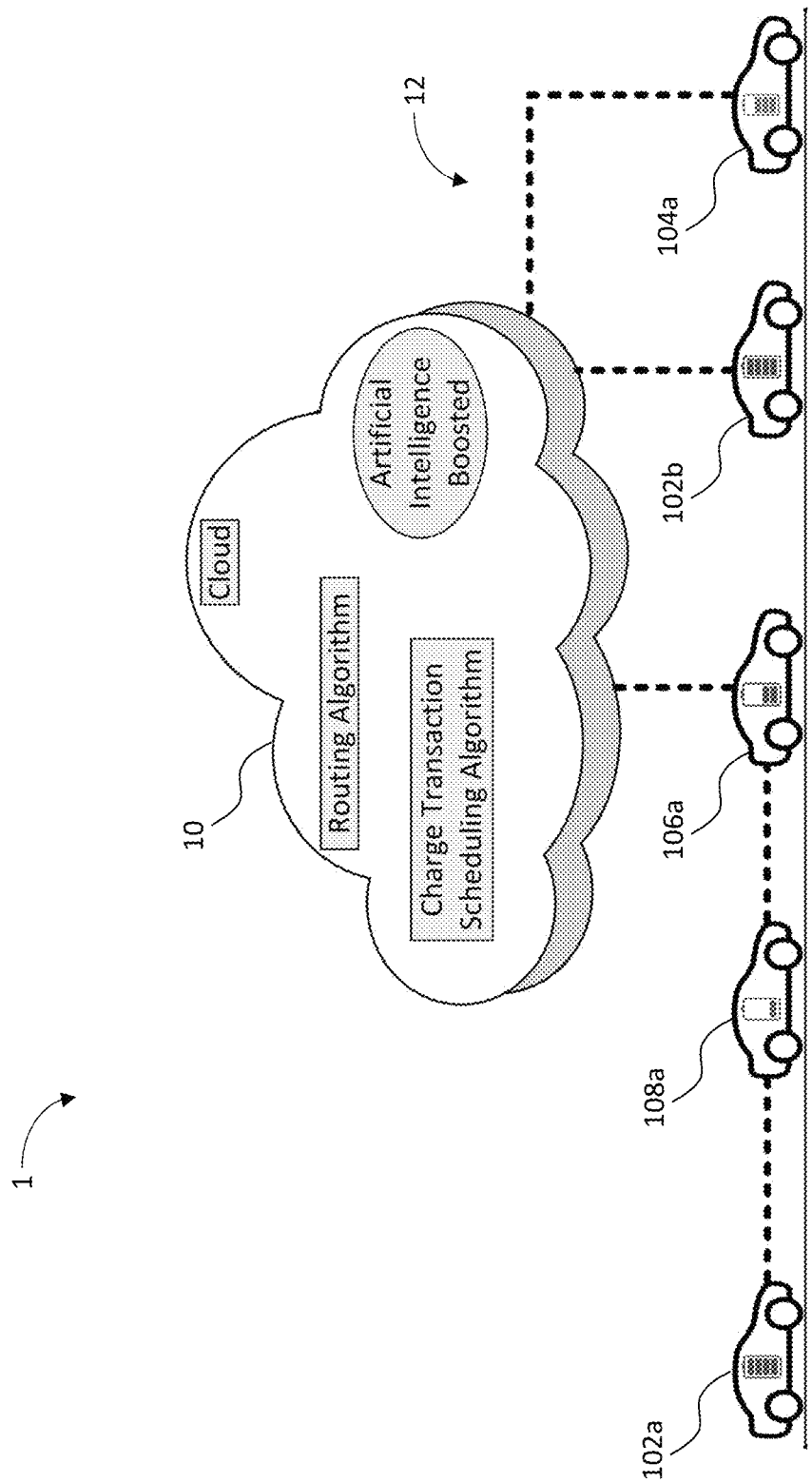
FIG. 4 provides an example of a system for entity-to-entity and entity-to-cloud communication, according to some embodiments described herein.
Figure 5:
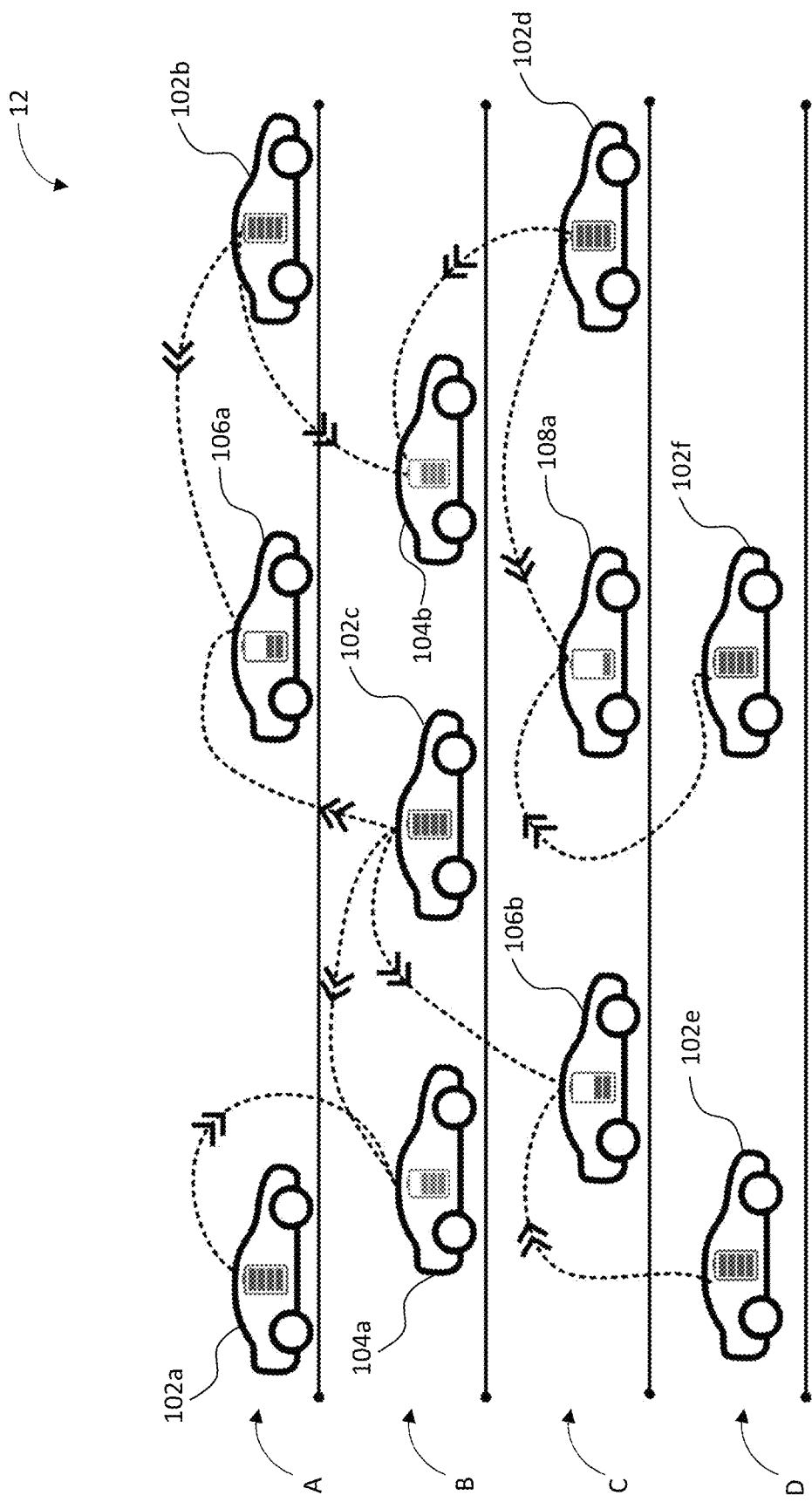
FIG. 5 provides an example of a system for on-the-go entity-to-entity charging, according to some embodiments described herein.

Referring now to FIGS. 3-5, according to some embodiments the system 1 can comprise vehicle networks (e.g., 12, 14, 16, 18) and a computing device 10 (e.g., a cloud computing device), for charging mobile entities on-the-go. In some embodiments, the autonomous charging of battery-operated mobile entities on-the-go may be similar in principle to on-air refueling of airplanes. According to some embodiments of the approach, a battery-operated mobile entity (Entity-A) can be caused to move to the front/rear or left/right side of another entity to be charged (Entity-B); speed-lock (i.e., communicate among themselves through entity-to-entity communication or through entity-to-cloud-to-entity communication to synchronize their speeds); and entity A extending a retractable charging cable to releasably engage a retractable charge receiving point of Entity-B (and other cars next to it, with which it speed-locks) and starts charging on-the-go. In some embodiments, the charging cable can be removed from Entity-B and taken back to Entity-A after sufficient charge is provided, if it is determined that continued engagement presents any sort of risk to life or infrastructure, if the route of one or both of Entity-A and Entity-B diverges from the other, or the like. By design of the on-the-go charging methods and apparatuses described herein, Entity-A should mirror the route and travel speed of Entity-B during the charging process. While this approach is suitable for any mixture of mobile entities having any mixture of modes of transport, the approach is particularly suitable for fully autonomous or substantially fully autonomous entities, although the basic mechanisms are applicable to partially autonomous or manual entities. The technology, approach, method, apparatuses, and systems naturally applies to any network of mobile battery-powered entities.

In some embodiments, the system 1 can comprise a computing device 10 comprising a cloud computing environment and associated infrastructure, telecommunications equipment, hardware, one or more processors, one or more memory devices, and the like. The one or more memory devices can store one or more algorithms, the algorithms capable of, with at least one of the one or more processors and at least one of the one or more memory devices, a method for scheduling charge transactions. In some embodiments, the one or more algorithms can comprise at least one of a routing algorithm and a charge transaction scheduling algorithm. In some embodiments, the computing device 10 can further include an artificial intelligence program stored on at least one of the one or more memory devices and configured to enact the one or more algorithms such that the computing device 10 can at least partially govern the movement of one or more mobile entities within a network and charge transactions carried out within the network. In some embodiments, the system 1 can comprise the first homogeneous vehicle network 12 comprising a plurality of vehicles of a single type, category, mode of transport, and/or charge transaction protocol type. In some embodiments, charge transactions within the first homogeneous vehicle network 12 can be at least partially governed by the computing device 10. In some embodiments, information related to the first homogeneous vehicle network 12 can be communicated to the computing device 10. In some embodiments, information related to the first homogeneous vehicle network 12 that can be communicated to the computing device 10 can comprise mobile entity identifiers, mobile entity locations, mobile entity battery type and current charge level, mobile entity destinations, road and weather conditions, and other suitable information, such as described above. Likewise, in some embodiments, the computing device 10 can be capable of communicating routing and/or charge transaction instructions to one or more mobile entities of the first homogeneous vehicle network 12.

For instance, as illustrated in FIG. 4, the computing device 10 can be configured to communicate routing and/or charge transaction instructions to one or more of a plurality of vehicles in the first homogeneous vehicle network 12, depending on the charge level of each of the plurality of vehicles. In some embodiments, the plurality of vehicles can be subdivided into any type or number of classes or groups of vehicles based at least on the charge level of the battery for each vehicle. For instance, the charge level of batteries for vehicles might be subdivided into four groups as follows: i) Vehicle A: 76%-100% of capacity, ii) Group B: 50%-75% of capacity, iii) Group C: 26%-50% of capacity, and iv) Group D: 0%-25% of capacity. As illustrated in FIG. 4, Group A vehicles are identified as 102, Group B vehicles are identified as 104, Group C vehicles are identified as 106, and Group D vehicles are identified as 108. In some embodiments, such as when the plurality of vehicles are subdivided into four groups as described, Group D vehicles may be prioritized in terms of routing and scheduling a charge transaction, with descending levels of prioritization for, respectively, Group C vehicles, Group B vehicles, and Group A vehicles. In some embodiments, Group A vehicles, and perhaps even Group B vehicles, may be removed from the schedule completely for a pre-determined time based at least upon an estimation of when the batter of said vehicles will likely be depleted of electric charge sufficiently to re-classify said vehicles as Group C or Group D. In some embodiments, Group A vehicles, and perhaps even Group B vehicles, may be re-classified as Charging Vehicles (also called "charge-supplying vehicles" herein), routed based at least upon an upcoming scheduled charge transaction, and tasked with communicating a replenishing supply of electrical charge to a Group D or Group C vehicle during the scheduled charge transaction.

In some embodiments, the computing device 10 may be capable of communicating with only a portion of the plurality of vehicles, or only a portion of the plurality of vehicles are capable of communicating with the computing device 10. As illustrated in FIG. 4, in some embodiments, one or more of the plurality of vehicles (e.g., 106a, 102b, and 104a) are capable of independent communication with the computing device 10, while one or more others of the plurality of vehicles (e.g., 102a and 108a) are incapable of independent communication with the computing device 10. As such, in some embodiments, a relay vehicle (e.g., 106a) can be configured to receive, from the vehicles (e.g., 102a and 108a) incapable of independent communication with the computing device 10, pertinent information about the vehicles (e.g., 102a and 108a) incapable of independent communication with the computing device 10, and communicate such pertinent information to the computing device 10. Likewise, in some embodiments, relay vehicles (e.g., 106a) can be configured to receive, from the computing device 10, routing instructions and/or charge transaction instructions destined for the vehicles (e.g., 102a and 108a) incapable of independent communication with the computing device 10, and communicate such routing instructions and/or charge transaction instructions to the vehicles (e.g., 102a and 108a) incapable of independent communication with the computing device 10. In some embodiments, the system 1 can be configured such that the relay vehicles (e.g., 106a) communicate information and/or instructions between the computing device 10 and another relay vehicle (e.g., 108a), the other relay vehicle (e.g., 108a) configured to further communicate the information and/or instructions between the relay vehicle (e.g., 106a) and the mobile entity (e.g., 102a) incapable of independent communication with the computing device 10. In some embodiments, the system 1 can be configured such that relay vehicles (e.g., 106a, 108a) are used even if a terminal vehicle (e.g., 102a) is not incapable of independent communication with the computing device 10. For instance, in some embodiments, a charging network (e.g., the first homogeneous vehicle network 12) may be configured such that a limited number of vehicles communicate independently with the computing device 10, the limited number of vehicles acting as relay vehicles to some or all of the remaining vehicles in the charging network. Without wishing to be bound by any particular theory, by communicating independent with only a limited number of the vehicles in the charging network, the computing device 10 can reduce the capacity and bandwidth required for communicating information and instructions between the plurality of vehicles of the charging network and the computing device 10. Furthermore, in some embodiments, the relay vehicles (e.g., 106a, 108a) can comprise an on-board computer or other such computing device preconfigured to carry out some aspects of decision-making with regard to charge scheduling and route scheduling without being required to communicate independently with the computing device 10 for every routing or charging decision. Furthermore, in some embodiments, the on-board computer or other such computing device of the relay vehicles (e.g., 106a, 108a) can be capable of receiving information from one or more other vehicles (e.g., 102a) and in some way optimizing the data packet(s) before transmitting the optimized data packet(s) to the computing device 10. In some embodiments, data packet optimization may include sampling from a signal record or signal stream, eliminating redundant data, eliminating unnecessary data, and other such means and methods for reducing the packet size and/or data complexity, thereby at least reducing the processing complexity and/or decision-making complexity for the computing device 10. For instance, if environmental conditions at or nearby the charge-receiving vehicle (e.g., 102a) are above or below a pre-determined threshold and are considered sufficient, the relay vehicle(s) (e.g., 108a, 106a) or a component (e.g., on-board computer) thereof may be instructed to replace the environmental condition data with an indicate that the environmental condition was sufficient to proceed with a charge transaction, thus eliminating unnecessary data storage and processing complexity during decision-making about whether and where to route the charge-receiving vehicle (e.g., 102a) and whether and where to schedule a charge transaction.

In some embodiments, the system 1 can further include a second homogeneous vehicle network 14 comprising a plurality of vehicles of a single type, category, mode of transport, and/or charge transaction protocol type. In some embodiments, the first homogeneous vehicle network 12 and the second homogeneous vehicle network 14 can be located in different geographical locations, can be differentiated by comprising vehicles of different types, categories, modes of transport and/or charge transaction protocol types, and/or can be differentiated by other characteristics or aspects such as payment method, hierarchical level within a hierarchy of mobile entities in the system 1, or other causes, means, or reasons without limitation. In some embodiments, the differentiation between the first homogeneous vehicle network 12 and the second homogeneous vehicle network 14 can be at least partially arbitrary or completely arbitrary, such as by design of the system 1. In some embodiments, the differentiation between the first homogeneous vehicle network 12 and the second homogeneous vehicle network 14 can be based at least upon an efficient sorting and categorization of a larger group of mobile entities by the computing device 10, the artificial intelligence program, an algorithm, or some combination thereof.

In some embodiments in which the first and/or second homogeneous vehicle networks 12, 14 comprise mobile terrestrial vehicles only, the system 1 can comprise other homogeneous networks, such as the homogeneous drone network 16 comprising a plurality of drones or other aerial mobile entities of a single type, category, mode of transport, and/or charge transaction protocol type. In some embodiments, the homogeneous drone network 16 can be located in a different geographical location than the first homogeneous vehicle network 12 and the second homogeneous vehicle network 14, can be differentiated by comprising vehicles of a different type, from a different category, vehicles having different modes of transport, and/or vehicles adhering to different charge transaction protocols. In some embodiments, the homogeneous drone network 16 can be differentiated from the first homogeneous vehicle network 12 and the second homogeneous vehicle network 14 by other characteristics or aspects such as payment method, hierarchical level within a hierarchy of mobile entities in the system 1, or other causes, means, or reasons without limitation.

In some embodiments, the system 1 can comprise a heterogeneous network 18 comprising a plurality of vehicles of two or more different vehicle types, from two or more different vehicle categories, having two or more different modes of transport, and/or adhering to two or more different charge transaction protocols. In some embodiments, the heterogeneous network 18 includes at least two of i) one or more terrestrial vehicles, ii) one or more aerial vehicles, iii) one or more aquatic vehicles, iv) one or more hybrid terrestrial/aerial vehicles, v) one or more hybrid terrestrial/aquatic vehicles, vi) one or more hybrid aerial/aquatic vehicles, vii) one or more charge vehicles, and viii) one or more charge relay vehicles.

In some embodiments, each charge transaction from one mobile entity to another can be scheduled by running an efficient (optimal, when possible) scheduling algorithm in the cloud that considers a charge distribution map and other information transmitted from the charging network (e.g., the first homogeneous vehicle network 12). In some embodiments, the goal of the system 1 can be to keep the battery-operated mobile entities in a perpetual running condition. Each entity can be equipped with one or more of the following features/capabilities: (1) receiving charge from another entity (of similar or dissimilar type—e.g., a drone charging a car or vice versa while both in motion); (2) provide charge to another entity; (3) relay charge from one charge donor entity to another charge receiver entity; and (4) vehicle-to-vehicle and/or vehicle-to-cloud communication about charge transaction scheduling, route, etc.

In some embodiments, the system 1 can comprise a network of mobile battery-operated entities and the cloud, and optionally, specialized charger entities, which are capable of storing and giving large amounts of charge to other entities. In some embodiments, these charging entities (also called "charge vehicles" herein) can be dedicated charging vehicles and might not, for instance, have another primary purpose such as personal transportation, recreation, freight transport, or the like. These charging entities or units can be stationed at a stationary charge station and can be caused to move on demand to join the charging network for the purpose of increasing the overall charge into the charging network. These charging entities may provide charge to one or more of the mobile battery-powered entities, which can use the charge to replenish a corresponding battery, if needed, and additionally or alternatively can distribute some or all of the charge to other entities such that the charge is distributed based at least on the demand of individual entities and to increase the overall efficiency of the entire charging network. In some embodiments, the goal for the set of charge transactions in a charging network is not necessary to (or only to) maximize the charge level in the battery of the recipient car—but to achieve an optimal working level given the amount of available charge. In other words, since the system 1 employs one or more algorithms, artificial intelligence, and/or other such technologies that are generally meant to make decisions with regard to a particular goal, a goal of the system 1 itself may be to increase the total miles traversed by battery-powered vehicles in the charging network (e.g., the first homogeneous vehicle network 12) without necessarily or simply optimizing a charge level of any one vehicle of the plurality of vehicles in the charging network.

For example, as illustrated in FIG. 5, a plurality of vehicles of the four groups discussed above (Group A=102, Group B=104, Group C=106, and Group D=108) are illustrated as traveling on a roadway in four parallel lanes (A, B, C, and D). According to the embodiment of FIG. 5, every vehicle in Group A (102) is caused to charge another at least one other vehicle, while no vehicles in Groups B, C, or D (104, 106, or 108) are caused to charge another vehicle. However, in some other embodiments, especially embodiments in which there are less Group A (102) vehicles, vehicles in Group B (104), and perhaps even Group C (106), can be caused to charge another vehicle. In such a way, the system 1 supports a division of labor by using specialized charger entities (e.g., charger cars, charger drones, or the like) to bring in a large amount of charge from one or more charging stations to replenish the overall charge available in the charging network (e.g., the first homogeneous vehicle network 12). This process essentially serves as charge "refilling" of the entire charging network. Once a select set of entities (positioned in optimal, or at least suitable, locations and having proper charge conditions) receive charge from a charger entity, they can become relay vehicles and propagate or distribute the charge to other entities in the network in a fashion that optimizes the overall efficiency across much or all of the system 1. In some embodiments, the entities in the charging network may be responsible for distributing the charge on-the-go to reduce or eliminate the amount of time that battery-powered mobile entities must remain stationary during a period of time due to an undesirable stationary charging activity.

Another aspect of the system 1 that is improved, at least in some embodiments, by the use of artificial intelligence-supported algorithms, is the scheduling of charge transactions for a large number of heterogeneous mobile entities when one of the following is true: i) a destination is unknown for at least a portion of the entities in the charging network, ii) at least a portion of the entities in the charging network will change their destination at some point during the time the portion of entities are active in the charging network, iii) at least a portion of the entities in the charging network will become disconnected or otherwise removed from the charging network unexpectedly, iv) at least a portion of the entities in the charging network will refuse to receive or relay a replenishing supply of electrical charge to another entity in the charging network, and v) at least a portion of the entities in the charging network will transmit to the computing device information about their location, destination, speed, battery condition, or the like that is incorrect, incomplete, or corrupted.

As such, in some embodiments, the computing device 10 can be configured to make decisions, using one or more algorithms and/or one or more artificial intelligence programs, related to an optimal route of each entity in the charging network and opportunities for charge transactions (based at least on entity route information, battery charge level status, nearby entities and their route information and battery charge level status, past and present traffic conditions and environmental conditions, and the like) between said entities. As discussed above in further detail, in some embodiments, the computing device 10 can generate a charge-distribution map and update the charge-distribution map in real-time or nearly real-time based at least on information provided by the entities in the charging network. In some embodiments, the charge-distribution map may also map congestion, if applicable, for entities along a desired route, such that the computing device 10 can balance the desire for charge transaction opportunities (which may require nearby charge-supplying entities) with route congestion and a desire for a minimized route duration (which is dependent upon choosing a path that has a sufficiently low level of congestion so as to not increase the route duration due beyond a particular threshold or more than an undesirable amount).

Figure 6:
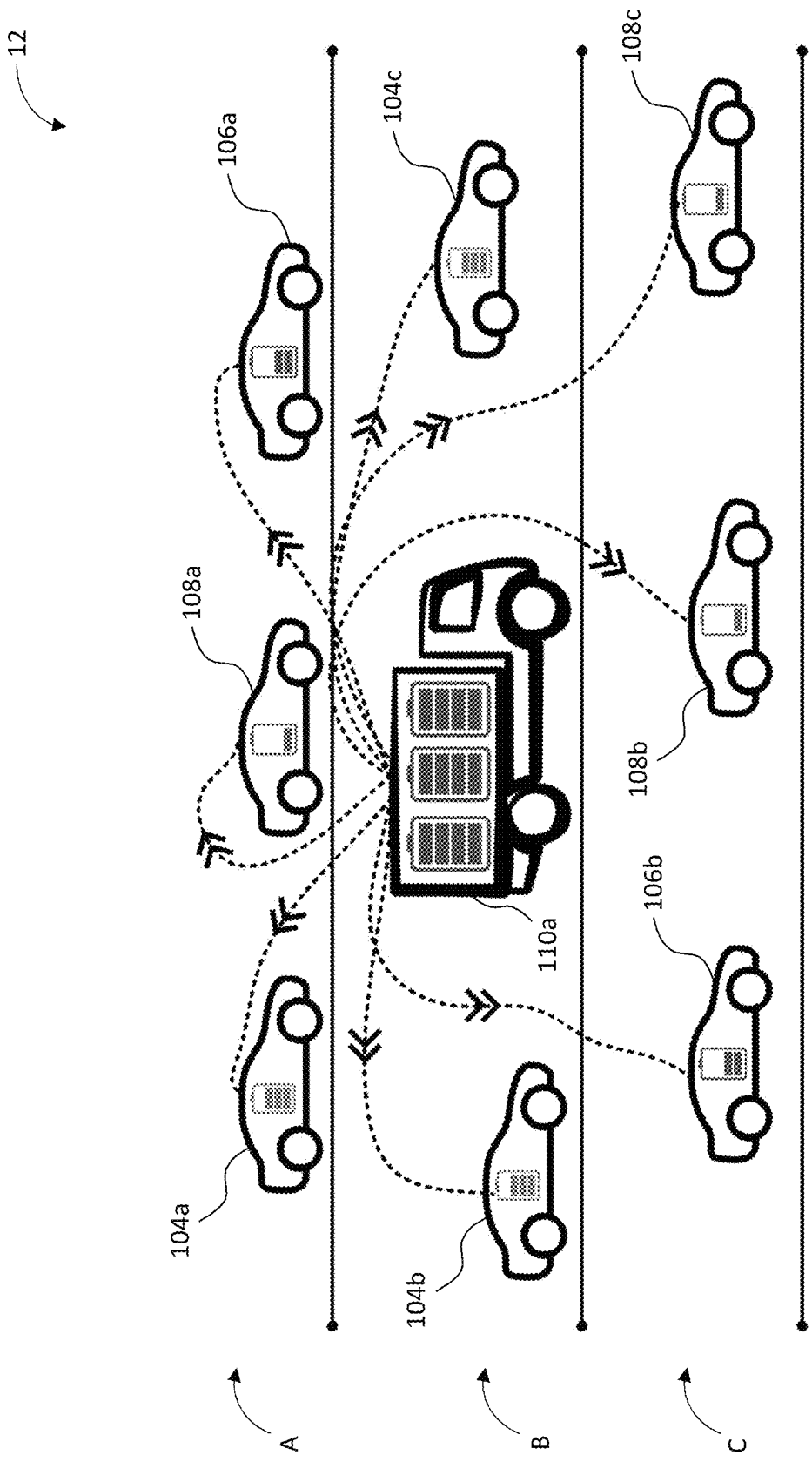
FIG. 6 provides an example of a system for on-the-go charging of entities by a mobile charging unit, according to some embodiments described herein.

Referring now to FIG. 6, an embodiment of the first homogeneous vehicle network 12 is illustrated with several vehicles having less than a full battery charge and traveling along a roadway in parallel lanes (A, B, and C). As illustrated, the overall network charge (the sum of battery charge levels of entities in the network locality) is low. Therefore, according to the illustrated embodiment, the computing device (e.g., 10) has caused a charging entity 110a to be deployed into the network to provide a replenishing supply of electrical charge to some or all of the entities in the first homogeneous vehicle network 12. In some embodiments, the charging entity 110a can have a high battery capacity and a high discharge rate such that several nearby entities with depleted battery levels can be charged at least partially simultaneously, thereby increasing the overall charge of the first homogeneous vehicle network 12.

Figure 7:
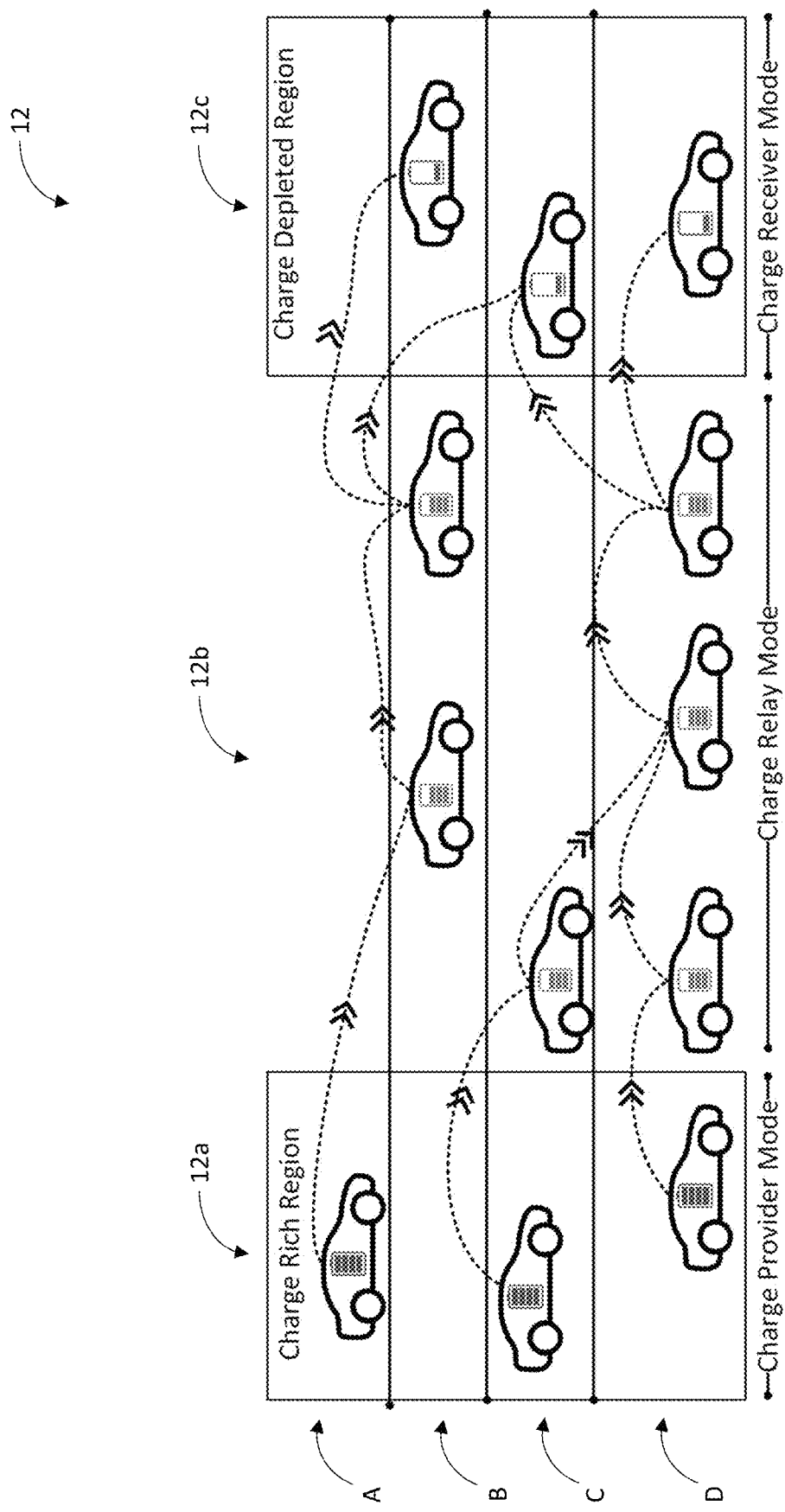
FIG. 7 provides an example of an approach for charging charge-depleted regions of a roadway by entity-to-entity relaying of charge from a charge-rich region via interstitial relay entities, according to some embodiments described herein.

Referring now to FIG. 7, an embodiment of the first homogeneous vehicle network 12 can have a charge rich region 12a and a charge depleted region 12c in the charge distribution map, separated by a charge relay region 12b. In some embodiments, the charge rich region 12a and the charge depleted region 12c can be separated by one or more moderately charged vehicles, e.g., across multiple lanes of traffic (A, B, C, and D) and/or by a linear distance of roadway along the direction of travel. In such embodiments, the cloud application can decide (based at least on what is optimal given the network state), to relay charge from the charge rich region 12a, through the charge relay region 12b, to the charge depleted region 12c, even though none of the mobile entities in the charge rich region 12a are nearby the mobile entities in the charge depleted region 12c. In order to accomplish the communication of a replenishing supply of electrical charge from mobile entities in the charge rich region 12a to mobile entities in the charge depleted region 12c, the mobile entities in the charge rich region 12a can be caused to operate as charge-supplying entities, the mobile entities in the charge depleted region 12c will operate as charge-receiving entities, and at least some of the mobile entities in the region between the charge rich region 12a and the charge depleted region 12c can be caused to relay the replenishing supply of electrical charge therebetween. In some embodiments, this approach can allow for mid-distance and even long-distance charging, can improve and even optimize travel time, and can reduce the overall charge expenditure for mobile entities in the first homogeneous vehicle network 12.

Figure 8:
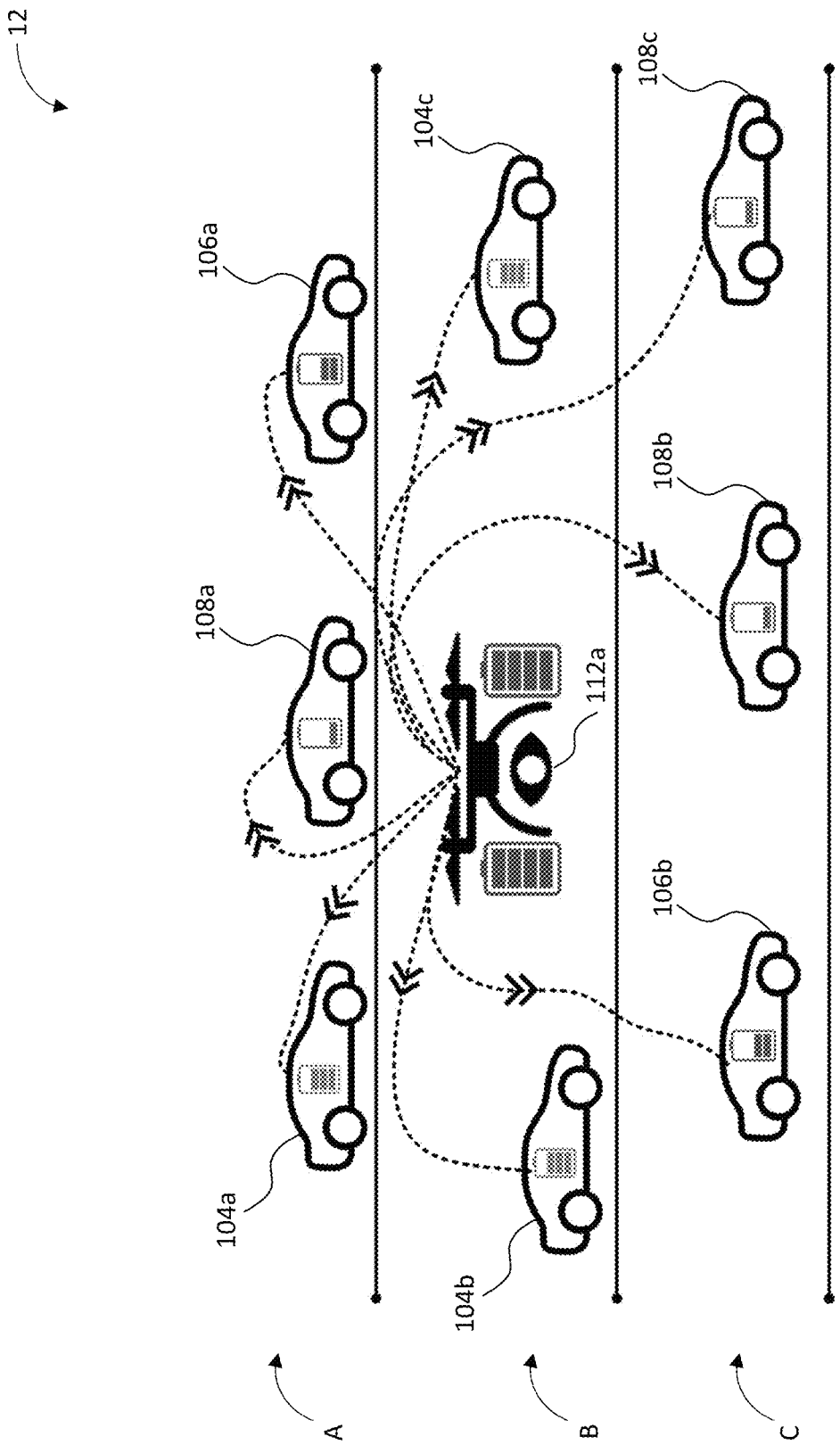
FIG. 8 provides an example of a heterogeneous network for on-the-go charging of mobile entities by an aerial charging vehicle, according to some embodiments described herein.

Referring now to FIG. 8, an embodiment of the first homogeneous vehicle network 12 is illustrated with several vehicles having less than a full battery charge and traveling along a roadway in parallel lanes (A, B, and C). As illustrated, the overall network charge (the sum of battery charge levels of entities in the network locality) is low. Therefore, according to the illustrated embodiment, the computing device (e.g., 10) has caused a charging entity 112a to be deployed into the network to provide a replenishing supply of electrical charge to some or all of the entities in the first homogeneous vehicle network 12. In some embodiments, the charging entity 112a can have a high battery capacity and a high discharge rate such that several nearby entities with depleted battery levels can be charged at least partially simultaneously, thereby increasing the overall charge of the first homogeneous vehicle network 12. As illustrated, the charging entity 112a is an aerial entity (e.g., a drone or other such unmanned aerial vehicle). Without wishing to be bound by any particular theory, the use of an aerial charging entity (e.g., the charging entity 112a) to provide a replenishing supply to the first homogeneous vehicle network 12 when it has a particularly low overall network charge or a charge depleted locality within the first homogeneous vehicle network 12 can be especially useful because aerial entities can more easily and more quickly reach any location within the first homogeneous vehicle network 12 since they can be caused to fly over, for instance, slow or stopped traffic to reach the charge depleted locality within the first homogeneous vehicle network 12.

Figure 9:
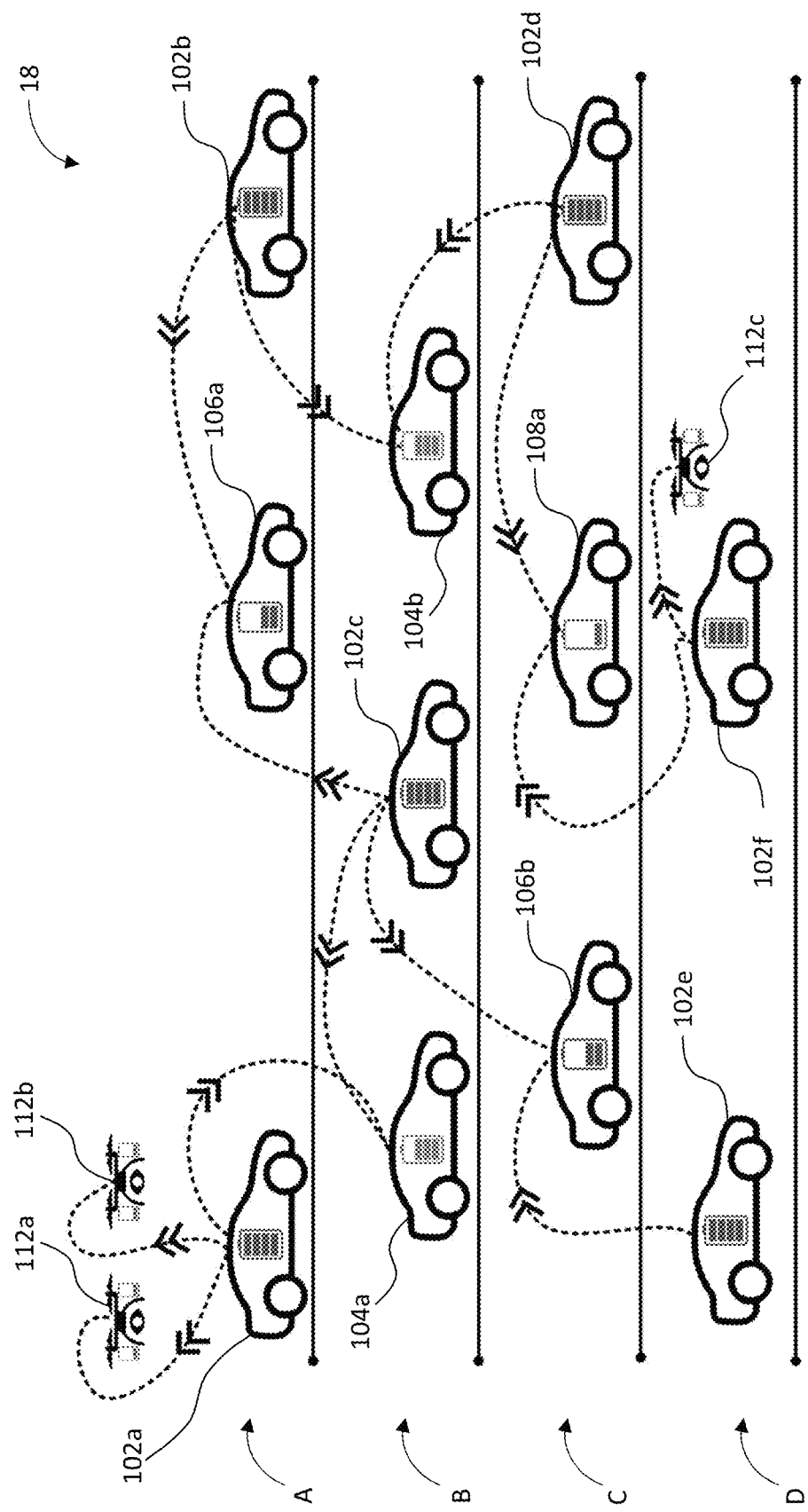
FIG. 9 provides an example of a heterogeneous network for on-the-go entity-to-entity charging between aerial and terrestrial entities, according to some embodiments described herein.

In a similar manner to how aerial entities can be used to quickly and easily provide a replenishing supply of electrical charge to a charge depleted locality within the first homogeneous vehicle network 12, other entities within the first homogeneous vehicle network 12 can be caused to provide a replenishing supply of electrical energy to an aerial entity with a depleted battery. Referring now to FIG. 9, an embodiment of the heterogeneous network 18 is illustrated with several vehicles having less than a full battery charge and traveling along a roadway in parallel lanes (A, B, C, and D), and several vehicles traveling through the air in a route generally corresponding with the roadway. As illustrated, the overall network charge (the sum of battery charge levels of entities in the network locality) is low. Therefore, according to the illustrated embodiment, the computing device (e.g., 10) has caused mobile entities having a battery charge level corresponding to Group A (102) to communicate a replenishing supply of electrical charge to mobile entities having a battery charge level corresponding to one of Group B (104), Group C (106), or Group D (108). As illustrated, the aerial entities each part of Group D (108) and therefore receive a replenishing supply of electrical charge from a terrestrial entity that is part of Group A (102). In some embodiments, such terrestrial entity-to-aerial entity charging on-the-go can be accomplished by any suitable means, such as the wired or wireless methods described in more detail above. Without wishing to be bound by any particular theory, at the power densities and charge capacities currently achievable for electrochemical cells and batteries, terrestrial entities and perhaps aquatic entities can achieve a better ratio of energy use to energy conveyance than aerial entities. Therefore, in some embodiments, mobile terrestrial entities can comprise a charge transmitting element that is particularly configured and dimensioned to be releasably coupled, electrically coupled, operably coupled, or otherwise in electrical communication with one or more aerial entities for purposes of communicating a replenishing supply of electrical charge to the one or more aerial entities.

In some embodiments, once the particular details of the charge transaction are agreed upon between a charge-supplying entity (e.g., a vehicle) and a charge-receiving entity (e.g., a drone), such as with the assistance of or at the direction of the computing device (e.g., 10), the charge transaction can commence. In some embodiments, during the charge transaction, a replenishing supply of electric charge can be communicated from a charge-supplying entity (e.g., 102a) to one or more charge-receiving entities (e.g., 108a, 108b). In some embodiments, the replenishing supply of electric charge can be communicated to the charge-receiving entity by a wired electrical coupling of the charge-supplying entity and the charge-receiving entity. In some embodiments, the charge-receiving entity can comprise a charge receiving element configured to be removably and electrically coupled to a charge transmitting element of the charge-supplying entity. In some embodiments, the charge transmitting element can be positioned on a roof or a side of the charge-supplying entity (e.g., 102a, 102b) such that the charge-receiving entities (e.g., 108a, 108b, and 108c) can be caused to be positioned nearby or on the charge-supplying entity such that the charge transmitting element and the charge receiving element can be suitably electrically coupled. In some embodiments, during regular operation of the charge-receiving entity, the charge receiving element can be configured to be retained within the charge-receiving entity, while the charge receiving element can be configured to be extended from the charge-receiving entity during a charge transaction so as to be coupled with the charge transmitting element of the charge-supplying entity. In some embodiments, the charge-receiving entity can have a charge receiving port that is not configured to be extended from the charge-receiving entity during a charge transaction, while the charge-supplying entity can be configured to extend the charge transmitting element to establish and maintain electrical communication between the charge transmitting element and the charge receiving port of the charge-receiving entity. In some embodiments, the charge receiving element of the charge-receiving entity can be configured to be extended out from the charge-receiving entity to establish and maintain electrical communication between the charge receiving element and a charge transmitting port of the charge-suppling entity, the charge transmitting port being stationary with regard to the charge-supplying entity during a charge transaction.

In some embodiments, the replenishing supply of electrical charge can be communicated to the charge-receiving entity by a wireless electrical coupling of the charge-supplying entity and the charge-receiving entity. In some embodiments, the replenishing supply of electrical charge can be communicated by a combination of a wired and a wireless electrical coupling of the charge-supplying entity and the charge-receiving entity. In some embodiments, the charge-receiving entity can comprise a wireless charging receiver and the charge-supplying entity can comprise a wireless charging transceiver. In some embodiments, the wireless charging receiver of the charge-receiving entity can be configured to receive the replenishing supply of electrical charge from the wireless charging transceiver of the charge-supplying entity, according to any suitable mechanism or protocol. Without wishing to be bound by any particular theory, the charge-receiving entity can be configured to receive the replenishing supply of electrical charge from the wireless charging transceiver of the charge-supplying entity by magnetic resonant coupling therebetween. Alternatively, without wishing to be bound by any particular theory, the charge-receiving entity can be configured to receive the replenishing supply of electrical charge from the wireless charging transceiver of the charge-supplying entity by tightly-coupled electromagnetic inductive or non-radiative charging. Alternatively, without wishing to be bound by any particular theory, the charge-receiving entity can be configured to receive the replenishing supply of electrical charge from the wireless charging transceiver of the charge-supplying entity by loosely-coupled or radiative electromagnetic resonant charging. Alternatively, without wishing to be bound by any particular theory, the charge-receiving entity can be configured to receive the replenishing supply of electrical charge from the wireless charging transceiver of the charge-supplying entity by uncoupled radio frequency wireless charging. Any and all other suitable wireless charging technologies, protocols, methods, approaches, systems, devices, and phenomena are contemplated herein and are hereby considered within the scope of this disclosure. In some embodiments, a proximity less than a pre-determined wireless charging proximity should be maintained between the charge-receiving entity and the charge-supplying entity for the duration of the charge transaction in order to maintain a wireless charging connection therebetween.

In some embodiments, depending upon the type and charging protocol of wireless charging device or system used, the pre-determined wireless charging proximity can be between about zero meters and about 20 meters, about 0.001 meters and about 20 meters, about 0.001 meters and about 19 meters, about 0.001 meters and about 18 meters, about 0.001 meters and about 17 meters, about 0.001 meters and about 16 meters, about 0.001 meters and about 15 meters, about 0.001 meters and about 14 meters, about 0.001 meters and about 13 meters, about 0.001 meters and about 12 meters, about 0.001 meters and about 11 meters, about 0.001 meters and about 10 meters, about 0.001 meters and about 9 meters, about 0.001 meters and about 8 meters, about 0.001 meters and about 7 meters, about 0.001 meters and about 6 meters, about 0.001 meters and about 5 meters, about 0.001 meters and about 4 meters, about 0.001 meters and about 3 meters, about 0.001 meters and about 2 meters, about 0.001 meters and about 1 meter, about 0.001 meters and about 0.5 meters, about 0.001 meters and about 0.25 meters, about 0.001 meters and about 0.1 meters, about 0.001 meters and about 0.01 meters, about 0.01 meters and about 5 meters about 0.02 meters and about 4 meters, about 0.03 meters and about 3 meters, about 0.04 meters and about 2 meters, about 0.05 meters and about 1 meter, about 0.002 meters and about 5 meters, about 0.003 meters and about 5 meters, about 0.003 meters and about 5 meters, about 0.004 meters and about 5 meters, about 0.005 meters and about 5 meters, about 0.006 meters and about 5 meters, about 0.007 meters and about 5 meters, about 0.008 meters and about 5 meters, about 0.009 meters and about 5 meters, or about 0.01 meters and about 5 meters, inclusive of all values and ranges therebetween. In some embodiments, depending upon the type and charging protocol of wireless charging device or system used, the pre-determined wireless charging proximity can be less than about 20 meters, about 19 meters, about 18 meters, about 17 meters, about 16 meters, about 15 meters, about 14 meters, about 13 meters, about 12 meters, about 11 meters, about 9 meters, about 8 meters, about 7 meters, about 6 meters, about 5 meters, about 4 meters, about 3 meters, about 2 meters, about 1 meter, about 0.5 meters, about 0.25 meters, about 0.1 meters, less than about 0.05 meters, less than about 0.01 meters, or less than about 0.001 meters, inclusive of all values and ranges therebetween. In some embodiments, depending upon the type and charging protocol of wireless charging device or system used, the pre-determined wireless charging proximity can be greater than about zero meters, about 0.001 meters, about 0.002 meters, about 0.003 meters, about 0.004 meters, about 0.005 meters, about 0.006 meters, about 0.007 meters, about 0.008 meters, about 0.009 meters, about 0.01 meters, about 0.02 meters, about 0.03 meters, about 0.04 meters, about 0.05 meters, about 0.06 meters, about 0.07 meters, about 0.08 meters, about 0.09 meters, about 0.1 meters, about 0.2 meters, about 0.3 meters, about 0.4 meters, about 0.5 meters, about 0.6 meters, about 0.7 meters, about 0.8 meters, about 0.9 meters, about 1 meter, about 1.25 meters, about 1.5 meters, about 1.75 meters, about 2 meters, about 2.25 meters, about 2.5 meters, about 2.75 meters, about 3 meters, about 3.25 meters, about 3.5 meters, about 3.75 meters, about 4 meters, about 4.25 meters, about 4.5 meters, about 4.75 meters, about 5 meters, about 6 meters, about 7 meters, about 8 meters, about 9 meters, about 10 meters, about 11 meters, about 12 meters, about 13 meters, about 14 meters, about 15 meters, about 16 meters, about 17 meters, about 18 meters, about 19 meters, or greater than about 20 meters, inclusive of all values and ranges therebetween.

Figure 10:
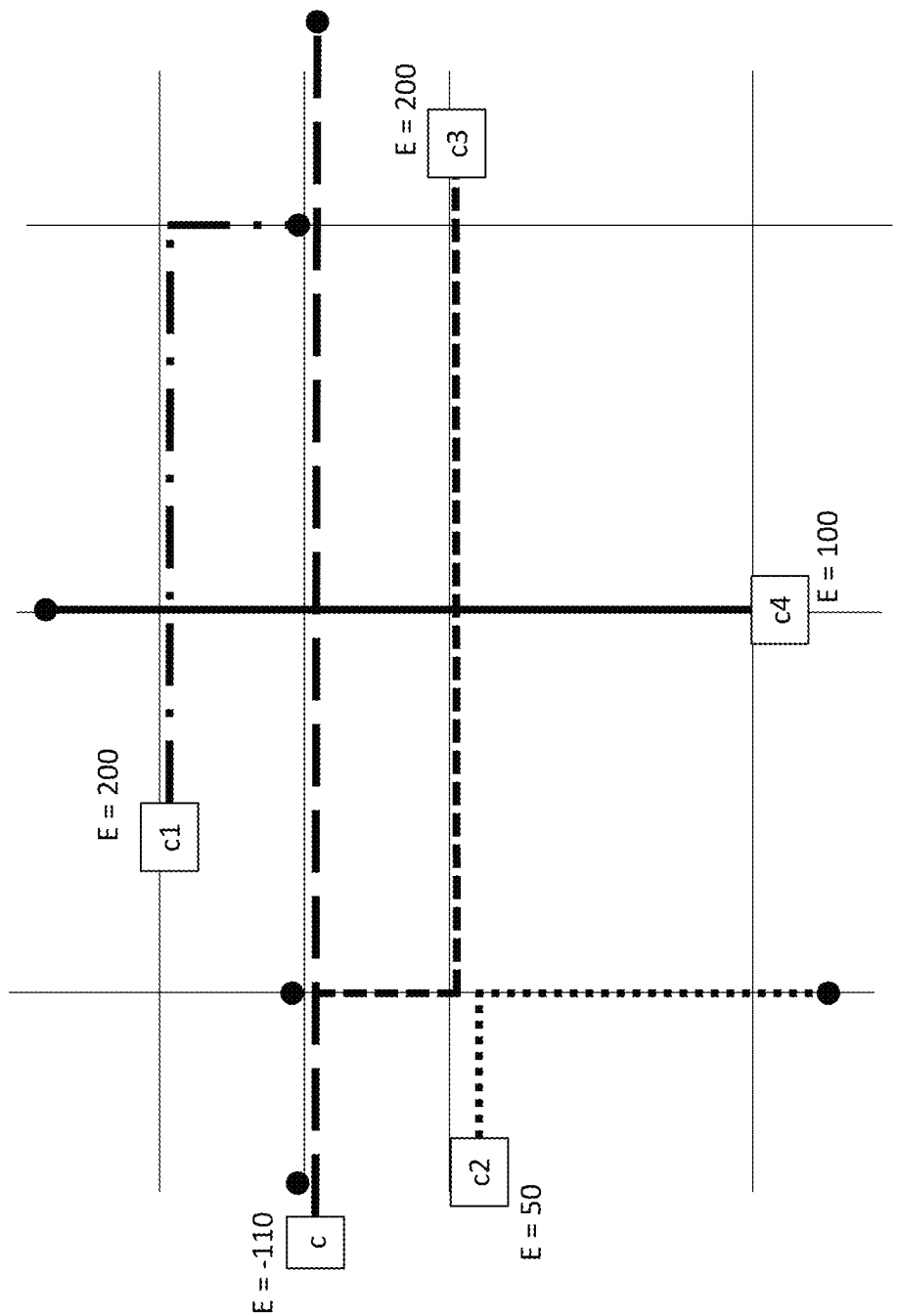
FIG. 10 provides an example of a fine-grained routing and charging transaction schedule before cloud application optimization, according to some embodiments described herein.

Referring now to FIGS. 10-15, a set of particular localities of embodiments of a vehicle network (e.g., 12) are illustrated. As illustrated in FIG. 10, a plurality of mobile entities (c, c1, c2, c3 and c4) are in motion within a particular locality, each mobile entity having a particular destination. As illustrated, E represents the amount of charge the entities will be left with after completing their respective trips. A negative E value indicates that the corresponding entity will likely require additional charge to finish the desired trip, while a positive E value indicates that the corresponding entity will have surplus charge after making the desired trip.

As discussed above, a charge-distribution map and route planning map, such as illustrated in FIGS. 10-15, can be used by a computing device (e.g., for instance a computing device comprising a processor, a memory device including specialized computer program code, a route planning algorithm, a charge transaction scheduling algorithm, and/or an artificial intelligence program) to track and schedule trip routes and charge transactions for a particular locality of a charge network and/or the charge network in full.

Figure 11:
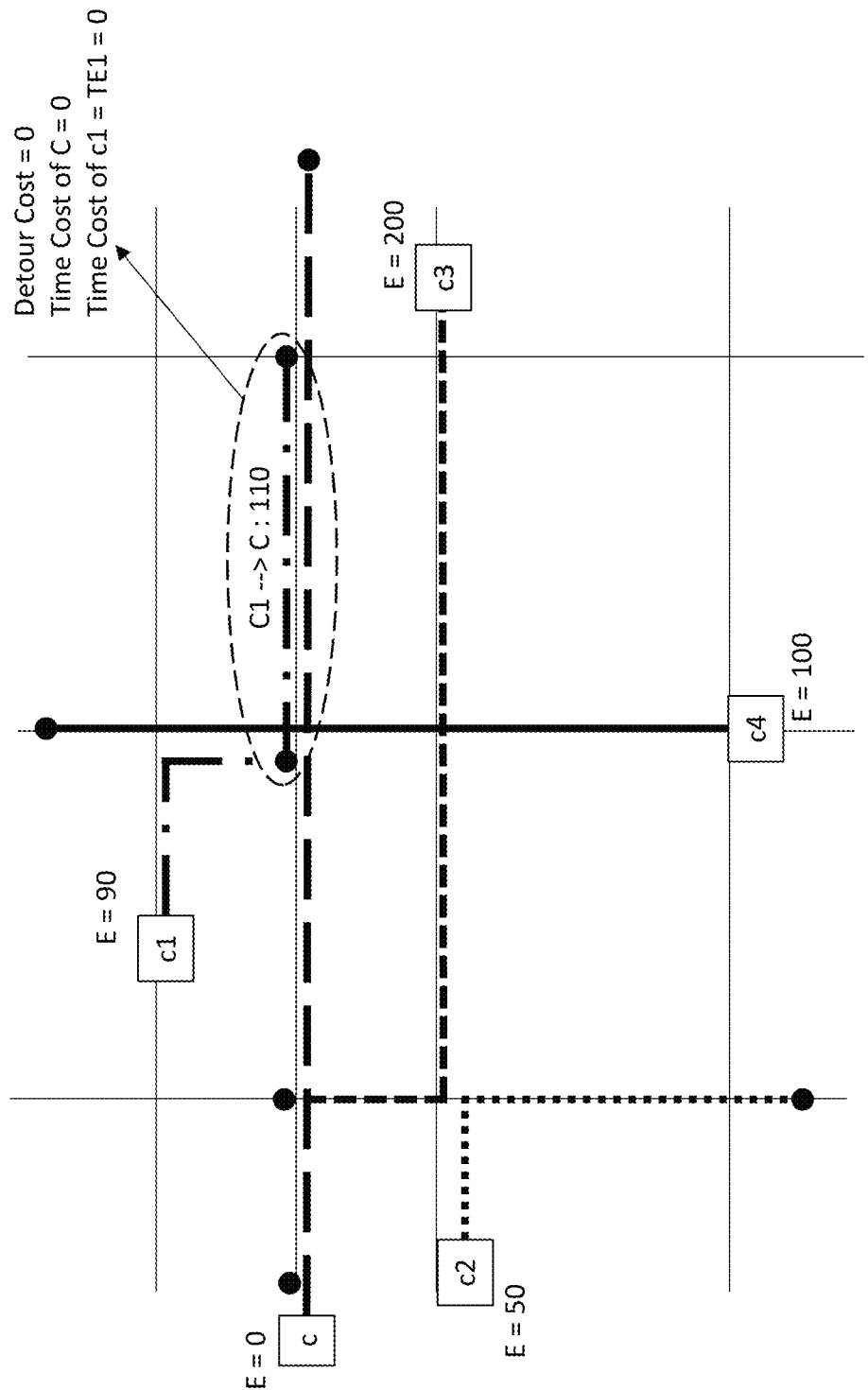
FIG. 11 provides an example of a fine-grained routing and charging transaction schedule after cloud application optimization, according to some embodiments described herein.

As illustrated in FIG. 10, entity c, will likely require an additional 110 units of charge to complete the desired trip, however a surplus of charge is expected for each of entity c1, entity c2, entity c3, and entity c4 at the end of the corresponding desired trip, as currently planned. As illustrated in FIG. 11, the computing device, with the assistance of specialized computer programs such as the route planning algorithm, the charge transaction scheduling algorithm, and/or the artificial intelligence program, suggests re-routing entity c1 to align the new route of entity c1 with the existing route of entity c and scheduling a charge transaction between entity c and entity c1 for during the period of time when the trip routes of entity c1 and entity c align. By re-routing c1 and scheduling a charge transaction between entity c1 and entity c, entity c is able to complete the desired trip, without compromising the ability of entity c1 to complete its desired trip, and without disturbing or re-routing the other entities in the locality. In addition, the computing device is configured to optimize the overall charge usage and travel time for all involved entities, meaning that c1 was not chosen at random as the entity to re-route, but rather that all possible or many of the possible re-routing options were considered in real-time or near real-time by the computing device and the optimal re-routing scenario in terms of overall charge use and travel time was chosen. In this particular example, the computing device was able to re-route only one entity (entity c1) and there was no resulting waste of time or electrical charge based at least on the re-routing of entity c1.

Figure 12:
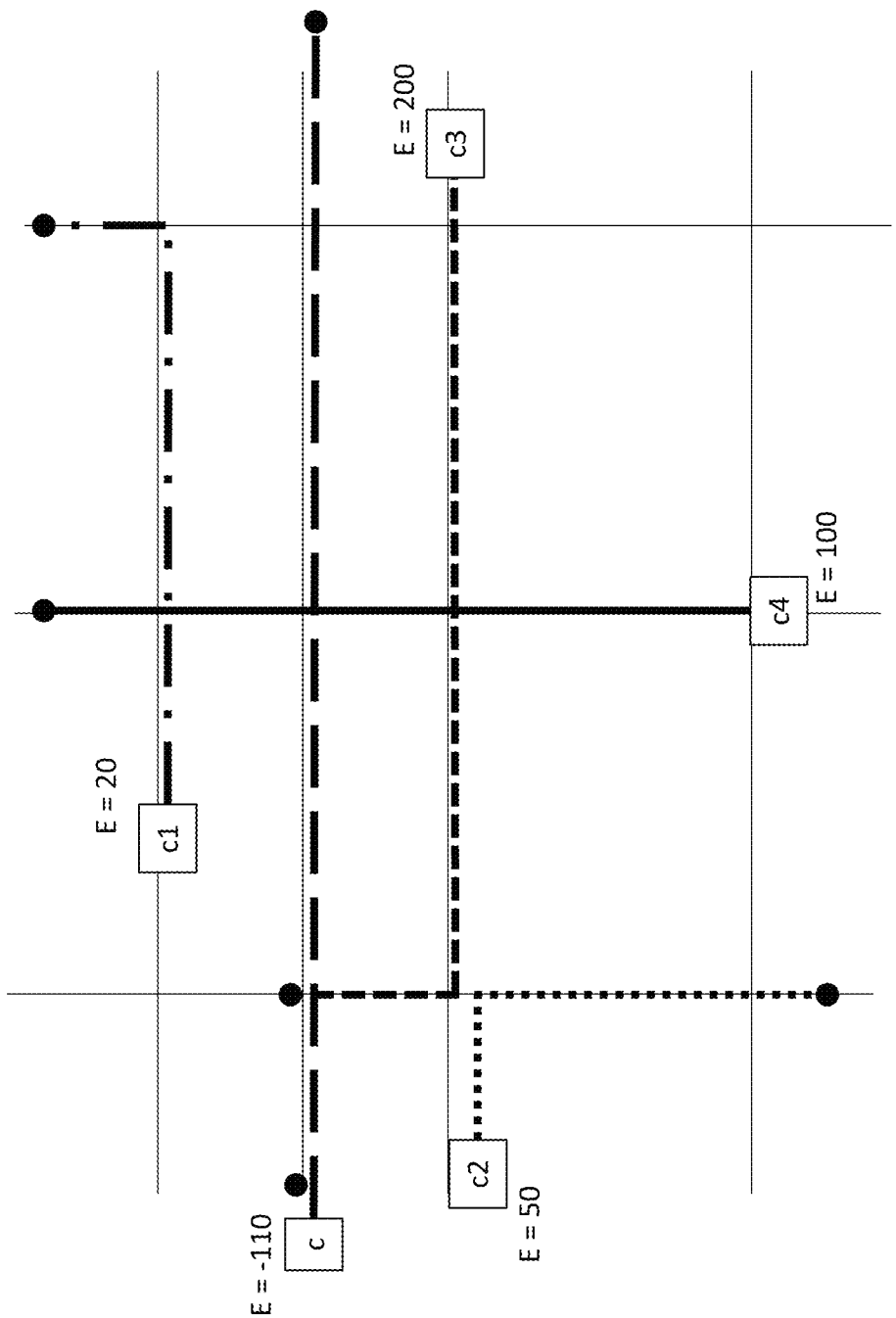
FIG. 12 provides an example of a fine-grained routing and charging transaction schedule before cloud optimization, according to some embodiments described herein.
Figure 13:
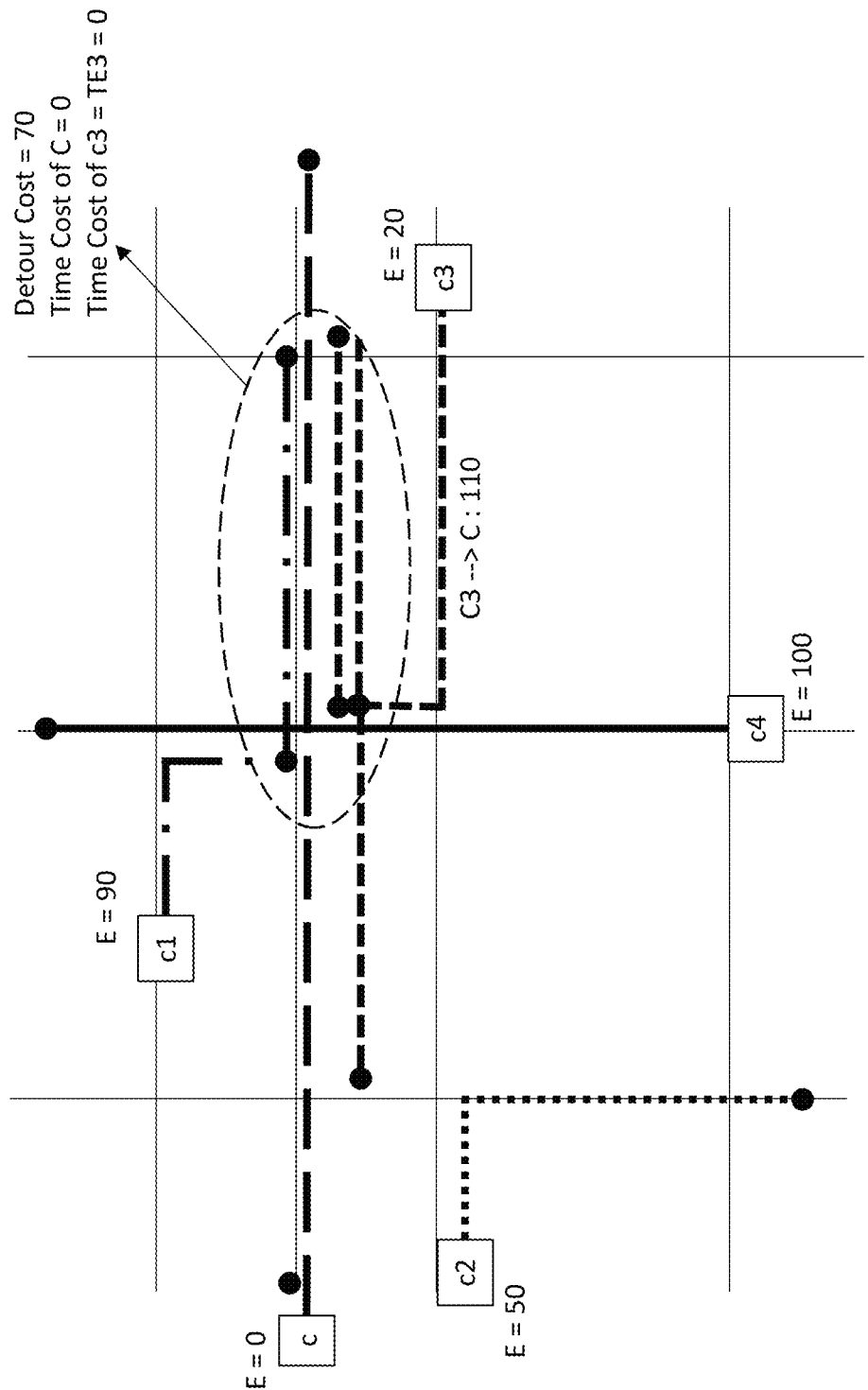
FIG. 13 provides an example of a fine-grained routing and charging transaction schedule after cloud optimization, according to some embodiments described herein.

In another example, as illustrated in FIG. 12, it is noted that entity c will likely require an additional 110 units of charge to complete the desired trip, however a surplus of charge is expected for each of entity c1, entity c2, entity c3, and entity c4 at the end of each corresponding desired trip, as currently planned. As illustrated in FIG. 13, the computing device, with the assistance of specialized computer programs such as the route planning algorithm, the charge transaction scheduling algorithm, and/or the artificial intelligence program, suggests re-routing entity c3 to align the new route of entity c3 with the existing route of entity c and scheduling a charge transaction between entity c and entity c3 for during the period of time when the trip routes of entity c3 and entity c align. By re-routing c3 and scheduling a charge transaction between entity c3 and entity c, entity c is able to complete the desired trip, without compromising the ability of entity c3 to complete its desired trip, and without disturbing or re-routing the other entities in the locality. In addition, the computing device is configured to optimize the overall charge usage and travel time for all involved entities, meaning that c3 was not chosen at random as the entity to re-route, but rather that all possible or many of the possible re-routing options were considered in real-time or near real-time by the computing device and the optimal re-routing scenario in terms of overall charge use and travel time was chosen. In this particular example, the computing device was able to re-route only one entity (entity c3) and, while there was an increase in the trip duration for entity c3 and a small loss of electrical charge based at least on the re-routing of entity c3, it was the optimal schedule in that the least number of entities experienced a loss of charge and the least number of entities experienced the smallest increase in trip duration.

Figure 14:
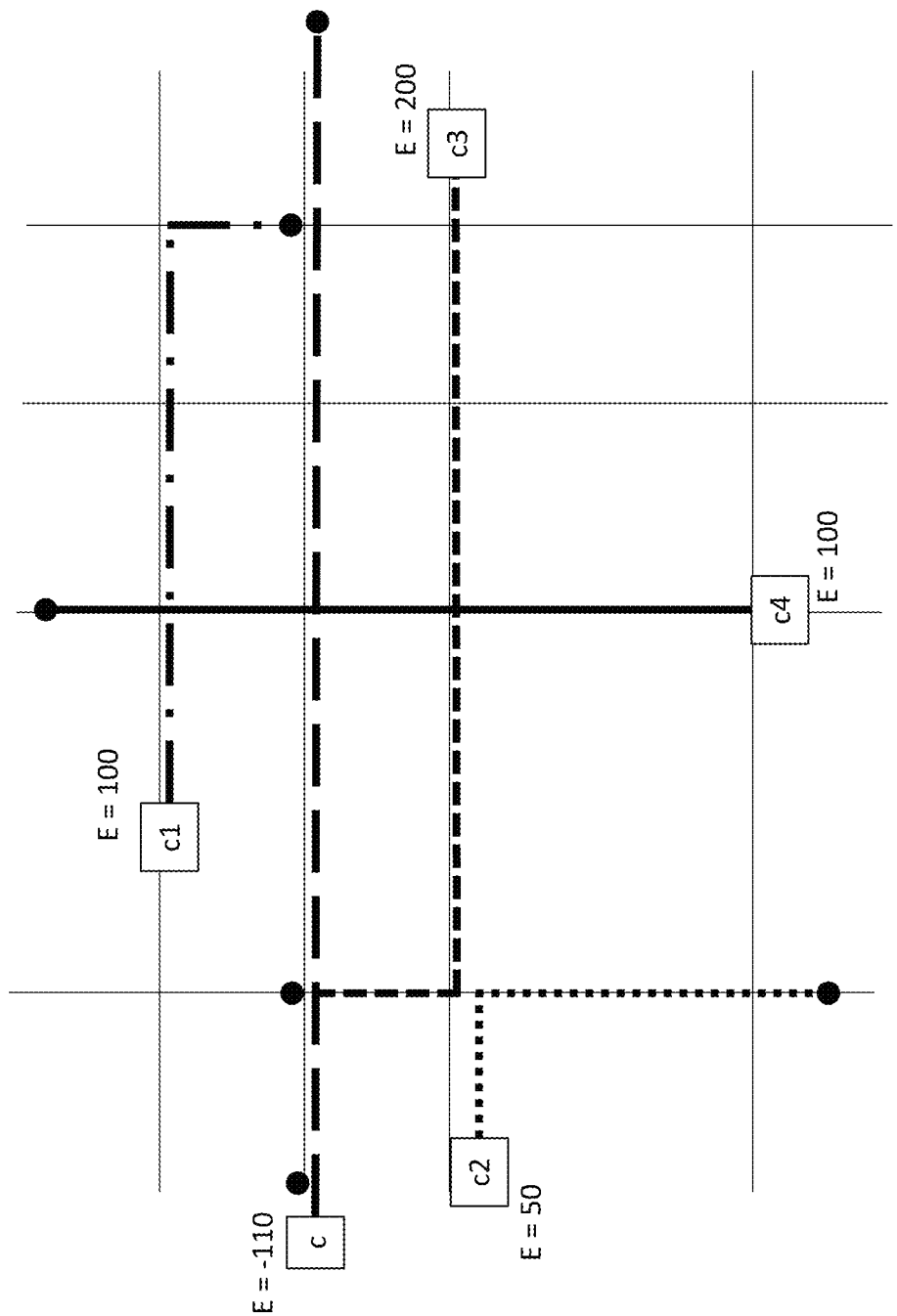
FIG. 14 provides an example of a fine-grained routing and charging transaction schedule before cloud optimization, according to some embodiments described herein.
Figure 15:
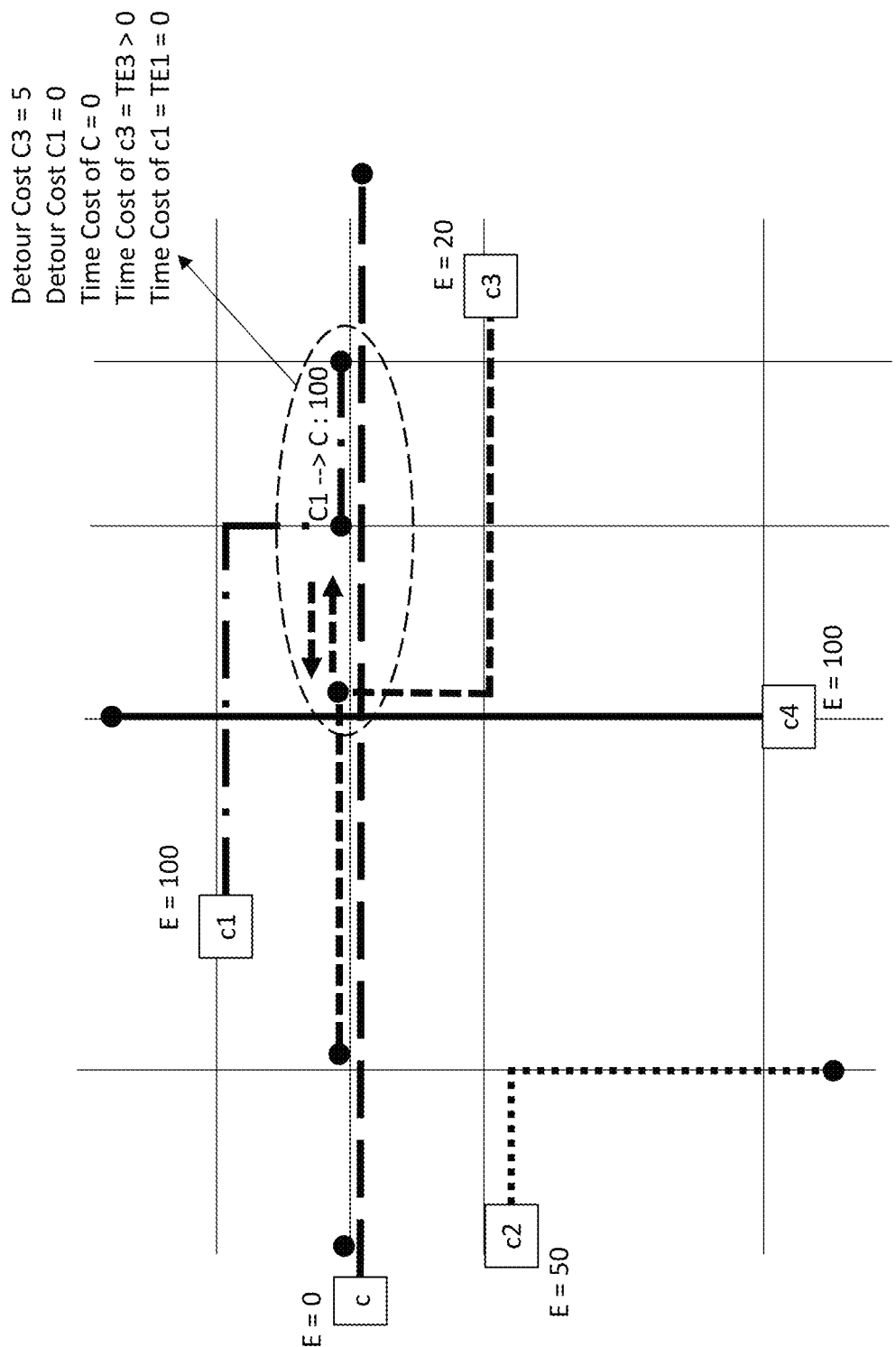
FIG. 15 provides an example of a fine-grained routing and charging transaction schedule after cloud optimization, according to some embodiments described herein.

In another example, as illustrated in FIG. 14, it is noted that entity c will likely require an additional 110 units of charge to complete the desired trip, however a surplus of charge is expected for each of entity c1, entity c2, entity c3, and entity c4 at the end of each corresponding desired trip, as currently planned. As illustrated in FIG. 15, the computing device, with the assistance of specialized computer programs such as the route planning algorithm, the charge transaction scheduling algorithm, and/or the artificial intelligence program, suggests re-routing entity c3 and c1 to align a portion of the new route of entity c3 with a portion of the existing route of entity c and a portion of the new route of entity c1 with another portion of the existing route of entity c, the computing device scheduling a first charge transaction between entity c and entity c3 for during the period of time when the trip routes of entity c3 and entity c align and a second charge transaction between entity c and entity c1 for during the period of time when the trip routes of entity c1 and entity c align. By re-routing entities c3 and c1, and by scheduling a first charge transaction between entity c3 and c and a second charge transaction between entity c1 and c, entity c is able to complete the desired trip, without compromising the ability of entity c3 or entity c1 to complete their desired trips, and without disturbing or re-routing the other entities in the locality. In addition, the computing device is configured to optimize the overall charge usage and travel time for all involved entities, meaning that c3 and c1 were not chosen at random as the entities to re-route, but rather that all possible or many of the possible re-routing options were considered in real-time or near real-time by the computing device and the optimal re-routing scenario in terms of overall charge use and travel time was chosen. In this particular example, the computing device was able to re-route only two entities (entity c3 and entity c1) and, while there was an increase in the trip duration for entity c3 and a small loss of electrical charge based at least on the re-routing of entity c3, there was no loss of charge to entity c1 nor an increase in the trip duration based at least on the re-routing of entity c1. As illustrated, the proposed route and charge transaction schedule for the particular situation presented at the particular locality was optimized by the computing device in that the least number of entities experienced a loss of charge and the least number of entities experienced the smallest increase in trip duration.

Figure 16:
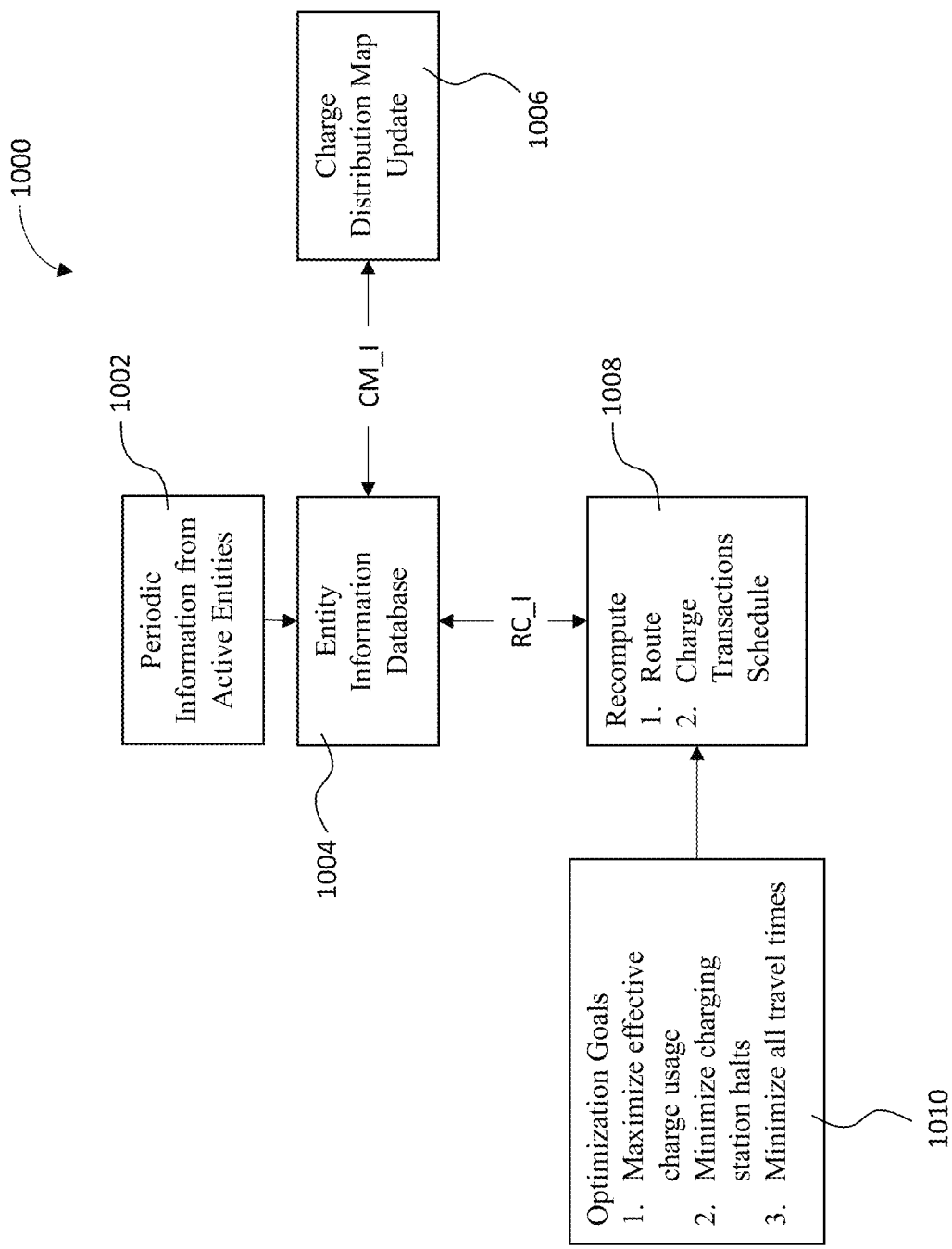
FIG. 16 provides an example of a charge scheduling algorithm, according to some embodiments described herein.
Figure 17:
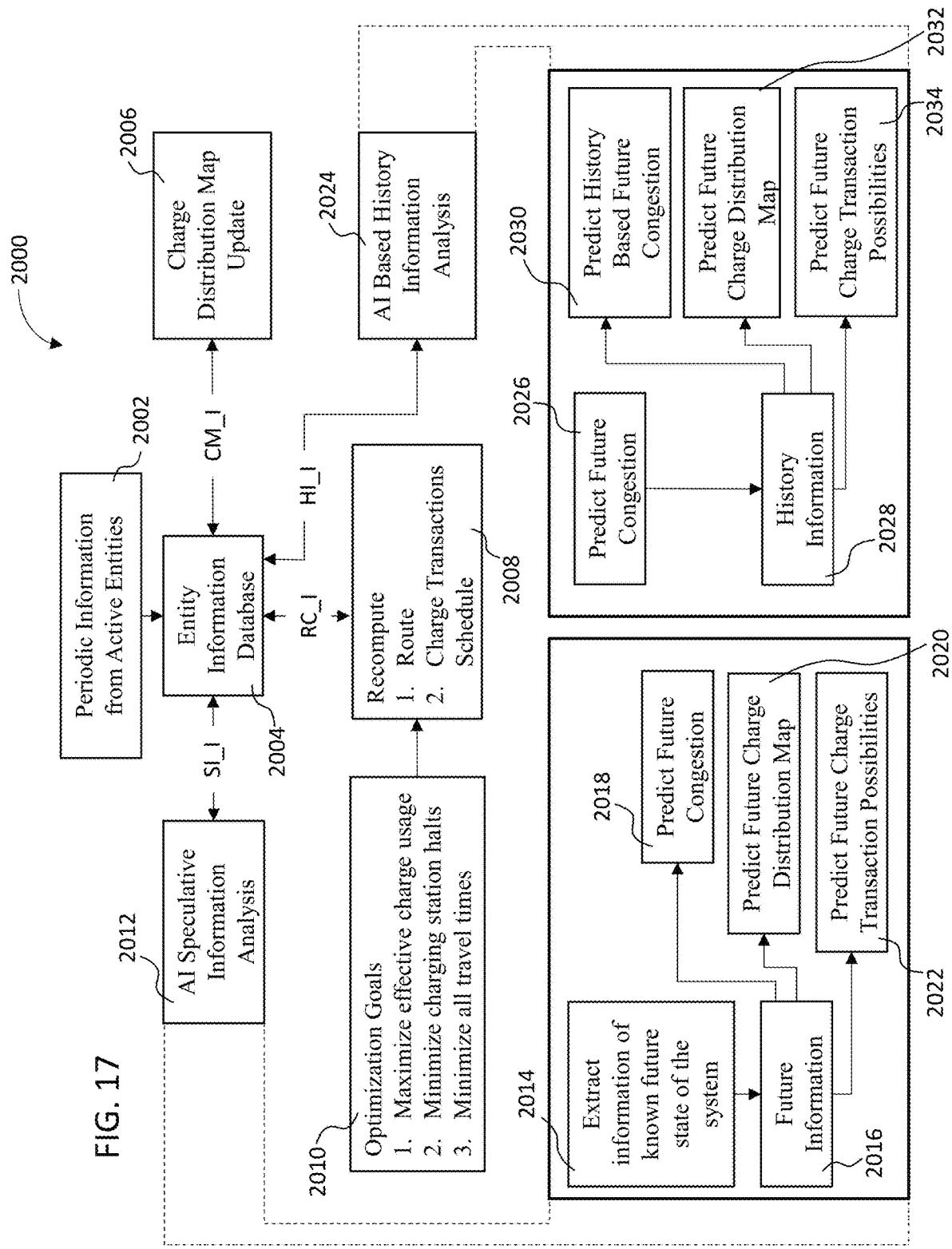
FIG. 17 provides an example of a charge scheduling algorithm, according to some embodiments described herein.
Figure 18:
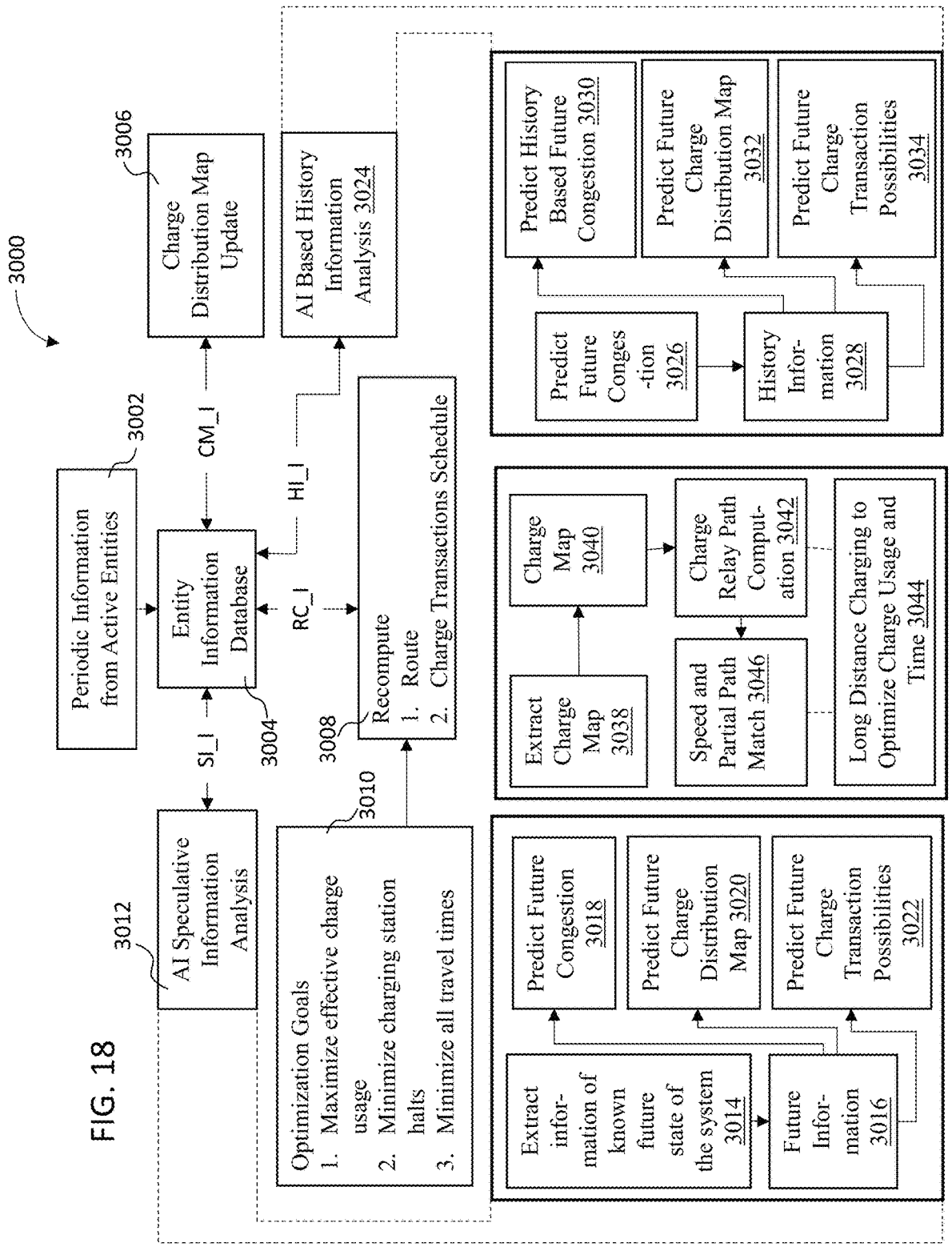
FIG. 18 provides an example of a charge scheduling algorithm, according to some embodiments described herein.

Turning now to the algorithmic decision-making process and to discussion of at least some of the algorithms considered herein, a general overview of some of the features of three example algorithms is provided in Table 1 and illustrated in FIGS. 16-18. Algorithms 1000, 2000, and 3000 represent scheduling and routing algorithms with varying levels of complexity, each of which are useful for decision-making with regard to the complex task of planning a large number of entity routes and charge transactions for a charge network, such as described herein.

TABLE 1

Select features of three of the algorithms considered for use in the systems and methods described herein.

| Features | Algorithm 1000 | Algorithm 2000 | Algorithm 3000 |
|---|---|---|---|
| Charge Distribution Map | X | X | X |
| Optimized Routing | X | X | X |
| Optimized Transaction Scheduling | X | X | X |
| Speculative Information Incorporation | | X | X |
| History Information Incorporation | | X | X |
| Relay Charging | | | X |

As with many goal-oriented or goal-directed processes and models, the particular charge scheduling and routing algorithms identified as Algorithm 1000, Algorithm 2000, and Algorithm 3000 in Table 1 each have optimization goals which include i) maximizing effective charge usage, ii) minimize the number and the duration of stops required by entities for charging at stationary charging stations, and iii) minimize all travel times for entities in the charge network. The three algorithms presented here and discussed in further detail below are provided for purposes of example and illustration only and are in no way intended to limit the scope of the present disclosure.

As illustrated in FIG. 16, Algorithm 1000, which is the least complex algorithm from among the three described herein, can be used by a computing device to generate and maintain a charge-distribution map and can be used to iteratively update, or update in real time, the charge-distribution map based at least on information about the current status of entities in the charge network to re-route entities as necessary and to schedule charge transactions. In some embodiments, periodic information from the vehicles/entities 1002 is sent to the computing device (e.g., a cloud application) and are stored in an Entity Information Database 1004. In some embodiments, with a periodicity of CM_I, an updated charge distribution map 1006 is generated and stored in the Entity Information Database 1004. In some embodiments, the Entity Information Database 1004 can contain some or all of the information used for routing and charge transaction scheduling. In some embodiments, with a periodicity of RC_I, routing and charge scheduling 1008 is performed for the network based at least upon pre-determined optimization goals 1010.

As illustrated in FIG. 17, Algorithm 2000, which is more complex than Algorithm 1000 and which provides the additional features of speculative information incorporation and historic information incorporation, also arguably provides, at least in some embodiments, a more optimized charge network with regard to the optimization goals. In some embodiments, the computing device can use Algorithm 2000 to generate and maintain a charge-distribution map and can be used to iteratively update, or update in real time, the charge-distribution map based at least on information about the current status of entities in the charge network to re-route entities as necessary and to schedule charge transactions. In some embodiments, periodic information from the vehicles/entities 2002 in the charge network is sent to the computing device (e.g., a cloud application) and they are stored in an Entity Information Database 2004. In some embodiments, with a periodicity of CM_I, an updated charge distribution map 2006 is generated and stored in the Entity Information Database 2004. In some embodiments, with a periodicity of SI_I, a speculative analysis 2012 is performed based at least on information obtained regarding future travel plans, weather forecast, traffic forecast, etc., as well as extracted information about a known future station of the system 2014. The algorithm employs artificial intelligence, such as machine learning, to predict future information 2016 about different aspects of the network, including, but is not limited to, predicting future congestion 2018, predicting future charge distribution map 2020, and predicting future charge transaction possibilities 2022. This information is computed and stored in the Entity Information Database 2004. In some embodiments, the Algorithm 2000 is capable of, with a periodicity of HI_I, performing a history information analysis 2024 based at least on extracted historic information 2026 that is compiled into history information 2028. In some embodiments, an artificial intelligence program uses Algorithm 2000 to make certain predictions based at least upon the history information 2028, including, but is not limited to, predicting congestion 2030, predicting the future charge distribution map 2032, and predicting future charge transaction possibilities 2034. In some embodiments, some or all of the information needed by the artificial intelligence, produced by the artificial intelligence, needed by Algorithm 2000, and/or produced by Algorithm 2000 may be stored in the Entity Information Database. In some embodiments, with a periodicity of RC_I, routing and charge scheduling 2008 is performed for the network based at least upon the pre-determined optimization goals 2010.

As illustrated in FIG. 18, Algorithm 3000, which is more complex than Algorithms 1000 or 2000, and which provides the additional features of speculative information incorporation, historic information incorporation, and relay charging, also arguably provides, at least in some embodiments, a more optimized charge network with regard to the optimization goals. In some embodiments, the computing device can use Algorithm 3000 to generate and maintain a charge-distribution map and can be used to iteratively update, or update in real time, the charge-distribution map based at least on information about the current status of entities in the charge network to re-route entities as necessary and to schedule charge transactions. In some embodiments, periodic information from the vehicles/entities 3002 in the charge network is sent to the computing device (e.g., a cloud application) and they are stored in an Entity Information Database 3004. In some embodiments, with a periodicity of CM_I, an updated charge distribution map 3006 is generated and stored in the Entity Information Database 3004. In some embodiments, with a periodicity of SI_I, a speculative analysis 3012 is performed based at least on information obtained regarding future travel plans, weather forecast, traffic forecast, etc., as well as extracted information about a known future station of the system 3014. The algorithm employs artificial intelligence to predict future information 3016 about different aspects of the network, including, but is not limited to, predicting future congestion 3018, predicting future charge distribution map 3020, and predicting future charge transaction possibilities 3022. This information is computed and stored in the Entity Information Database 3004. In some embodiments, the Algorithm 3000 is capable of, with a periodicity of HI_I, performing a history information analysis 3024 based at least on extracted historic information 3026 that is compiled into history information 3028. In some embodiments, an artificial intelligence program uses Algorithm 3000 to make certain predictions based at least upon the history information 3028, including, but is not limited to, predicting congestion 3030, predicting the future charge distribution map 3032, and predicting future charge transaction possibilities 3034. In some embodiments, a status of all charger entities 3036 is then processed and stored in the Entity Information Database 3004. If the computing device decides to set up a relay charge sharing scenario between two localities or zones of the network, the relay setup, the computing device deploys the charging entities and optimizes the route and scheduled charge transactions therefore. To do so, the computing device uses an extracted charge map 3038 to generate a charge map 3040 of the current status and location of charging entities. To boost the overall charge in the network, the computing device uses artificial intelligence and Algorithm 3000 to compute a charge relay path 3042 from a charge rich region to a charge depleted region based at least upon long distance charging scenarios to optimize charge usage and minimize trip delays 3044. The computing device then determines the best speed and at least partial path match 3046 for the charging entity such that the relay connection is maintained. In some embodiments, some or all the information needed by the artificial intelligence, produced by the artificial intelligence, needed by Algorithm 3000, and/or produced by Algorithm 3000 may be stored in the Entity Information Database 3004. In some embodiments, with a periodicity of RC_I, routing and charge scheduling 3008 is performed for the network based at least upon the predetermined optimization goals 3010.

In some embodiments, the number and types of units in a network can dynamically change, e.g., a network at a specific instant of time may consist of n units which are only capable of receiving cars, m units of which are capable of just providing charge and p units which can do both as well as relaying charge (optionally). In some embodiments, the types of the units may vary in terms of their type of motion, e.g., a network may consist of n number of cars and m number of drones. In some embodiments, a charge transaction can occur between two different networks. Assume, for instance, that one network of units is owned by a specific company or organization and another network is owned by a different company or organization. In an event that there are several networks (each with dynamically varying number and types of units), then charge can be shared across networks based at least on pre-negotiated or real-time online negotiations on charge transfer rate and other parameters. Hence, both intra- and inter-network charge transfers are possible. Both inter and inter-network charge transactions can be fully autonomous, based at least on the algorithms described above or variants thereof, and based at least on the requisite information on the locations of units, charge distribution map, etc.

In some embodiments, approaches described herein and algorithms described herein can be operable to charge battery-powered entities both within and between charge networks. For instance, excess charge can be transmitted from a first charge network to a second charge network upon determining that the second charge network is a charge-depleted network relative to the first charge network and/or that the first charge network has excess charge. In some embodiments, an algorithm such as described above, can be used for charge transaction scheduling and/or route scheduling within and between a plurality of charge networks. In some embodiments, a computing device, such as a cloud application, computing network, server, or the like, can be used to apply such an algorithm to schedule a charge transaction between the first charge network and the second charge network.

In some embodiments, a scheduler may use an algorithm and/or a charge distribution map to determine where to allocate charge, either by peer-to-peer charging or charging via MoCS. The scheduler may operate according to a set of optimization goals, which guide the scheduler in determining an optimal distribution of charge throughout an EV fleet. In some embodiments, while computing various EV routes, rerouting EVs as necessary, determining a spatiotemporal schedule for charge transactions, and/or a schedule for deploying MoCS in the system, the scheduler may consider certain factors. In some embodiments, the scheduler may consider the following optimization goals:

1) maximize effective charge usage by analyzing the charge distribution map;
2) minimize charging station halts by sustaining low battery vehicles;
3) minimize travel time of all EVs by limiting the number of rerouting;
4) maximize battery life by considering the depth of discharge of each EV; and
5) prioritize MoCS as charge providers over passenger EVs and the like.

In some embodiments, the final decision of the scheduler may be a function of all the optimization parameters, where each parameter can be weighted differently depending on which goals the user wishes to prioritize. While the five optimization goals presented above are one possible set of optimization goals, other embodiments include less, more, and/or different optimization goals, e.g., based at least upon the desired outcome of a system operator and/or alternative constraints and/or preferences.

In addition to Algorithm 1000, Algorithm 2000, and Algorithm 3000, described hereinabove, other algorithms for the scheduling of peer-to-peer and MoCS-to-EV charging events, making routing/rerouting decisions, and deciding when/where to deploy MoCS to the system are contemplated, such as Algorithm 3000' presented in Table 2.

TABLE 2

| Algorithm 3000' |
| --- |
| 1: procedure GENERATE_SCHEDULE(Charge_Dist_Map) |
| 2:    Instruction_List = ∅     ▷ Initialized to empty set. |
| 3:    Crit_EVs_List = find_critical_evs(Charge_Dist_Map) |
| 4:    i = 0 |
| 5:    while i < length(Crit_EVs_List) do |
| 6:       Prov_EV = find_prov_ev(Crit_EVs_List[i]) |
| 7:       inst = gen_charge_tran_inst(Prov_EV, Crit_EVs_List[i]) |
| 8:       Instruction_List.append(inst) |
| 9:       i = i + 1 |
| 10:   Charge_DR_List = find_charge_dr(Charge_Dist_Map) |
| 11:   i = 0 |
| 12:   while i < length(Charge_DR_List) do |
| 13:      ins_pt = find_best_mocs_ins_pt(Charge_DR_List[i]) |
| 14:      mocs_ins_num = find_MoCS_num(Charge_DR_List[i]) |
| 15:      MoCS_Inst = gen_mocs_ins_inst(ins_pt, mocs_ins_num) |
| 16:      Instruction_List.append(MoCS_Inst) |
| 17:      i = i + 1 |
| 18:   return Instruction_List |

Algorithm 3000' was used in a SUMO simulation in order to evaluate the effectiveness of this approach for scheduling charge transactions in a complex EV fleet using MoCS. In some embodiments, according to Algorithm 3000," a scheduler can generate, retrieve, receive, or request a charge distribution map (Charge_Dist_Map) as an input and generate a list of instructions (Instruction_List) to be followed by the EVs, MoCS, and MoCS depots. The scheduler acts as an intelligent decision function. In some embodiments, a method such as find_critical_evs can be used for identifying the EVs in the network with critical battery capacity using the charge distribution map maintained in the cloud control system. In line 3 of Algorithm 3000," this method is used to generate the critical EV list (Crit_EVs_List). The method find_prov_ev can then be used to identify the best provider EV (Prov_EV) for a given critical EV from all nearby EVs within a user-specified range. This method uses a greedy search algorithm based at least on a linear weighted function of all the optimization goals mentioned earlier. In line 7 of Algorithm 3000," charge transaction instruction (inst) are generated; inst being used to facilitate the charge transfer. The instruction (inst) is appended to the Instruction_List in line 8 of Algorithm 3000'. The instructions are targeted towards helping the EVs to come nearby and speed lock. A find charge dr method is then used to find all the charge deprived regions in the network using a linear search. In line 10 of Algorithm 3000," the find charge dr method is used to find the regions in the road system with a high density of critical EVs. According to Algorithm 3000," two methods are then defined, find_best_mocs_ins_pt and find_MoCS_num, to find out the best MoCS insertion point and the amount of MoCS that should be activated or spawned to deal with a particular charge deprived region, respectively. The MoCS insertion point (ins_pt) is selected based at least on the predicted trajectory of the low battery charge EVs such that the MoCS can easily converge with them. The number of MoCS to be inserted (mocs_ins_num) is based at least on the severity (number of critical EVs) of the charge deprived region and the MoCS quota remaining. The function gen_mocs_ins_inst generates the instruction (MoCS_Inst) specifying the amount of MoCS and MoCS insertion location to be sent to the MoCS depot. The complete Instruction_List is then returned in line 18 of Algorithm 3000' from the GENERATE_SCHEDULE method. The instructions generated are sent to the respective MoCS depots and EVs. For the purposes of the SUMO simulation, the SUMO simulator was modified to emulate MoCS depots and the whole EV network.

Multi-Level Batteries for Rapid Charging/Discharge

Electric vehicles often rely upon onboard storage devices, such as batteries or electrochemical cells, to power the electric vehicle. Many electric vehicles rely upon chemical and electrochemical reactions and electron/ion exchange between an anode and a cathode. In some embodiments, an electric vehicle can be configured to have more than one electrochemical cell or battery. In some embodiments, an electric vehicle can comprise one or more electrochemical cells having a first charge transfer rate, one or more other electrochemical cells having a second charge transfer rate different from the first charge transfer rate, and a charge transfer element in electrical communication with at least one of the one or more electrochemical cells or at least one of the one or more other electrochemical cells. In some embodiments, the charge transfer element may be configured to electrically couple the power plant of the electric vehicle to a power plant of another electric vehicle, whereby the charge transfer element can cause an electrical charge to be communicated into or out of the at least one of the one or more electrochemical cells or the at least one of the one or more other electrochemical cells of the electric vehicle while the electric vehicle is moving.

In some embodiments, the one or more other electrochemical cells can be electrically coupled to the one or more electrochemical cells. In some embodiments, the first charge transfer rate is larger than the second charge transfer rate. In some embodiments, the charge transfer element can be configured to be in electrical communication with the at least one of the one or more electrochemical cells and the at least one of the one or more other electrochemical cells. In some embodiments, the charge transfer element may be configured to establish an electrical connection between the charge transfer element and another charge transfer element of the other electric vehicle, select, based at least upon one or more characteristics of the power plant of the other electric vehicle, the at least one of the one or more electrochemical cells or the at least one of the one or more other electrochemical cells, and establish electrical communication between the selected at least one electrochemical cell of the electric vehicle and the charge transfer element.

In some embodiments, the charge transfer element can be configured to cause a replenishing supply of the electrical charge to be communicated from the selected at least one electrochemical cell, through the charge transfer element, to another charge transfer element of the other electric vehicle. In some embodiments, wherein the power plant of the electric vehicle is configured to cause a further replenishing supply of the electrical charge to be communicated from a non-selected at least one electrochemical cell, through the selected at least one electrochemical cell, through the charge transfer element, and to the other charge transfer element of the other electric vehicle.

In some embodiments, a method can be carried out, such as by a charge transfer element, computer program, processing circuitry, or the like, for mobile charging between electric vehicles while the electric vehicles travel along a route. In some embodiments, the method can comprise providing a first electric vehicle that comprises at least one first electrochemical cell having a first charge transfer rate, at least one second electrochemical cell having a second charge transfer rate less than the first charge transfer rate, and a first charge transfer element configured to select one of the at least one first electrochemical cell or the at least one second electrochemical cell into which to charge electrical charge or from which to discharge electrical charge. In some embodiments, the method can further comprise establishing an electrical connection between the first charge transfer element and a second charge transfer element of a second electric vehicle; and selecting, based at least in part upon a charge rate of at least one third electrochemical cell of the second electric vehicle, from among the at least one first electrochemical cell and the at least one second electrochemical cell, at least one electrochemical cell. In some embodiments, in an instance in which the first electric vehicle is being charged by the second electric vehicle, causing communication of a replenishing supply of the electrical charge from the third electrochemical cell of the second electric vehicle, through the second charge transfer element, through the first charge transfer element, and into the at least one electrochemical cell of the first electric vehicle. In some embodiments, in an instance in which the second electric vehicle is being charged by the first electric vehicle, causing communication of the replenishing supply of the electrical charge from the at least one electrochemical cell of the first electric vehicle, through the first charge transfer element, through the second charge transfer element, and into the third electrochemical cell of the second electric vehicle.

In some embodiments, the method can further comprise receiving charge transfer instructions comprising an indication of a vehicle identification, a current speed, a current location, and a current overall charge level of the second electric vehicle, the charge transfer instructions further comprising an indication of the third charge transfer rate for the third electrochemical cell of the second electric vehicle. In some embodiments, the at least one first electrochemical cells are electrically coupled to the at least one second electrochemical cells, the method further comprising: in an instance in which the charge transfer instructions indicate the first electric vehicle is to charge the second electric vehicle while the electric vehicles travel along the route, said selecting comprises selecting the at least one first electrochemical cell as the at least one electrochemical cell, and a first charge level of the at least one first electrochemical cell is less than a second charge level of the at least one second electrochemical cell, causing communication of the replenishing supply of the electrical charge from the at least one second electrochemical cell into the at least one first electrochemical cell before communicating the replenishing supply of electrical charge from the at least one first electrochemical cell, through the first and second charge transfer elements, and into the third electrochemical cell of the second electric vehicle.

In some embodiments, the at least one first electrochemical cells are electrically coupled to the at least one second electrochemical cells, the method further comprising: in an instance in which the charge transfer instructions indicate the first electric vehicle is to be charged by the second electric vehicle while the electric vehicles travel along the route, said selecting comprises selecting the at least one first electrochemical cell as the at least one electrochemical cell, and a first charge level of the at least one first electrochemical cell is greater than a second charge level of the at least one second electrochemical cell, causing communication of an initial supply of the electrical charge from the first electrochemical cell to the second electrochemical cell before receiving the replenishing supply of the electrical charge from the at least one third electrochemical cell of the second vehicle, through the first and second charge transfer elements, and into the first electrochemical cell of the first electric vehicle.

In some embodiments, a power plant (electrical charge storage and delivery system) for an electric vehicle can comprise one or more batteries having a faster charge transfer rate and/or a lower charge capacity and one or more batteries having a slower charge transfer rate and/or a higher charge capacity. In some embodiments, an algorithm can be used to make efficient use of the batteries to charge other entities (e.g., electric batteries) and to receive charge from other entities. In some embodiments, the slower charge transfer rate, larger charge capacity battery in may be used as the charge storage unit while the faster charge transfer rate, smaller charge capacity battery may be used to quickly transfer electric charge to other entities or to quickly receive electric charge from other entities during a charge transfer event. In some embodiments, charge transfer may also be carried out between the faster charge transfer rate battery and the slower charge transfer rate battery within a single electric vehicle for optimal charge management. In some embodiments, an algorithm may be carried out to optimize the charge sharing efficiency within electric vehicles and/or between electric vehicles. In some embodiments, an electric vehicle may comprise a multi-level battery or a multi-level battery system comprising a collection of multiple sets of batteries where each set has a different charge transfer rate. In some embodiments, each set of batteries can consist of multiple battery units.

Figure 19:
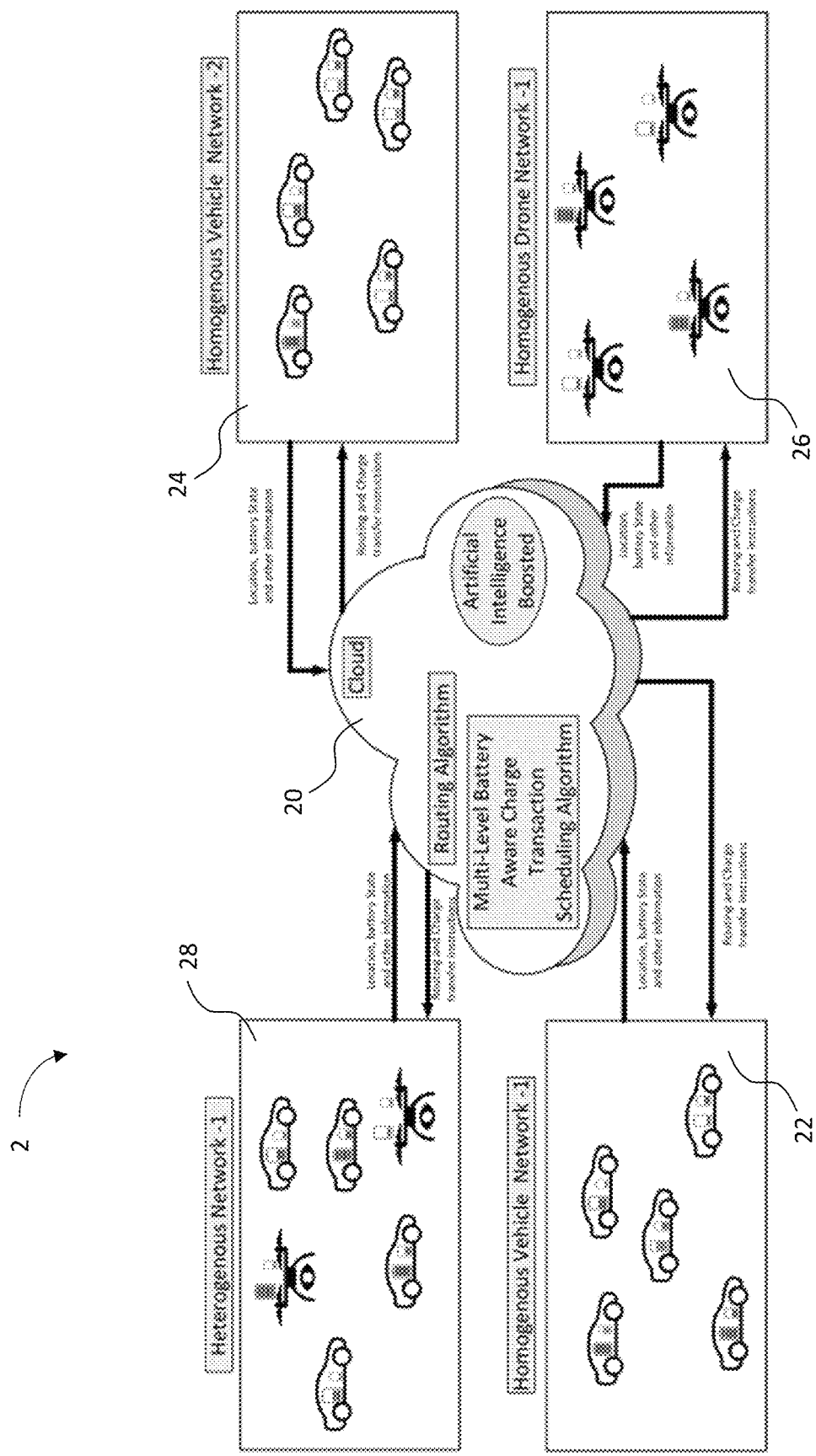
FIG. 19 provides an example transportation system comprising a heterogeneous network of multi-level battery electric vehicles in communication with a cloud computing entity configured to optimize charge distribution through the transportation system, according to some embodiments described herein.

FIG. 19 illustrates a transportation system 2 comprising a first homogeneous vehicle network 22, a second homogeneous vehicle network 24, a homogeneous drone network 26, and a vehicle heterogeneous network 28 of electric vehicles and other entities configured to be in communication with a computing device 20 (e.g., cloud computing device). In some embodiments, the first homogeneous vehicle network 22 can be similar to the first homogeneous vehicle network 12 described herein. In some embodiments, one or more vehicles in the first homogeneous vehicle network 22 can have a multi-level battery system comprising one or more "fast" batteries having a first charge transfer rate and a first charge capacity and one or more "slow" batteries having a second charge transfer rate slower than the first charge transfer rate and a second charge capacity. In some embodiments, the computing device 20 can be substantially similar to the computing device 10. In some embodiments, the computing device 20 can be configured to send and receive information with the vehicles in the transportation system 2. For instance, in some embodiments, the computing device 20 can receive from vehicles a current location of the vehicle, battery configuration information, a current battery state, a speed and destination of the vehicle, charge transfer configurational information, and/or the like. In some embodiments, the computing device 20 can be configured to prepare a charge distribution map of the vehicles in the transportation system 2 and/or in networks (e.g., 22, 24, 26, 28) in the transportation system 2. In some embodiments, the computing device 20 can update the charge distribution map based at least on further or new information and data provided by the vehicles or the like. In some embodiments, the computing device 20 can use an algorithm to route some or all of the vehicles in the transportation system 2, to schedule charge transfer events and manage charge distribution throughout the transportation system 2, and/or can send battery configuration change instructions to vehicles.

Figure 20:
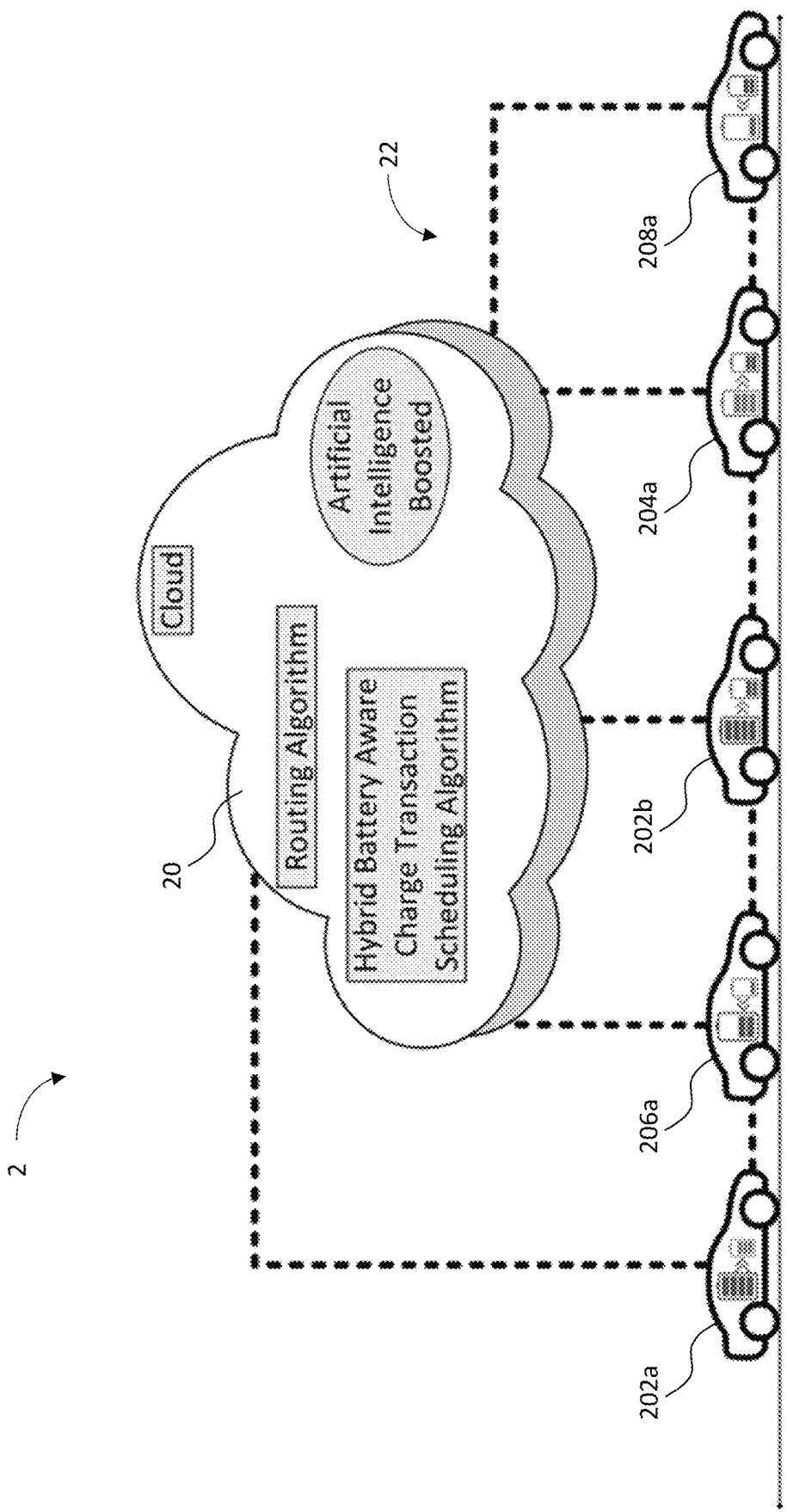
FIG. 20 provides an example of a system for entity-to-entity and entity-to-cloud communication, according to some embodiments described herein.

Referring now to FIG. 20, an embodiment of the transportation system 2 is illustrated as comprising a first electric vehicle 202a, a second electric vehicle 206a, a third electric vehicle 202b, a fourth electric vehicle 204a, and a fifth electric vehicle 208a, each of the electric vehicles being in communication with the computing device 20. In some embodiments, the first and third electric vehicles 202a, 202b can have a total electric charge level that is above an upper threshold and/or a charge level in excess of the required charge for to reach their respective destinations. In some embodiments, the second electric vehicle 206a and fifth electric vehicle 208a, can have a total electric charge level that is above a lower threshold and/or a charge level insufficient for the vehicles to reach their respective destinations. In some embodiments, the computing device 20 can identify one or more donor vehicles (e.g., 202a, 202b) and one or more receiving vehicles (e.g., 206a, 208a). In some embodiments, the computing device 20 can account for the total charge of the vehicles as well as the particular battery configurations and capabilities of each vehicle when determining donor and receiving vehicles, when optimizing the routes for the vehicles, and when scheduling charge transfer events.

By way of example only, the computing device 20 can provide route instructions to the first electric vehicle 202a and the second electric vehicle 206a such that the vehicles are speed locked, can account for the charge transfer rate, capacity, and level of each battery within the multi-battery or multi-level battery system of each vehicle, and can provide charge transfer instructions to one or both of the vehicles to initiate a charge transfer event. By way of example only, in an instance in which the computing device 20 determines that the first electric vehicle 202a has a full first battery with a first charge transfer rate and a partially depleted second battery with a second charge transfer rate higher than the first charge transfer rate, the computing device 20 may determine that the second electric vehicle 206a should receive a replenishing supply of electric charge from an electric vehicle or mobile charging station other than the first electric vehicle 202a, or the computing device 20 may determine that the first electric vehicle 202a should transfer charge from the full first battery to the partially depleted second battery, speed and destination lock the first electric vehicle 202a and second electric vehicle 206a so the vehicles can be electrically coupled, and initiate a charge transfer event between the first electric vehicle 202a and second electric vehicle 206a by communicating a replenishing supply of electric charge from the partially depleted second battery of the first electric vehicle 202a to one or more batteries of the second electric vehicle 206a (e.g., a depleted first battery of the second electric vehicle 206a that has at least a similar charge transfer rate and is configurationally compatible with the partially depleted second battery of the first electric vehicle 202a).

By way of another example, in an instance in which the computing device 20 determines that the third electric vehicle 202b should donate electric charge to the fifth electric vehicle 208a, the computing device 20 may cause one or more of the vehicles to speed up or slow down (e.g., by speed and/or destination locking the two vehicles) and/or can relay a replenishing supply of electric charge through the fourth electric vehicle 204a. In some embodiments, the computing device 20 can optimize charge transfer based, for instance, upon the configuration and capacity information for the multi-battery or multi-level battery systems in the third electric vehicle 202b, fourth electric vehicle 204a, and fifth electric vehicle 208a. By way of example only, if the third electric vehicle 202b has a full first battery having a slower charge transfer rate and a partially depleted second battery having a faster charge transfer rate, and if one or more of the fourth and fifth electric vehicles 204a, 208a have partially depleted batteries having charge transfer rate sufficiently similar to that of the partially depleted second battery of the third electric vehicle 202b, the computing device 20 may determine that the third electric vehicle 202b should initially or simultaneously transfer electric charge internally from the full, slower charge transfer rate battery to the partially depleted, faster charge transfer rate battery before or during the charge transfer event from the third electric vehicle 202b to one or more of the fourth and fifth electric vehicles 204a, 208a. Said otherwise, the computing device 20 can optimize charge transfer within a single vehicle, between and among other vehicles, by accounting not only for overall charge level of vehicles but also by accounting for transfer rate capacities of particular vehicles and batteries within vehicles, and can optimize charge distribution through the transportation system 2 or the first homogeneous vehicle network 22 while also reducing the amount of time necessary for vehicle-to-vehicle or mobile charging device-to-vehicle charge transfer events while the vehicles continue to travel along their routes towards their destinations. In some embodiments, by accounting for the speed of charge transfer and by optimizing where charge is stored at a particular point in time within the multi-battery or multi-level battery system of the vehicles, the computing device 20 can increase the number of potential donor vehicles and receiver vehicles by reducing the amount of time that the route and speed for paired vehicles must coincide for the charge transfer event to occur.

Figure 21:
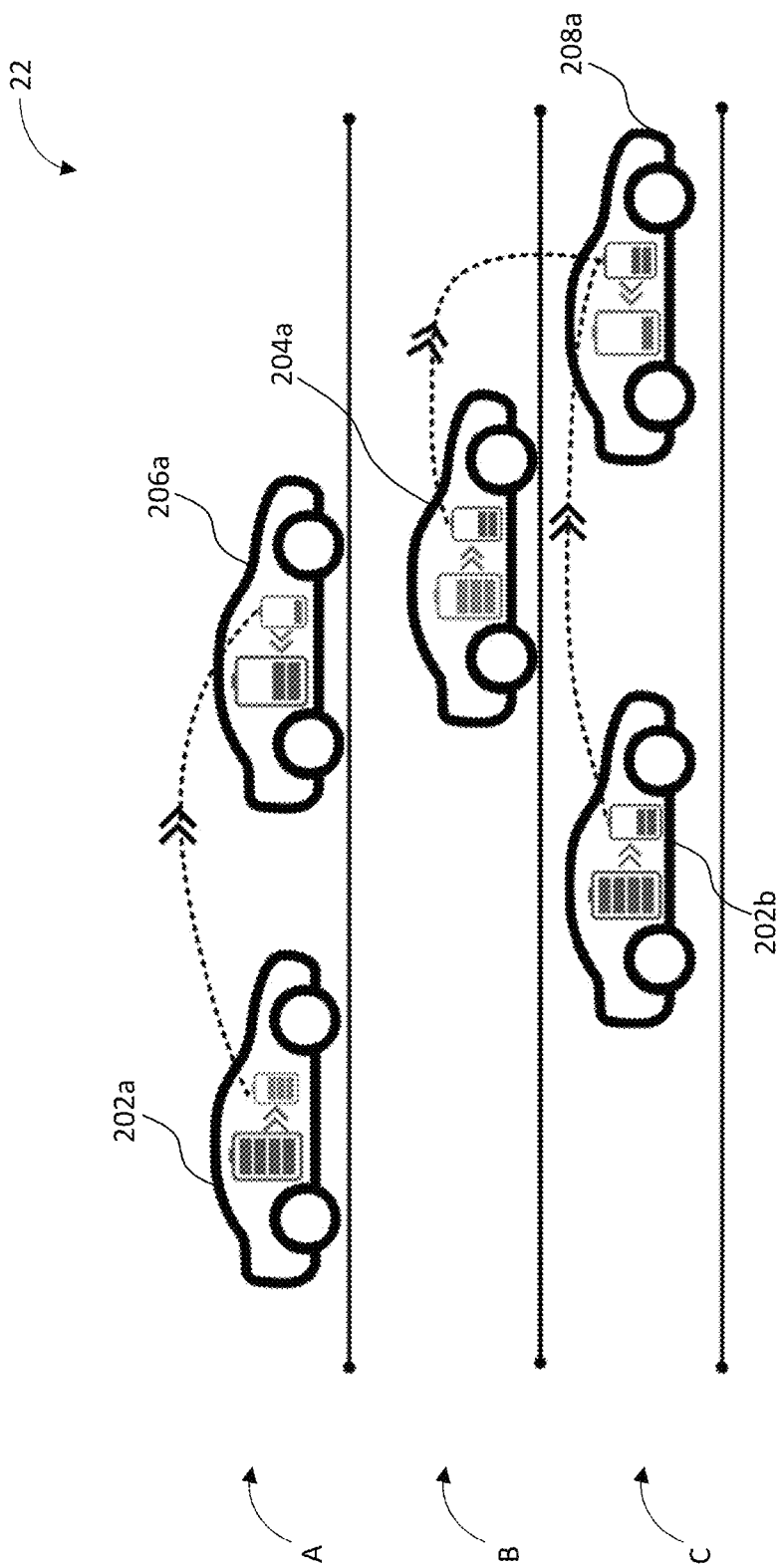
FIG. 21 provides an example approach for on-the-go peer-to-peer charging of vehicles having multi-level battery systems, according to some embodiments described herein.

Referring now to FIG. 21, an embodiment of the first homogeneous vehicle network 22 is illustrated as comprising electric vehicles that comprise a multi-battery system or a multi-level battery system. In some embodiments, each electric vehicle may have a larger primary (slower charge transfer rate) battery and a smaller secondary (higher charge transfer rate) battery. As illustrated, according to an embodiment, the first electric vehicle 202a can be instructed to provide a replenishing supply of electric charge to the second electric vehicle 206a and the third electric vehicle 202b and fourth electric vehicle 204a can be instructed to provide a replenishing supply of electric charge to the fifth electric vehicle 208a. In some embodiments, the first electric vehicle 202a can be instructed to cause transfer of charge internally from the larger, slower battery to the smaller, faster battery and then transfer the replenishing supply of electric charge to the smaller, faster battery of the second electric vehicle 206a, while the second electric vehicle 206a may be instructed to cause transfer internally of charge from the smaller, faster battery to the larger, slower battery of the second electric vehicle 206a. By doing so, the first electric vehicle 202a can relay charge from the larger, slower battery of the first electric vehicle 202a to the larger, slower battery of the second electric vehicle 206a by way of the two smaller, faster batteries, rather than simply transfer electric charge from the smaller, faster battery of the first electric vehicle 202a to the smaller, faster battery of the second electric vehicle 206a, which would be quick but would leave the second electric vehicle 206a with a depleted larger, slower battery. In some embodiments, the larger, slower transfer rate battery of an electric vehicle may not be optimal for vehicle-to-vehicle or entity-to-vehicle charge transfer events, but may be used primarily for powering the electric vehicles drivetrain, which means that simply charging the smaller, faster charge transfer rate battery of an electric vehicle may not provide sufficient electric charge for the receiving electric vehicle to reach its desired destination and/or may further require an internal charge transfer from the smaller charge capacity battery to the larger charge capacity battery.

As referred to herein, a "small battery" may refer to any electrochemical device or battery that has a relatively lower charge storage capacity, while a "large battery" may refer to any electrochemical device or battery that has a relatively higher charge storage capacity. Likewise, as referred to herein, a "fast battery" may refer to any electrochemical device or battery that has a relatively larger charge transfer rate (e.g., discharge rate, charging rate), while a "slow battery" may refer to any electrochemical device or battery that has a relatively smaller charger transfer rate. In some but not all embodiments, a small battery may have a faster charge transfer rate than a large battery. In some embodiments, electric vehicles comprising such a multi-battery system or such a multi-level battery system can be capable of connecting with multiple other entities (e.g., electric vehicles, mobile charging stations, etc.) at the same time. In some embodiments, electric charge may also be transferred within the multi-battery system or multi-level battery system, such as between a large battery and a small battery, depending on a current vehicle state or a current battery state (e.g., battery specific charge level, total charge capacity, charge transfer rate, and overall electric vehicle charge level).

Figure 22:
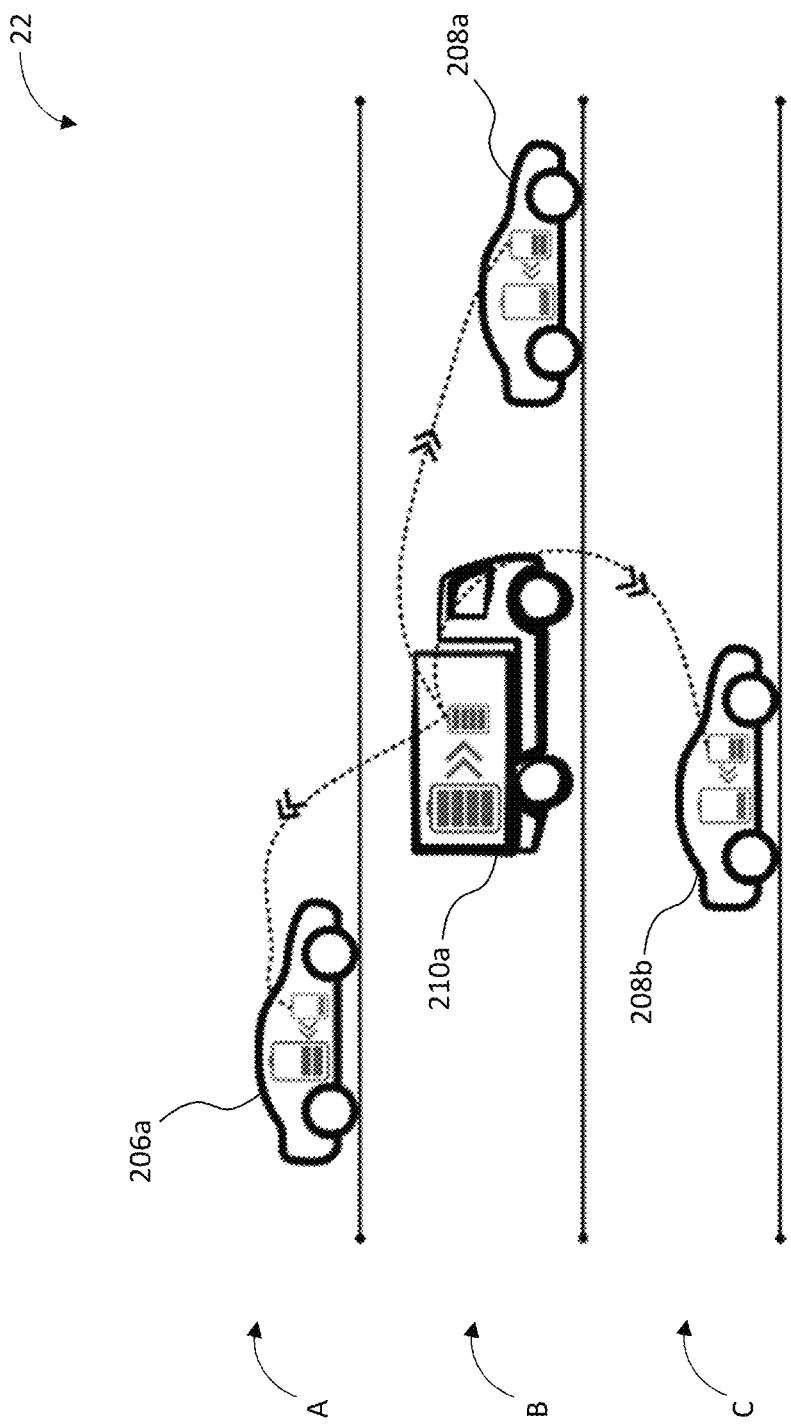
FIG. 22 provides an example of a system for on-the-go charging of mobile battery-level entities by a mobile charging unit, according to some embodiments described herein.
Figure 23:
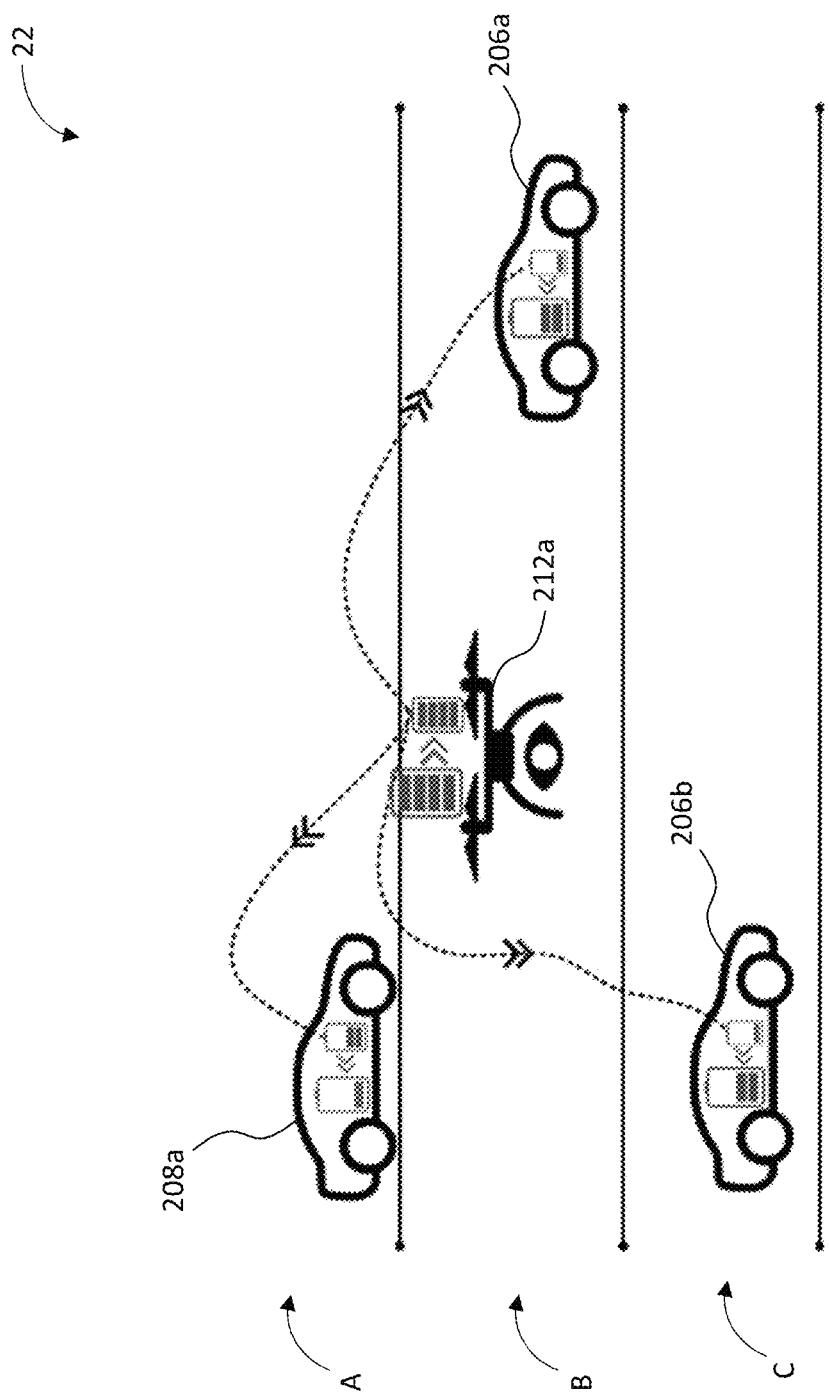
FIG. 23 provides an example of a heterogeneous network for on-the-go charging of mobile multi-level battery powered entities by an aerial charging vehicle comprising a multi-level battery, according to some embodiments described herein.

As illustrated in FIGS. 22 and 23, the first homogeneous vehicle network 22 may comprise insufficient total charge across all electric vehicles (e.g., the second electric vehicle 206a, the fifth electric vehicle 208a, and a sixth electric vehicle 208b) for any of the depleted or partially depleted electric vehicles to be charge donors to other electric vehicles. In such an instance, the computing device 20 or the like may deploy a mobile charging station 210a, such as a charge storing truck that comprises a multi-battery system or a multi-level battery system, and which can be configured to charge one or more of the electric vehicles. In some embodiments, the mobile charging station 210a can comprise one or more large, slow batteries and one or more small, fast batteries. In an instance in which the electric vehicles (e.g., 206a, 208a, 208b) each comprise a similar small, fast battery to that of the mobile charging station 210a, the mobile charging station 210a can transfer electric charge internally from the large, slow battery to the small, fast battery of the mobile charging station 210a, the mobile charging station 210a can provide replenishing supplies of electric charge respectively to the small, fast battery of each of the electric vehicles (e.g., 206a, 208a, 208b), and the electric vehicles (e.g., 206a, 208a, 208b) can internally transfer electric charge from the respective small, fast battery to the large, slow battery of the respective electric vehicles (e.g., 206*a*, 208*a*, 208*b*). In some embodiments, the mobile charging station 210*a* may not include multiple or multi-level batteries, in which case the mobile charging station 210*a* can provide a replenishing supply of electric charge to whichever of the batteries or battery levels of the electric vehicles (e.g., 206*a*, 208*a*, 208*b*) is suitably aligned configurationally or from the perspective of charge transfer rate. In some embodiments, if an electric vehicle (e.g., 208*a*) only has a large, slow battery whereas another electric vehicle (e.g., 206*a*) only has a small, fast battery, the mobile charging station 210*a* may provide a replenishing supply of electric charge from its large, slow battery to electric vehicle 208*a* and another replenishing supply of electric charge from its small, fast battery to the second electric vehicle 206*a*. In some embodiments, if the mobile charging station 210*a* is configured to provide a replenishing supply of electric charge to only one of the electric vehicles (e.g., 206*a*) but not the other electric vehicles (e.g., 208*a*, 208*b*) in the first homogeneous vehicle network 22, the computing device 20 may cause the second electric vehicle 206*a* to receive one or more replenishing supplies of electric charge (e.g., from one or both of the large, slow battery and the small, fast battery of the mobile charging station 210*a*) and to relay at least a portion of the one or more replenishing supplies of electric charge to the fifth electric vehicle 208*a* and/or the sixth electric vehicle 208*b*.

As illustrated in FIG. 22, the mobile charging station 210*a* is terrestrial, however a deployed mobile charging entity may be aerial (such as illustrated in FIG. 23), aquatic, and/or the like. While the same or similar considerations and principles apply with regard to the charge distribution and mobile charging entity deployment approach illustrated in FIG. 23 as that illustrated in FIG. 22, an aerial charge distribution drone 212*a* has additional degrees of freedom compared to a terrestrial mobile charging station (e.g., the mobile charging station 210*a*), which can be used by the computing device 20 or the like to further optimize charge distribution, vehicle routing, and minimize halts within the transportation system 2.

In some embodiments, priority with regard to charging order, selection between fast or slow charge transfer rates, and direct or relay charge transfer can be optimized based at least upon the destinations and routes of the electric vehicles 206*a*, 208*a*, 208*b* in the first homogeneous vehicle network 22 such that the greatest amount of electric charge is transferred to the most vehicles and the vehicles in most need of electric charge receive an electric charge transfer to ensure that all or the greatest possible number of electric vehicles 206*a*, 208*a*, 208*b* reach their respective destination, which may be quantified for the purposes of algorithmic optimization as a minimized number of "halts," which may refer to the number of times electric vehicles in the transportation system 2 must stop (e.g., to recharge at a stationary charging station and/or when stranded due to charge depletion below a critical minimum threshold) and/or the duration of stops experienced by electric vehicles in the transportation system 2 over a period of time.

Figure 24:
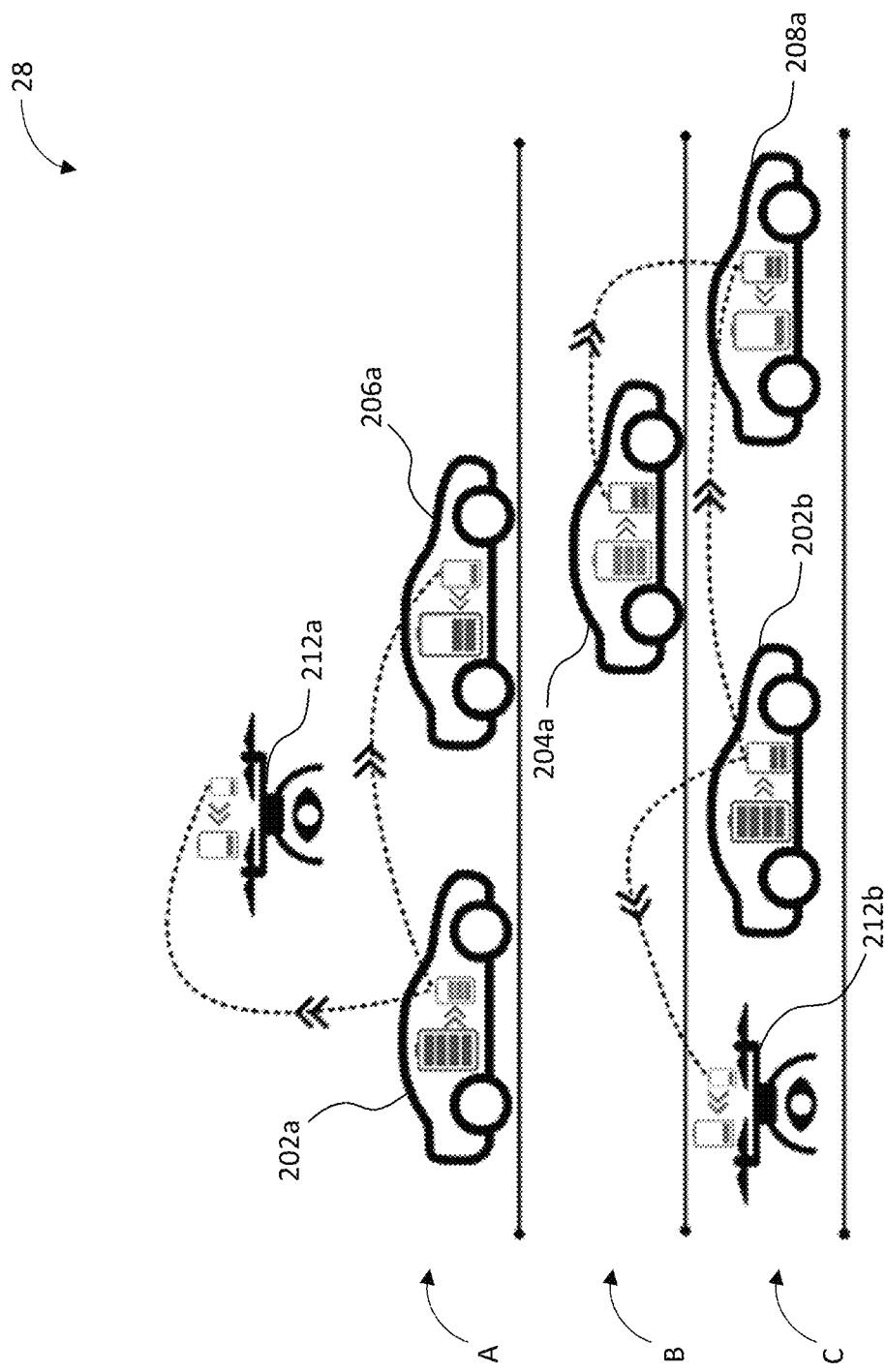
FIG. 24 provides an example of a heterogeneous network for on-the-go peer-to-peer charging of mobile multi-level battery powered entities, according to some embodiments described herein.

Referring now to FIG. 24, an exemplary embodiment of the heterogeneous vehicle network 28 of the transportation system 2 is illustrated. In some embodiments, the heterogeneous vehicle network 28 can comprise one or more vehicles of a first type or transport mode and one or more vehicles of a second type or transport mode. Said otherwise, the heterogeneous vehicle network 28 includes two or more vehicle types and the computing device 20 accounts for the vehicle type and/or transport mode in optimizing vehicle routes and charge distribution across the transportation system 2. For instance, as illustrated in FIG. 24, the first electric vehicle 202*a* can be caused to provide a replenishing supply of electric charge to the aerial charge distribution drone 212*a* as well as the second electric vehicle 206*a*. In some embodiments, one or more of the first electric vehicle 202*a*, the aerial charge distribution drone 212*a*, and the second electric vehicle 206*a* may comprise a multi-battery system or a multi-level battery system. In some embodiments, the first electric vehicle 202*a* can be configured to or instructed to provide a replenishing supply of electric charge from its small, fast battery to the small, fast battery of the aerial charge distribution drone 212*a* and the small, fast battery of the second electric vehicle 206*a*. In some embodiments, the first electric vehicle 202*a* can be further configured to or instructed to internally transfer electric charge from its large, slow battery to its small, fast battery before, during, or after providing the replenishing supply of electric charge to the aerial charge distribution drone 212*a* and the second electric vehicle 206*a*. In some embodiments, the third electric vehicle 202*b* and the fourth electric vehicle 204*a* can be configured to or instructed to provide a replenishing supply of electric charge to the fifth electric vehicle 208*a*. In some embodiments, the fourth electric vehicle 204*a* may further be configured to or instructed to provide a replenishing supply of electric charge to a second aerial charge distribution drone 212*b*. As discussed above with regard to FIGS. 22 and 23, the computing device 20 can implement the approach illustrated in FIG. 24 by accounting for the various routes, transport speeds, battery configurational information, battery charge transfer rates, battery capacities, current location of vehicles, current battery specific or overall charge level of vehicles, and other considerations such as lane position, altitude, vehicle owner preferences, vehicle owner charging/tolling information, etc.

Figure 25:
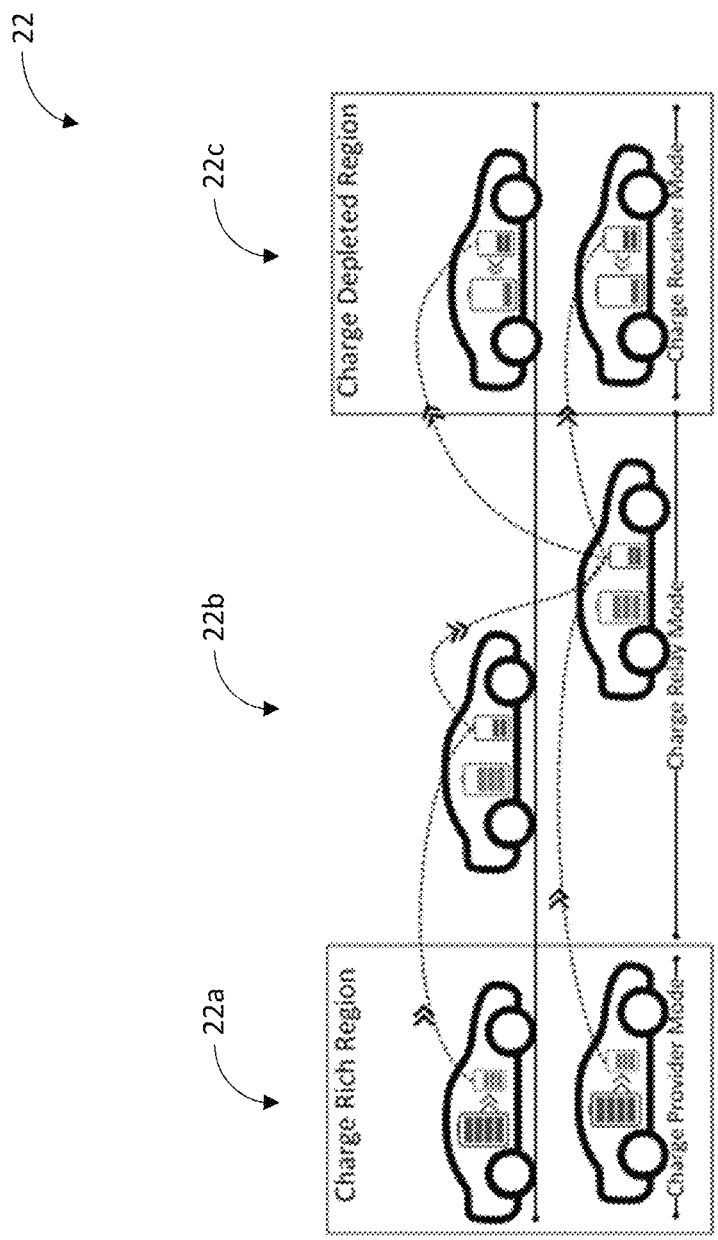
FIG. 25 provides an example of an approach for charging charge-depleted regions of a roadway by entity-to-entity relaying of charge from a charge-rich region via interstitial relay entities, according to some embodiments described herein.

As discussed above with regard to the first homogeneous vehicle network 12 of the system 1 illustrated in FIG. 7, the first homogeneous vehicle network 22 of the transportation system 2 illustrated in FIG. 25 can likewise be separated into a charge rich region 22*a*, a charge depleted region 22*c* separated a distance from the charge rich region 22*a*, and one or more relay regions 22*b* therebetween. In some embodiments, the computing device 20 may determine, in an instance in which the one or more electric vehicles, mobile charging stations, drones, and/or the like located within the charge relay region 22*b* are configured to be electrically coupled to electric vehicles or the like in the charge rich region 22*a* and or electric vehicles or the like in the charge depleted region 22*c*, to provide charge relay instructions to one or more of the electric vehicles or the like in the charge relay region 22*b*. In some embodiments, charge relay instructions may differ from charge transfer instructions in that the relaying electric vehicle or the like is instructed to receive the replenishing supply of electric charge from a donor entity in the charge rich region 22*a* and thereafter provide the replenishing supply of electric charge to a receiving entity in the charge depleted region 22*c*, either directly or by way of one or more other relaying electric vehicles or the like within the charge relay region 22*b* of the first homogeneous vehicle network 22. Such a concept or network slicing approach can be carried out by the computing device 20 or the like in other networks, such as the homogeneous drone network 26, the heterogeneous vehicle network 28 or the like.

As such, described herein are systems, methods, devices, computer program products, algorithms, and approaches for optimizing on-the-go charge sharing between battery-operated entities consisting of multiple battery sets/groups or multi-layered battery sets/groups. In some embodiments, each battery set may have a different charge transfer rate and/or charge different capacity. In some embodiments, the different charge transfer rate and/or different charge capacity may be a function of one or more of differing anode chemistry, differing cathode chemistry, differing electrolyte chemistry, differing battery chemistry, differing battery construction, differing battery size, differing current collectors, differing separator chemistry, differing ion charge depth or discharge depth, differing passivation or inactivation rate, differing charge/discharge speed, and/or the like.

In some embodiments, each battery set may comprise one or more battery units that can be separately interfaced for parallel charging and/or which can be placed in series such that electric charge can be transferred between battery units of the same electric vehicle or the like.

In some embodiments, the described method is flexible enough to deal with multiple sets of batteries having varying charge transfer rates, different electric vehicles having different multi-battery system or multi-level battery system configurations and capabilities, the change in battery capacity and charge transfer rate over time as batteries age and/or are replaced. In some embodiments, one or more algorithms can be used to optimize the overall charge usage within the transportation system 2.

In some embodiments, charge distribution optimization can be carried out according to a number of exemplary modes, which include but are not limited to:

Solo-Mode: the multi-battery system or multi-level battery system utilization and configurations for charge transfer can be determined by the electric vehicle or battery-powered entity itself based at least on local/global information of other entities present nearby in the transportation system 2.

Hive-Mode: some, most, or all battery-operated entities can be controlled by a cloud application (e.g., the computing device 20 or the like) which can determine multi-battery system or multi-level battery system utilization and configurations for charge transfer, along with route, speed and other functional parameters of each entity in the network in order to optimize or optimize with constraints the distribution of charge and minimize or minimize with constraints the number of halts of entities in the transportation system 2.

Mixed-Mode: a cloud application (e.g., the computing device 20 or the like) provides high-level and coarse directions to the battery-operated entities for charge sharing, and then each entity itself makes the final decision as to what needs to be done given the scenario and the cloud application/system's suggestion.

In some embodiments, such approaches may allow for charge transfer between sets of batteries inside the same entity to facilitate more efficient charge management within each entity in addition to more efficient charge management between entities with regard to optimization goals such as minimization of "halts" or maximization of entities reaching their desired destination.

In some embodiments, algorithms can be used, such as Algorithms 1000, 2000, 3000, or 3000' described above for routing vehicles and for scheduling charge transfer, but Algorithms 1000, 2000, 3000, 3000' do not account for intra-entity charge management for entities that have a multi-battery system or a multi-level battery system. As such, described hereinbelow are additional exemplary algorithms of varying complexity for optimal charge sharing in a transportation system, e.g., the transportation system 2, comprising entities employing multi-battery systems or multi-level battery systems. Also described hereinbelow is a calibration method for determining an optimal number of battery sets and battery unit capacities for a given cost and performance constraint for entities such as electric vehicles, drones, or the like in a system (e.g., the transportation system 2). In some embodiments, the described approaches, methods, devices, systems, computer program products, algorithms, and/or the like can reduce overall entity-to-entity pairing time and allow for overall faster charge transfer rates between two or more battery-operated entities. In some embodiments, the described approaches, methods, devices, systems, computer program products, algorithms, and/or the like can be optimized for both homogeneous and heterogeneous networks of battery operated entities, across an array of transport modes, in various degrees of freedom (e.g., two-dimensional terrestrial networks, three-dimensional terrestrial networks, two-dimensional aerial networks, three-dimensional aerial networks, two-dimensional aquatic networks, three-dimensional aquatic networks, hybrid terrestrial-aerial networks, hybrid terrestrial-aquatic networks, hybrid aerial-aquatic networks, hybrid terrestrial-aerial-aquatic networks, and/or the like).

While the multi-battery systems and multi-level battery systems described herein are generally described with regard to on-the-go charging of entities in the transportation system 2, such multi-battery systems and multi-level battery systems can also lead to faster charging at stationary charging stations, faster emergency re-charging at the side of the road, can lead to improvements of the battery health and life span of the multi-battery systems and multi-level battery systems and batteries/electrochemical cells/charge storage devices thereof by optimizing charge storage and transfer throughout the multi-battery systems and multi-level battery systems. Said otherwise, for batteries for which a charge depleted state is detrimental to the health and life span of the battery, storage of charge, intra system charge management, and inter-entity/network charge management may be optimized where possible to reduce or eliminate conditions which are harmful to the health or life span of batteries within the system.

Design and Method for Multi-Level Battery Internal Operation

According to some embodiments, one or more entities, e.g., electric vehicles, drones, mobile charging stations, or the like, within a system can comprise a multi-battery system or a multi-layer battery system configured to provide power to the drivetrain of the entity and/or to be stored until being transferred to another entity within the transportation system 2. In some embodiments, such multi-battery systems and multi-level battery systems can comprise one or more battery units that are either standalone, partially interfaced, or fully interfaced for independent charging/discharging, interdependent charging/discharging, parallel charging/discharging, charging/discharging in series, combinations thereof, or the like. In some embodiments, one or more batteries in multi-battery systems and multi-level battery systems can have a particular, fixed charge capacity, which may refer to the potential electrical energy stored within the battery. In some embodiments, one or more batteries in multi-battery systems and multi-level battery systems can have a particular, fixed charge transfer rate, which may refer to the rate at which the potential electrical energy stored in the battery is converted to kinetic electrical energy when discharging from the battery and/or the rate at which kinetic electrical energy (e.g., a replenishing supply of electric charge) is transferred to potential electrical energy (e.g., chemical, ionic, etc.) within the battery when charging the battery.

Referring now to FIGS. 26-30, exemplary embodiments of a multi-level battery system 300 are illustrated. In some but not all embodiments, multi-level batteries (e.g., a first multi-level battery 301 and/or a second multi-level battery 308) in the multi-level battery system 300 can comprise one or more battery levels arranged according to, e.g., their respective charge transfer rates. For instance, a first level (L1) may refer to a first level of a multi-level battery system 300, which may refer in some embodiments to a grouping of one or more batteries that have the highest relative charge transfer rate as compared to other batteries in the multi-level battery system 300. In some embodiments, the multi-level battery system 300 can further comprise a second layer (L2) comprising one or more batteries having the next highest relative charge transfer rate among the batteries in the multi-level battery system 300.

In some embodiments, a multi-level battery 301 can further comprise additional levels, e.g., L3, L4, L5, etc.) arranged, for instance, in descending order by charge transfer rate. In some embodiments, multi-level batteries 301, 308 can comprise two layers, three layers, four layers, five layers, six layers, seven layers, eight layers, nine layers, ten layers, eleven layers, twelve layers, thirteen layers, fourteen layers, fifteen layers, sixteen layers, seventeen layers, eighteen layers, nineteen layers, twenty layers, or more than twenty layers, inclusive of all values and ranges therebetween. In some embodiments, multi-level batteries 301, 308 can comprise greater than one layer, greater than two layers, greater than four layers, greater than five layers, greater than six layers, greater than seven layers, greater than eight layers, greater than nine layers, greater than ten layers, greater than eleven layers, greater than twelve layers, greater than thirteen layers, greater than fourteen layers, greater than fifteen layers, greater than sixteen layers, greater than seventeen layers, greater than eighteen layers, greater than nineteen layers, greater than twenty layers, or greater than thirty layers, inclusive of all values and ranges therebetween. In some embodiments, layers of a multi-layer battery can comprise one battery, two batteries, three batteries, four batteries, five batteries, six batteries, seven batteries, eight batteries, nine batteries, ten batteries, eleven batteries, twelve batteries, thirteen batteries, fourteen batteries, fifteen batteries, sixteen batteries, seventeen batteries, eighteen batteries, nineteen batteries, twenty batteries, or more than twenty batteries, inclusive of all values and ranges therebetween. In some embodiments, a layer of a multi-layer battery can comprise one battery, greater than one battery, two batteries, greater than two batteries, greater than three batteries, greater than four batteries, greater than five batteries, greater than six batteries, greater than seven batteries, greater than eight batteries, greater than nine batteries, greater than ten batteries, greater than eleven batteries, greater than twelve batteries, greater than thirteen batteries, greater than fourteen batteries, greater than fifteen batteries, greater than sixteen batteries, greater than seventeen batteries, greater than eighteen batteries, greater than nineteen batteries, greater than twenty batteries, greater than twenty five batteries, greater than thirty batteries, greater than thirty five batteries, greater than forty batteries, greater than forty five batteries, greater than fifty batteries, greater than fifty five batteries, greater than sixty batteries, greater than sixty five batteries, greater than seventy batteries, greater than seventy five batteries, greater than eighty batteries, greater than eighty five batteries, greater than ninety batteries, greater than ninety five batteries, greater than one hundred batteries, greater than 250 batteries, greater than 500 batteries, greater than 750 batteries, or greater than 1,000 batteries, inclusive of all values and ranges therebetween. In some embodiments, a layer of a multi-layer battery can comprise between one battery and about 1,000 batteries, between one battery and about 750 batteries, between one battery and about 500 batteries, between one battery and about 250 batteries, between one battery and about 100 batteries, between one battery and about seventy five batteries, between one battery and about fifty batteries, between one battery and about twenty five batteries, between one battery and about twenty batteries, between one battery and about fifteen batteries, between one battery and about ten batteries, between one battery and about five batteries, between two batteries and about 100 hundred batteries, between two batteries and about seventy five batteries, between two batteries and about fifty batteries, between two batteries and about twenty five batteries, between two batteries and about twenty batteries, between two batteries and about fifteen batteries, between two batteries and about ten batteries, between two batteries and nine batteries, between two batteries and eight batteries, between two batteries and about batteries, between two batteries and six batteries, between two batteries and five batteries, between two batteries and four batteries, between two batteries and three batteries, or between one battery and ten batteries, inclusive of all values and ranges therebetween. In some embodiments, one or more layers of a multi-layer battery may comprise only a single battery while one or more other layers of the multi-layer battery comprise two or more batteries. In some embodiments, one or more batteries from one or more layers may be in operable and/or electrical communication with one or more other batteries from one or more other layers of the multi-layer battery. In some embodiments, each battery layer of a multi-layer battery may comprise one or more batteries a charge transfer rate, a charge capacity, and/or the like, that is different from other batteries in other layers of the multi-layer battery. In some embodiments, each layer of batteries in the multi-layer battery may comprising batteries having a charge transfer rate or a charge capacity that is different from one other layer, two other layers, three other layers, four other layers, five other layers, some of the other layers, a majority of the other layers, most of the other layers, substantially all of the other layers, or all of the other layers, inclusive of all values and ranges therebetween.

Figure 26:
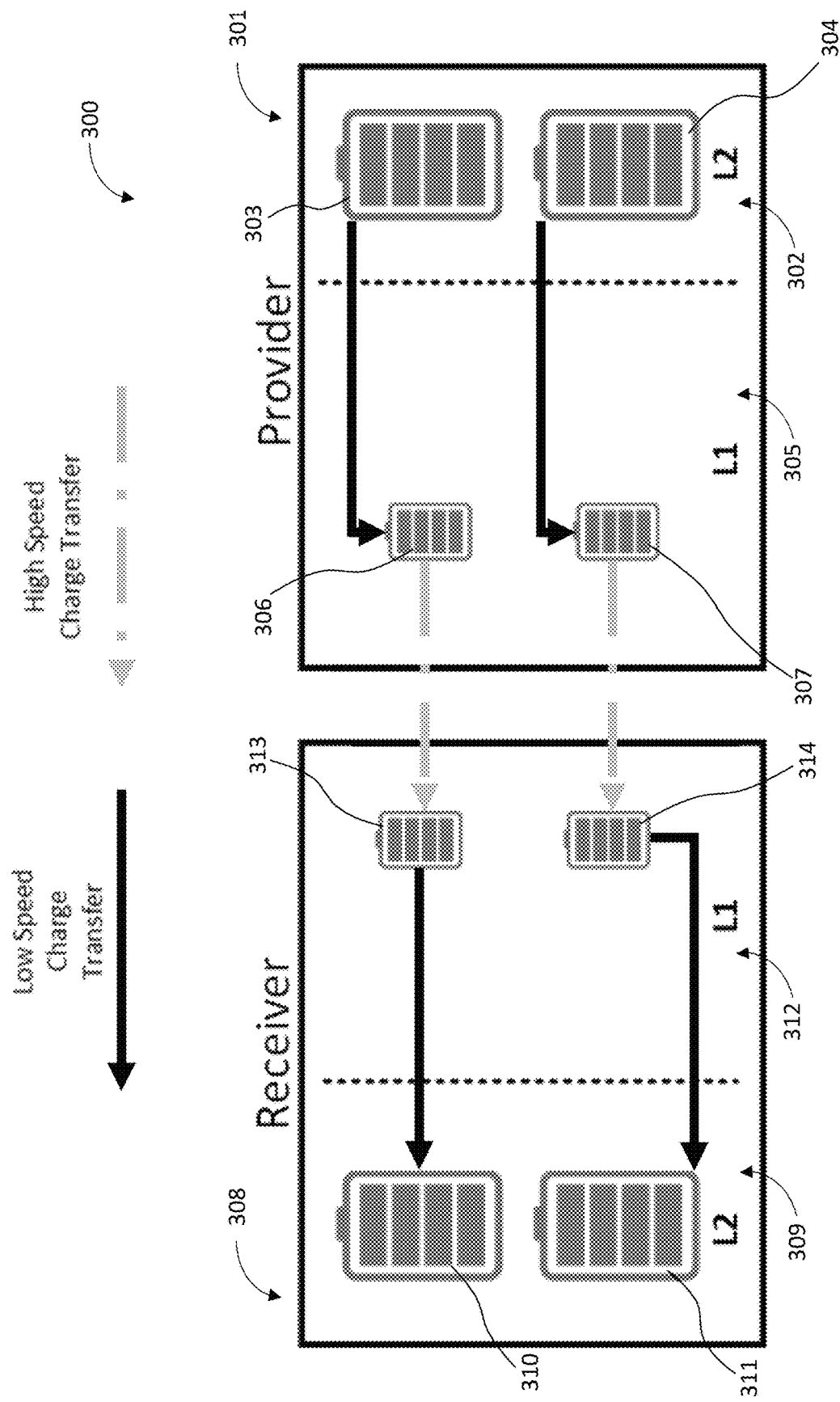
FIG. 26 provides an exemplary charge-providing two-level battery system configured to provide a replenishing charge to an exemplary charge-receiving two-level battery system, according to some embodiments described herein.

In some embodiments, such as illustrated in FIG. 26, the multi-level battery system 300 can comprise a first multi-level battery 301 associated with an electrical charge provider, the first multi-level battery 301 comprising a first battery group 302 comprising a first slow battery 303 and a second slow battery 304, the first and second slow batteries 303, 304 having a larger charge capacity and a slower charge transfer rate than other batteries in the first multi-level battery 301. In some embodiments, the first multi-level battery 301 can further comprise a second battery group 305 comprising a first fast battery 306 and a second fast battery 307, collectively the fast batteries 306, 307. In some embodiments, the fast batteries 306, 307 can have a smaller charge capacity and a faster charge transfer rate than other batteries in the first multi-level battery 301. In some embodiments, one or more batteries from the first battery group 302 can be electrically coupled to or configured to be in electrical communication with one or more batteries of the second battery group 305. In some embodiments, the first slow battery 303 may be in electrical communication with the first fast battery 306 and the second slow battery 304 may be in electrical communication with the second fast battery 307. In some embodiments, the multi-level battery system 300 can further comprise a second multi-level battery 308 associated with a charge receiver, the second multi-level battery 308 comprising a first battery group 309 comprising a first slow battery 310 and a second slow battery 311, the first and second slow batteries 310, 311 having a larger charge capacity and a slower charge transfer rate than other batteries in the second multi-level battery 308. In some embodiments, the second multi-level battery 308 can further comprise a second battery group 312 comprising a first fast battery 313 and a second fast battery 314, collectively the fast batteries 313, 314. In some embodiments, the fast batteries 313, 314 can have a smaller charge capacity and a faster charge transfer rate than other batteries in the second multi-level battery 308. In some embodiments, one or more batteries from the first battery group 309 can be electrically coupled to or configured to be in electrical communication with one or more batteries of the second battery group 312. In some embodiments, the first slow battery 310 may be in electrical communication with the first fast battery 313 and the second slow battery 311 may be in electrical communication with the second fast battery 314. As such, in an instance in which the first multi-level battery 301 is associated with a charge providing entity, such as a fully or partially charged electric vehicle, and the second multi-level battery 308 is associated with a charge receiving entity, such as a charge depleted electric vehicle, a replenishing supply of electrical charge may be provided by one or more of the fast batteries 306, 307 of the first multi-level battery 301 to one or more of the fast batteries 313, 514 of the second multi-level battery 308, such as by way of charge transfer elements physically and/or electrically coupling the multi-level batteries 301, 308 together, or wirelessly. In some embodiments, either in order to provide further electrical charge to the second multi-level battery 308 or to replenish the charge level of the one or more fast batteries 306, 307 of the first multi-level battery 301, the first multi-level battery 301 may transfer electrical charge from one or more of the slow batteries 303, 304 to one or more of the fast batteries 306, 307, which may relay the electrical charge on to the second multi-level battery 308 and/or store the electrical charge at the one or more of the fast batteries 306, 307. In some embodiments, when one or more of the fast batteries 313, 314 of the second multi-level battery 308 receives a replenishing supply of electrical charge, e.g., from one or more of the fast batteries 306, 307 of the first multi-level battery 301, the electrical charge may be stored locally or relayed on to one or more of the slow batteries 310, 311 of the second multi-level battery 308.

In some embodiments, the fast batteries 306, 307 and/or 313, 314 may have a relatively higher charge transfer rate and can predominantly or exclusively be used for inter-entity charge transfer while the slow batteries 303, 304 and/or 310, 311 may have a relatively lower charge transfer rate, with an accompanying higher charge capacity, and may predominantly or exclusively be used for intra-entity charge transfer, such as by slowly replenishing the fast batteries 306, 307 and/or 313, 314. In some embodiments, the multi-level battery system 300 may allow for more rapid charge transfer between two entities (e.g., electric vehicles), more rapid detachment of the charge-providing and charge-receiving entities, and more rapid return of the entities to their normal route for more expeditious arrival at their respective desired destination. In some embodiments, there is a corresponding reduction in cost and environmental impacts associated with such an approach that utilizes more rapid charge transfer where possible at least because entities generally need to be rerouted less or for less time from their respective most singularly optimized route, leading to a reduction in the expenditure of charge from the system for rerouting entities for entity-to-entity charging on-the-go. In some embodiments, there is also a corresponding reduction risk as the entities need to be electrically coupled while on-the-go for less time, reducing the risk that such electrical coupling and/or physical coupling of moving vehicles may present.

In addition, if the total charge capacity provided for an entity, such as an electric vehicle, were provided as a single battery or bank of battery cells, then charging of that battery or bank of battery cells would likely require a single recharging input with significant inefficiencies being possible in terms of charging in series or charging in parallel. However, if an entity can establish more than one electrical connection with more than one input of replenishing charge, such as via each of the slow batteries 310, 311 and each of the fast batteries 313, 314 via different charge transfer rates and potentially from more than one provider entity (e.g., a nearby electric vehicle and a deployed mobile charging station) simultaneously, then the rate of total charge level replenishment for a receiver entity or a relay entity or the like can increase even more.

Figure 27:
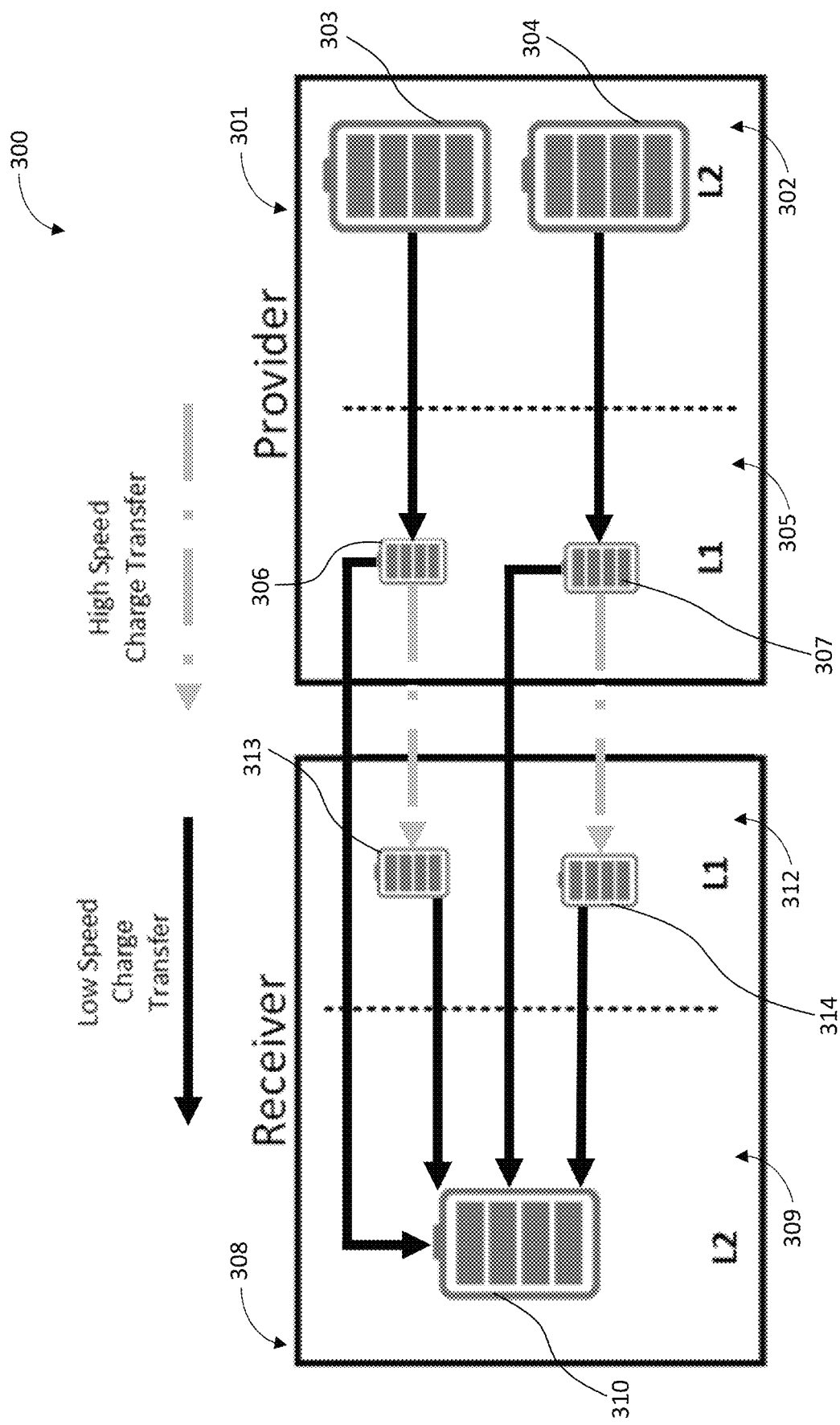
FIG. 27 provides an exemplary charge-providing two-level battery system configured to provide a replenishing charge to an exemplary charge-receiving two-level battery system, according to some embodiments described herein.

As illustrated in FIG. 27, an exemplary embodiment of the multi-level battery system 300 can comprise the first multi-level battery 301 associated with an electrical charge provider, the first multi-level battery 301 comprising the first battery group 302 comprising the first slow battery 303 and the second slow battery 304, the first and second slow batteries 303, 304 having a larger charge capacity and a slower charge transfer rate than other batteries in the first multi-level battery 301. In some embodiments, the first multi-level battery 301 can further comprise the second battery group 305 comprising the first fast battery 306 and the second fast battery 307, collectively the fast batteries 306, 307, which have a lesser charge capacity and faster charge transfer rate than the slow batteries 303, 304. In some embodiments, one or more batteries from the first battery group 302 can be electrically coupled to or configured to be in electrical communication with one or more batteries of the second battery group 305. In some embodiments, the first slow battery 303 may be in electrical communication with the first fast battery 306, and the second slow battery 304 can be in electrical communication with the second fast battery 307. In some embodiments, the multi-level battery system 300 can further comprise the second multi-level battery 308 associated with a charge receiver, the second multi-level battery 308 comprising the first battery group 309 comprising the slow battery 310, the first slow battery 310 having a larger charge capacity and a slower charge transfer rate than other batteries in the second multi-level battery 308. In some embodiments, the second multi-level battery 308 can further comprise the second battery group 311 comprising the first fast battery 312 and the second fast battery 313, which have a lesser charge capacity and faster charge transfer rate than the slow battery 310. In some embodiments, the slow battery 310 from the first battery group 309 can be electrically coupled to or configured to be in electrical communication with one or more batteries of the second battery group 311. In some embodiments, the slow battery 310 may be in electrical communication with the first fast battery 312 and the second fast battery 313, which may be further in electrical communication with, respectively, the first fast battery 306 and the second fast battery 307 of the first multi-level battery 301. Additionally or alternatively, the slow battery 310 can be in electrical communication with one or more of the first fast battery 306 and the second fast battery 307 such that the fast batteries 306, 307 of the first multi-level battery 301 can directly charge the slow battery 310 of the second multi-level battery 308. As such, in an instance in which the first multi-level battery 301 is associated with a charge providing entity, such as a fully or partially charged electric vehicle, and the second multi-level battery 308 is associated with a charge receiving entity, such as a charge depleted electric vehicle, a replenishing supply of electrical charge may be provided by one or more of the fast batteries 306, 307 of the first multi-level battery 301 to one or more of the fast batteries 312, 313 and/or the slow battery 310 of the second multi-level battery 308, such as by way of charge transfer elements physically and/or electrically coupling the multi-level batteries 301, 308 together, or wirelessly. In some embodiments, either in order to provide further electrical charge to the second multi-level battery 308 or to replenish the charge at the one or more fast batteries 306, 307 of the first multi-level battery 301, the first multi-level battery 301 may transfer electrical charge from one or more of the slow batteries 303, 304 to one or more of the fast batteries 306, 307, which may store some or all of the electrical charge or relay the electrical charge to one or more of the fast batteries 312, 313 or the slow battery 310 of the second multi-level battery 308. In some embodiments, such as depending upon which of the fast batteries 312, 313 or the slow battery 310 of the second multi-level battery 308 is/are charge depleted, one or more of the fast batteries 306, 307 of the first multi-level battery 301 or a computing entity may choose to send the replenishing supply of electrical charge to the more depleted of the batteries at the second multi-level battery 308 or, if charging time is limited, the fast batteries 306, 307 can be caused to send the replenishing supply of electrical charge to the fast batteries 312, 313 if doing so would realize a faster speed of charge transfer. In some embodiments, when one or more of the fast batteries 312, 313 of the second multi-level battery 308 receives a replenishing supply of electrical charge, the electrical charge may be stored locally or relayed on to the slow battery 310 of the second multi-level battery 308.

In some embodiments, the fast batteries 306, 307, 312, 313 may have a relatively higher charge transfer rate and can predominantly or exclusively be used for inter-entity charge transfer while the slow batteries 303, 304, 310 may have a relatively lower charge transfer rate, with an accompanying higher charge capacity, and may predominantly or exclusively be used for intra-entity charge transfer, such as by slowly replenishing the fast batteries 306, 307, 312, 313.

Figure 28:
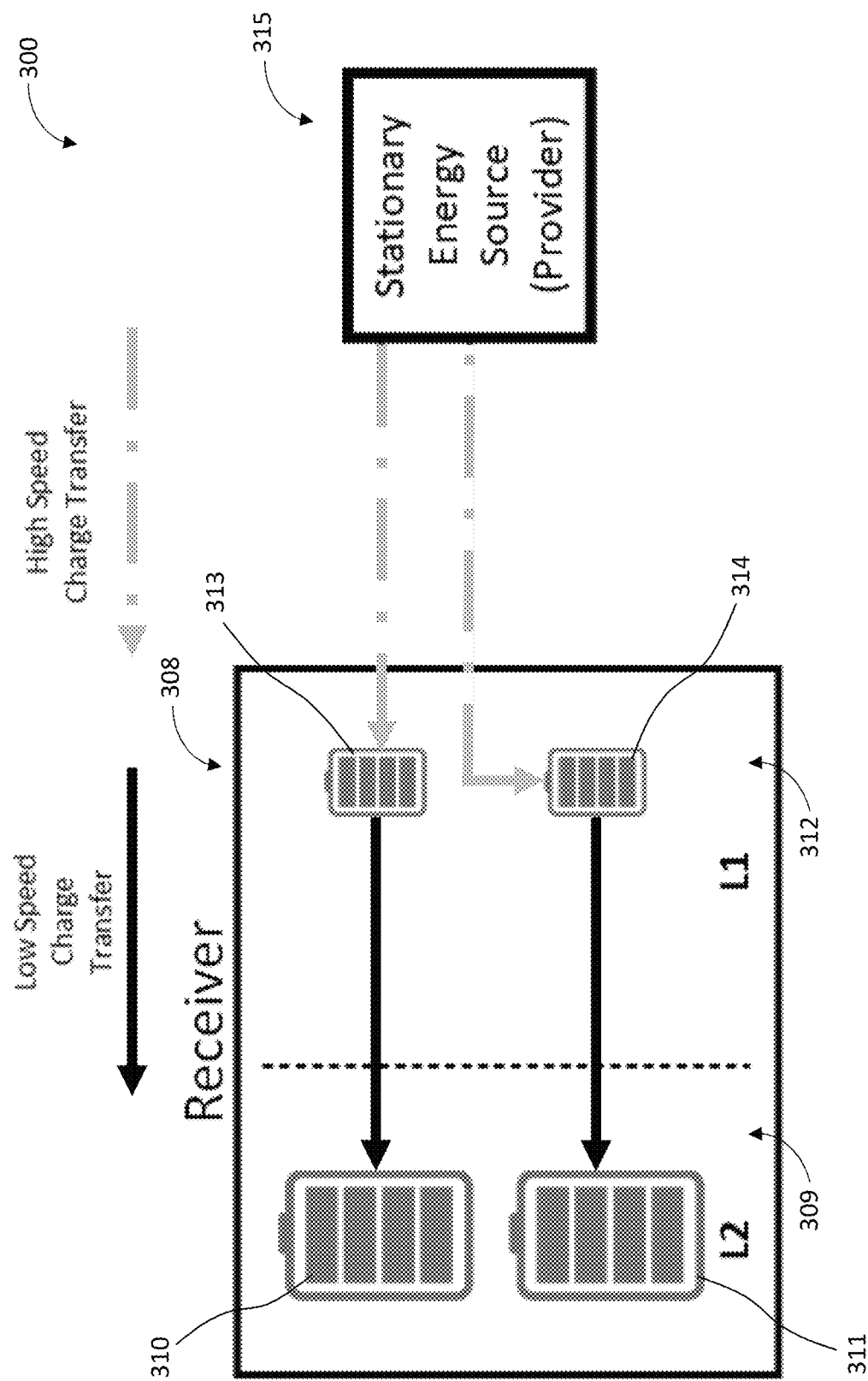
FIG. 28 provides an exemplary charge-receiving two-level battery system configured to receive a replenishing supply of charge from a stationary charge-providing energy source, according to some embodiments described herein.

As illustrated in FIG. 28, according to an embodiment, the multi-level battery system 300 can alternatively comprise an external stationary energy source 315 as the charge provider rather than another multi-level battery, such as the first multi-level battery 301. In some embodiments, the external stationary energy source 315 can charge the L1 battery set 312 of the receiver multi-level battery (e.g., the second multi-level battery 308) and the receiver multi-level battery (e.g., the second multi-level battery 308) can be unplugged from the external stationary energy source 315 and used before being charged again. By way of example only, by assuming the combined capacity of the L2 battery set 309 to be 100 units, assuming the combined capacity of the L1 battery set 312 to be 10 units, assuming the charging transfer rate of the L1 battery set 312 to be 10 units/sec, assuming the charging transfer rate of the L2 battery set 309 to be 1 unit/sec, and assuming no charge transfer loss, the L1 battery set 312 may be fully charged in about 1 sec. Once the L1 battery set 312 is sufficiently or fully charged, the receiver multi-level battery (e.g., the second multi-level battery 308) can be disconnected from the external stationary energy source 315 and the L1 battery set 312 can transfer charge to the L2 battery set 309. Depending upon the charge transfer rates, for example assuming the charge transfer rates above, the transfer of charge from the L1 battery set 312 to the L2 battery set 309 can take about 10 seconds, and may operate internal to the second multi-level battery 308 while the charging takes place. In some embodiments, the process of charging the L1 battery set 312 and then transferring charge from the L1 battery set 312 to the L2 battery set 309 can be repeated a number of times, e.g., greater than five times, greater than six times, greater than seven times, greater than eight times, greater than nine times, or greater than 10 times, inclusive of all values and ranges therebetween, and the L2 battery set 309 can then be sufficiently or fully charged, assuming no or minimal loss/discharge with an effective contact time of about 10 seconds. As such, the effective charging rate of the second multi-level battery 308, according to the assumptions above, may be about 10 units/sec.

In some embodiments, devices such as but not limited to mobile phones, tablets, smart watches, medical implants, and/or the like can benefit from battery systems such as described herein that charge rapidly and/or in short bursts via fast batteries. In some embodiments, the charging can be done in a wired charging mode or in a wireless charging mode. In some embodiments, wireless and/or wired charging stations or charging surfaces can be installed on, within, or partially within walls, inside and near elevators, on a desk, and/or the like.

Figure 29:
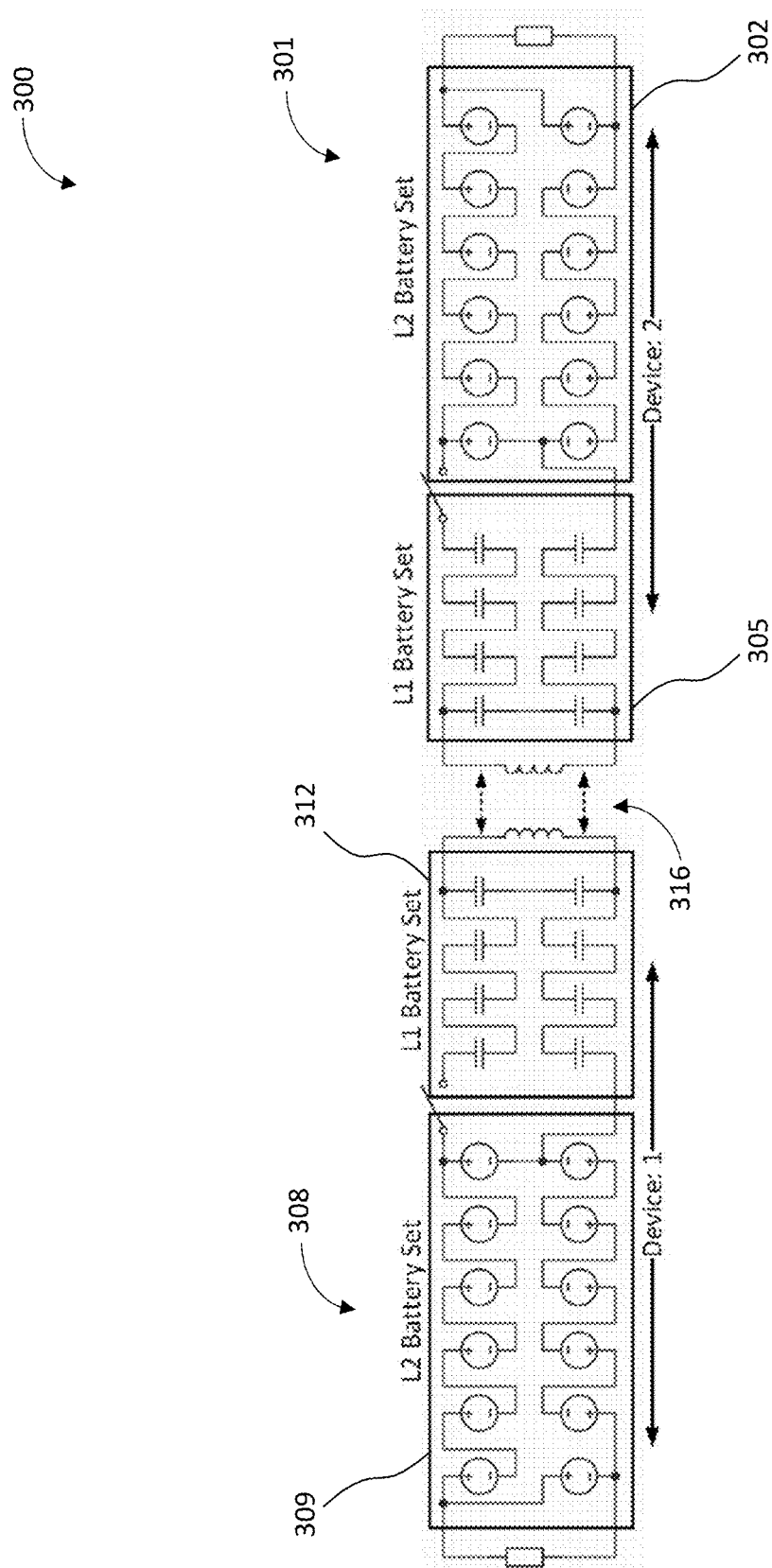
FIG. 29 provides an exemplary charge-providing two-level battery system configured to wirelessly provide a replenishing charge to an exemplary charge-receiving two-level battery system, according to some embodiments described herein.

Referring now to FIG. 29, the multi-level battery system 300 can be used for battery-to-battery charging between multi-level batteries 301, 308. In some embodiments, on-the-go charging can be used for charge sharing between any battery operated devices. In some embodiments, this on-the-go battery-to-battery charging allows for sharing of a small amount of charge over a small contact time between the provider and the receiver. Once the L1 battery set 312 of the receiver (e.g., the second multi-level battery 308) gets full, the devices can be disconnected and used separately while the L1 battery set 312 of the receiver (e.g., the second multi-level battery 308) recharges the corresponding L2 battery set 309. In some embodiments, the L2 battery set 302 of the provider, the first multi-level battery 301, will replenish the corresponding L1 battery set, the second battery group 305, to allow it to provide a burst of charge to other devices such as the receiver (e.g., the second multi-level battery 308) in the future.

Figure 30:
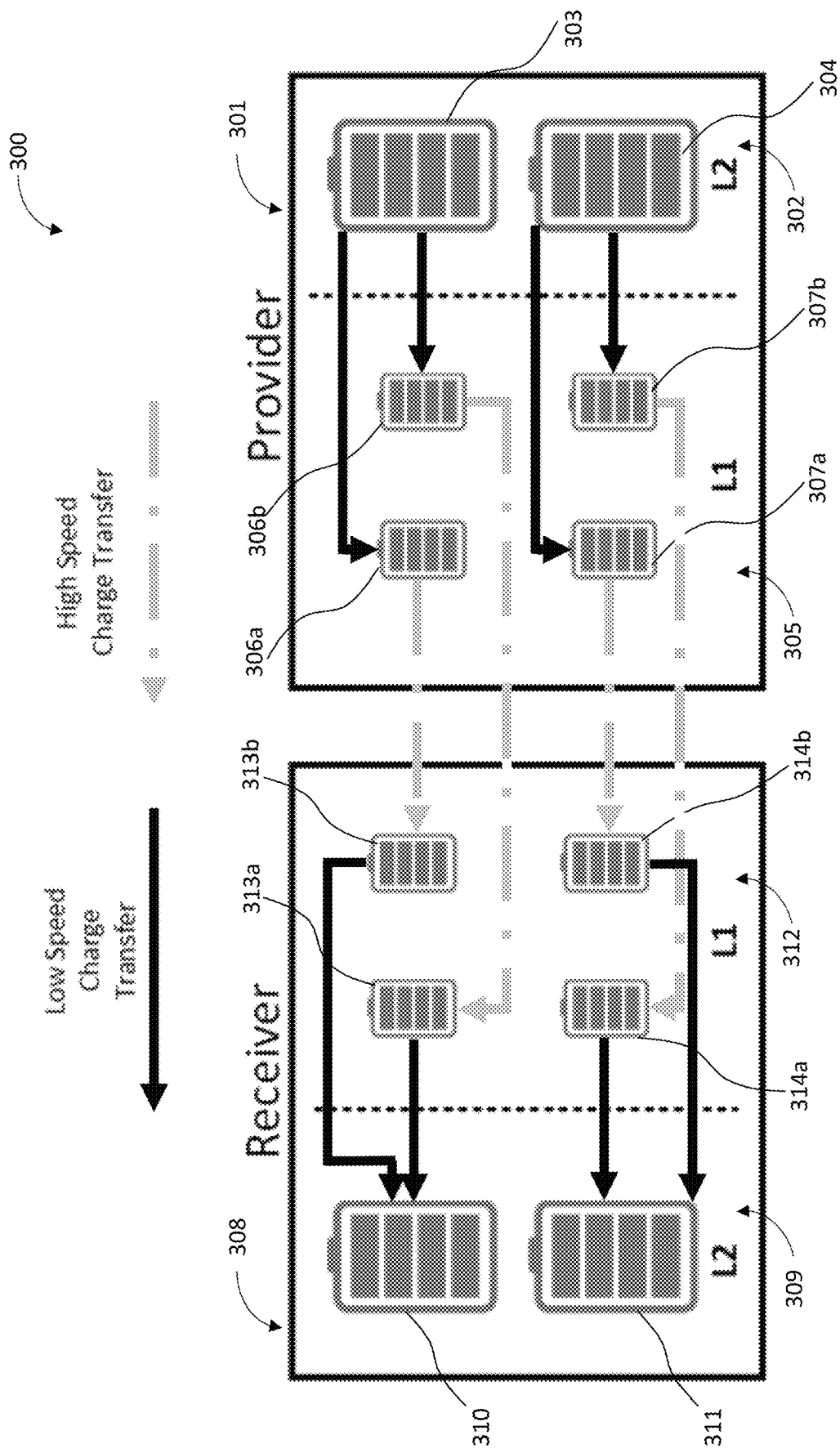
FIG. 30 provides an exemplary charge-providing two-level battery system configured to provide a replenishing charge to an exemplary charge-receiving two-level battery system, according to some embodiments described herein.

In some embodiments, such as illustrated in FIG. 30, the multi-level battery system 300 can comprise the first multi-level battery 301 associated with an electrical charge provider, the first multi-level battery 301 comprising the first battery group 302 comprising the first slow battery 303 and the second slow battery 304, the first and second slow batteries 303, 304 having a larger charge capacity and a slower charge transfer rate than other batteries in the first multi-level battery 301. In some embodiments, the first multi-level battery 301 can further comprise the second battery group 305 comprising a first fast battery 306a, a second fast battery 306b, a third fast battery 307a, and a fourth fast battery 307b, collectively the fast batteries 306a, 306b, 307a, 307b. In some embodiments, the fast batteries 306a, 306b, 307a, 307b can have a smaller charge capacity and a faster charge transfer rate than other batteries in the first multi-level battery 301. In some embodiments, one or more batteries from the first battery group 302 can be electrically coupled to or configured to be in electrical communication with one or more batteries of the second battery group 305. In some embodiments, the first slow battery 303 may be in electrical communication with the first and second fast batteries 306a, 306b, and the second slow battery 304 may be in electrical communication with the third and fourth fast batteries 307a, 307b. In some embodiments, the multi-level battery system 300 can further comprise the second multi-level battery 308 associated with the charge receiver, the second multi-level battery 310 comprising the first battery group 309 comprising the first slow battery 310 and the second slow battery 311, the first and second slow batteries 310, 311 having a larger charge capacity and a slower charge transfer rate than other batteries in the second multi-level battery 308. In some embodiments, the second multi-level battery 308 can further comprise the second battery group 312 comprising a first fast battery 313a, a second fast battery 313b, a third fast battery 314a, and a fourth fast battery 314b, collectively the fast batteries 313a, 313b, 314a, 314b. In some embodiments, the fast batteries 313a, 313b, 314a, 314b can have a smaller charge capacity and a faster charge transfer rate than other batteries in the second multi-level battery 308. In some embodiments, one or more batteries from the first battery group 309 can be electrically coupled to or configured to be in electrical communication with one or more batteries of the second battery group 312. In some embodiments, the first slow battery 310 may be in electrical communication with the first and second fast batteries 313a, 313b, and the second slow battery 311 may be in electrical communication with the third and fourth fast batteries 314a, 314b. As such, in an instance in which the first multi-level battery 301 is associated with a charge providing entity, such as a fully or partially charged electric vehicle, and the second multi-level battery 308 is associated with a charge receiving entity, such as a charge depleted electric vehicle, a replenishing supply of electrical charge may be provided by one or more of the fast batteries 306a, 306b, 307a, 307b of the first multi-level battery 301 to one or more of the fast batteries 313a, 313b, 314a, 314b of the second multi-level battery 308, such as by way of charge transfer elements physically and/or electrically coupling the multi-level batteries 301, 308 together, or wirelessly. In some embodiments, either in order to provide further electrical charge to the second multi-level battery 308 or to replenish the charge at the one or more fast batteries 306a, 306b, 307a, 307b of the first multi-level battery 301, the first multi-level battery 301 may transfer electrical charge from one or more of the slow batteries 303, 304 to one or more of the fast batteries 306a, 306b, 307a, 307b, which may relay the electrical charge on to the second multi-level battery 308 and/or store the electrical charge at the one or more of the fast batteries 306a, 306b, 307a, 307b. In some embodiments, when one or more of the fast batteries 313a, 313b, 314a, 314b of the second multi-level battery 308 receives a replenishing supply of electrical charge, e.g., from one or more of the fast batteries 306a, 306b, 307a, 307b of the first multi-level battery 301, the electrical charge may be stored locally or relayed on to one or more of the slow batteries 310, 311 of the second multi-level battery 308.

In some embodiments, the fast batteries 306a, 306b, 307a, 307b, and/or 313a, 313b, 314a, 314b may have a relatively higher charge transfer rate and can predominantly or exclusively be used for inter-entity charge transfer while the slow batteries 303, 304 and/or 310, 311 may have a relatively lower charge transfer rate, with an accompanying higher charge capacity, and may predominantly or exclusively be used for intra-entity charge transfer, such as by slowly replenishing the fast batteries 306a, 306b, 307a, 307b, and/or 313a, 313b, 314a, 314b. In some embodiments, such a system may allow for more rapid charge transfer between two entities (e.g., electric vehicles), more rapid detachment of the charge-providing and charge-receiving entities, and more rapid return of the entities to their normal route for more expeditious arrival at their respective desired destination. In some embodiments, there is a corresponding reduction in cost and environmental impacts associated with such an approach that utilizes more rapid charge transfer where possible at least because entities generally need to be rerouted less or for less time from their respective most singularly optimized route, leading to a reduction in the expenditure of charge from the system for rerouting entities for entity-to-entity charging on-the-go. In some embodiments, there is also a corresponding reduction risk as the entities need to be electrically coupled while on-the-go for less time, reducing the risk that such electrical coupling and/or physical coupling of moving vehicles may present.

In addition, if the total charge capacity provided for an entity, such as an electric vehicle, were provided as a single battery or bank of battery cells, then charging of that battery or bank of battery cells would likely require a single recharging input with significant inefficiencies being possible in terms of charging in series or charging in parallel. However, if an entity can establish more than one electrical connection with more than one input of replenishing charge, such as via each of the slow batteries 310, 311 and each of the fast batteries 313a, 313b, 314a, 314b via different charge transfer rates and potentially from more than one provider entity (e.g., a nearby electric vehicle and a deployed mobile charging station) simultaneously, then the rate of total charge level replenishment for a receiver entity or a relay entity or the like can increase even more.

Figure 31:
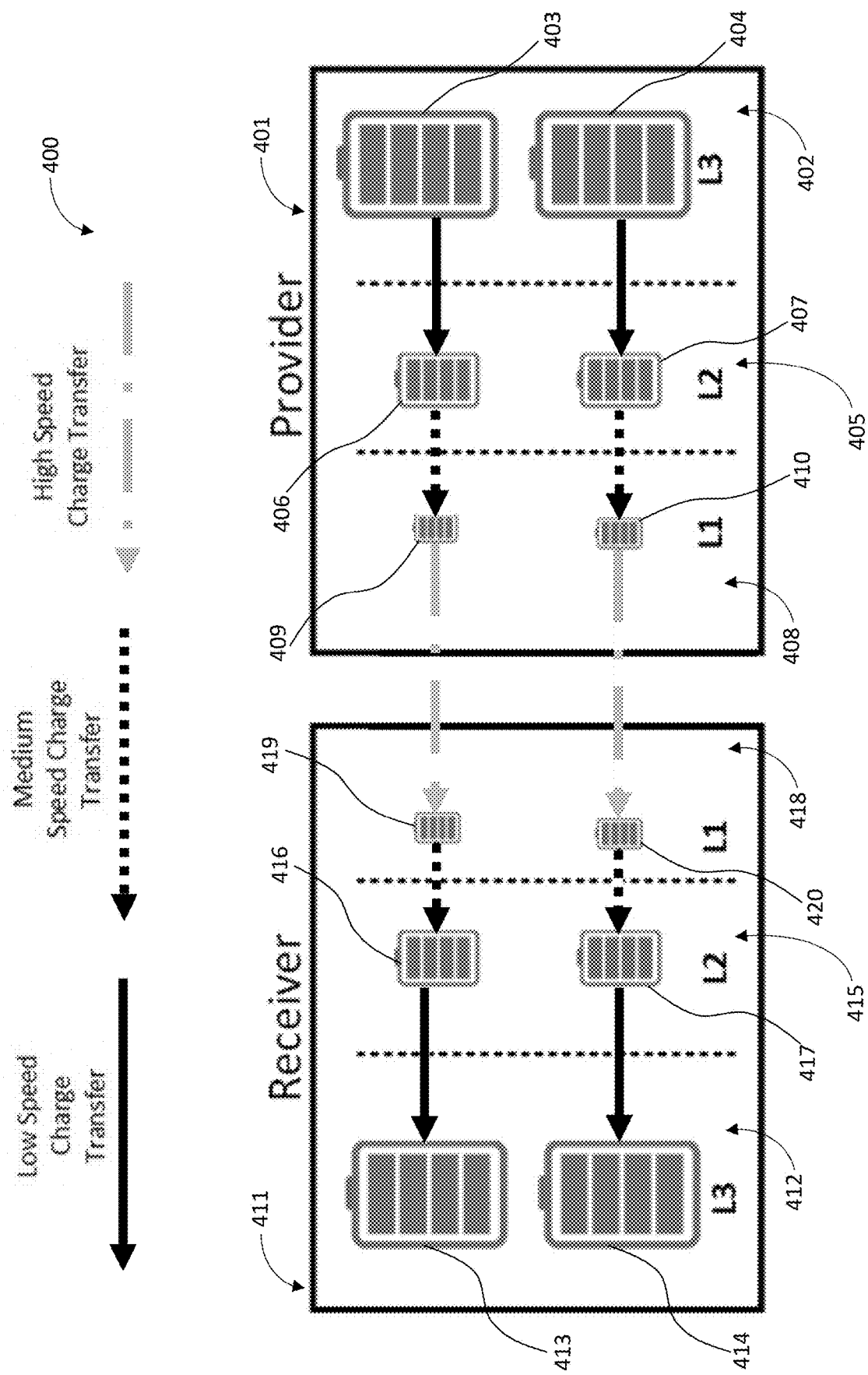
FIG. 31 provides an exemplary charge-providing three-level battery system configured to provide a replenishing charge to an exemplary charge-receiving three-level battery system, according to some embodiments described herein.

Referring now to FIG. 31, an exemplary embodiment of a multi-level battery system 400 can comprise a first multi-level battery 401 associated with an electrical charge provider, the first multi-level battery 401 comprising a first battery group 402 comprising a first slow battery 403 and a second slow battery 404, the first and second slow batteries 403, 404 having a larger charge capacity and a slower charge transfer rate than other batteries in the first multi-level battery 401. In some embodiments, the first multi-level battery 401 can further comprise a second battery group 405 comprising a first moderate battery 406 and a second moderate battery 407, collectively the moderate batteries 406, 407, which have a lesser charge capacity and faster charge transfer rate than the slow batteries 403, 404. In some embodiments, the first multi-level battery 401 can further comprise a third battery group 408 comprising a first fast battery 409 and a second fast battery 410, the fast batteries 409, 410 having a lower charge capacity and faster charge transfer rate than the other batteries in the first multi-level battery 401. In some embodiments, one or more batteries from the first battery group 402 can be electrically coupled to or configured to be in electrical communication with one or more batteries of the second battery group 405, and one or more batteries of the second battery group 405 can be electrically coupled to or configured to be in electrical communication with one or more batteries of the third battery group 408. In some embodiments, the first slow battery 403 may be in electrical communication with the first moderate battery 406, which may be further in electrical communication with the first fast battery 409. Likewise, the second slow battery 404 can be in electrical communication with the second moderate battery 407 which in turn may be in electrical communication with the second fast battery 410. In some embodiments, the multi-level battery system 400 can further comprise a second multi-level battery 411 associated with a charge receiver, the second multi-level battery 411 comprising a first battery group 412 comprising a first slow battery 413 and a second slow battery 414, the first and second slow batteries 413, 414 having a larger charge capacity and a slower charge transfer rate than other batteries in the second multi-level battery 411. In some embodiments, the second multi-level battery 411 can further comprise a second battery group 415 comprising a first moderate battery 416 and a second moderate battery 417, which have a lesser charge capacity and faster charge transfer rate than the slow batteries 413, 414. In some embodiments, the second multi-level battery 411 can further comprise a third battery group 418 comprising a first fast battery 419 and a second fast battery 420, the fast batteries 419, 420 having a lower charge capacity and faster charge transfer rate than the other batteries in the second multi-level battery 411. In some embodiments, one or more batteries from the first battery group 412 can be electrically coupled to or configured to be in electrical communication with one or more batteries of the second battery group 415, and one or more batteries of the second battery group 415 can be electrically coupled to or configured to be in electrical communication with one or more batteries of the third battery group 418. In some embodiments, the first slow battery 413 may be in electrical communication with the first moderate battery 416, which may be further in electrical communication with the first fast battery 419. Likewise, the second slow battery 414 can be in electrical communication with the second moderate battery 417 which in turn may be in electrical communication with the second fast battery 420. As such, in an instance in which the first multi-level battery 401 is associated with a charge providing entity, such as a fully or partially charged electric vehicle, and the second multi-level battery 411 is associated with a charge receiving entity, such as a charge depleted electric vehicle, a replenishing supply of electrical charge may be provided by one or more of the fast batteries 409, 410 of the first multi-level battery 401 to one or more of the fast batteries 419, 420 of the second multi-level battery 411, such as by way of charge transfer elements physically and/or electrically coupling the multi-level batteries 401, 411 together, or wirelessly. In some embodiments, either in order to provide further electrical charge to the second multi-level battery 411 or to replenish the charge at the one or more fast batteries 409, 410 of the first multi-level battery 401, the first multi-level battery 401 may transfer electrical charge from one or more of the slow batteries 403, 404 to one or more of the moderate batteries 406, 407, which may store some or all of the electrical charge or relay the electrical charge to one or more of the fast batteries 409, 410, which may further in turn relay the electrical charge on to the second multi-level battery 411 and/or store the electrical charge at the one or more of the fast batteries 409, 410. In some embodiments, when one or more of the fast batteries 419, 420 of the second multi-level battery 411 receives a replenishing supply of electrical charge, e.g., from one or more of the fast batteries 409, 410 of the first multi-level battery 401, the electrical charge may be stored locally or relayed on to one or more of the moderate batteries 416, 417, which may store the charge locally or relay the electrical charge on to one or more of the slow batteries 413, 414 of the second multi-level battery 411.

In some embodiments, the fast batteries 409, 410 and/or 419, 420 may have a relatively higher charge transfer rate and can predominantly or exclusively be used for inter-entity charge transfer while the moderate batteries 406, 407 and/or 416, 417 and/or the slow batteries 403, 404 and/or 413, 414 may have a relatively lower charge transfer rate, with an accompanying higher charge capacity, and may predominantly or exclusively be used for intra-entity charge transfer, such as by slowly replenishing the fast batteries 409, 410 and/or 419, 420.

In some embodiments, using the multi-level battery system 300, the multi-level battery system 400, or the like, such as illustrated in FIGS. 26-31 may allow for more rapid charge transfer between two entities (e.g., mobile battery-powered entities, electric vehicles, drones, or the like), more rapid detachment of the charge-providing and charge-receiving entities, and more rapid return of the entities to their normal route for more expeditious arrival at their respective desired destination. In some embodiments, there is a corresponding reduction in cost and environmental impacts associated with such an approach that utilizes more rapid charge transfer where possible at least because entities generally need to be rerouted less or for less time from their respective most singularly optimized route, leading to a reduction in the expenditure of charge from the system for rerouting entities for entity-to-entity charging on-the-go. In some embodiments, there is also a corresponding reduction risk as the entities need to be electrically coupled while on-the-go for less time, reducing the risk that such electrical coupling and/or physical coupling of moving vehicles may present.

In addition, if the total charge capacity provided for an entity, such as an electric vehicle, were provided as a single battery or bank of battery cells, then charging of that battery or bank of battery cells would likely require a single recharging input with significant inefficiencies being possible in terms of charging in series or charging in parallel. However, if an entity can establish more than one electrical connection with more than one input of replenishing charge, such as via each or the slow batteries, each of any moderate batteries, and each of the fast batteries via different charge transfer rates and potentially from more than one provider entity (e.g., a nearby electric vehicle and a deployed mobile charging station) simultaneously, then the rate of total charge level replenishment for a receiver entity or a relay entity or the like can increase even more.

Figure 32:
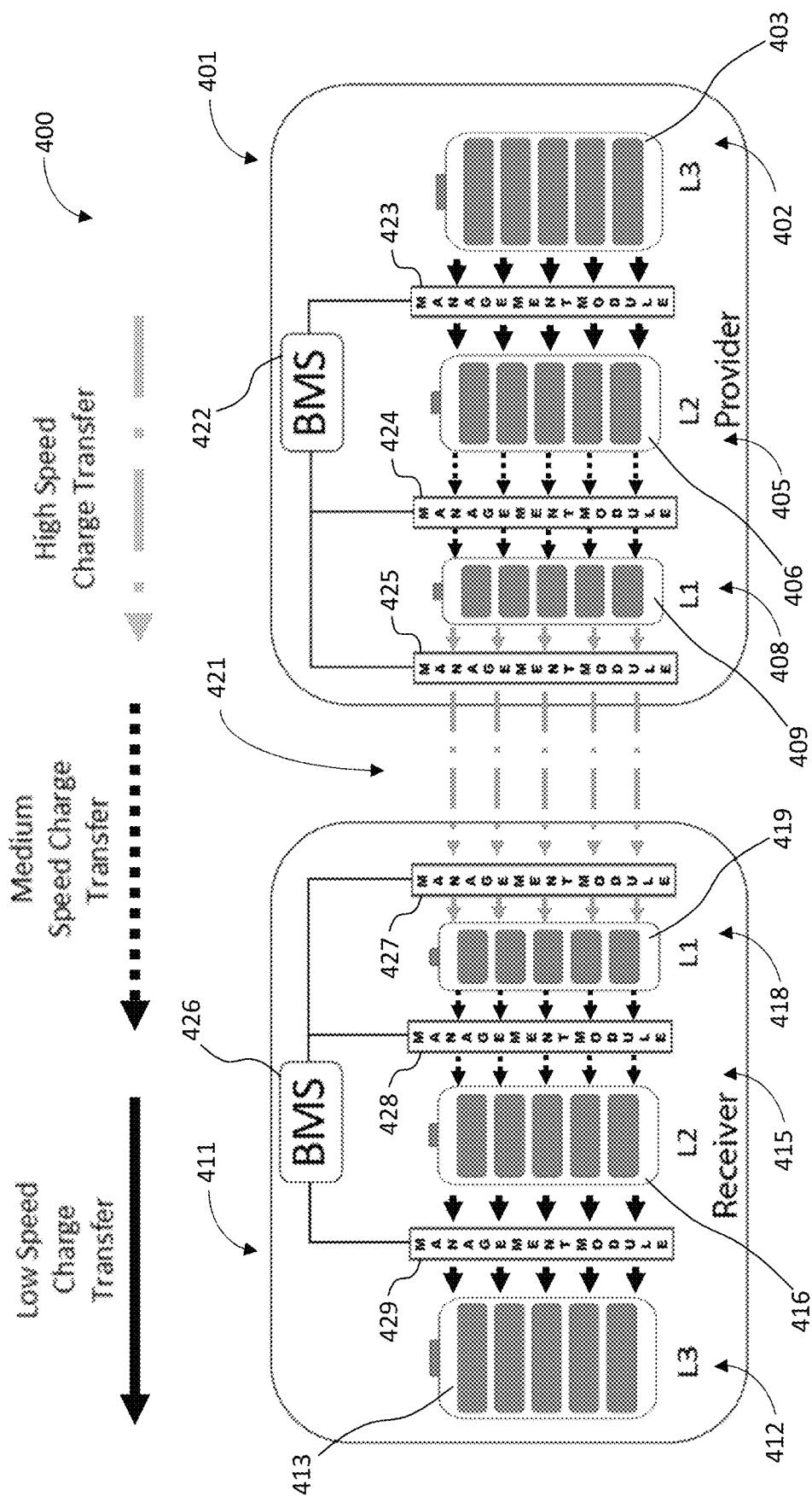
FIG. 32 provides an exemplary system-level architecture for multi-level battery systems comprising one or more battery management systems, according to some embodiments described herein.
Figure 33:
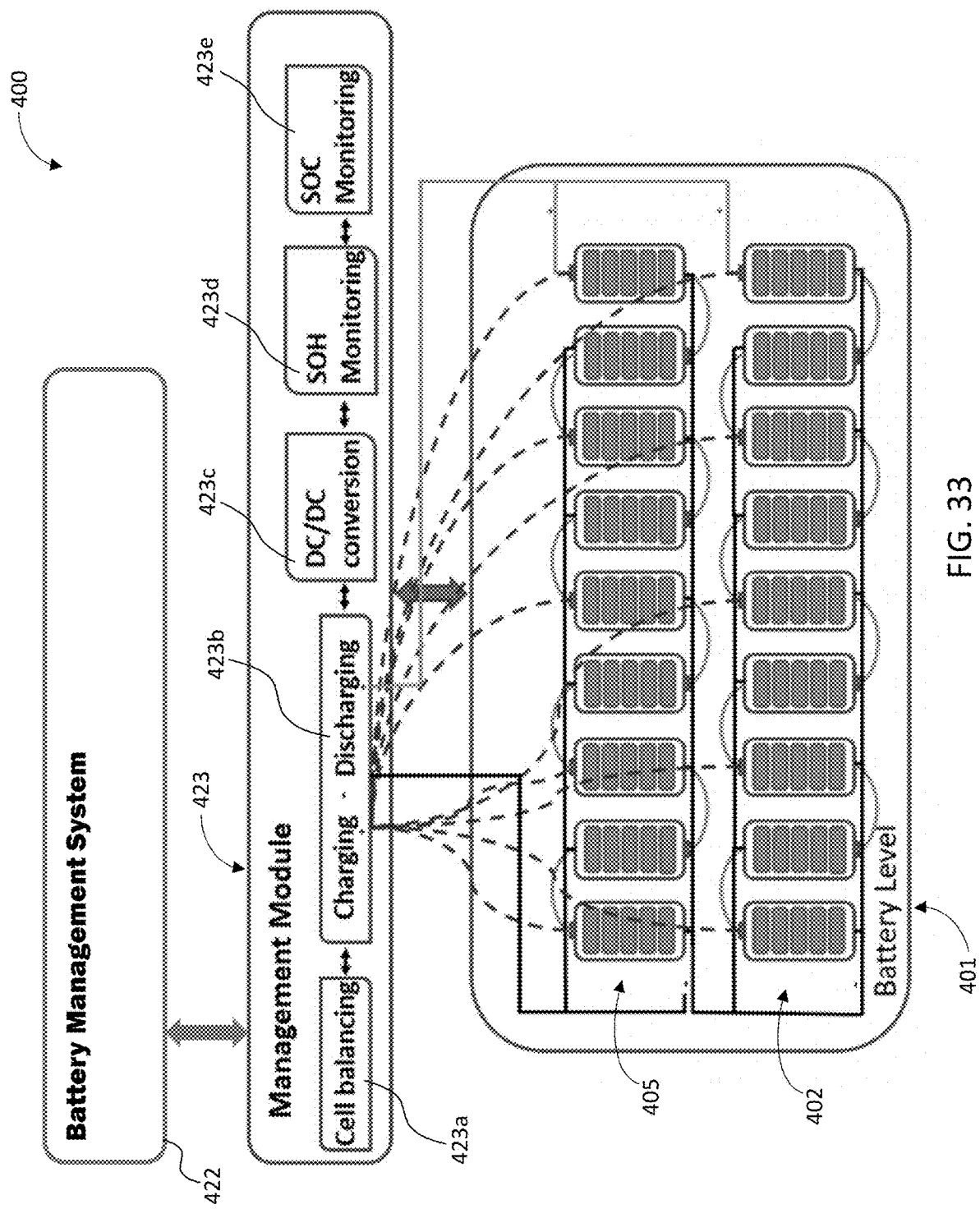
FIG. 33 provides an exemplary battery management system configured to track and manage charge transfer within a single multi-level battery system, handle DC-to-DC conversion and connectivity between the battery levels, and provide information about intra-battery system charge distribution to external entities, according to some embodiments described herein.

Referring now to FIGS. 32 and 33, the multi-level battery system 400 is illustrated, according to some embodiments. As illustrated, the multi-level battery system 400 comprises a first multi-level battery 401 that can be a battery system or subsystem for any suitable device, vehicle, system, network, apparatus, process, structure, and/or the like. The multi-level battery 401 can be, in some instances, a charge provider, while in other instances the multi-level battery 401 can be a charge receiver. In some instances, the multi-level battery 401 can be configured to, at least over a particular duration, neither provide nor receive charge. In some embodiments, the multi-level battery 401 can comprise three battery sets (402, 405, 408) with each battery set comprising one or more batteries or other suitable electrochemical or the like charge storage/transfer devices. In some embodiments, the multi-level battery 401 can comprise a battery management system 422 in operable communication with one or more of the battery sets 402, 405, 408. In some embodiments, the battery management system 422 can be configured to store structural, configurational, organizations, dimensional, compositional, functional, chemical, electrochemical, or other such information about the multi-level battery 401. In some embodiments, the battery management system 422 can be configured to manage the charge load (e.g., the distribution of charge, current charge levels, charge capacity, and/or the like) across a battery or battery system and may also be configured to keep one or more logs associated with the same. In some embodiments, the battery management system 422, 426 may act as a control unit for communication between the multi-level battery 401, 411 and the systems connected with the same. For instance, the multi-level battery 401 may be part of an electric or hybrid vehicle and may be connected to a central control system, onboard computer, and/or the like for the electric or hybrid vehicle. As such, in some embodiments, the battery management system 422 may control some or all functions of the first multi-level battery 401, such as charging, discharging, recharging, intra-battery charge transfer, and/or the like. In some embodiments, the battery management system 422 may act with some autonomy with regard to the control of some or all functions of the first multi-level battery 401 but may receive, e.g., from one of the central control system, the onboard computer, and/or the like, instructions or further information regarding discharge demand by, e.g., the electric or hybrid vehicle, which may affect, disallow, augment, limit, amend, or otherwise change the manner in which the battery management system 422 controls or partially controls the multi-level battery system 401.

In some embodiments, the multi-level battery system 401 can comprise one or more management modules (e.g., 423, 424, 425) that may be configured to be in operable and/or electrical communication with one or more of the battery management system 422, the first slow battery 403, the first moderate battery 406, the first fast battery 409, and/or the like. In some embodiments, the battery management system 422 can be configured to be in operable and/or electrical communication with one or more of the management modules 423, 424, 425, an external entity, the second multi-level battery system 411, a battery management system 426 of the second multi-level battery system, a cloud computing entity, a wireless network, a local processor, a remote processor, a distributed processor, and/or the like. In some embodiments, a first management module 423 may be in operable or electrical or electrochemical or another suitable manner of communication with the battery management system 422, the first slow battery 403, and the first moderate battery 406. In multi-level battery systems in which a battery level comprises a plurality of batteries or other suitable charge storage/transfer devices, the first management module 423 may be configured to be in constant or sporadic electrical or operable communication with only one, more than one, or all of the plurality of batteries in one or more of the battery levels, e.g., 403 and 403 in the first battery level 402 of the first multi-level battery 401. In some embodiments, the first multi-level battery 401 can further comprise a second management module 424 in operable communication with one or more of the first moderate battery 406 and the first fast battery 409, as well as the battery management system 422. In some embodiments, the first multi-level battery 401 can further comprise a third management module 425 in operable communication with at least the first fast battery 409 and the battery management system 422. In some embodiments, the management modules 423, 424, 425 of the first multi-level battery 401 may be operable to, and/or dimensioned and configured to, commence, control, monitor, regulate, control, limit, communicate about, and/or terminate charge transfer from between batteries within a same level (e.g., between the first slow battery 403 and the second slow battery 404), between batteries in different levels (e.g., between the first slow battery 403 and the first moderate battery 406), between levels (e.g., between the first battery level 402 and the second battery level 405), between multi-level batteries (e.g., between the first multi-level battery 401 and the second multi-level battery 411), between a single-level battery and a multi-level battery (or vice versa), between a stationary charging entity and a multi-level battery (or vice versa), between a mobile charging station and a multi-level battery (or vice versa), and/or the like.

In some embodiments, the multi-level battery system 400 further comprises the second multi-level battery 411 that may act as a charge receiver in some instances, and a charge provider in other instances. In some embodiments, the multi-level battery system 400 can comprise only one multi-level battery (e.g., 401) and the second multi-level battery (e.g., 411) may be a part of another multi-level battery system (not shown). In some embodiments, the second multi-level battery 411 can also comprise a battery management system 426 configured to be in operable and/or electrical communication with one or more management modules 427, 428, 429, the one or more management modules 427, 428, 429 being in operable and/or electrical communication with, at least partial control of, and/or control of the slow, moderate, and fast batteries 412, 416, 419 and/or the like. In some embodiments, in an instance in which the first multi-level battery 401 is acting as a charge provider for the second multi-level battery 411, the battery management system 422 of the first multi-level battery 401 can be configured to transfer or cause transfer of charge from one or more levels 402, 405, 408 to one or more levels 412, 415, 418 of the second multi-level battery 411. In some embodiments, the battery management system 426 of the second multi-level battery 411 can be configured to receive the charge transferred from the first multi-level battery 401 and cause distribution of the charge or part of the charge to one or more of the slow, moderate, and/or fast batteries 413, 416, 419 distributed across respective layers 412, 415, 418 of the second multi-level battery 411.

In some embodiments, management modules 426, 424, 425, 427, 428, 429 may be located nearby a respective one or more battery levels of a respective one of the multi-level batteries 401, 411. In some embodiments, management modules 426, 424, 425, 427, 428, 429 may be configured to manage various localized workloads and tasks, including but not limited to charge balancing across various batteries and levels of the multi-level battery 401, 411, charging, discharging, DC/DC conversion, state-of-charge (SOC) monitoring, state-of-health (SOH) monitoring, short/mid/long-term tracking of SOC-SOH metrics, communication with the battery management system 422, 426, and/or the like. In some embodiments, a management module (e.g., 425) may be configured to receive instructions from the battery management system (e.g., 422) to establish a connection 421 (e.g., a wireless or wired connection) between the first multi-level battery 401 and the second multi-level battery 411, and to transfer or cause transfer of a replenishing supply of charge from one or more of the batteries (e.g., the first fast battery 409) of the first multi-level battery 401 to one or more other batteries (e.g., the first fast battery 419) of the second multi-level battery 411. In some embodiments, the battery management system 422 of the first multi-level battery 401 may communication with the battery management system 426 of the second multi-level battery 411 about an upcoming charge transfer event, which may in turn provide instructions to a management module (e.g., 427) to receive or cause receipt of the replenishing supply of charge from the first multi-level battery 401. In some embodiments, one or more of the battery management systems 422, 426 or management units (e.g., 425, 427) or other components or elements of the multi-level battery system 400 may be involved in the transfer of charge between the first multi-level battery 401 and the second multi-level battery 411.

As illustrated in FIG. 33, an implementation of a management module connected to various battery layers is provided. In some embodiments, the management module 423 may comprise a cell balancing module 423a. In some embodiments, the cell balancing module 423a can be configured to track and control charge transfer within the multi-level battery 401. In some embodiments, charging and discharging circuits 423b can be provided between the various batteries in the first battery layer 402, the various batteries in the second battery layer 405, and/or the associated management module 423. In some embodiments, the charging and discharging circuits 423b can be used to integrate the batteries within the multi-level battery 401. In some embodiments, the charging/discharging circuits 423b can be vertically integrated. In some embodiments, in order to promote or ensure efficient charge transfer between the various battery layers 402, 405, the management module 423 can comprise a DC to DC conversion unit 423c, e.g., at each battery level 402, 405, or for the entire multi-level battery 401. In some embodiments, the DC/DC conversion unit 423c may promote or ensure maximum energy transfer and control over the transfer rate. In some embodiments, it may not be advisable to use only one of the battery management systems 422 for each multi-level battery 401. For instance, in some embodiments, such as when different battery chemistries and different battery performances are incorporated into a single multi-layer battery, different layers and/or different battery types or configurations may be most efficiently and safely operated by using a dedicated battery management system 422 for each battery layer 402, 405, battery type, and/or the like. In some embodiments, the management module 423 may further comprise a SOH monitoring unit 423d and/or a SOC monitoring unit 423e. In some embodiments, the SOC monitoring unit 423d can be configured to help the battery management system 422 or the management module 423 estimate or calculate optimal, desired, and/or actual link times for charge transfer events with other entities comprising a multi-level battery, e.g., 411. The link time calculation may help the battery management system 422 or the management module 423 sync the energy transfer at the exact intervals while limiting or eliminating the requirement for down time associated with stationary charging of the multi-level battery 401.

Such a multi-level battery system 400 can be beneficial for a wide array of applications and uses beyond electric and hybrid vehicle applications, such as for battery-operated or battery-supplemented elevators, mobile devices, recreational vehicles, industrial equipment, and/or the like. By way of example only, a battery-operated entity that can comprise a multi-level battery 401 can include but is not limited to an extraterrestrial rover or the like. Rovers, e.g., rovers configured to operate on another planet or the Moon are not currently deployed on the dark side of celestial bodies because rovers currently require direct solar contact. For one reason, the power requirements for a rover to successfully conduct an autonomous mission away from a stationary charging location and out of solar contact may be too great to allow current rovers to operate over the full duration of the mission. However, high energy power beaming for laser powered Unmanned Vehicles (UVs) and the use of high intensity electron beams to deliver power using Rectenna is contemplated for delivering power to such rovers when they are out of direct solar contact extraterrestrially. However, there is not currently any solution for how to store the beamed energy efficiently, especially since the beamed energy is contemplated as being sent in short bursts and to a rover that is continuing to traverse the extraterrestrial landscape during recharging. One of the problems with storing energy from such beams is that not all types of batteries can store that incoming power at that speeds. However, according to some embodiments, a multi-level battery such as the first multi-level battery 401 or the second multi-level battery 411 can receive beamed energy, e.g., a short burst of beamed energy, can carry out the charging of one or more fast, very fast, or ultra-fast charge transfer batteries, e.g., 406, 407, 409, 410, 416, 417, 419, 420, and then charge the slower charge transfer batteries, e.g., 403, 404, 413, 414, during receipt of the energy beam and/or once the energy beam is discontinued. In some embodiments, UVs equipped with such multi-level batteries may be deployed to regions of extraterrestrial landscapes where solar power is not accessible. In some embodiments, a satellite, e.g., a satellite comprising the multi-level battery 401, can be placed into orbit around a celestial body. The satellite can then capture solar energy during a portion of its orbit about the celestial body and store the solar energy as electrical or electrochemical energy in the fast battery layers (e.g., 405, 408) of the multi-level battery 401 during exposure to the solar energy, and can then recharge the slower battery levels (e.g., 402) during and after exposure to solar energy. The satellite can then, during another portion of its orbit about the celestial body that aligns with the location of the rover in the extraterrestrial landscape, transmit one or more high energy beams to the UV with very high discharge rates as compared to traditional batteries. The UV, e.g., a UV comprising the multi-level battery 411, can rapidly convert the high energy beams to a replenishing charge and cause recharging of the fastest battery layers (e.g., 418, 415) initially and then cause charge transfer from the fastest battery layers of the UV to the slower battery layers (e.g., 412) during and/or after recharging the fastest battery layers using the high energy beams. In some embodiments, the multi-level battery system 400 can be capable of calculating link time, e.g., using a battery management system 426 and/or a management module 427, 428, 429. As such, the receiver (e.g., 411) and the provider (e.g., 401) can sync up to periodically transfer sufficient energy through the high energy beams to ensure the UV has sufficient charge to continue operating even outside direct contact with solar energy by maximizing the efficiency of charge transfer and minimizing the time required for the satellite to location lock on the UV and transmit the high energy beams thereto. Furthermore, since the system 400 has an ability for short bursts of high energy beams, such a system would help in deep space communication systems also.

Figure 34:
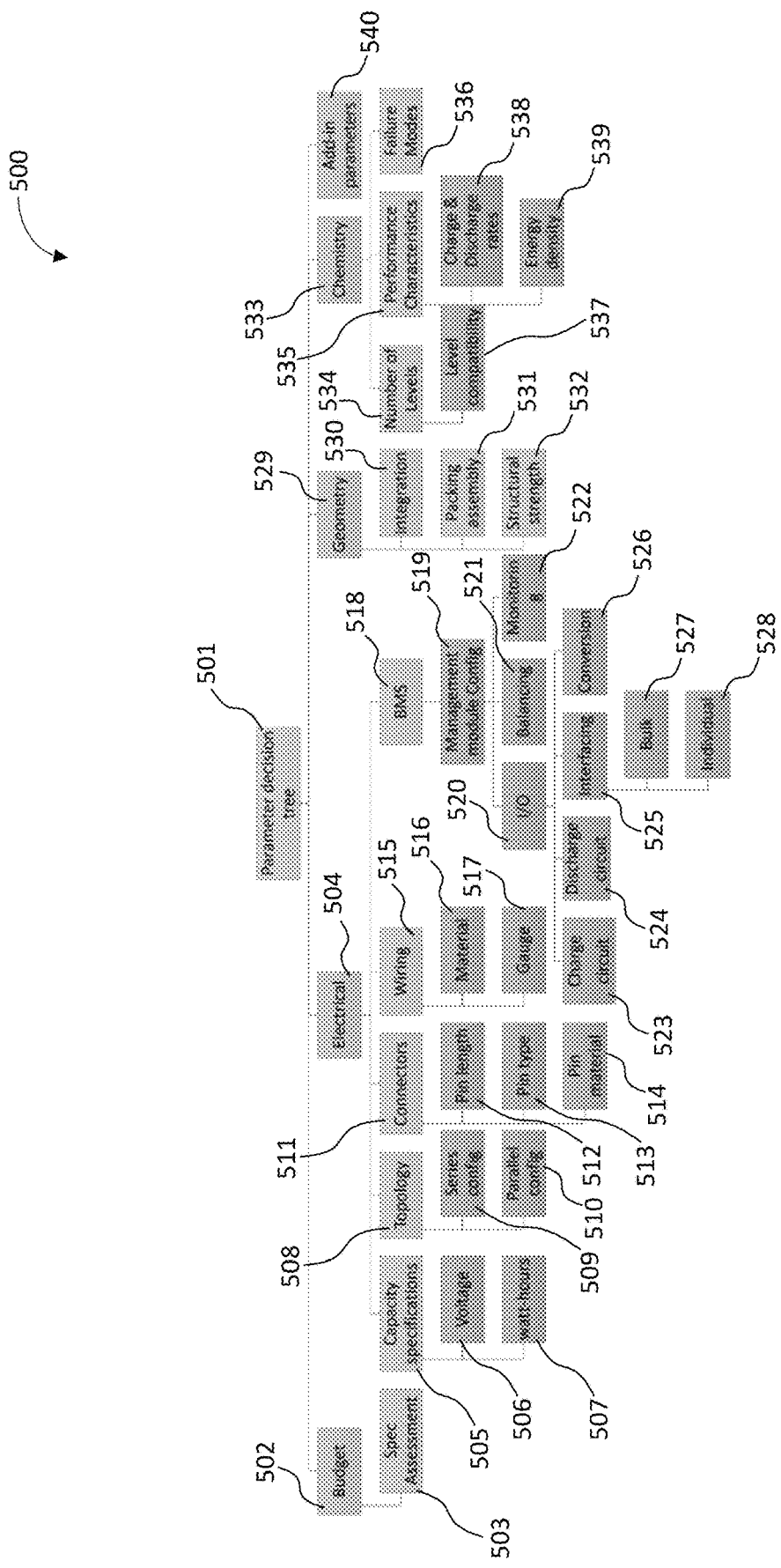
FIG. 34 provides an exemplary decision tree for a multi-level battery architecture compiler, the decision tree comprising some of the available parameters used for algorithmically determining an appropriate multi-level battery architecture and specifications, according to some embodiments described herein.

Referring now to FIGS. 33-34, a process and/or algorithm is provided for optimizing the architecture, configuration, chemistry, capabilities, structure, and/or the like of a multi-level battery such as the first multi-level battery 401. Depending on the application, performance and cost constraints, an optimization process can be provide for determining the optimal number of battery levels, battery capacity, number of battery units, charging rate of batteries, and other multi-level battery system parameters. Provided in FIG. 34 is a battery architecture compiler 600 configured to carry out such an optimization process, and provided in FIG. 33 is a parameter decision tree 500, according to an embodiment, that can be used in part or in full, and/or can be modified by and/or added to by the battery architecture compiler 600.

In some embodiments, the battery architecture compiler 600 can use a heuristic process to determine the optimal battery architecture parameters. Some of the parameters (e.g., as illustrated in the parameter decision tree 500) can be specified by the user, may be default parameters, may be optional parameters, and/or the like. In some embodiments, such parameters may serve as inputs and specifications that provide bounds for the battery architecture compiler 600 when carrying out an optimization.

The parameter decision tree 500 can be, according to one embodiment, organized under a decision tree identifier or heading 501, and can be organized hierarchically by parameter categories. In some embodiments, the parameter categories may include budget 502, electrical specification 504, battery geometry 529, battery chemistry 533, add-in parameters 540, and/or the like. In some embodiments, the budget 502 may comprise one or more allocated budget values for the desired optimized battery architecture and will be application-specific. In some embodiments, parametric decisions may be foundationally bounded by the allocated budget, while in other embodiments parametric decisions made by the battery architecture compiler 600 may comprise one or more layers or bounds for allocated budget such that other parameters can be balanced against allocated budget to arrive at a truly optimized battery architecture. In some embodiments, the allocated budget may limit the battery architecture compiler 600 to output a design with components compromising the economic requirement. In some embodiments, the battery architecture compiler 600 then does a specification analysis 503 based at least on the allocated budget input to select components, optimize configurations, optimize chemistry, and the like. The components can have weights which would allow the battery architecture compiler 600 to spend more on a certain component, if required, than allowed within the bounds of the allocated budget.

With regard to the electrical category 504, electrical bounds may be established for the battery architecture compiler 600 based at least on capacity specifications 505 such as voltage 506 and watt-hour 507 requirements, and can be used by the battery architecture compiler 600 to decide on a topology 508 specification, a wiring 515 specification, and/or a connectors 511 specification to be used in the optimal battery architecture. For instance, the battery architecture compiler 600 can use the topology 508 specification to determine whether to recommend a series battery configuration 509, a parallel battery configuration 510, a combination or variation thereof, and/or the like. In some embodiments, the topology 508 may be used by the battery architecture compiler 600 to provide the required quantities or qualities of individual battery elements in order to make an operable battery within the broader category of the electrical specifications 504. In some embodiments, the wiring 515 specification can be used by the battery architecture compiler 600 to determine an optimal material choice 516, gauge 517, and/or the like, e.g., based at least on a built in loss model. In some embodiments, battery management system 518 configurations and settings may also be determined by the battery architecture compiler 600. In some embodiments, for each level of the optimized multi-level battery, management module configurations 519 can be individually configured by the battery architecture compiler 600, e.g., based at least on level-specific requirements. In some embodiments, input/output (I/O) interfacing parameters 520, charge balancing parameters 521, and charge monitoring parameters 522 can be optimized by the battery architecture compiler 600. In some embodiments, other electrical category 504 parameters such as discharge circuit parameters 524, interfacing parameters 525, and conversion parameters 526 can be optimized by the battery architecture compiler 600. In some embodiments, the battery architecture compiler 600 can decide, with regard to interfacing parameters 525, between bulk interfacing 527, individual interfacing 528, combinations or variations thereof, and/or the like. In some embodiments, the I/O interfacing 520 and conversion 526 parameters may be decided based at least in part on given electrical 504 configurations and one or more battery geometry parameters 529, such as integration parameters 530, packing assembly parameters 531, structural strength parameters 532, the number of levels 534 in the optimized multi-level battery, inter-level compatibility 537, and/or the like. The battery architecture compiler 600 can optimize the multi-level battery accounting for the fact that once individual cells have been configured they need to be packed for assembly into one or more layers and into a particular battery architecture. The battery architecture compiler 600 can therefore determine, retrieve, calculate, optimize, and/or otherwise account for packing geometry parameters 529, which may be based at least on a mathematical model of physical/spatial packing efficiency of the multiple layers and batteries into the multi-level battery that is as compact as possible given other constraints and bounds. In some embodiments, depending on the complexity of the geometrical shape of batteries, layers, bus bars, the battery management system, the management modules, the charging/discharging circuitry, and/or the like, particular structural and mechanical details about the structural support structure 532 may be recommended by the battery architecture compiler 600 as part of the optimization. In some embodiments, the geometry parameters 529 and/or the loss model may each or both be used by the battery architecture compiler 600 for determining the integration level 530 parameters of the optimized multi-level battery.

In some embodiments, the battery architecture compiler 600 may further account for chemistry specification 533 of the optimized multi-level battery. In some embodiments, the chemistry specifications 533 may comprise various input parameters, such as number of levels 534 and inter-level compatibility 537 either in addition to or instead of these parameters being accounted for by the battery architecture compiler 600 when accounting for and optimizing battery geometry 529. In some embodiments, optional input parameters can be determined by the battery architecture compiler 600, can be provided by a user, can be provided by some combination thereof, or the like. In some embodiments, the user may specify a particular battery type or the battery architecture compiler 600 can decide a suitable battery type (e.g., for each level and/or individual batteries within each level) based at least on the chemistry 533 requirements specified. In some embodiments, other parameters that can be considered by the battery architecture compiler 600 when considering and optimizing battery chemistry 533 can include performance characteristics 535, charging and discharging rates 538 for different battery chemistries and configurations, energy density 539 of various battery chemistries and configurations, and failure modes 536 for different battery chemistries and configurations. In some embodiments, based at least on the chemical properties 533, such as energy densities 539, performance characteristics 535, and/or failure modes 536 of the battery, the selected battery chemistries and configurations can be either selected or unselected by the battery architecture compiler 600 and then allocated to one or more levels with respect to their charge transfer speeds, inter-layer compatibility 537, and/or the like. The fastest battery (e.g., the battery chemistry and configuration with the highest charge transfer rate among the battery chemistries and configurations selected for the multi-level battery) may be allocated by the battery architecture compiler 600 to L1, the next fastest battery may be allocated by the battery architecture compiler 600 to L2, and so on. In some embodiments, the compatibility between the levels (e.g., 537) may be used by the battery architecture compiler 600 as an especially important parameter for optimizing the charge transfer between layers, which may be influenced by and/or determined by the chemical and electrical parameters.

Figure 35:
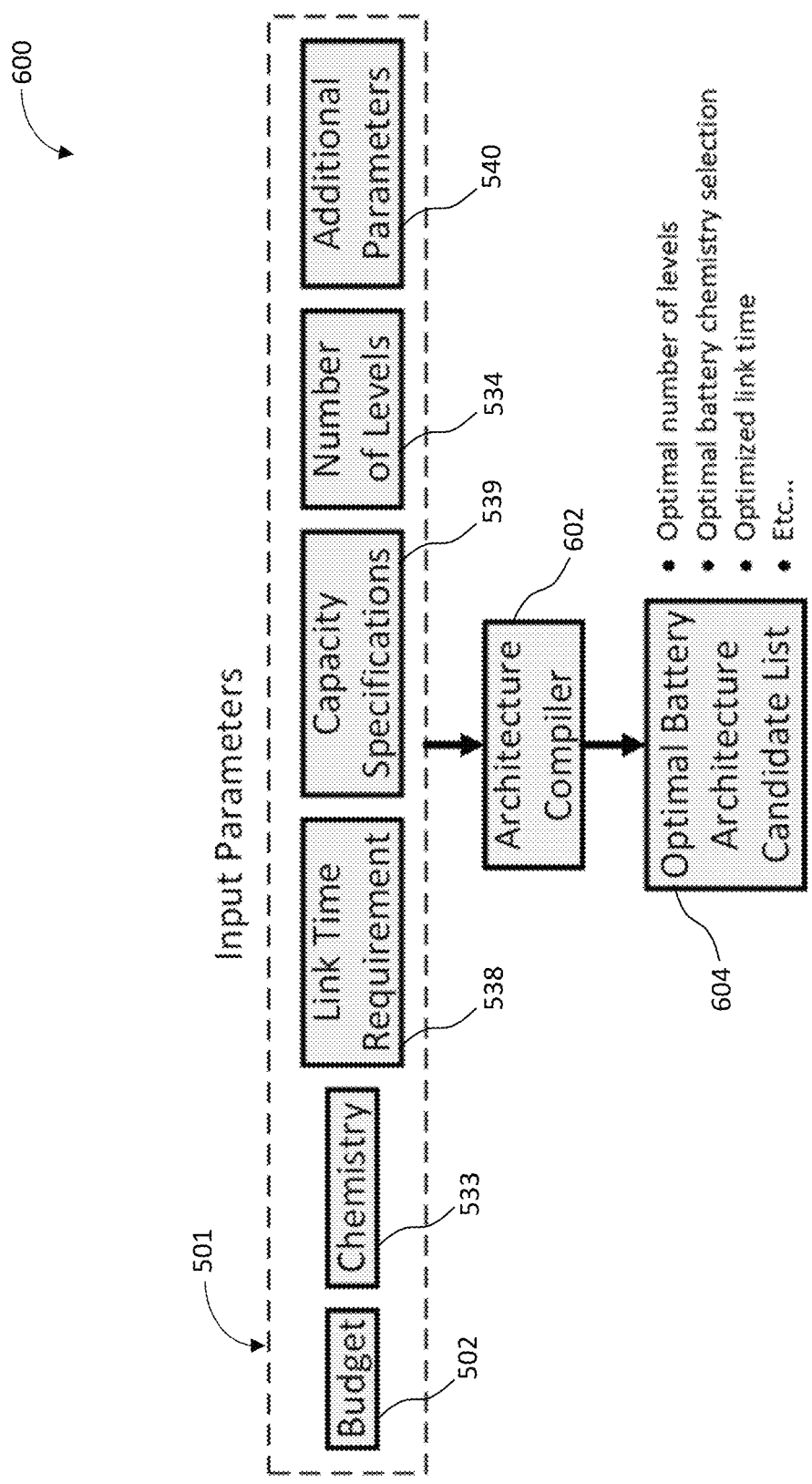
FIG. 35 provides an exemplary multi-level battery architecture compiler configured to algorithmically determine an appropriate multi-level battery architecture and specifications, according to some embodiments described herein.

As illustrated in FIG. 35, the battery architecture compiler 600 can use one or more of the input parameters 501 from a parameter decision tree such as the parameter decision tree 500 illustrated in FIG. 34 as inputs to the parametric optimization process. In some embodiments, the battery architecture compiler 600 illustrated in FIG. 35 is operable to determine an optimal and balanced battery architecture for a multi-level battery such that the optimized multi-level battery exhibits the best possible electrochemical/electrical performance based at least on these and other parameters. A non-exhaustive list of possible inputs parameters 501 is illustrated in FIG. 35 as comprising budget 502, chemistry 533, link time requirements (i.e., charge & discharge rates 538), capacity specifications (i.e., energy densities 539), a number of levels 534, and additional parameters 540 without limitation. In some embodiments, the battery architecture compiler 600 may know, determine, be taught that, or assume that multi-level battery performance is expected to decrease with increased the link time required to charge the multi-level battery. As described herein, "link time" is defined as the duration of time over which a battery system is in contact with an energy source during a charge transfer event. Without wishing to be bound by any particular theory, the battery architecture compiler 600 may know, determine, calculate, deduce, be taught, that, or otherwise consider that by increasing charge transfer speeds at L1, link time may be reduced or minimized. At high charging and discharging rates, the battery system may be capable of handling high throughput for a minimized or reduced link time interval.

In some embodiments, the battery architecture compiler 600 may comprise an architecture compiler 602 configured to carry out mathematical modeling and optimization/algorithmic/parametric calculations and return one or more optimal battery architecture candidates 604. In some embodiments, the battery architecture compiler 600 can generate the one or more optimal battery architecture candidates 604 through a process of topological optimization, loss modeling, modeling of level integration, modeling of level compatibility, modeling of packing and assembly characteristics, and scenario analysis. In some embodiments, the battery architecture compiler 600 can evaluate, based at least on the electrical specifications defined by the user and/or the battery architecture compiler 600, some or all of the topology 508 options, such as a series configuration 509, a parallel configuration 510, and/or the like. The battery architecture compiler 600 can then conduct loss modeling by using at least the material considerations 516 and the failure model 536 associated with the respective battery chemistry of various available chemistries 533 to create the loss model. In some embodiments, further optimizations can be based, at least in part, on this loss model. In some embodiments, the battery architecture compiler 600 can then carry out a level integration analysis based at least on the battery chemistries 533, electrical specifications 504, and/or the like, and the battery architecture compiler 600 can then organize the available battery technologies (chemistry 533, electrical considerations 504, and/or the like) by level within the desired multi-level battery. In some embodiments, the battery architecture compiler 600 can then carry out a level compatibility analysis by comparing design requirements for each battery level and testing the compatibility of each level with other levels in the multi-level battery. Based at least on this, management module configurations 519 for the battery management system 518 can then be determined by the battery architecture compiler 600 and assigned to a particular battery level. Once the battery architecture compiler 600 determines that each level is suitably compatible with each other level, a further level integration 530 analysis is then carried out by the battery architecture compiler 600 to determine whether the multi-level battery should be vertically integrated or otherwise structured for optimal interoperability between battery layers. In some embodiments, the battery architecture compiler 600 can then carry out a packing and assembly analysis based at least on an initial list of optimal battery architectures/chemistries, by modeling the geometry and packing structure of each battery configuration on the list of optimal battery architectures and chemistries. Once packing and assembly parameters are considered and the list of battery architecture candidates is further edited and/or reorganized, the final optimal battery architecture candidate list 604 is formed. In some embodiments, the battery architecture compiler 600 can then provide the full final version of the optimal battery architecture candidate list 604 to the user or the battery architecture compiler 600 can identify a subset of the optimal battery architecture candidate list 604 and provide a targeted recommendation to the user. In some embodiments, the battery architecture compiler 600 may be in operable communication with one or more of the computing device 10, the computing device 20, or the like. In some embodiments, the battery architecture compiler 600 may be in operable communication with and/or may comprise one or more of the computing entity 700 and/or the external computing entity 800, described below with regard to FIGS. 41 and 42.

While the battery architecture compiler 600 described above can, in some embodiments, refer to a parametric analysis, loss modeling, and parameter optimization process, in some embodiments, an algorithm may be used, e.g., by a user, an artificial intelligence program, or the like, to identify various optimal parameters, characteristics, compositions, structures, functionalities, organizations, and/or the like (e.g., an optimal number of battery levels) for a multi-level battery system, e.g., a multi-level battery system for an electric vehicle or the like, with the optimal number of batteries in each level having an optimal battery capacity that will result in the overall system functioning more efficiently and resulting in better battery health and longer battery life span. The optimal parameters, characteristics, compositions, structures, functionalities, organizations, and/or the like can be determined based at least on the particular application, user inputs, use parameters, interoperability needs, structural and/or other limitations of the device or system in which the multi-level battery system is being implemented, and/or budget considerations.

Figure 36:
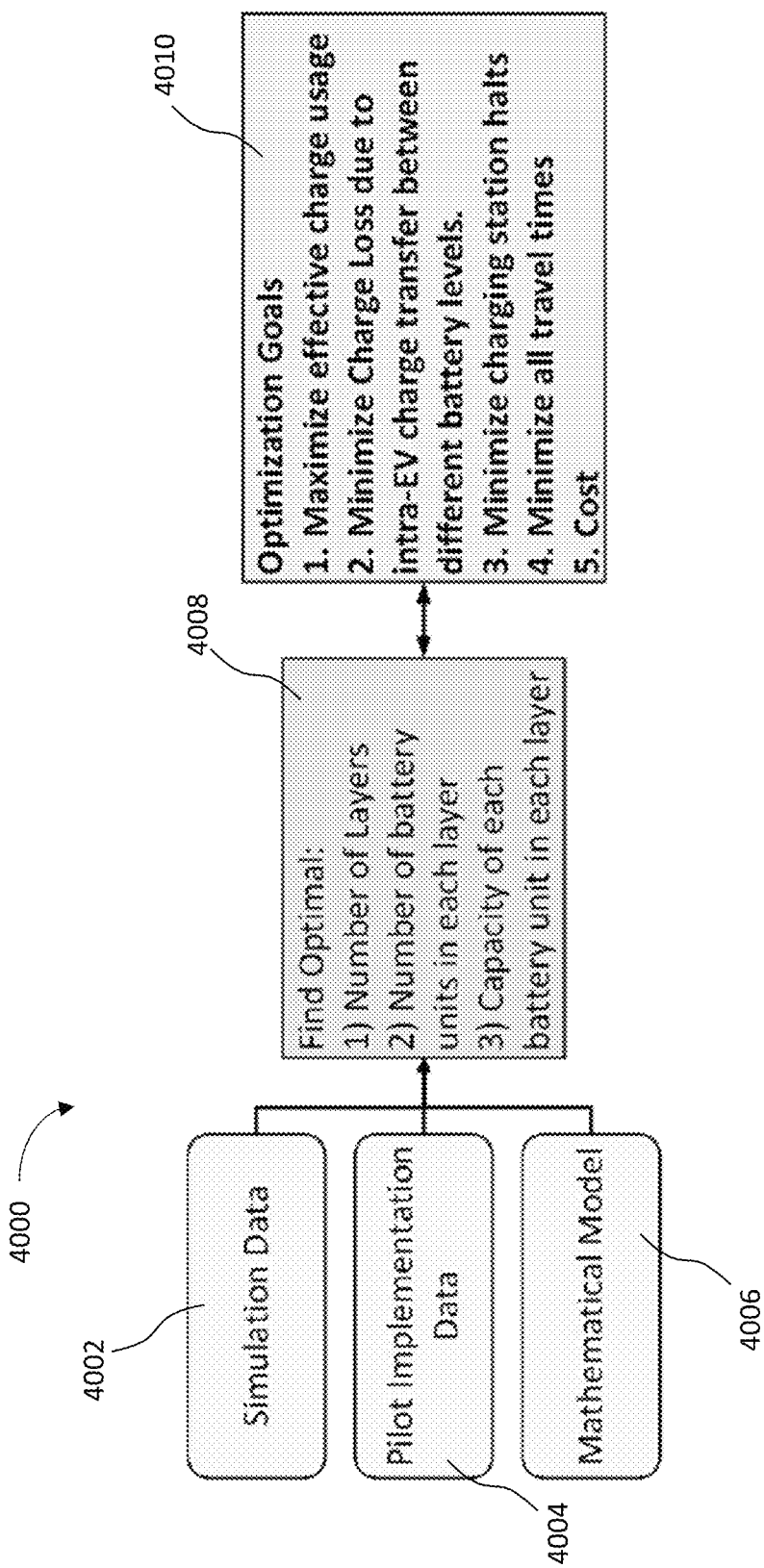
FIG. 36 provides an example of an algorithm operable to determine an optimal number of battery levels of charge transfer rates and battery capacities, according to some embodiments described herein.

Referring now to FIG. 36, it is not always necessary for the charge provider and the charge receiver to have the same number, configuration, capacity, orientation, or the like of batteries and battery levels in order for the algorithm to determine a suitable charge transfer optimization inter-entity as well as intra-entity. In some embodiments, for parallel charge transferring between entities, it may be helpful to step up the voltage to reduce the current, however such considerations are also able to be considered and recommended/instructed by the algorithm or the computing device 20 when providing route instructions, charge transfer instructions, and batter configuration instructions to entities in the transportation system 2.

In some embodiments, while the smallest, lowest level (L1) battery set (e.g., having the highest charge transfer rate) may be ideal for charge transfer between entities, higher level battery sets (having lower charge transfer rates) can also be used to receive or provide charge directly to/from other entities either instead of the L1 (fast) batteries or in parallel to the L1 batteries. In some embodiments, such as illustrated in FIG. 36, an optimization sequence or algorithm may determine the suitable or optimal configuration in order to get an extra overall charge transfer speed boost between entities and/or within the transportation system 2 as a whole. In some embodiments, one or more of the first multi-level battery 301 and the second multi-level battery 308 may comprise one or more DC/DC converters in order for the fast batteries 306, 307 to provide the replenishing supply of electrical charge directly to the slow battery 310. In some embodiments, in a 2-level battery system such as illustrated in FIGS. 26-30, the L1 batteries of the provider entity can simultaneously charge the L1 and L2 battery sets.

Exemplary System for Optimized Charge Distribution in a Transportation Network

In some embodiments, a transportation network can comprise one or more battery-powered entities such as electric vehicles, which forms a local/global network to facilitate charge sharing between entities. In some embodiments, the electric vehicles or battery-operated entities are capable of sharing charge with each other on demand. Charge can be shared via a physical connection or via wireless means. In some embodiments, the battery-operated entities have multiple sets of batteries with varying capacity and charge transfer rate.

In some embodiments, in a Solo-Mode, the battery operated entities are capable of sharing charge among each other without the guidance of the cloud application, so each entity may comprise suitable hardware and access or store locally suitable software for implementing the algorithms to make the charge transfer decision and for communicating such decisions/requests with other entities and/or for requesting deployment of a charging resource such as a mobile charging station.

In some embodiments, in a Hive-Mode, the entire battery-operated network(s) will be managed by a cloud application which determines effective usage of the Multi-Level battery system. The cloud application may or may not determine the route, speed and other functional parameters of the battery operated entities.

In some embodiments, in a Mixed-Mode, the entire battery-operated network(s) can be guided by a cloud application but most of the decisions will be taken by each individual entity given the information provided. As such, each entity may require hardware and/or software for implementing the algorithms to make the decision, but will also need to be configured to communicate with the cloud application.

In some embodiments, e.g., for Hive Mode and Mixed Mode, the cloud application may be capable of storing relevant entity network information and may have the computational capability to execute the proposed algorithms. The computation can be internally distributed and executed on cluster of systems to obtain speed up.

According to some embodiments, at any given time, an entity will either be in "Receiver State" or in "Provider State" or in "Relay State," which are described and defined here. In some embodiments, in "Receiver State" the entity is capable of receiving charge from other entities and within the entity charge is push towards the larger slower battery sets. In some embodiments, in "Provider State" the receiver is capable of giving charge to other entities and within the entity charge is push towards the faster smaller battery sets. In some embodiments, in "Relay State," the entities can relay the charge from one entity to another but they may not or do not lose any charge due to transfer. In some embodiments, in "Relay State," internal battery charge transfer may not take place.

In some embodiments, in order to determine an optimal number of battery layers/levels/sets and the best combination of battery unit capacities for each set, it may be important to ensure a good balance is struck between the system building cost and system/battery performance. In some embodiments, these parameters can be determined by, for instance, i) developing charging model and simulating the whole system of EVs/Entities using a simulation tool and then based at least on the model and simulation, figuring out which set of parameters works best for the given application; and/or ii) implementing the system in a small region to calibrate the parameters for full scale implementation.

As such, four proposed algorithms, Algorithm 4000, Algorithm 5000, Algorithm 6000, and Algorithm 7000 are described hereinafter for use in optimizing electrical charge distribution in a transportation network that accounts for entities using multi-level battery systems. A comparison of some of the features and capabilities of the four proposed algorithms is provided in Table 3.

TABLE 3

Comparison of Different Multi-Level Charge sharing Algorithms.

| Features | Algorithm 4000 | Algorithm 5000 | Algorithm 6000 | Algorithm 7000 |
|---|---|---|---|---|
| Charge Distribution Map |  | X | X | X |
| Optimized Routing |  | X | X | X |
| Optimized Transaction Scheduling |  | X | X | X |
| Machine Learning Guided |  | X | X | X |
| History Information Incorporation |  | X | X |  |
| Local Information Aware |  | X | X | X |
| Global Information Aware |  | X | X | X |
| Multi-Level Battery Aware | X | X | X | X |
| Global Decision System |  | X |  |  |
| Local Decision System | X |  | X | X |
| Relay Mode |  | X | X | X |

Figure 37:
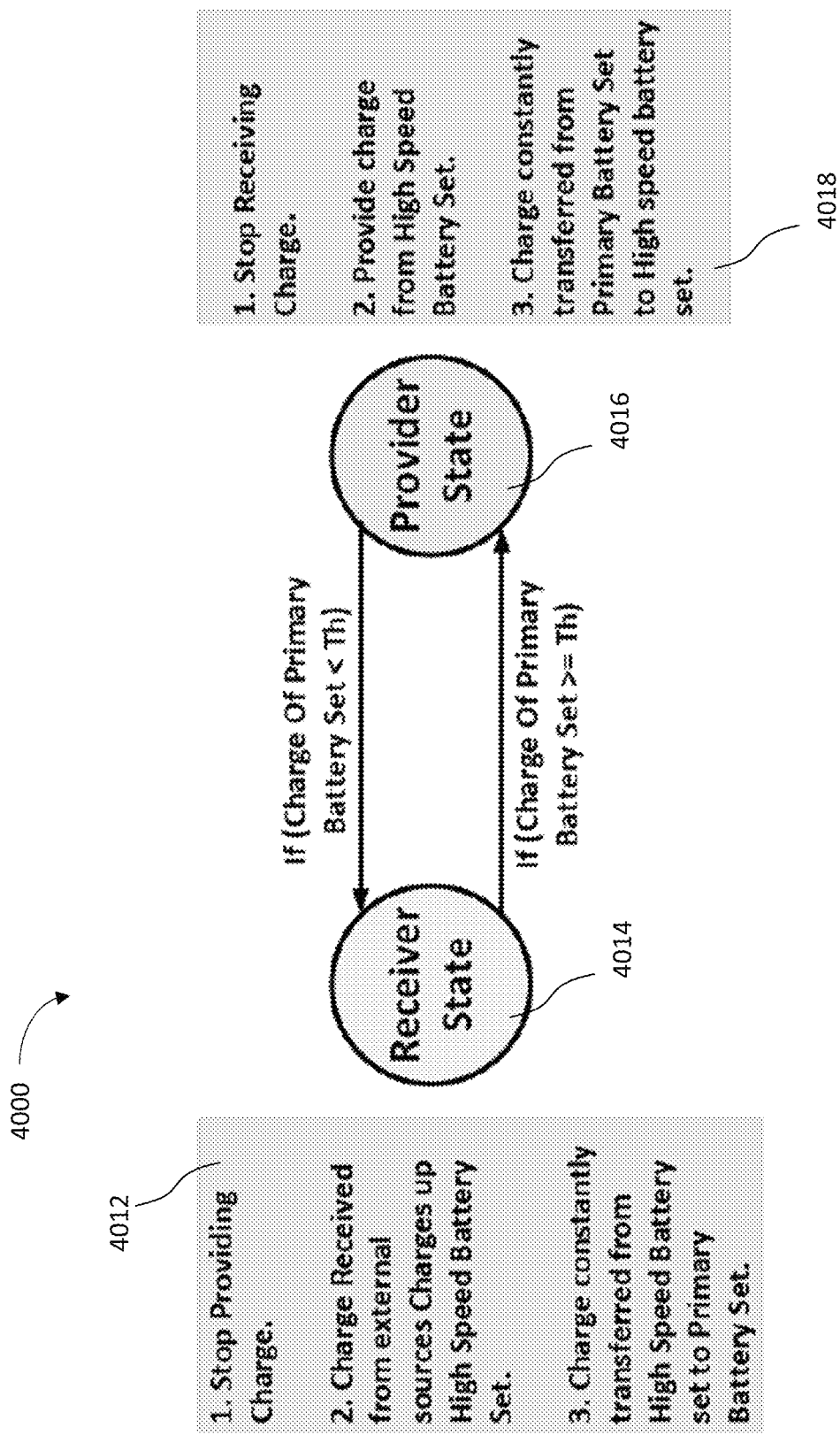
FIG. 37 provides an example of an algorithm operable to determine when to switch back-and-forth between a higher capacity, slower charge transfer rate battery and a lower capacity, higher charge transfer rate battery for charging into or discharge from an electric vehicle, according to some embodiments described herein.

Referring now to FIG. 37, an Algorithm 4000 is illustrated that is, as noted from Table 3, one of the simplest algorithms that is applicable for Solo-Mode. In Solo-Mode mode, each entity can determine a charge transfer is needed and request transfer from another entity and/or can receive a request from another entity asking the entity to provide charge to the requesting other entity, but entities cannot operate in the "Relay-State."

According to Algorithm 4000, for instance, in the "Receiver State," an entity may receive charge to the fastest charge transfer rate battery set, e.g., by default or upon request, which can maintain a high charging speed for the entity and across the system. In some embodiments, in the "Receiver State," an entity may transfer charge from its high speed battery set to its lower speed battery set, which may clear up the high speed battery set for receiving charge from external entities. In some embodiments, in the "Provider State," an entity may transfer charge from its fastest non-empty battery set to the target entity. In some embodiments, in the "Provider State," an entity may transfer charge from lower speed battery set to higher speed battery set, which may replenish the high speed battery set for providing charge to external entities. As such, Algorithm 4000 is a relatively simple form of the charge sharing algorithm for a 2-level battery system.

According to Algorithm 4000, simulation data 4002, pilot implementation data 4004, and one or more mathematical models 4006 can be input in order to find optimal parameters 4008 and configurations for an entity according to a set of optimization goals 4010.

Using Algorithm 4000, the entities can switch between receiver and provider state based at least on the battery charge state of the primary battery (biggest battery set with slowest charge transfer rate/L2). In some embodiments, if an entities charge level falls below a certain threshold (Th), then the entity can move to "Receiver State." Once the primary battery (L2) charge level moves above a certain threshold (Th), the entity can then move to the "Provider State."

FIG. 37 illustrates one embodiment for using the Algorithm 4000 for managing charge transfer for an entity in Solo-Mode. In some embodiments, the entity in Receiver State 4014 may have a current charge transfer mode 4012 in which the entity either stops providing the charge, charge is received from external sources and charges up the fastest batteries in the multi-level battery of the entity, and/or charge is constantly transferred from the fastest batteries in the multi-level battery of the entity to slower or the slowest batteries in the multi-level battery. In some embodiments, the entity in "Receiver State" 4014 can be in electrical connection with an entity in "Provider State" 4016, which can have a current charge transfer mode 4018 such as to stop receiving charge, provide charge to the entity in "Receiver State" 4014 from higher or the highest transfer speed battery set of the entities multi-level battery, and/or charge is constantly transferred from a slower or the slowest batteries of the entities multi-level battery to the faster or fastest battery set in the entity's multi-level battery. In some embodiments, if the charge of the L1 battery set of the entity in "Receiver State" 4014 is less than a threshold, the entity in "Provider State" 4016 provides charge to the entity in "Receiver State" 4014, however if the charge of the L1 battery set of the entity in "Receiver State" 4014 is equal to or greater than the threshold, the entities reverse states such that the entity that was in "Receiver State" is now in "Provider State" and vice versa.

Figure 38:
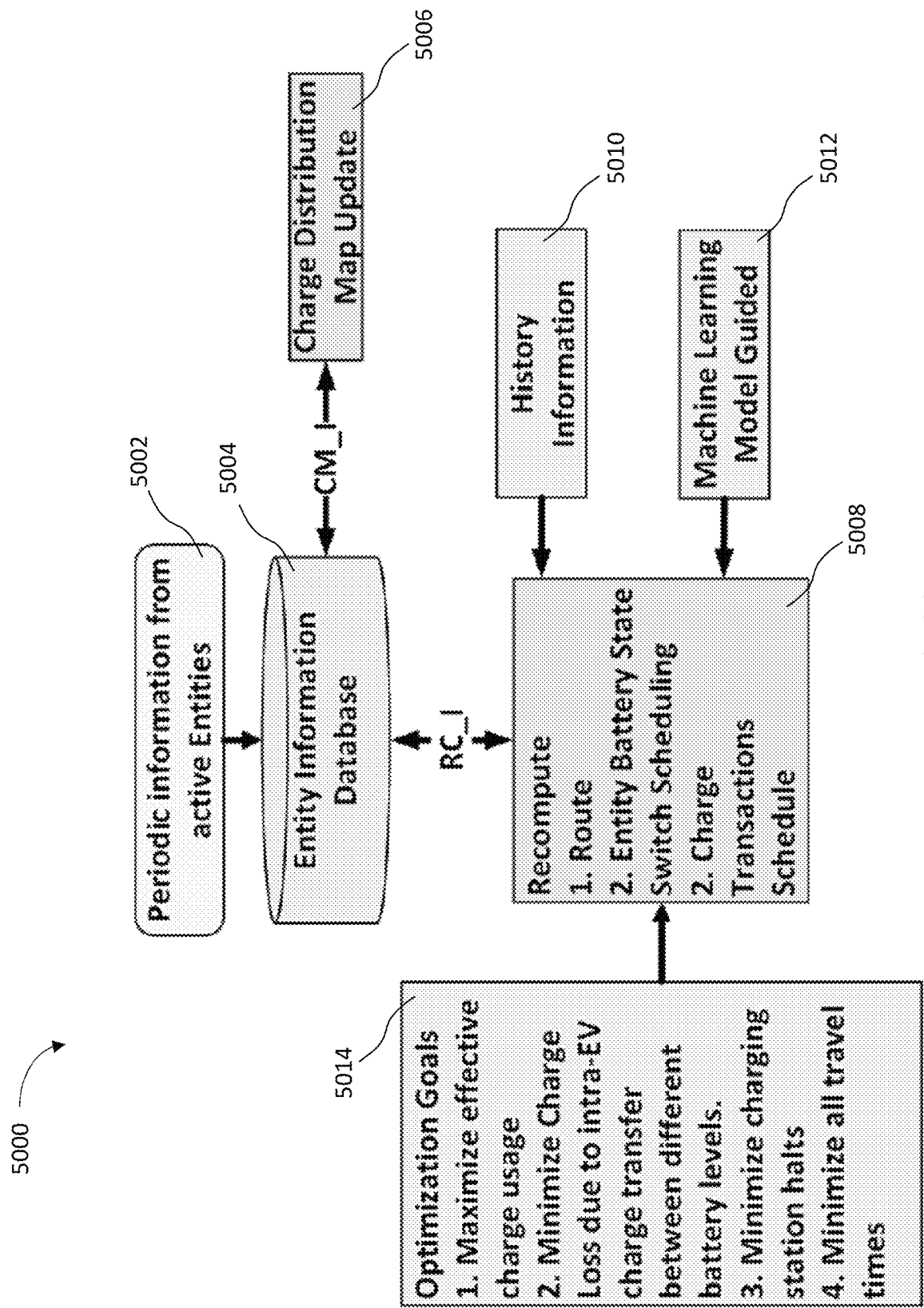
FIG. 38 provides an example of an algorithm operable to determine an optimal number of battery levels of charge transfer rates and battery capacities, to route electric vehicles within a transportation system, and to schedule charge transfers between electric vehicles, according to some embodiments described herein.

Referring now to FIG. 38, an Algorithm 5000 can be carried out, at least in part by a computing entity (e.g., 10, 20, 700, 800), e.g., for optimizing charge distribution and minimizing "halts," among other objectives, for a transportation network (e.g., 1, 2).

In some embodiments, periodic information from active entities 5002, such as location, speed, battery charge levels, and other functional parameters are collected from all the battery operated entities in the network and are stored in a database ("Entity Information Database 5004"), e.g., inside the cloud application. In some embodiments, with a periodicity of CM I, the information inside the "Entity Information Database 5004" can be used to compute the charge distribution map 5006, such as described elsewhere herein. In some embodiments, this map holds the information regarding the battery charge levels of some or all active entities in the network(s). In some embodiments, with a periodicity of RC I, the information inside the "Entity Information Database 5004" can be used in a Compute or Recompute block 5008 to compute, e.g., entity battery state switch decisions, re-routing requirements, the charge transaction schedule, and/or the like. In some embodiments, these computations may be influenced or informed by one or more of "History Information 5010" containing congestion, charge requirement details, etc. from earlier time period, and/or "Machine Learning Models 5012" that can make optimal decision based at least on past information. In some embodiments, these computations can be guided by one or more optimization goals 5014, which may include but are not limited to one or more of maximize effective charge usage, minimize charge loss due to intra-entity charge transfer between primary (higher capacity, slower) battery sets and higher speed, lower capacity battery sets, minimize charging station halts, minimize all travel times, and/or the like.

In the receiver state, the entity will receive charge to the fastest charge transfer rate battery set, which may keep the charging speed high. In the receiver state, the entities will transfer charge from high speed battery sets to lower speed battery sets. This will clear up the high speed battery sets for receiving charge from external entities. In the provider state, the entities will transfer charge from its fastest non-empty battery set to the target entity. In the provider state, the entities will transfer charge from low speed battery sets to higher speed battery sets. This will replenish the high speed battery sets for providing charge to external entities. In "Relay State," the entities can relay the charge from one entity to another but they don't lose any charge due to transfer. In "Relay State," no internal battery charge transfer take place.

Figure 39:
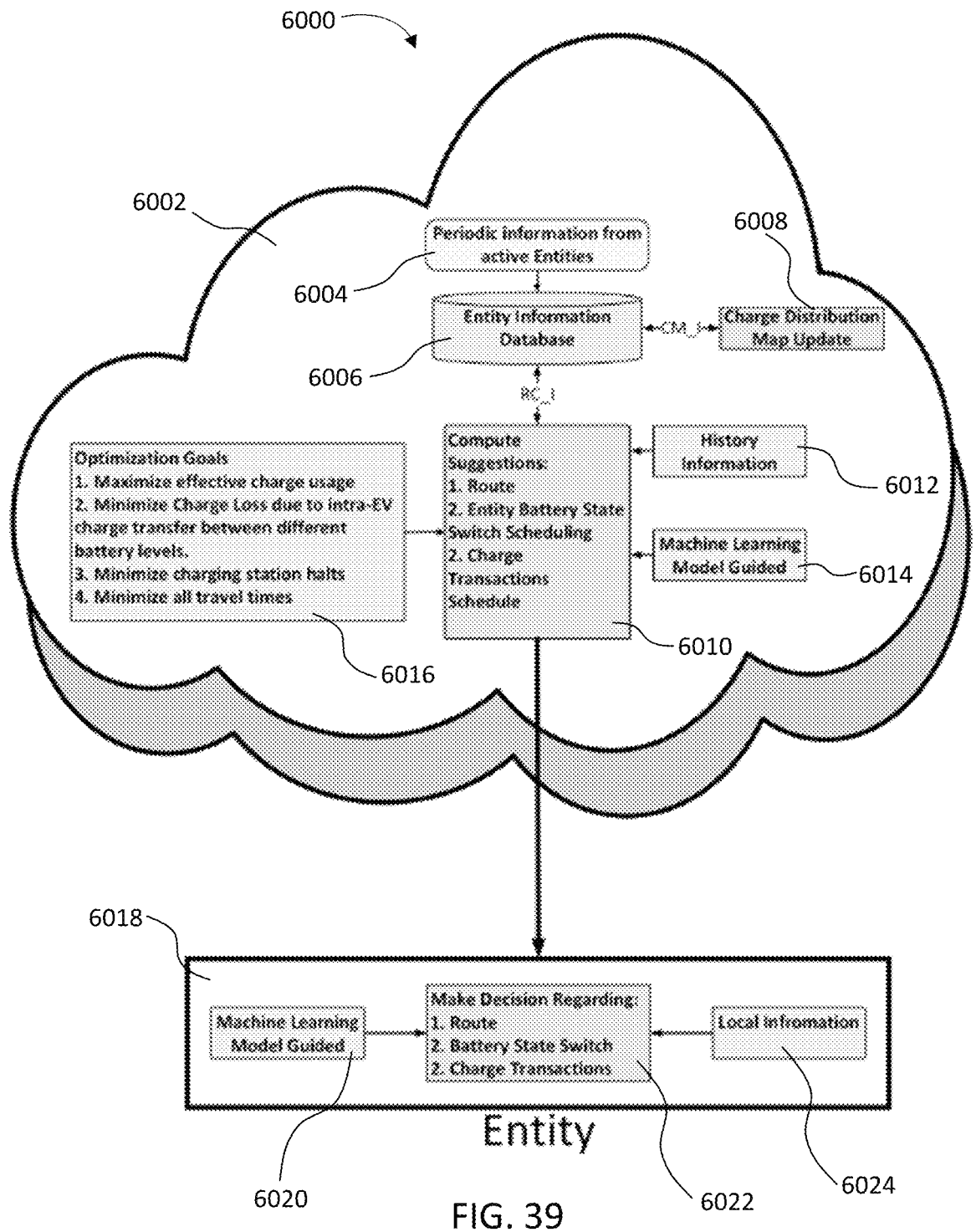
FIG. 39 provides an example of an algorithm operable to generate a charge distribution map for a transportation network of electric vehicles, determine an optimal number of battery levels of charge transfer rates and battery capacities, to route electric vehicles within a transportation system, and to schedule charge transfers between electric vehicles, according to some embodiments described herein.

Referring now to FIG. 39, an Algorithm 6000 is provided for optimizing routes, charge transfer events, and the like for a transportation system, which may be carried out in part in a computing device 6002 (e.g., cloud computing device) and in part at the entity 6018. In some embodiments, periodic information from active entities 6004, such as location, speed, battery charge levels, and other functional parameters are collected from all the battery operated entities in the network and are stored in a database ("Entity Information Database 6006") inside the cloud application 6002. In some embodiments, with a periodicity of CM I, the information inside the "Entity Information Database 7006" can be used to compute a charge distribution map 6008 that holds the information regarding the battery charge level of all the entities in the network(s). In some embodiments, with a periodicity of RC I, the information inside the "Entity Information Database 6002" can be used in a Compute block 6010 to compute suggestions for the network, such as entity battery state switch decisions, re-routing requirements, the charge transaction schedule, and the like. In some embodiments, the Compute block 6010 can be influenced by or informed by "History Information 6012" containing congestion, charge requirement details, etc. from earlier time periods, and/or "Machine Learning Models 6010" that can make optimal decision based at least on past information. In some embodiments, the Compute block 6010 may be guided by or may optimize decisions towards a set of optimization goals 6016, such as Maximize Effective charge Usage, Minimize Charge Loss due to intra-EV charge transfer between Primary Battery Set and High Speed Battery Set,—Minimize charging station halts, Minimize all travel times, and the like.

In some embodiments, the suggestions are sent over to the entity 6018 which makes the final decision regarding its route, battery state (switch between "Receiver State" and "Provider State") and charge transaction scheduling. This process is carried out by a Decision-Making process 6022 and informed by one or more machine learning models 6020 and local information 6024 at or nearby the entity 6018. In some embodiments, in the receiver state, the entity will receive charge to the fastest charge transfer rate battery set, which may keep the charging speed high. In some embodiments, in the receiver state, the entities will transfer charge from high speed battery sets to lower speed battery sets, which may clear up the high speed battery sets for receiving charge from external entities. In some embodiments, in the provider state, the entities will transfer charge from its fastest non-empty battery set to the target entity. In some embodiments, in the provider state, the entities will transfer charge from low speed battery sets to higher speed battery sets. This will replenish the high speed battery sets for providing charge to external entities. In some embodiments, in "Relay State," the entities can relay the charge from one entity to another but they don't lose any charge due to transfer. In "Relay State," no internal battery charge transfer take place.

Figure 40:
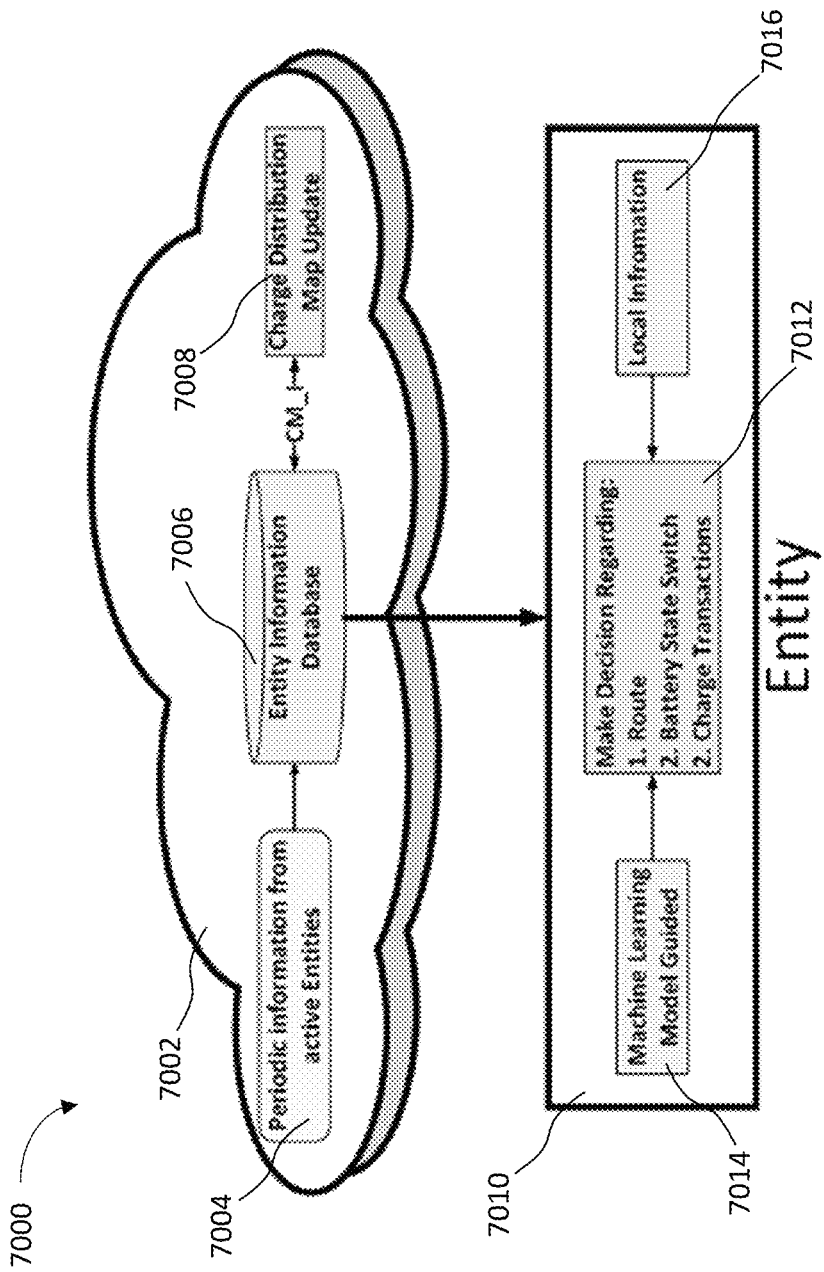
FIG. 40 provides an example of an algorithm operable to generate a charge distribution map for a transportation network of electric vehicles, determine an optimal number of battery levels of charge transfer rates and battery capacities, to route electric vehicles within a transportation system, and to schedule charge transfers between electric vehicles, according to some embodiments described herein.

Referring now to FIG. 40, an Algorithm 7000 is illustrated for managing charge distribution for an entity in Solo-Mode, for instance partially in a cloud application 7002 and partially at the entity 7010. In some embodiments, periodic information 7004 such as location, speed, battery charge levels, and other functional parameters are collected from all the battery operated entities in the network and are stored in a database ("Entity Information Database 7006") inside the cloud application 7002. In some embodiments, with a periodicity of CM I, the information inside the "Entity Information Database 7002" is used to compute the charge distribution map 7008, which may hold information regarding the battery charge level of all the entities in the network(s), among other information. In some embodiments, the global entity information digest and charge distribution map 7008 may be sent over to the entity 7010, which makes the final decision regarding its route, battery state (switch between "Receiver State" and "Provider State") and charge transaction scheduling. This process 7012 may be guided by local information 7016 around the entity 7010 and a machine learning model 7014. In some embodiments, in the receiver state, the entity will receive charge to the fastest charge transfer rate battery set, which may keep the charging speed high. In some embodiments, in the receiver state, the entities will transfer charge from high speed battery sets to lower speed battery sets, which may clear up the high speed battery sets for receiving charge from external entities. In some embodiments, in the provider state, the entities will transfer charge from its fastest non-empty battery set to the target entity. In some embodiments, in the provider state, the entities will transfer charge from low speed battery sets to higher speed battery sets. This will replenish the high speed battery sets for providing charge to external entities. In some embodiments, in "Relay State," the entities can relay the charge from one entity to another but they don't lose any charge due to transfer. In "Relay State," no internal battery charge transfer take place.

Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid-state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Figure 41:
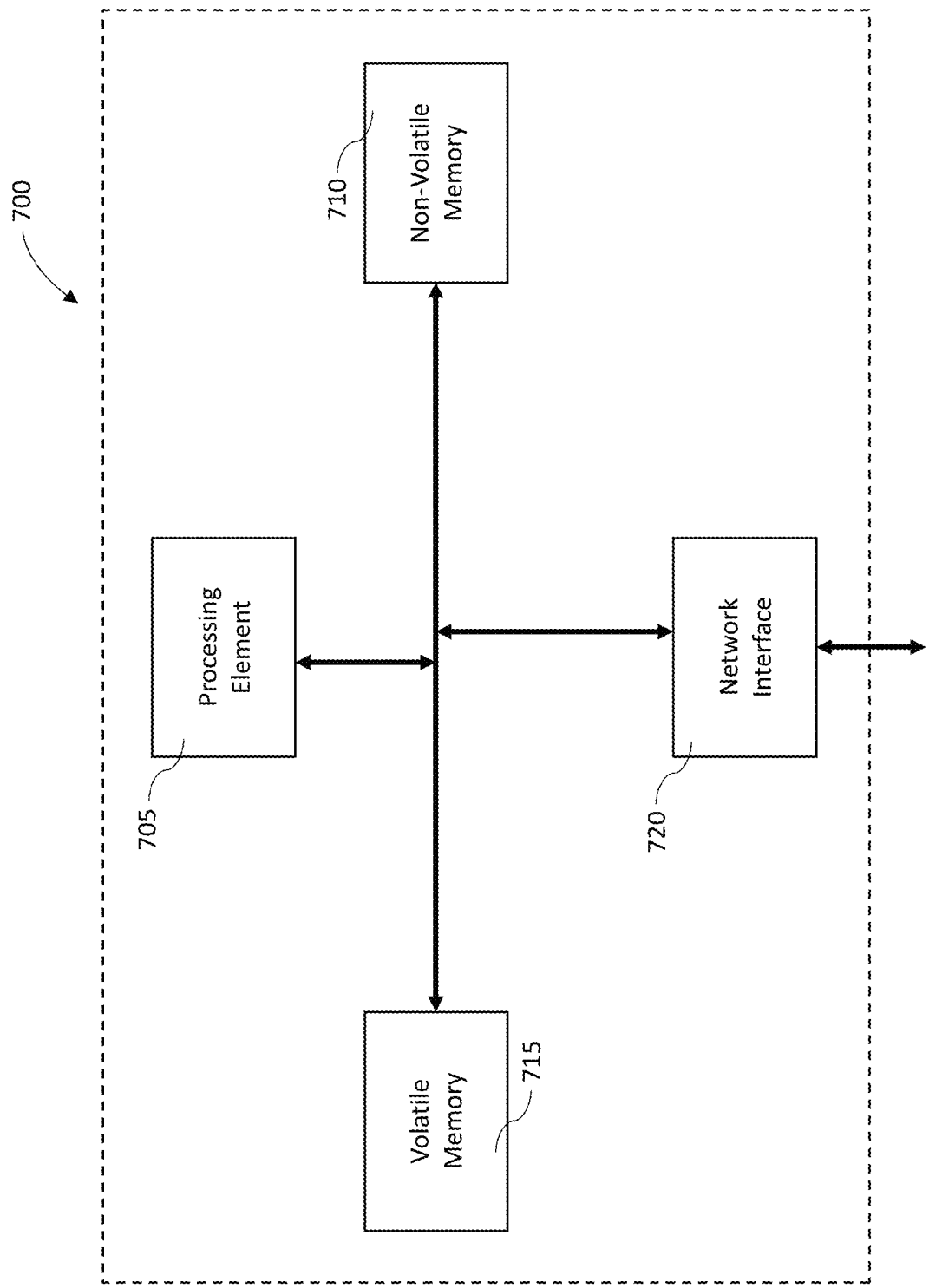
FIG. 41 provides an example computing entity configured to carry out part or all of at least some of the various processes, algorithms, and methods described herein, according to some embodiments described herein.

FIG. 41 provides a schematic of a computing device 700 according to at least one embodiment of the present disclosure. In some embodiments, the computing device 700 can be similar to or the same as the computing device 10. In some embodiments, the computing device 10 can comprise the computing device 700, or vice versa. In some embodiments, the computing device 700 can be configured to carry out all or part of any of the methods, algorithms, processes, or approaches described herein, according to a set of instructions or according to computer program code. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in at least one embodiment, the computing device 700 may include may include or be in communication with one or more processing elements 705 (also referred to as processors, processing circuitry, and/or similar terms used herein interchangeably) that communicate with other elements within the computing device 700 via a bus, for example. As will be understood, the processing element 705 may be embodied in a number of different ways. For example, the processing element 705 may be embodied as one or more complex programmable logic devices (CPLDs), microprocessors, multi-core processors, coprocessing entities, application-specific instruction-set processors (ASIPs), microcontrollers, and/or controllers. Further, the processing element 705 may be embodied as one or more other processing devices or circuitry. The term circuitry may refer to an entirely hardware embodiment or a combination of hardware and computer program products. Thus, the processing element 705 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 705 may be configured for a particular use or configured to execute instructions stored in volatile or non-volatile media or otherwise accessible to the processing element 705. As such, whether configured by hardware or computer program products, or by a combination thereof, the processing element 705 may be capable of performing steps or operations according to embodiments of the present invention when configured accordingly.

In one embodiment, the computing device 700 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 710, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the computing device 700 may further include or be in communication with volatile media (also referred to as volatile storage, memory, memory storage, memory circuitry and/or similar terms used herein interchangeably). In one embodiment, the volatile storage or memory may also include one or more volatile storage or memory media 715, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 705. Thus, the databases, database instances, database management systems, data, applications, programs, program modules, scripts, source code, object code, byte code, compiled code, interpreted code, machine code, executable instructions, and/or the like may be used to control certain aspects of the operation of the computing device 700 with the assistance of the processing element 705 and operating system.

In at least one embodiment, the computing device 700 may also include one or more communications interfaces 720 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing device 700 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the computing device 700 may include or be in communication with one or more input elements, such as a keyboard input, a mouse input, a touch screen/display input, motion input, movement input, audio input, pointing device input, joystick input, keypad input, and/or the like. The computing device 700 may also include or be in communication with one or more output elements (not shown), such as audio output, video output, screen/display output, motion output, movement output, and/or the like.

Exemplary External Computing Entity

Figure 42:
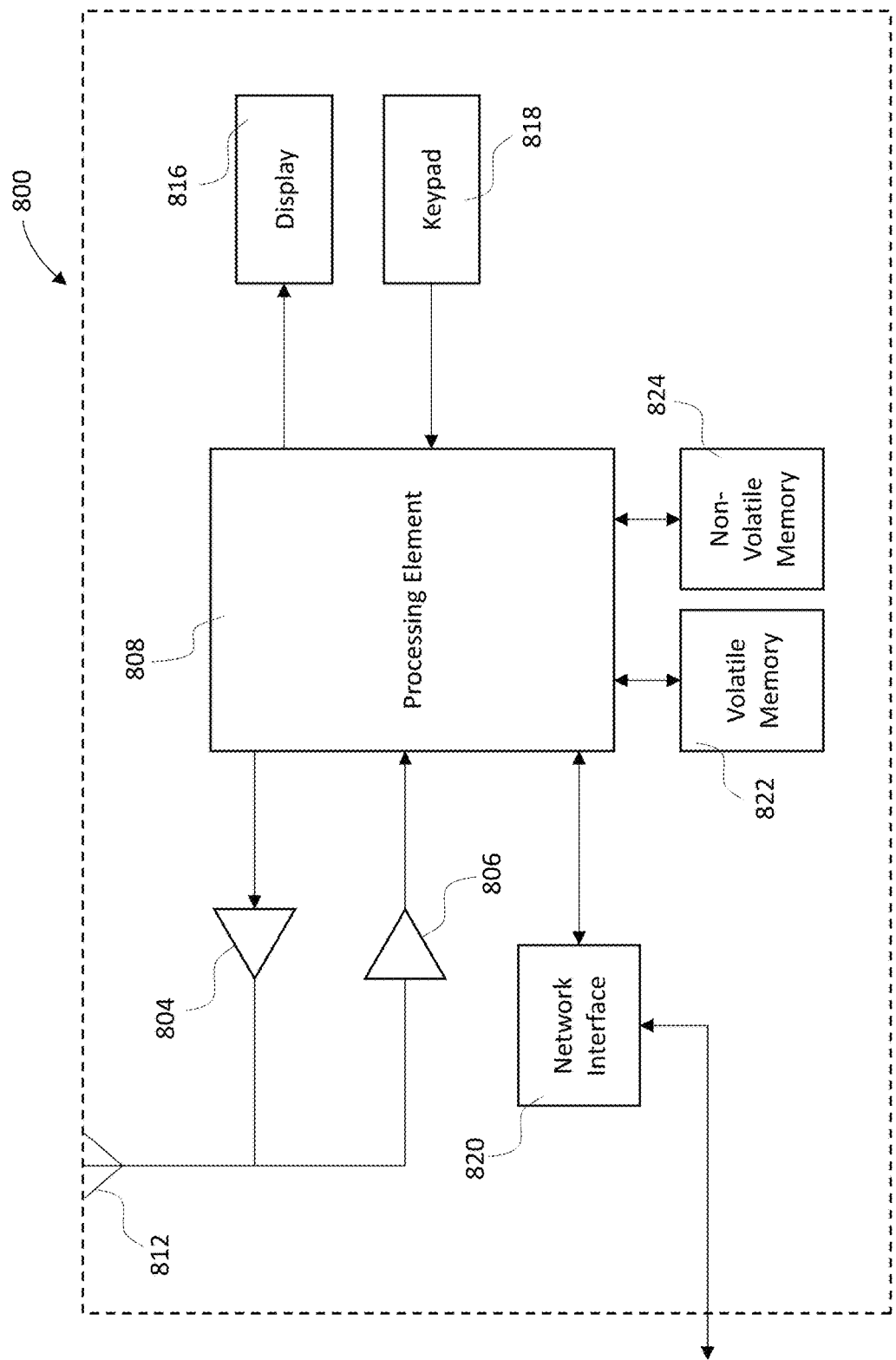
FIG. 42 provides an example computing entity configured to carry out part or all of at least some of the various processes, algorithms, and methods described herein, according to some embodiments described herein.

FIG. 42 provides an illustrative schematic representative of an external computing entity 800 that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. External computing entities 800 can be operated by various parties. As shown in FIG. 42, the external computing entity 800 can comprise an antenna 812, a transmitter 804 (e.g., radio), a receiver 806 (e.g., radio), and a processing element 808 (e.g., CPLDs, microprocessors, multi-core processors, coprocessing entities, ASIPs, microcontrollers, and/or controllers) that provides signals to and receives signals from the transmitter 804 and receiver 806, correspondingly.

The signals provided to and received from the transmitter 804 and the receiver 806, correspondingly, may include signaling information/data in accordance with air interface standards of applicable wireless systems. In this regard, the external computing entity 800 may be capable of operating with one or more air interface standards, communication protocols, modulation types, and access types. More particularly, the external computing entity 800 may operate in accordance with any of a number of wireless communication standards and protocols, such as those described above with regard to the computing device 700. In a particular embodiment, the external computing entity 800 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing entity 800 may operate in accordance with multiple wired communication standards and protocols, such as those described above with regard to the computing device 700 via a network interface 820.

Via these communication standards and protocols, the external computing entity 800 can communicate with various other entities using concepts such as Unstructured Supplementary Service Data (USSD), Short Message Service (SMS), Multimedia Messaging Service (MMS), Dual-Tone Multi-Frequency (DTMF) Signaling, and/or Subscriber Identity Module (SIM) Dialer. The external computing entity 800 can also download changes, add-ons, and updates, for instance, to its firmware, software (e.g., including executable instructions, applications, program modules), and operating system.

According to one embodiment, the external computing entity 800 may include location determining aspects, devices, modules, functionalities, and/or similar words used herein interchangeably. For example, the external computing entity 800 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the external computing entity's 800 position in connection with a variety of other systems, including cellular towers, Wi-Fi access points, and/or the like. Similarly, the external computing entity 800 may include indoor positioning aspects, such as a location module adapted to acquire, for example, latitude, longitude, altitude, geocode, course, direction, heading, speed, time, date, and/or various other information/data. Some of the indoor systems may use various position or location technologies including radio-frequency identification (RFID) tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The external computing entity 800 may also comprise a user interface (that can comprise a display 816 coupled to a processing element 808) and/or a user input interface (coupled to a processing element 808). For example, the user interface may be a user application, browser, user interface, and/or similar words used herein interchangeably executing on and/or accessible via the external computing entity 800 to interact with and/or cause display of information/data from the computing device 700, as described herein. The user input interface can comprise any of a number of devices or interfaces allowing the external computing entity 800 to receive data, such as a keypad 818 (hard or soft), a touch display, voice/speech or motion interfaces, or other input device. In embodiments including a keypad 818, the keypad 818 can comprise (or cause display of) the conventional numeric (0-9) and related keys (#, *), and other keys used for operating the external computing entity 800 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The external computing entity 800 can also include volatile storage or memory 822 and/or non-volatile storage or memory 824, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external computing entity 800. As indicated, this may include a user application that is resident on the entity or accessible through a browser or other user interface for communicating with the computing device 700 and/or various other computing entities.

In another embodiment, the external computing entity 800 may include one or more components or functionality that are the same or similar to those of the computing device 700, as described in greater detail above. As will be recognized, these architectures and descriptions are provided for exemplary purposes only and are not limiting to the various embodiments.

In various embodiments, the external computing entity 800 may be embodied as an artificial intelligence (AI) computing entity, such as a vehicle's AI-based navigation system, Apple's Siri, an Amazon Echo, Amazon Echo Dot, Amazon Show, Google Home, and/or the like. Accordingly, the external computing entity 800 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

By way of example only, any of the Algorithm 1000, Algorithm 2000, and/or Algorithm 3000 can be carried out by one of the computing device 700 and/or the external computing entity 800. In some embodiments, route scheduling and charge transfer events can be mapped and scheduled using one or more of the computing device 700 and/or the external computing entity 800. Likewise, in some embodiments, the charge distribution map can be generated, stored, updated, and/or utilized for scheduling charge distribution throughout a roadway system using one or more of the computing device 700 and/or the external computing entity 800.

Figure 43:
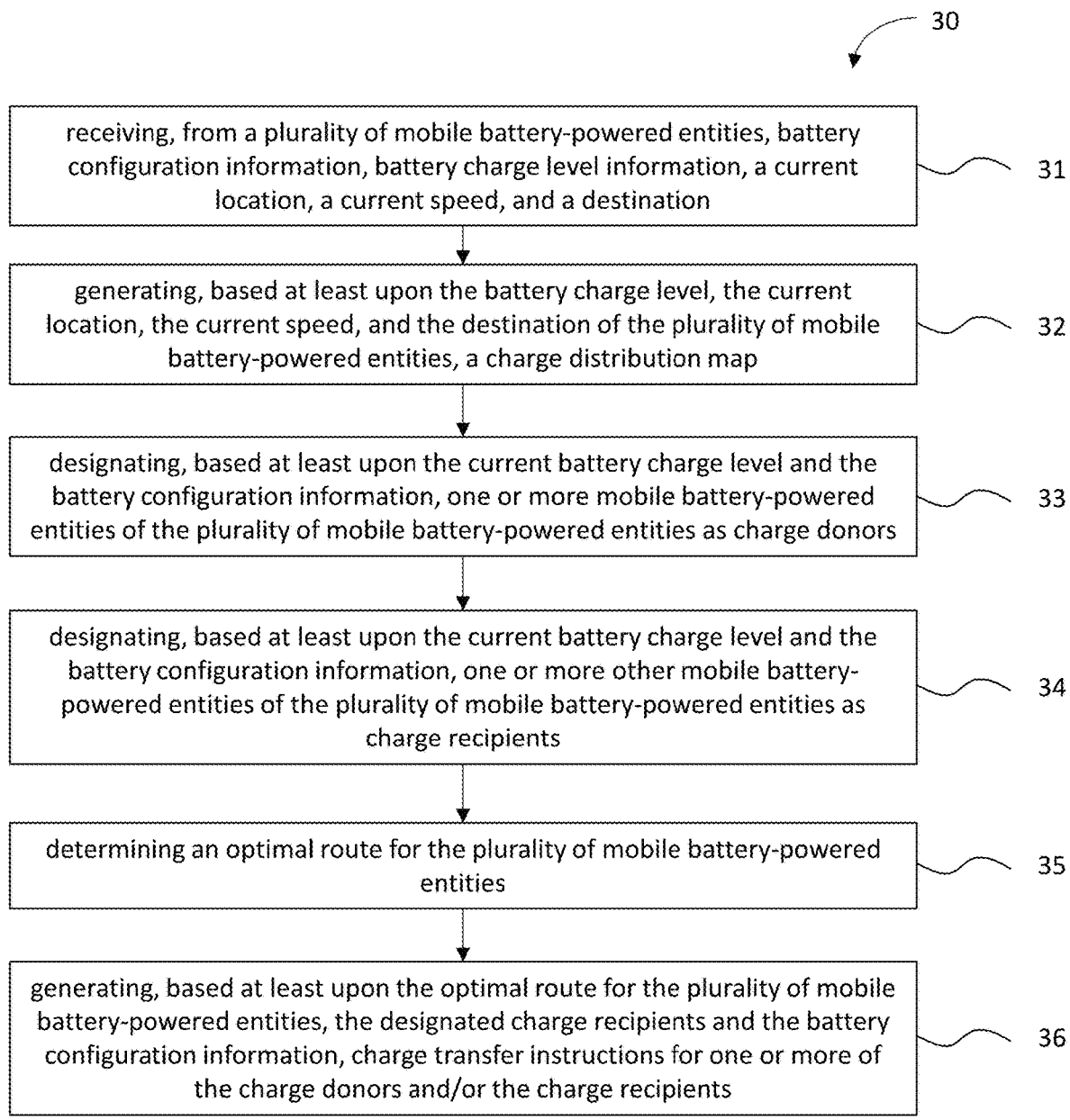
FIG. 43 provides a process flow diagram of an example method for charging a mobile entity, according to some embodiments described herein.

For example, FIG. 43 provides an exemplary method 30 for charging a mobile entity that can be carried out, in part or in full, by one or more of the computing device 700 and/or the external computing entity 800. In some embodiments, the method 30 can comprise receiving, from a plurality of mobile battery-powered entities, battery configuration information, battery charge level information, a current location, a current speed, and a destination, at 31. In some embodiments, the method 30 can further comprise generating, based at least upon the battery charge level, the current location, the current speed, and the destination of the plurality of mobile battery-powered entities, a charge distribution map, at 32. In some embodiments, the method 30 can further comprise designating, based at least upon the current battery charge level and the battery configuration information, one or more mobile battery-powered entities of the plurality of mobile battery-powered entities as charge donors, at 33. In some embodiments, the method 30 can further comprise designating, based at least upon the current battery charge level and the battery configuration information, one or more other mobile battery-powered entities of the plurality of mobile battery-powered entities as charge recipients, at 34. In some embodiments, the method 30 can further comprise determining an optimal route for the plurality of mobile battery-powered entities, at 35. In some embodiments, the method 30 can further comprise generating, based at least upon the optimal route for the plurality of mobile battery-powered entities, the designated charge recipients and the battery configuration information, charge transfer instructions for one or more of the charge donors and/or the charge recipients, at 36.

Figure 44:
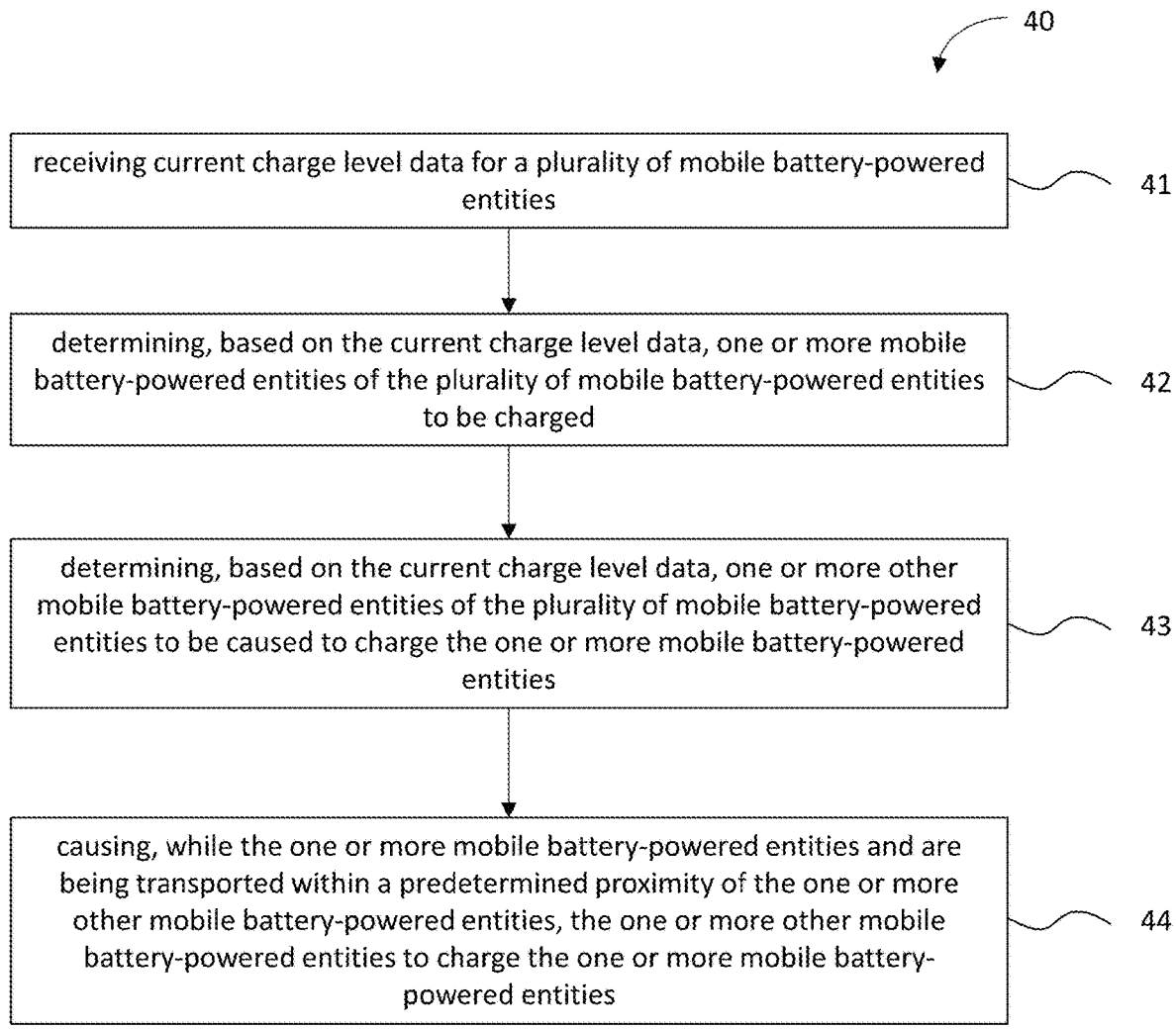
FIG. 44 provides a process flow diagram of an example method for governing charge transactions for a charging network, according to some embodiments described herein.

For another example, FIG. 44 provides a method 40 for governing charge transactions for a charging network, which can be carried out in part or in full by one or more of the computing device 700 and/or the external computing entity 800. In some embodiments, the method 40 can comprise receiving current charge level data for a plurality of mobile battery-powered entities, at 41. In some embodiments, the method 40 can further comprise determining, based at least on the current charge level data, one or more mobile battery-powered entities of the plurality of mobile battery-powered entities to be charged, at 42. In some embodiments, the method 40 can further comprise determining, based at least on the current charge level data, one or more other mobile battery-powered entities of the plurality of mobile battery-powered entities to be caused to charge the one or more mobile battery-powered entities, at 43. In some embodiments, the method 40 can further comprise causing, while the one or more mobile battery-powered entities and are being transported within a predetermined proximity of the one or more other mobile battery-powered entities, the one or more other mobile battery-powered entities to charge the one or more mobile battery-powered entities, at 44.

Figure 45:
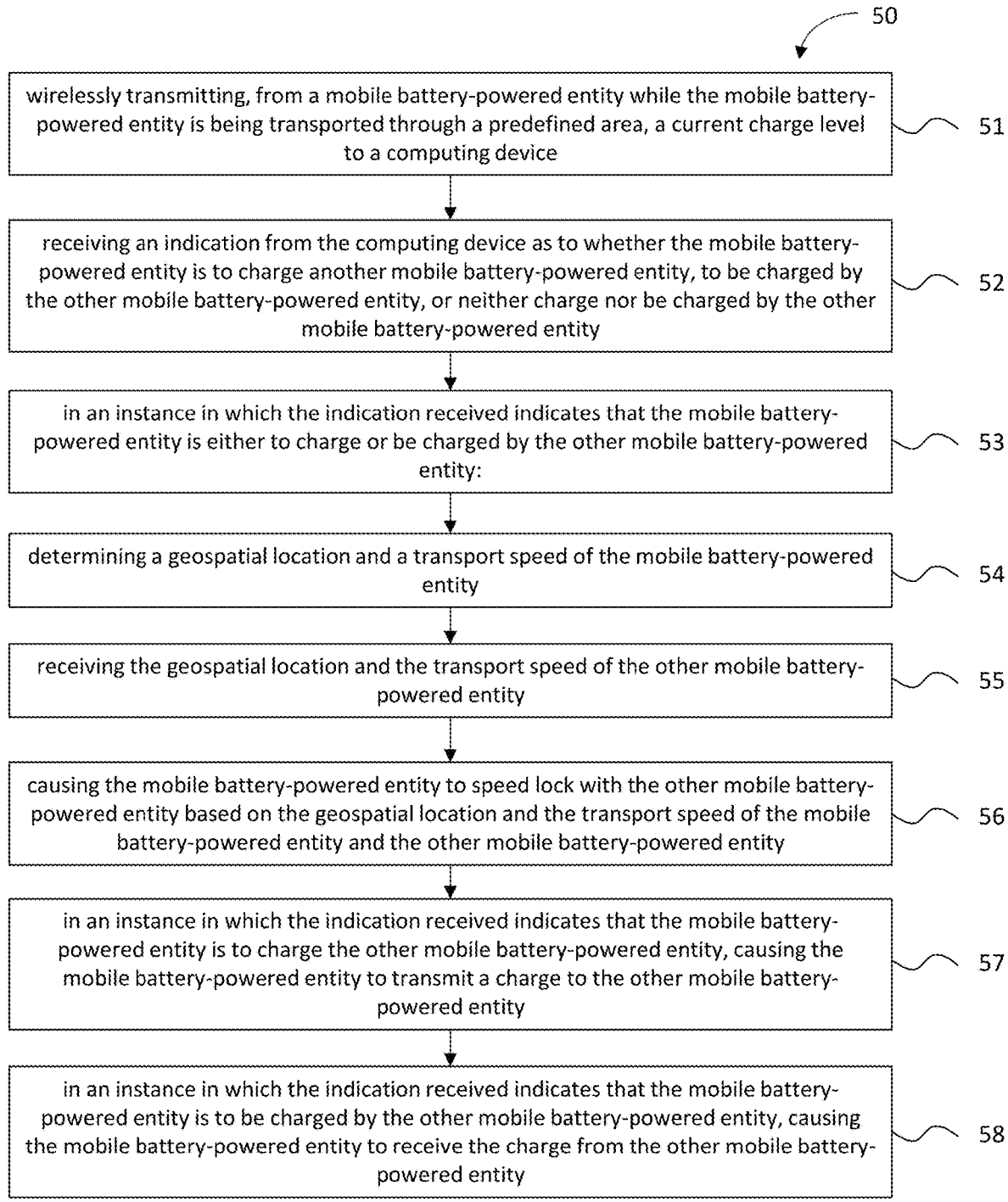
FIG. 45 provides a process flow diagram of an example method for charging a mobile entity, according to some embodiments described herein.

For another example, FIG. 45 provides a method 50 for charging a mobile entity that can be carried out in part or in full by one or more of the computing device 700 and/or the external computing entity 800. In some embodiments, the method 50 can comprise wirelessly transmitting, from a mobile battery-powered entity while the mobile battery-powered entity is being transported through a predefined area, a current charge level to a computing device, at 51. In some embodiments, the method 50 can further comprise receiving an indication from the computing device as to whether the mobile battery-powered entity is to charge another mobile battery-powered entity, to be charged by the other mobile battery-powered entity, or neither charge nor be charged by the other mobile battery-powered entity, at 52. In some embodiments, the method 50 can further comprise in an instance in which the indication received indicates that the mobile battery-powered entity is either to charge or be charged by the other mobile battery-powered entity, at 53. In some embodiments, the method 50 can further comprise determining a geospatial location and a transport speed of the mobile battery-powered entity, at 54. In some embodiments, the method 50 can further comprise receiving the geospatial location and the transport speed of the other mobile battery-powered entity, at 55. In some embodiments, the method 50 can further comprise causing the mobile battery-powered entity to speed lock with the other mobile battery-powered entity based at least on the geospatial location and the transport speed of the mobile battery-powered entity and the other mobile battery-powered entity, at 56. In some embodiments, the method 50 can further comprise in an instance in which the indication received indicates that the mobile battery-powered entity is to charge the other mobile battery-powered entity, causing the mobile battery-powered entity to transmit a charge to the other mobile battery-powered entity, at 57. In some embodiments, the method 50 can further comprise in an instance in which the indication received indicates that the mobile battery-powered entity is to be charged by the other mobile battery-powered entity, causing the mobile battery-powered entity to receive the charge from the other mobile battery-powered entity, at 58.

Figure 46:
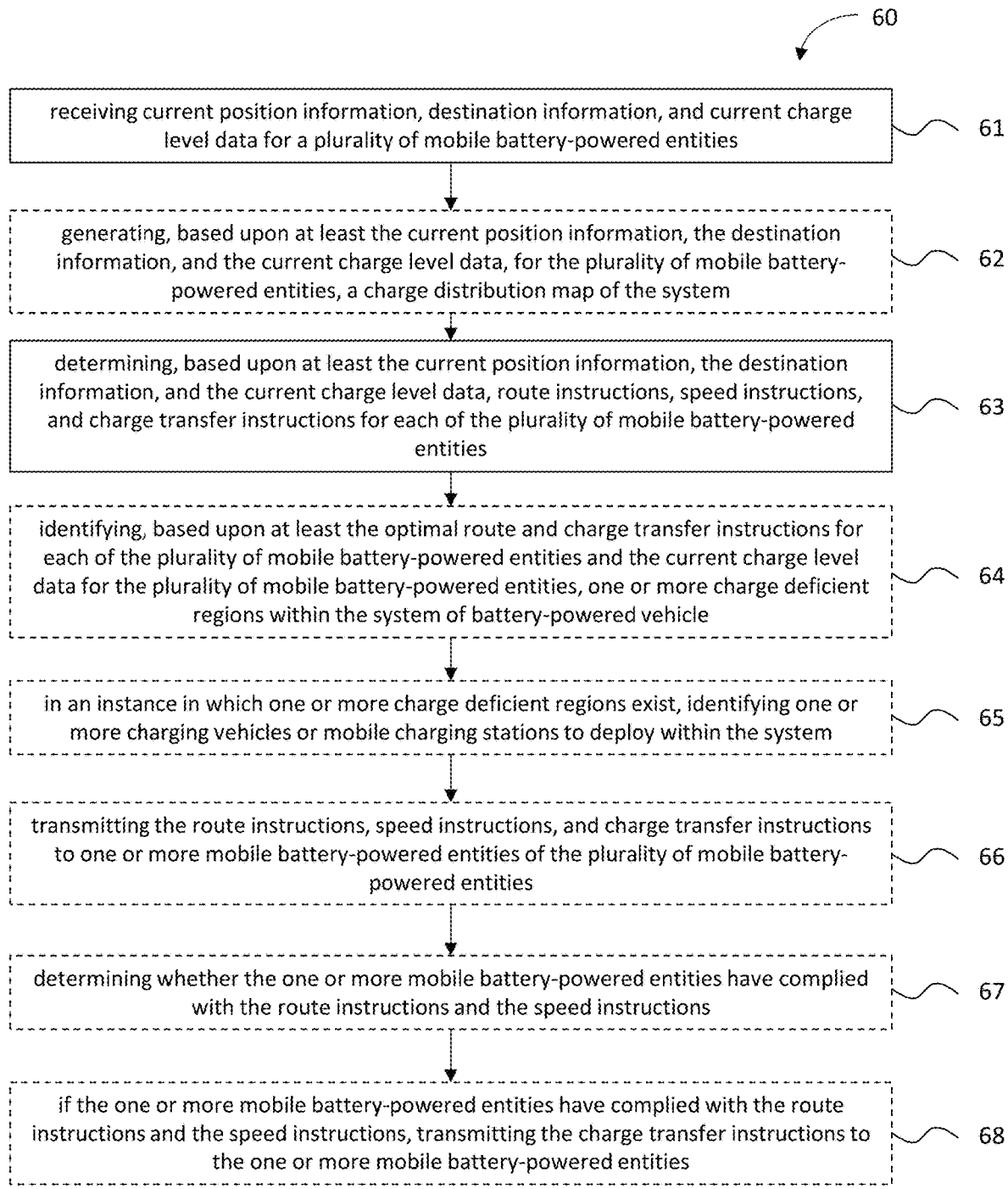
FIG. 46 provides a process flow diagram of an example method for distributing charge through a network of mobile battery-powered entities, according to some embodiments described herein.

For yet another example, FIG. 46 provides a method 60 for distributing charge within a system or network of mobile battery-powered entities and/or mobile charging stations that can be carried out in part or in full by, e.g., one or more of the computing device 700 and/or the external computing entity 800. In some embodiments, the method 60 can comprise receiving current position information, destination information, and current charge level data for a plurality of mobile battery-powered entities, at 61. In some embodiments, the method 60 can, optionally, further comprise generating, based at least upon at least the current position information, the destination information, and the current charge level data, for the plurality of mobile battery-powered entities, a charge distribution map of the system, at 62. In some embodiments, the method 60 can further comprise determining, based at least upon at least the current position information, the destination information, and the current charge level data, route instructions, speed instructions, and charge transfer instructions for each of the plurality of mobile battery-powered entities, at 63. In some embodiments, the method 60 can, optionally, further comprise identifying, based at least upon at least the optimal route and charge transfer instructions for each of the plurality of mobile battery-powered entities and the current charge level data for the plurality of mobile battery-powered entities, one or more charge deficient regions within the system of battery-powered vehicle, at 64. In some embodiments, the method 60 can, optionally, further comprise in an instance in which one or more charge deficient regions exist, identifying one or more charging vehicles or mobile charging stations to deploy within the system, at 65. In some embodiments, the method 60 can, optionally, further comprise transmitting the route instructions, speed instructions, and charge transfer instructions to one or more mobile battery-powered entities of the plurality of mobile battery-powered entities, at 66. In some embodiments, the method 60 can, optionally, further comprise. In some embodiments, the method 60 can, optionally, further comprise determining whether the one or more mobile battery-powered entities have complied with the route instructions and the speed instructions, at 67. In some embodiments, the method 60 can, optionally, further comprise. In some embodiments, the method 60 can, optionally, further comprise if the one or more mobile battery-powered entities have complied with the route instructions and the speed instructions, transmitting the charge transfer instructions to the one or more mobile battery-powered entities, at 68.

Figure 47:
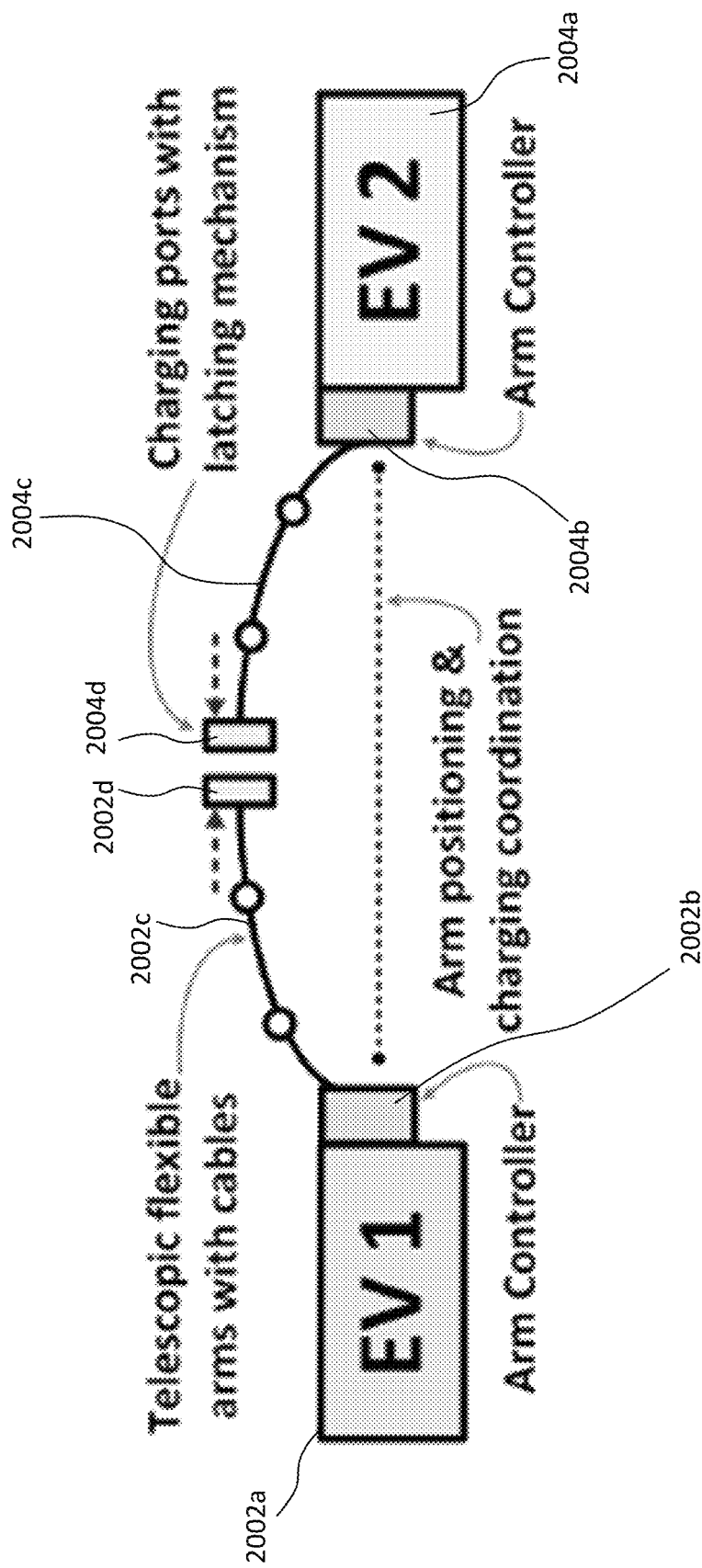
FIG. 47 illustrates an apparatus for electrically coupling two or more electric vehicles in an on-the-go charging system, according to an embodiment.

FIG. 47 provides an example of a connection apparatus for establishing an electrical connection between one or more vehicles or other entities during an electric charge transfer event. In some embodiments, the first vehicle 2002a can be sufficiently positioned nearby the second vehicle 2004a on the roadway or elsewhere (e.g., in air, in water, etc.) such that the components of the first and second vehicles 2002a, 2004a can reach therebetween. In some embodiments, one of the first vehicle 2002a or the second vehicle 2004a can be designated as the lead with regard to vehicle positioning, speed, velocity, and commencement of charge transfer, with the other of the two vehicles being subject to the direction of the lead vehicle. In some embodiments, the first vehicle 2002a can comprise a charging arm controller 2002b coupled to a proximal end of a charging cable arm 2002c and configured to control the movements of the charging cable arm 2002c. In some embodiments, the charging cable arm 2002c can comprise a connection interface 2002d at a distal end of the charging cable arm 2002c, the connection interface 2002d configured to maintain an electrical connection with another vehicle to receive or transmit a replenishing supply of electrical charge. Likewise, the second vehicle 2004a can also include a charging arm controller 2004b configured to control the movements of a charging cable arm 2004c, the charging cable arm 2004c having a connection interface 2004d at the distal end of the charging cable arm 2004c. In some embodiments, when a charge transfer event is initiated between the first vehicle 2002a and the second vehicle 2004a, the lead vehicle, e.g., the first vehicle 2002a, may use the charging arm controller 2002b to move, orient, extend, retract, rotate, or otherwise position the charging cable arm 2002c such that the connection interface 2002d is positioned at a desired charging orientation or position with respect to the first vehicle 2002a. Previously, concurrently, or subsequently, the first vehicle 2002 or another entity of the system can cause the second vehicle 2004a to use its charging arm controller 2004b to move its charging cable arm 2004c such that the connection interface 2004d of the second vehicle 2004a is located at or sufficiently near the connection interface 2002d of the first vehicle 2002a such that an electrical connection can be established between the first vehicle 2002a and the second vehicle 2004a. Although not shown, in some embodiments, one or more of the first vehicle 2002a or the second vehicle 2004a may further include one or more sensors, cameras, processors, and/or the like such that the proximity, speed, and/or velocity of a paired vehicle, the location, orientation, and/or movement of a charging cable arm of the paired vehicle, and/or the location of a connection interface of a paired vehicle can be determined, measured, monitored, calculated, estimated, or the like, e.g., in real-time, before or during a charge transfer event.

In some embodiments, a charging cable arm (e.g., 2002c, 2004c) can comprise a safe, insulated, and firm telescopic arm carrying the charging cable. In some embodiments, after two EVs lock speed and are in range for charge sharing, they can extend their charging arms, as shown in FIG. 47. The arms heads can contain the charging ports, and they will latch together using, e.g., either magnetic pads or other means. The arms and the overall charging operation can be coordinated by the respective arm controllers of each EV. This is just one possible realization of the charge transfer mechanism. The entire charging operation can be safely orchestrated if the EVs involved follow a certain predefined protocol. For autonomous/semi-autonomous EVs, the pairing mechanism can be further streamlined. Wireless charging is also contemplated, such as by way of inductive charging, wireless radio-frequency-to-direct current (RF-to-DC) charging, or the like.

As mentioned briefly hereinabove, to analyze the effectiveness of a cloud control system and the scheduling algorithms, an open-source traffic simulator, SUMO (Simulation of Urban Mobility), was integrated with a peer-to-peer car charging (P2C2) scheduler. Modifications to SUMO were made to support peer-to-peer car charging and the mobilization of one or more MoCS. In the resulting quantitative analysis, the P2C2 scheduler communicated with SUMO periodically to gather traffic information and send instructions. For this analysis, a 240 km stretch of highway was tested. Each simulation instance was run for 5 hours in real-time, with each EV traveling at least 50 km. Each EV was assumed to weigh 2,109 kg with a battery capacity of 75 kWh. Unless otherwise mentioned, in this simulation the EVs and MoCS enter the simulation with a full charge. The weight of each MoCS is 11,793 kgs, which is the gross vehicle weight rating for a class 6 truck. Each MoCS is assumed to carry about 850 kWh charge and are battery powered themselves. From the simulation, the effect(s) of parameters such as (1) MoCS-to-EV charge transfer rate, (2) amount of MoCS in the network, and (3) battery capacity reduction of the EVs in later sections were observed.

Three different traffic scenarios were tested. The internal parameters defining each of these scenarios are as follows:
1) Light Traffic: Initially 500 EVs are inserted with a new EV entering the simulation every 4 seconds. A total of 5,000 EVs will be inserted over 5 hours.
2) Medium Traffic: Initial traffic of 1,000 EVs with a new EV entering the simulation every 3 seconds. A total of 7,000 EVs will be inserted over 5 hours.
3) High Traffic: Initially 2,000 EVs are inserted with a new EV entering the simulation every 2 seconds. A total of 11,000 EVs will be inserted over 5 hours.

A charging rate of 1 kW/min was assumed for simulation based at least on a realistic EV-to-EV charging estimate. For purposes of the simulations, an EV is considered to be "halted" when its charge reaches zero. All charge transfer events were carried out with 95% efficiency (i.e., assuming a 5% charge loss during transfer).

Figure 48:
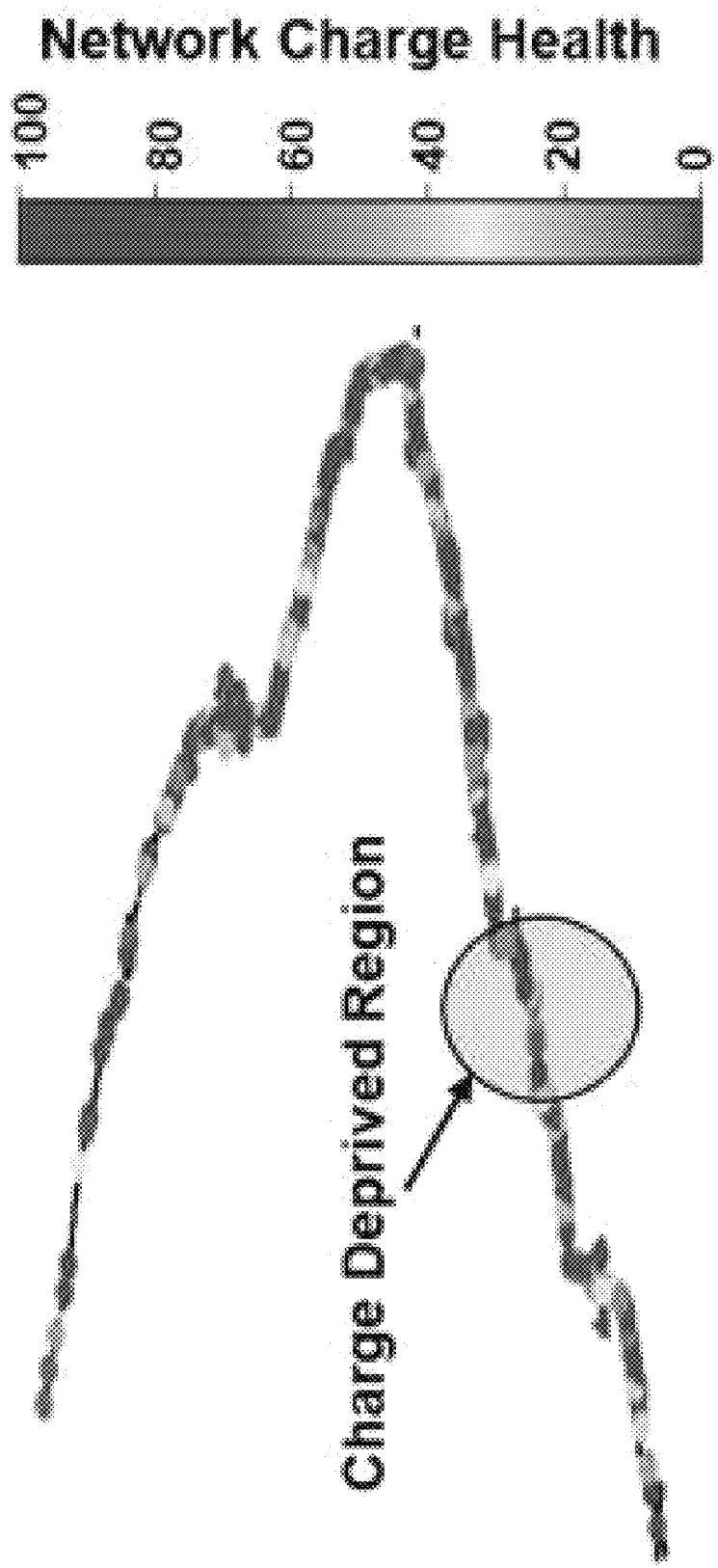
FIG. 48 provides an example of a charge distribution map of electric charge within a distributed on-the-go charging system at a point in time, according to some embodiments described herein.
Figure 49A:
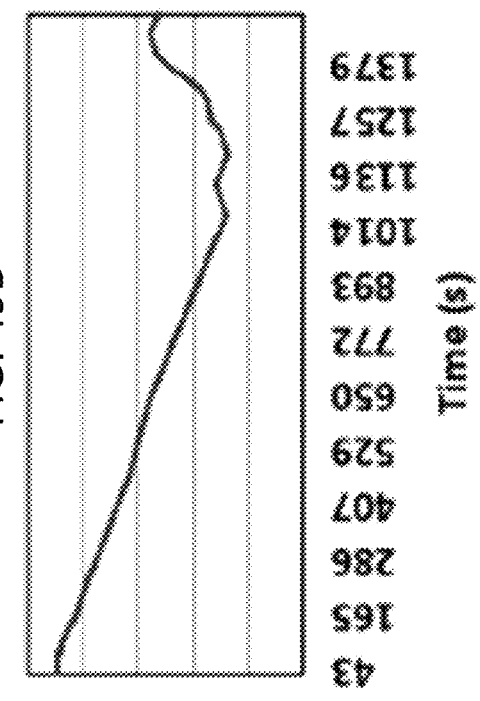
FIG. 49A-FIG. 49H provide a series of charge graphs illustrating changes in battery charge level over time for exemplary EVs (FIGS. 49A-49E and FIG. 49G) and MoCS (FIGS. 49F and 49H) in an on-the-go electric vehicle (EV) charging network, according to some embodiments described herein.
Figure 49B:
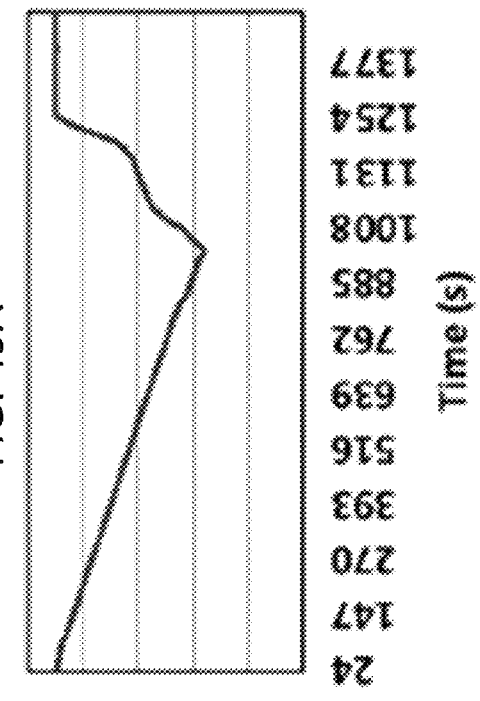
Figure 49C:
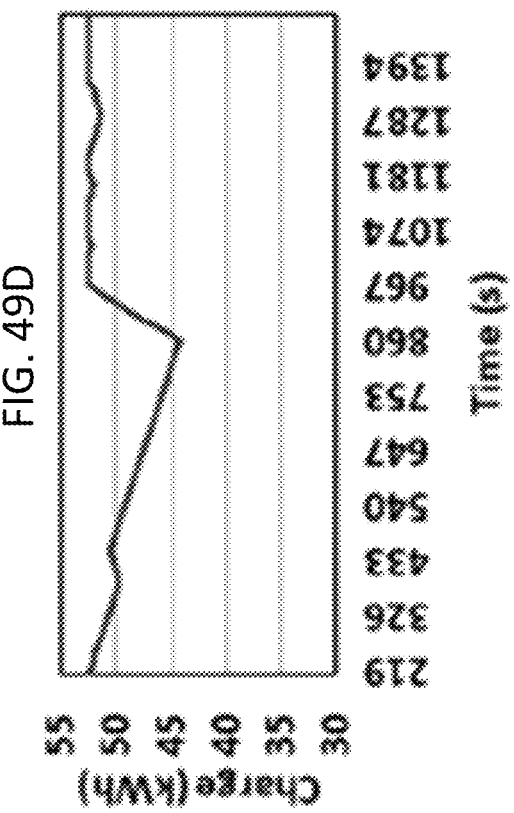
Figure 49D:
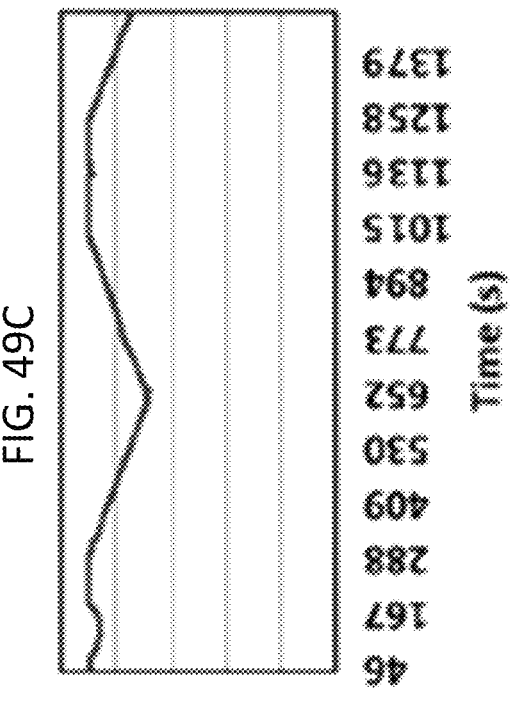
Figure 49E:
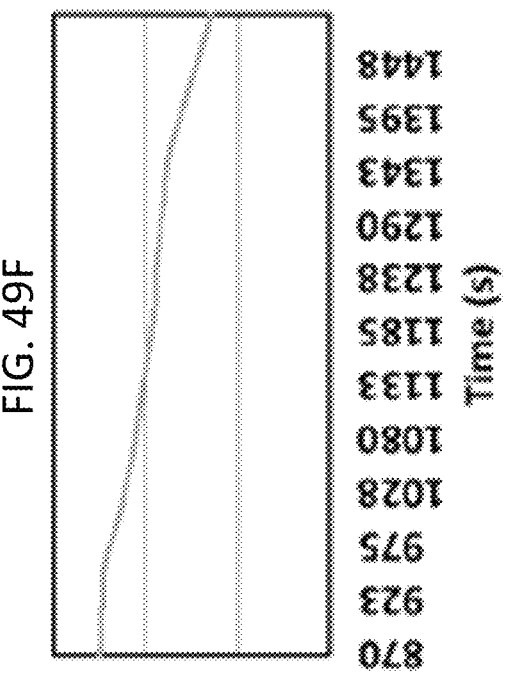
Figure 49F:
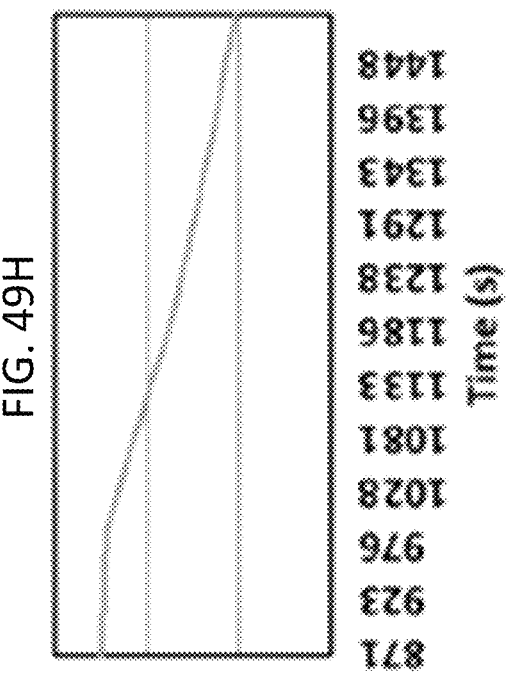
Figure 49G:
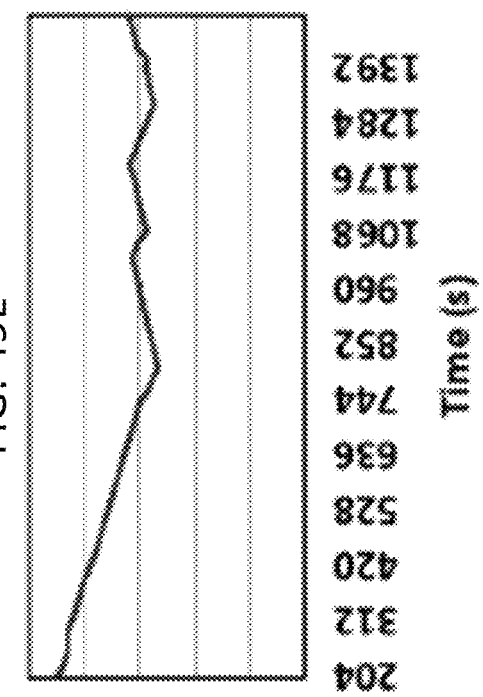
Figure 49H:
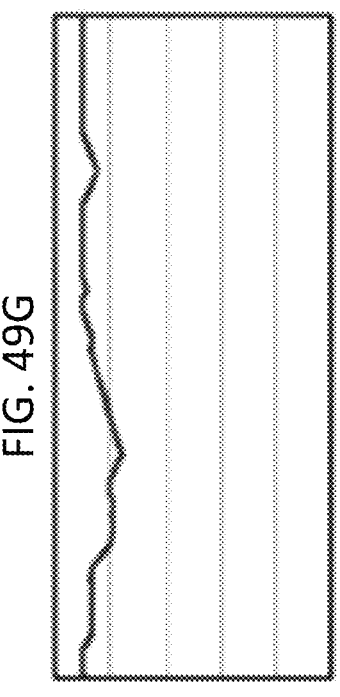

FIG. 48 illustrates the overall charge distribution in the highway. Each point on the plot indicates the average charge of vehicles in the region. In the charge distribution map shown, a potential charge deprived region (within the circle) can be identified. Depending upon the preferences and optimization goals for the scheduler, the scheduler would likely deploy one or more MoCS to the identified charge deprived region within the charge distribution map.

FIGS. 49A-49H provide a series of charge graphs illustrating changes in battery charge level over time for exemplary EVs (FIGS. 49A-49E and FIG. 49G) and MoCS (FIGS. 49F and 49H) in an on-the-go EV charging network, according to some embodiments described herein. FIGS. 49A-49H illustrate the battery charge trend for 6 sampled EVs and 2 sampled MoCS from the network. The EVs generally experienced an initial drop in the battery charge before they were assigned another EV as a charge provider. After that point, most of the EVs maintained a particular battery level sufficient for continued operation and continue to move perpetually. The purpose of deploying a MoCS is to deposit a relatively large amount of charge in the network quickly; hence, they constantly lose charge as can be seen from the plots of FIGS. 49F and 49H.

One observation was the effect of different MoCS-to-EV charge transfer rates on the percentage of EV halts. For purposes of these simulations, a 1× charge rate is 1 kWh per minute. In some embodiments, the charge transfer rate was changed for charge transfer events between an MoCS and an EV while the EV-to-EV charge transfer rate remained 1 kWh per minute throughout the simulations.

Figure 50:
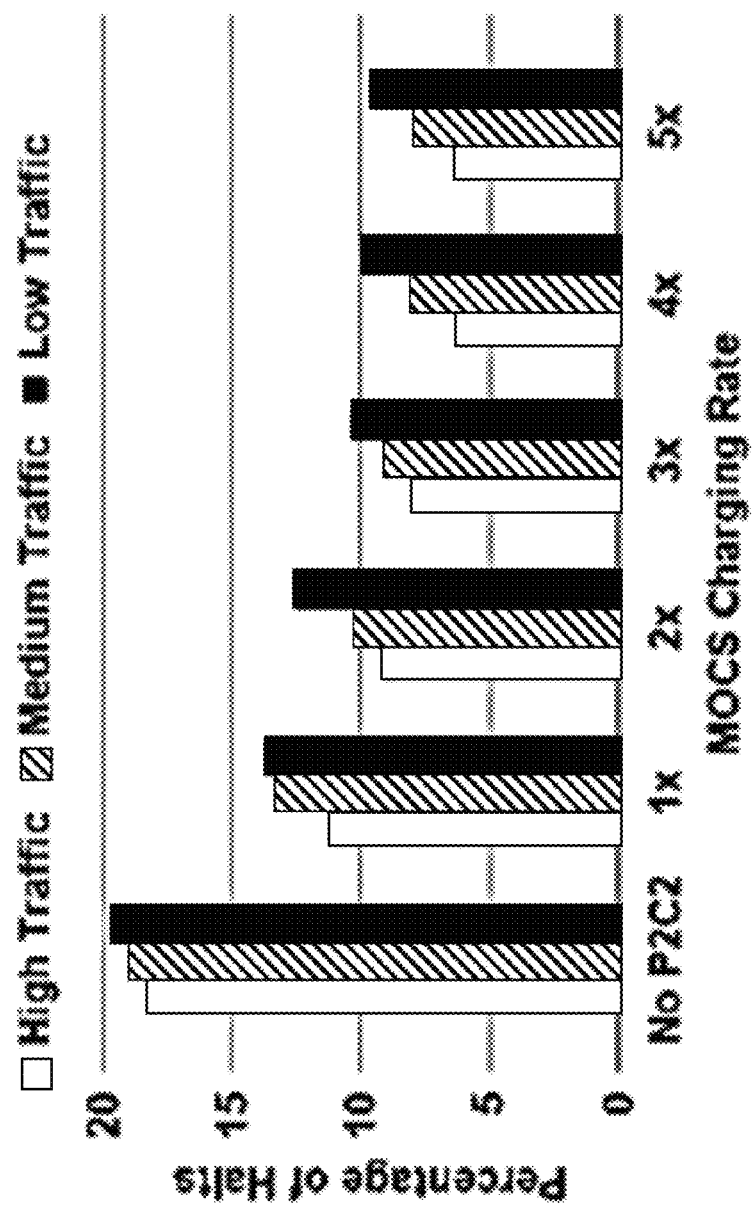
FIG. 50 provides a graph illustrating the percentage of EV halts for systems having a variety of MoCS-to-EV charge transfer rates, according to some embodiments.
Figure 51:
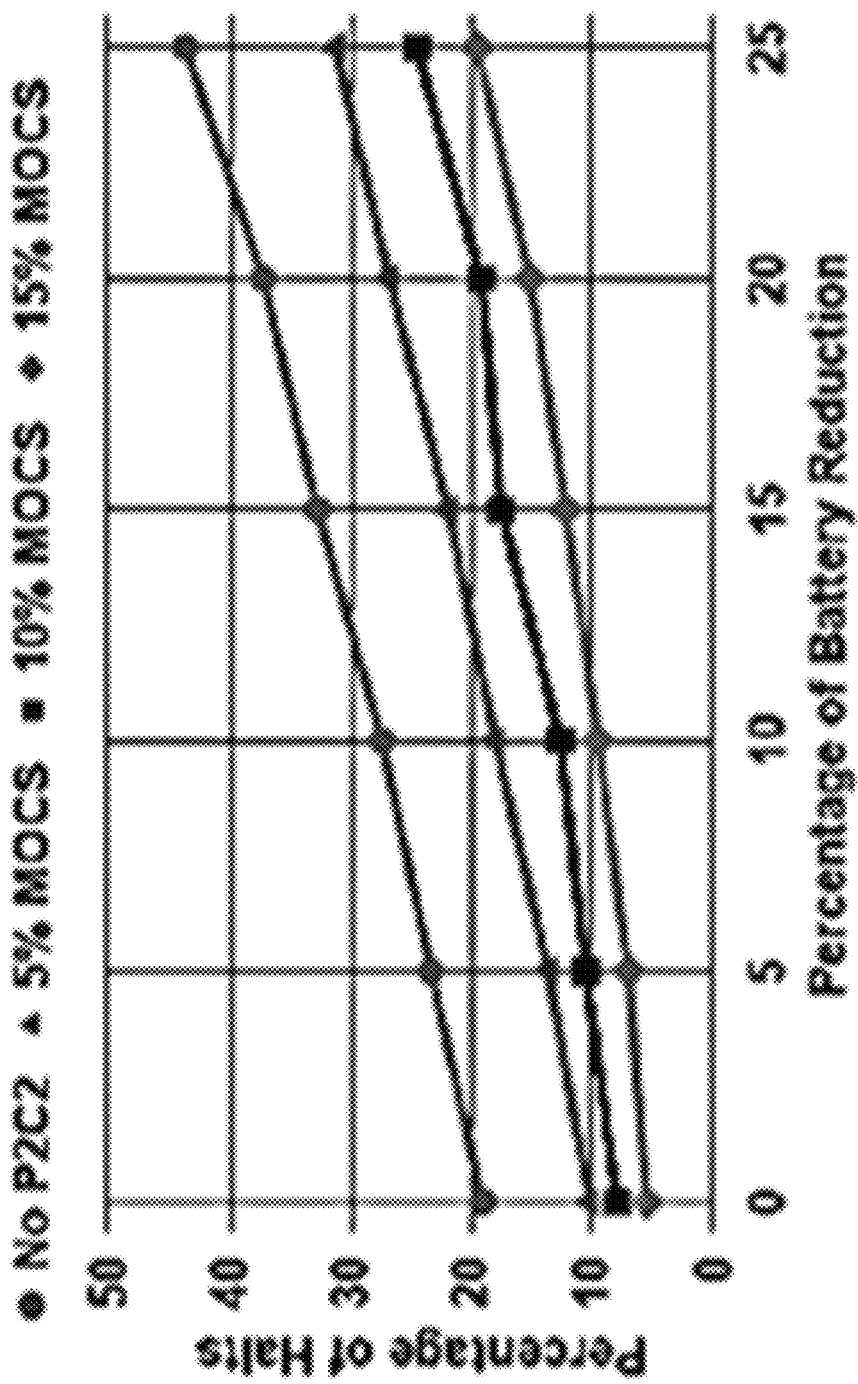
FIG. 51 provides a graph illustrating percentage of EV halts compared to changes in battery capacity for a variety of systems having different MoCS densities, according to some embodiments.

FIG. 50 illustrates that the percentage of halts for all the three traffic scenarios decreased in conjunction with increases in the MoCS charge transfer rate. If fast charge transfer batteries can be used in the EVs/MoCS, then the effectiveness of EV-to-EV and/or MoCS-to-EV (e.g., P2C2) scenarios is increased. In some embodiments, such charging schemes appear to be more effective in denser traffic scenarios. As can be seen in FIG. 51, the percentage of halts for high traffic is least. With more EVs in the network, less rerouting may be needed, and an EV with a critical battery state can be quickly assigned to a provider EV which is close by.

Figure 52:
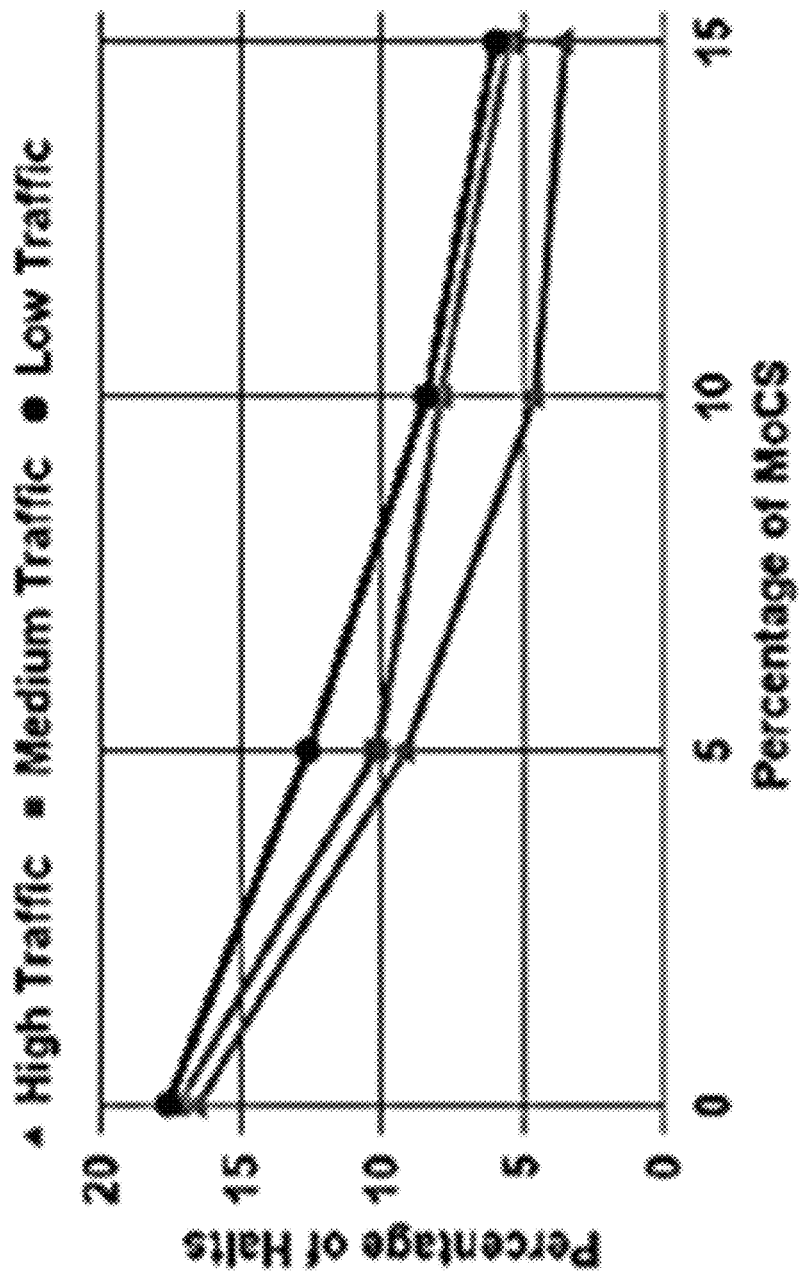
FIG. 52 provides a graph illustrating how the percentage of EV halts changes as the limit on the percentage of MoCS in the network is increased, according to some embodiments.

To observe the effect of the number of MoCS in the network on the percentage of EV halts, the MoCS-to-EV charge transfer rate was set to 2× (2 kWh per minute), the EV-to-EV charging rate was set to 1× (1 kWh per minute), and the limit on the percentage of MoCS in the network was varied. The percentage of MoCS refers to the maximum allowable MoCS for every 100 EVs in the network. FIG. 52 illustrates that, as we increase the limit of the percentage of MoCS, the percentage of EV halts decreases. As such, a higher quantity of charge influx also helps to reduce EV halts.

Based at least on the battery capacity of the cars used in the simulation, it should take approximately 10 hours to fully charge on National Electrical Manufacturers Association (NEMA) 14-50 plugs through a 240 V outlet. By multiplying the average time charging for each EV halt with the total number of halts from Table 4, the total charge time for all traffic scenarios was obtained. As shown in Table 4, the total time spent for stationary charging reduces significantly due to an EV-to-EV and MoCS-to-EV charge sharing scenario. The percent reduction for P2C2 was calculated compared to the required charge time results for no P2C2 (without EV-to-EV and MoCS-to-EV charge sharing). A MoCS-to-EV charging rate of 2× and a limit of 5% MoCS in the system were used for obtaining the P2C2 results in Table 4.

TABLE 4

Percentage of halt induced charging time reduction in different traffic scenarios

| | Light Traffic | | Medium Traffic | | High Traffic | |
|---|---|---|---|---|---|---|
| | Baseline | P2C2 | Baseline | P2C2 | Baseline | P2C2 |
| % of Halts | 19.68 | 12.62 | 19.02 | 10.18 | 18.25 | 9.16 |
| Num of EVs | 5,000 | 5,000 | 7,000 | 7,000 | 11,000 | 11,000 |
| Halt time (hrs.) | 9,840 | 6,310 | 13,314 | 7,126 | 20,075 | 10,076 |
| Halt Time Cut (%) | — | 35.87 | — | 46.48 | — | 49.81 |

FIG. 51 illustrates the effect of reducing the battery capacity of the EVs on the percentage of halts for the medium-traffic scenario. We see the percentage of faults increase as the battery capacity is reduced. There is therefore a trade-off between the number of MoCS deployed and the battery capacity of EVs. If the number of MoCS deployed is within 15% of the total EVs in the network, the necessary minimum battery capacity of all EVs can be reduced by 24.4% while the number of EV halts does not increase compared to the baseline scenario. As such, the battery capacities of all EVs can be reduced by having more MoCS deployed in the system.

EXAMPLE

According to an exemplary embodiment, a multi-level battery system can comprise:
a) a Li-ion level (e.g., L3) having a regular high density Li-ion battery being selected as the lowest (slowest charge transfer speed) level. This battery has a very high capacity when compared to the other two levels but also charges at a very slow rate when compared to the other two. The current implementation has 532.80 KJ battery setup of this type. That's equal to a 148 WHr battery with rated 40000 mAHr at 3.7V. This battery also has the highest energy density with respect to other levels. The battery is designed to charge at 18 W of peak power.
b) a Li-ion level with fast charging (e.g., L2) having a fast charging Li-ion implementation selected as the medium (moderate charge transfer speed) level. With lower capacity at 133 KJ. That's equal to 37 WHr battery with rated 10000 mAHr at 3.7V. This battery is designed to charge at 60 W.
c) a super-capacitor level (e.g., L1) as the highest (fastest charge transfer speed) level. The super-capacitor level can comprise a super-capacitor bank with an equivalent capacitance of, for instance, 650F at 10 v, having a maximum rated current transfer of about 600 Amps or greater, and having a capacity of about 32.5 KJ.

In some embodiments, the multi-level battery may have layer-specific capacities, charging powers, and charging times of:
(a) Energy of Battery at L3=532.80 KJ
(b) Energy of Battery at L2=133.20 KJ
(c) Energy of Battery at L1=32.50 KJ
(d) Charging power L3=18 W
(e) Charging power L2=60 W
(f) Charging time of L1 at 500 A=13 s
(g) Charging time of L1 at 250 A=26 s
(h) Charging time of L1 at 100 A=65 s Various multi-level battery systems were simulated, and the link time was calculated for charge transfer between the various multi-level battery systems. Each battery level was simulated as having a DC/DC conversion and losses were appropriately considered. The DC/DC conversion between the batteries was simulated as being 5V. The following multi-level battery systems were simulated:
1) A one level system comprising a lower charge transfer rate Li-ion battery.
2) A first two level system comprising a higher charge transfer rate Li-ion level and a lower charge transfer rate Li-ion level.
3) A second two level system comprising a super-capacitor bank level and a lower charge transfer rate Li-ion level.
4) A three level system comprising a super-capacitor bank level, a higher charge transfer rate Li-ion level, and a lower charge transfer rate Li-ion level.

As illustrated in Table 5, in a first scenario, charging a lower charge transfer rate Li-ion battery would take about 1,816 mins if charged at 18 W, meaning a receiver would need to be connected to the provider for 1,816 minutes to fully charge the lower charge transfer rate Li-ion battery.

However, in a second scenario, the simulation illustrated that, by using a higher charge transfer rate Li-ion level, e.g., having a charging rate of 60 W, to receive charge from the provider and to internally charge the lower charge transfer rate Li-ion level, the time required to fully charge the multi-level battery was reduced by about 5 times. Furthermore, in a third scenario in which the very high charging speed super-capacitor bank is utilized for receiving charge from the provider and internally transferring charge to other levels, the time required to charge the multi-level battery system was reduced by between about 25 times and about 69 times as compared to the conventional, lower charge transfer rate Li-ion battery scenario. In a fourth scenario in which a three-level configuration is simulated and the provider-facing level is comprised of a very high charging speed super-capacitor bank for receiving charge from the provider and internally transferring charge to other levels, the time required to charge the multi-level battery system was reduced by between about 103 times and about 277 times as compared to the conventional, lower charge transfer rate Li-ion battery scenario. The average improvement was calculated based at least on an average of time that the provider and receiver are linked at the different input currents. The peak improvement was calculated by comparing link times at peak current input, which was 500 A.

TABLE 5

Link time reduction with respect to increase in number of battery levels.

| | Link Time (mins) | Improvement |
|---|---|---|
| 1-Level (Li-ion) | 1816 | — |
| 2-Level (Li-ion + Li-ion) | 375 | 4.84 |
| 2-Level (Li-ion + Super Cap) | 26.20 | 69.31 |
| 3-Level (Li-ion + Li-ion + Super Cap) | 6.55 | 227.25 |

Provided herein are systems, methods, apparatuses, computer program products, and algorithms for optimal charge sharing between battery-operated entities consisting of multiple battery sets/groups, including for optimization of charge sharing for battery-operated entities comprising multiple battery levels having different charge transfer rates and/or different capacities. According to some embodiments, provided herein are systems, methods, apparatuses, computer program products, and algorithms for optimal charging of a battery-operated entity consisting of multiple battery sets/groups from an external energy outlet, e.g., when two or more of the battery levels have a different charge transfer rate and/or a different capacity. Also provided herein is a Multi-Level Battery Architecture Compiler (BAC) and associated methods and apparatuses for determining (based at least on the application of the battery) the optimal number of battery levels, battery capacity of each level, number of battery units, charge transfer rates of batteries and other multi-level battery system parameters using simulation, physical prototypes, and heuristics based methods targeted for specific applications. According to some embodiments, provided herein are systems, methods, apparatuses, computer program products, and algorithms for sustaining battery-operated entities through short-duration, high charge transfer rate charging events followed by internal charge transfer within the battery-operated entities themselves. Also described herein are methods, systems, apparatuses, computer program products, and algorithms for charging, e.g., via any suitable charging surface, any battery operated device, examples comprising rapid, short duration charging of an elevator as the elevator moves between floors, rapid charging of an electric train as it travels along a track, rapid charging of a phone in contact with a charging surface on a desk, and/or the like.

Apparatus, systems, and methods described herein relate generally to multi-level batteries, fast battery charging, and fast charge sharing between battery-operated entities. For example, according to a first embodiment, a multi-level battery system can be provided that comprises one or more electrochemical cells having a first charge transfer rate; one or more other electrochemical cells having a second charge transfer rate different from the first charge transfer rate; and a charge transfer element in electrical communication with at least one of the one or more electrochemical cells or at least one of the one or more other electrochemical cells, the charge transfer element being configured to electrically couple the power plant of the electric vehicle to a power plant of another electric vehicle, whereby the charge transfer element can cause an electrical charge to be communicated into or out of the at least one of the one or more electrochemical cells or the at least one of the one or more other electrochemical cells of the electric vehicle while the electric vehicle is moving. In some embodiments, the one or more other electrochemical cells are electrically coupled to the one or more electrochemical cells. In some embodiments, the first charge transfer rate is larger than the second charge transfer rate. In some embodiments, the charge transfer element is configured to be in electrical communication with the at least one of the one or more electrochemical cells and the at least one of the one or more other electrochemical cells. In some embodiments, the charge transfer element is further configured to: establish an electrical connection between the charge transfer element and another charge transfer element of the other electric vehicle, select, based at least upon one or more characteristics of the power plant of the other electric vehicle, the at least one of the one or more electrochemical cells or the at least one of the one or more other electrochemical cells, and establish electrical communication between the selected at least one electrochemical cell of the electric vehicle and the charge transfer element. In some embodiments, the charge transfer element is configured to cause a replenishing supply of the electrical charge to be communicated from the selected at least one electrochemical cell, through the charge transfer element, to another charge transfer element of the other electric vehicle. In some embodiments, the multi-level battery system of the electric vehicle is configured to cause a further replenishing supply of the electrical charge to be communicated from a non-selected at least one electrochemical cell, through the selected at least one electrochemical cell, through the charge transfer element, and to the other charge transfer element of the other electric vehicle.

According to a second embodiment, a method can be provided for mobile charging between electric vehicles while the electric vehicles travel along a route, the method comprising: providing a first electric vehicle comprising: at least one first electrochemical cell having a first charge transfer rate, at least one second electrochemical cell having a second charge transfer rate less than the first charge transfer rate, and a first charge transfer element configured to select one of the at least one first electrochemical cell or the at least one second electrochemical cell into which to charge electrical charge or from which to discharge electrical charge; the method further comprising: establishing an electrical connection between the first charge transfer element and a second charge transfer element of a second electric vehicle; selecting, based at least in part upon a charge rate of at least one third electrochemical cell of the second electric vehicle, from among the at least one first electrochemical cell and the at least one second electrochemical cell, at least one electrochemical cell; in an instance in which the first electric vehicle is being charged by the second electric vehicle, causing communication of a replenishing supply of the electrical charge from the third electrochemical cell of the second electric vehicle, through the second charge transfer element, through the first charge transfer element, and into the at least one electrochemical cell of the first electric vehicle; and, in an instance in which the second electric vehicle is being charged by the first electric vehicle, causing communication of the replenishing supply of the electrical charge from the at least one electrochemical cell of the first electric vehicle, through the first charge transfer element, through the second charge transfer element, and into the third electrochemical cell of the second electric vehicle. In some embodiments, the method can further comprise receiving charge transfer instructions comprising an indication of a vehicle identification, a current speed, a current location, and a current overall charge level of the second electric vehicle, the charge transfer instructions further comprising an indication of the third charge transfer rate for the third electrochemical cell of the second electric vehicle. In some embodiments, the at least one first electrochemical cells are electrically coupled to the at least one second electrochemical cells, and the method can further comprise: in an instance in which the charge transfer instructions indicate the first electric vehicle is to charge the second electric vehicle while the electric vehicles travel along the route, said selecting comprises selecting the at least one first electrochemical cell as the at least one electrochemical cell, and a first charge level of the at least one first electrochemical cell is less than a second charge level of the at least one second electrochemical cell, causing communication of the replenishing supply of the electrical charge from the at least one second electrochemical cell into the at least one first electrochemical cell before communicating the replenishing supply of electrical charge from the at least one first electrochemical cell, through the first and second charge transfer elements, and into the third electrochemical cell of the second electric vehicle. In some embodiments, the at least one first electrochemical cells are electrically coupled to the at least one second electrochemical cells, and the method can further comprise: in an instance in which the charge transfer instructions indicate the first electric vehicle is to be charged by the second electric vehicle while the electric vehicles travel along the route, said selecting comprises selecting the at least one first electrochemical cell as the at least one electrochemical cell, and a first charge level of the at least one first electrochemical cell is greater than a second charge level of the at least one second electrochemical cell, causing communication of an initial supply of the electrical charge from the first electrochemical cell to the second electrochemical cell before receiving the replenishing supply of the electrical charge from the at least one third electrochemical cell of the second vehicle, through the first and second charge transfer elements, and into the first electrochemical cell of the first electric vehicle.

According to a third embodiment, a method can be provided for mobile charging between electric vehicles while the electric vehicles travel along a route, the method comprising: providing a first electric vehicle comprising: at least one first electrochemical cell having a first charge transfer rate, at least one second electrochemical cell having a second charge transfer rate less than the first charge transfer rate, and a first charge transfer element configured to select one of the at least one first electrochemical cell or the at least one second electrochemical cell into which to charge electrical charge or from which to discharge electrical charge; the method further comprising: establishing an electrical connection between the first charge transfer element and a second charge transfer element of a second electric vehicle; selecting, based at least in part upon a charge rate of at least one third electrochemical cell of the second electric vehicle, from among the at least one first electrochemical cell and the at least one second electrochemical cell, at least one electrochemical cell; in an instance in which the first electric vehicle is being charged by the second electric vehicle, causing communication of a replenishing supply of the electrical charge from the third electrochemical cell of the second electric vehicle, through the second charge transfer element, through the first charge transfer element, and into the at least one electrochemical cell of the first electric vehicle; and, in an instance in which the second electric vehicle is being charged by the first electric vehicle, causing communication of the replenishing supply of the electrical charge from the at least one electrochemical cell of the first electric vehicle, through the first charge transfer element, through the second charge transfer element, and into the third electrochemical cell of the second electric vehicle. In some embodiments, the method can further comprise: receiving charge transfer instructions comprising an indication of a vehicle identification, a current speed, a current location, and a current overall charge level of the second electric vehicle, the charge transfer instructions further comprising an indication of the third charge transfer rate for the third electrochemical cell of the second electric vehicle. In some embodiments, the at least one first electrochemical cells are electrically coupled to the at least one second electrochemical cells, and the method can further comprise: in an instance in which the charge transfer instructions indicate the first electric vehicle is to charge the second electric vehicle while the electric vehicles travel along the route, said selecting comprises selecting the at least one first electrochemical cell as the at least one electrochemical cell, and a first charge level of the at least one first electrochemical cell is less than a second charge level of the at least one second electrochemical cell, causing communication of the replenishing supply of the electrical charge from the at least one second electrochemical cell into the at least one first electrochemical cell before communicating the replenishing supply of electrical charge from the at least one first electrochemical cell, through the first and second charge transfer elements, and into the third electrochemical cell of the second electric vehicle. In some embodiments, the at least one first electrochemical cells are electrically coupled to the at least one second electrochemical cells, and the method can further comprise: in an instance in which the charge transfer instructions indicate the first electric vehicle is to be charged by the second electric vehicle while the electric vehicles travel along the route, said selecting comprises selecting the at least one first electrochemical cell as the at least one electrochemical cell, and a first charge level of the at least one first electrochemical cell is greater than a second charge level of the at least one second electrochemical cell, causing communication of an initial supply of the electrical charge from the first electrochemical cell to the second electrochemical cell before receiving the replenishing supply of the electrical charge from the at least one third electrochemical cell of the second vehicle, through the first and second charge transfer elements, and into the first electrochemical cell of the first electric vehicle.

According to a fourth embodiment, a method can be provided that comprises: receiving, from a plurality of mobile battery-powered entities, battery configuration information, battery charge level information, a current location, a current speed, and a destination; generating, based at least upon the battery charge level, the current location, the current speed, and the destination of the plurality of mobile battery-powered entities, a charge distribution map; designating, based at least upon the current battery charge level and the battery configuration information, one or more mobile battery-powered entities of the plurality of mobile battery-powered entities as charge donors; designating, based at least upon the current battery charge level and the battery configuration information, one or more other mobile battery-powered entities of the plurality of mobile battery-powered entities as charge recipients; determining an optimal route for each of the plurality of mobile battery-powered entities; and generating, based at least upon the optimal route for the plurality of mobile battery-powered entities, the designated charge recipients and the battery configuration information, charge transfer instructions for one or more of the charge donors and/or the charge recipients. In some embodiments, the charge transfer instructions comprise one or more of a current position of the corresponding mobile battery-powered entity, a current charge level for the corresponding mobile battery-powered entity, a charge capacity for the corresponding mobile battery-powered entity, a charge transfer rate capacity for the corresponding mobile battery-powered entity, charging cable configurational information for the corresponding mobile battery-powered entity, transport speed information for the corresponding mobile battery-powered entity, pre-determined route information for the corresponding mobile battery-powered entity, a destination for the corresponding mobile battery-powered entity, vehicle identification information for the corresponding mobile battery-powered entity, or charge transfer payment information for the corresponding mobile battery-powered entity. In some embodiments, the method can further comprise: identifying, based at least upon the charge distribution map, one or more charge deficient regions; and causing deployment of at least one charging vehicle or a mobile charging station. In some embodiments, each of the plurality of mobile battery-powered entities is selected from among battery-powered terrestrial vehicles, battery-powered aerial vehicles, battery-powered aquatic vehicles, charge relay vehicles, mobile charging stations, and charge storage vehicles. In some embodiments, the method can further comprise: receiving, from the plurality of mobile battery-powered entities, updated battery configuration information, updated battery charge level information, an updated current location, an updated current speed, and an updated destination; and updating the charge distribution map.

According to a fifth embodiment, a method for distributing charge within a system of battery-powered vehicles can be provided, the method comprising: receiving current position information, current speed information, destination information, battery confirmation information, and current charge level data for a plurality of mobile battery-powered entities; and determining route instructions, speed instructions, and charge transfer instructions for each of the plurality of mobile battery-powered entities based at least upon one or more of the current position information, the current speed information, the destination information, the battery confirmation information, and the current charge level data. In some embodiments, the method can further comprise: generating, based at least upon at least the current position information, the destination information, and the current charge level data, for the plurality of mobile battery-powered entities, a charge distribution map. In some embodiments, the charge transfer instructions comprise one or more of a current position of the corresponding mobile battery-powered entity, a current charge level for the corresponding mobile battery-powered entity, a charge capacity for the corresponding mobile battery-powered entity, a charge transfer rate capacity for the corresponding mobile battery-powered entity, charging cable configurational information for the corresponding mobile battery-powered entity, transport speed information for the corresponding mobile battery-powered entity, pre-determined route information for the corresponding mobile battery-powered entity, a destination for the corresponding mobile battery-powered entity, vehicle identification information for the corresponding mobile battery-powered entity, or charge transfer payment information for the corresponding mobile battery-powered entity. In some embodiments, each of the plurality of mobile battery-powered entities is selected from among battery-powered terrestrial vehicles, battery-powered aerial vehicles, battery-powered aquatic vehicles, charge relay vehicles, mobile charging stations, and charge storage vehicles.

According to a sixth embodiment, an apparatus can be provided that comprises at least one processor and at least one memory including computer program code, the at least one memory and the computer program code configured to, with the processor, cause the apparatus to carry out at least one of the method of the first embodiment, the method of the second embodiment, the method of the third embodiment, the method of the fourth embodiment, and/or the method of the fifth embodiment.

According to a seventh embodiment, an apparatus can be provided that comprises at least one processor and at least one memory including computer program code, the at least one memory and the computer program code configured to, with the processor, cause the apparatus to at least: receive, from a plurality of mobile battery-powered entities, battery configuration information, battery charge level information, a current location, a current speed, and a destination; generate, based at least upon the battery charge level, the current location, the current speed, and the destination of the plurality of mobile battery-powered entities, a charge distribution map; designate, based at least upon the current battery charge level and the battery configuration information, one or more mobile battery-powered entities of the plurality of mobile battery-powered entities as charge donors; designate, based at least upon the current battery charge level and the battery configuration information, one or more other mobile battery-powered entities of the plurality of mobile battery-powered entities as charge recipients; determine an optimal route for each of the plurality of mobile battery-powered entities; and generate, based at least upon the optimal route for the plurality of mobile battery-powered entities, the designated charge recipients and the battery configuration information, charge transfer instructions for one or more of the charge donors and/or the charge recipients. In some embodiments, the at least one memory and the computer program code are configured to, with the processor, cause the apparatus to at least: transmit the route instructions and speed instructions to one or more mobile battery-powered entities of the plurality of mobile battery-powered entities; determine whether the one or more mobile battery-powered entities have complied with the route instructions and the speed instructions; and, in an instance in which the one or more mobile battery-powered entities have complied with the route instructions and the speed instructions, transmit the charge transfer instructions to the one or more mobile battery-powered entities. In some embodiments, the at least one memory and the computer program code are configured to, with the processor, cause the apparatus to at least: identify, based at least upon at least the charge distribution map, one or more charge deficient regions within the charge distribution map; and, in an instance in which one or more charge deficient regions exist, transmit deployment instructions and charge replenishment instructions to one or more charging vehicles or mobile charging stations.

According to an eighth embodiment, a computer program product, such as a computer program product comprising a non-transitory computer readable medium storing computer readable instructions, the computer readable instructions operable to cause an apparatus, such as the apparatus of the sixth embodiment or the apparatus of the seventh embodiment, to carry out at least one of the method of the first embodiment, the method of the second embodiment, the method of the third embodiment, the method of the fourth embodiment, and/or the method of the fifth embodiment.

According to a ninth embodiment, a multi-level battery for an electric vehicle is provided. In some embodiments, the multi-level battery can comprise: a first level comprising one or more first batteries having a first charge transfer rate and a first charge capacity; a second level comprising one or more second batteries having a second charge transfer rate different from the first charge transfer rate and a second charge capacity different from the first charge capacity; a charge transfer element in electrical communication with the one or more first batteries, the one or more second batteries, and an external charge source, the charge transfer element being configured to electrically couple the power plant of the electric vehicle to a power plant of another electric vehicle, whereby the charge transfer element can cause an electrical charge to be communicated into or out of the at least one of the one or more electrochemical cells or the at least one of the one or more other electrochemical cells of the electric vehicle while the electric vehicle is moving; and a battery management system configured to monitor a charge level in the one or more first batteries and the one or more second batteries, cause communication of the electrical charge into or out of at least one of the one or more first batteries, at least one of the one or more second batteries, the external charge source, and/or a powertrain of the electric vehicle. In some embodiments, the external charge source comprises one or more of: a stationary charging station, a mobile charging station, another electric vehicle, a charging drone, or a wireless charging transmitter.

According to a tenth embodiment, a method can be carried out that comprises: determining a first set of battery characteristics related to battery architecture; optimizing the first set of battery characteristics based at least upon at least one of: budget requirements, chemical compatibility requirements, and electrical requirements; determining, based at least upon the optimized first set of battery characteristics, a second set of battery characteristics; optimizing the second set of battery characteristics based at least upon at least one of: use requirements, space requirements, and structural requirements; and providing a battery architecture recommendation comprising the optimized first set of battery characteristics and the optimized second set of battery characteristics. In some embodiments, one or more of the first set of battery characteristics or the second set of battery characteristics comprise one or more of: a number of layers, a number of batteries per layer, a composition of each battery in each layer, a battery structure, a charge capacity, a charge transfer rate, a topology, a wiring type, a wiring configuration, a wiring material, a battery packing configuration, and one or more failure modes.

According to an eleventh embodiment, a method can be carried out that provides: determining a current charge level of each battery in a multi-level battery system; in an instance in which the current charge level of a first battery in a first level of the multi-level battery system is below a level-specific current threshold and the current charge level of a second battery in a second level of the multi-level battery system is above the level-specific current threshold, causing transfer of charge from the second battery to the first battery; and in an instance in which the current charge level of the first battery in the first level of the multi-level battery system is below the level-specific current threshold and no other battery of the multi-level battery system has sufficient charge to provide charge to the first battery, receiving, at a current exchange mechanism of the multi-level battery system, charge from an external charge source.

To provide an overall understanding, certain illustrative embodiments have been described; however, it will be understood by one of ordinary skill in the art that systems, apparatuses, and methods described herein can be adapted and modified to provide systems, apparatuses, and methods for other suitable applications and that other additions and modifications can be made without departing from the scope of systems, apparatuses, and methods described herein.

The embodiments described herein have been particularly shown and described, but it will be understood that various changes in form and details may be made. Unless otherwise specified, the illustrated embodiments can be understood as providing exemplary features of varying detail of certain embodiments, and therefore, unless otherwise specified, features, components, modules, and/or aspects of the illustrations can be otherwise combined, separated, interchanged, and/or rearranged without departing from the disclosed systems or methods. Additionally, the shapes and sizes of components are also exemplary and unless otherwise specified, can be altered without affecting the scope of the disclosed and exemplary systems, apparatuses, or methods of the present disclosure.

Conventional terms in the field of electrochemical cells have been used herein. The terms are known in the art and are provided only as a non-limiting example for convenience purposes. Accordingly, the interpretation of the corresponding terms in the claims, unless stated otherwise, is not limited to any particular definition. Thus, the terms used in the claims should be given their broadest reasonable interpretation.

Although specific embodiments have been illustrated and described herein, it will be appreciated by those of ordinary skill in the art that any arrangement that is adapted to achieve the same purpose may be substituted for the specific embodiments shown. Many adaptations will be apparent to those of ordinary skill in the art. Accordingly, this application is intended to cover any adaptations or variations.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements or any relative order of operations or organization on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure and is submitted with the understanding that it will not be used to interpret or limit the scope or meaning of the claims.

In this Detailed Description, various features may have been grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments may be combined with each other in various combinations or permutations. The scope of the embodiments should be determined with reference to the appended claims, along with the full scope of equivalents to which such claims are entitled.

The invention claimed is:

1. A power plant for an electric vehicle, the power plant comprising:
    one or more first electrochemical cells having a first charge transfer rate and a first charge capacity;
    one or more second electrochemical cells having a second charge transfer rate less than the first charge transfer rate and a second charge capacity different from the first charge capacity;
    a charge transfer element in electrical communication with the one or more first electrochemical cells and the one or more second electrochemical cells, the charge transfer element being configured to electrically couple the power plant of the electric vehicle to a second power plant of a second electric vehicle, whereby the charge transfer element is configured to cause an electrical charge to be communicated into or out of at least one of the one or more first electrochemical cells or at least one of the one or more second electrochemical cells of the electric vehicle; and
    a battery management system configured to
        determine a current charge level in the one or more first electrochemical cells and the one or more second electrochemical cells,
        determine a charge requirement of the electric vehicle based on the current charge level in the one or more first electrochemical cells and the one or more second electrochemical cells and a projected route to a destination associated with the electric vehicle,
        receive route information associated with the second electric vehicle,
        determine, based at least on the charge requirement of the electric vehicle and the route information associated with the second electric vehicle, an available inter-vehicle charge duration,
        in an instance in which the available inter-vehicle charge duration is less than a predetermined threshold, cause communication of the electrical charge from the second power plant in the second electric vehicle into the one or more second electrochemical cells, and
        in an instance in which the available inter-vehicle charge duration is equal to or greater than the predetermined threshold, cause communication of the electrical charge from the second power plant in the second electric vehicle into the one or more first electrochemical cells.

2. The power plant of claim 1, wherein the one or more second electrochemical cells are electrically coupled to the one or more first electrochemical cells.

3. The power plant of claim 1, wherein the charge transfer element is configured to be in electrical communication with the one or more first electrochemical cells and the one or more second electrochemical cells.

4. The power plant of claim 3, wherein the charge transfer element is configured to:
    establish an electrical connection between the charge transfer element and a second charge transfer element of the second electric vehicle,
    receive, from the second electric vehicle, a recharge request,
    select, based at least upon one or more characteristics of the second power plant of the second electric vehicle, at least one of the one or more first electrochemical cells or at least one of the one or more second electrochemical cells to provide a replenishing supply of the electrical charge to the second power plant of the second electric vehicle, and
    cause establishment of an electrical communication between the selected at least one electrochemical cell of the electric vehicle and the second charge transfer element of the second electric vehicle via the charge transfer element of the electric vehicle.

5. The power plant of claim 4, wherein the power plant of the electric vehicle is configured to cause a further replenishing supply of the electrical charge to be communicated from a non-selected at least one electrochemical cell, through the selected at least one electrochemical cell, through the charge transfer element, and to the second charge transfer element of the second electric vehicle.

6. A method for charging a power plant of an electric vehicle, the power plant comprising:
- at least one first electrochemical cell having a first charge transfer rate,
- at least one second electrochemical cell electrically coupled to the at least one first electrochemical cell, the at least one second electrochemical cell having a second charge transfer rate less than the first charge transfer rate,
- a charge transfer element electrically coupled to the at least one first electrochemical cell, the first charge transfer element being configured to select one of the at least one first electrochemical cell or the at least one second electrochemical cell into which to communicate an electrical charge or from which to discharge the electrical charge, and
- a battery management system in operable communication with the charge transfer element, the method comprising:
  - determining a current charge level in the at least one first electrochemical cell and the at least one second electrochemical cell,
  - determining a charge requirement of the electric vehicle based on the current charge level in the at least one first electrochemical cell and the at least one second electrochemical cell and a projected route to a destination associated with the electric vehicle,
  - receiving route information associated with a second electric vehicle within a predetermined distance of the electric vehicle,
  - determining, based at least on the charge requirement of the electric vehicle and the route information associated with the second electric vehicle, an available inter-vehicle charge duration,
  - in an instance in which the available inter-vehicle charge duration is less than a predetermined threshold, causing communication of the electrical charge from a second power plant in the second electric vehicle into the at least one second electrochemical cell via the charge transfer element, and
  - in an instance in which the available inter-vehicle charge duration is equal to or greater than the predetermined threshold, causing communication of the electrical charge from the second power plant in the second electric vehicle into the at least one first electrochemical cell via the charge transfer element.

7. The method of claim 6, wherein the at least one first electrochemical cells are electrically coupled to the at least one second electrochemical cells.

8. The method of claim 7, further comprising:
- determining a charge transfer rate of a second power plant in the second electric vehicle; and
- determining a charge capacity of the at least one first electrochemical cell and a charge capacity of the at least one second electrochemical cell.

9. The method of claim 8, wherein said determining the charge requirement is based at least upon one or more of:
- the destination and the route of the electric vehicle,
- a destination and a route of the second electric vehicle,
- a discharge rate from the power plant to the electric vehicle during operation of the electric vehicle,
- the charge level of the at least one first electrochemical cell and the charge level of the at least one second electrochemical cell,
- a first charge transfer rate associated with the at least one first electrochemical cell and a second charge transfer rate associated with the at least one second electrochemical cell,
- the charge transfer rate of the second power plant in the second electric vehicle, or
- the available inter-vehicle charge duration, wherein the available inter-vehicle charge duration is a maximum duration of time for which the second electric vehicle can be electrically coupled to the charge transfer element of the electric vehicle.

* * * * *